US008933904B2

(12) United States Patent
Maloney et al.

(10) Patent No.: US 8,933,904 B2
(45) **Date of Patent: *Jan. 13, 2015**

(54) TRANSACTION AUTOMATION AND ARCHIVAL SYSTEM USING ELECTRONIC CONTRACT DISCLOSURE UNITS

(71) Applicant: Reynolds & Reynolds Holdings, Inc., Dayton, OH (US)

(72) Inventors: William C. Maloney, Atlanta, GA (US); Mark A. Singleton, Brasselton, GA (US)

(73) Assignee: Reynolds & Reynolds Holdings, Inc., Dayton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/012,146

(22) Filed: Aug. 28, 2013

(65) Prior Publication Data

US 2014/0168178 A1 Jun. 19, 2014

Related U.S. Application Data

(63) Continuation of application No. 13/273,268, filed on Oct. 14, 2011, now Pat. No. 8,547,356, which is a continuation of application No. 12/559,675, filed on Sep. 15, 2009, now Pat. No. 8,194,045, which is a (Continued)

(51) Int. Cl.
*G09G 5/00* (2006.01)
*G06Q 10/00* (2012.01)

(Continued)

(52) U.S. Cl.
CPC ................ *G06Q 10/00* (2013.01); *G06Q 30/00* (2013.01); *G06Q 40/12* (2013.01); *G06F 3/03545* (2013.01); *G06F 3/0412* (2013.01)
USPC ............ 345/173; 345/689; 705/342; 705/346

(58) Field of Classification Search
CPC ..... G06F 3/041; G06F 3/0412; G06F 3/0488; G06F 3/04883; G06F 3/04845; G06F 2200/1614; G06Q 30/00; G06Q 30/06; G06Q 30/0601
USPC ............... 345/156–179, 649, 689; 178/18.01, 178/18.03; 705/1.1, 5, 6, 35, 342, 346
See application file for complete search history.

(56) References Cited

U.S. PATENT DOCUMENTS

| | | | |
|---|---|---|---|
| 2,131,145 | A | 9/1938 | Schlack et al. |
| 4,878,553 | A | 11/1989 | Yamanami et al. |

(Continued)

FOREIGN PATENT DOCUMENTS

| | | |
|---|---|---|
| WO | WO 97/09687 | 3/1997 |
| WO | WO 00/16280 | 3/2000 |

(Continued)

OTHER PUBLICATIONS

Cintiq 18SX Interactive Pen Display Installation Guide and User's Manual, 2002, WACOM Co. Ltd., 62 pages.

(Continued)

*Primary Examiner* — Regina Liang

(74) *Attorney, Agent, or Firm* — Womble Carlyle Sandridge & Rice LLP

(57) ABSTRACT

A transaction automation and archival system is provided for controlling, real-time logging, and archiving complex commercial transactions such as the purchase and financing of an automobile. An electronic contract disclosure unit or ECDU includes a digitizing video display for imaging the various documents involved in the transaction and a digitizer for allowing participants to sign, indicate choices, and otherwise interact directly on documents and images presented on the display. A computer controls the progress of the transaction, controlling, for example, the order of presentation of documents to a vehicle purchaser, receiving signatures on the displayed documents, offering choices of various packages to the purchaser, and insuring that the transaction is carried out properly. The transaction is logged for future review which may include a video record. One or more fingerprint readers allow participants to select between options while simultaneously verifying the identity of the individual making the selection.

17 Claims, 101 Drawing Sheets

Related U.S. Application Data continuation of application No. 11/339,812, filed on Jan. 25, 2006, now abandoned.

(60) Provisional application No. 60/647,569, filed on Jan. 27, 2005, provisional application No. 60/663,801, filed on Mar. 21, 2005, provisional application No. 60/675,116, filed on Apr. 27, 2005, provisional application No. 60/691,681, filed on Jun. 17, 2005, provisional application No. 60/734,546, filed on Nov. 8, 2005.

(51) Int. Cl.

| | |
|---|---|
| ***G06Q 30/00*** | (2012.01) |
| ***G06Q 40/00*** | (2012.01) |
| ***G06F 3/0354*** | (2013.01) |
| ***G06F 3/041*** | (2006.01) |

(56) References Cited

U.S. PATENT DOCUMENTS

| | | | | |
|---|---|---|---|---|
| 4,988,837 | A | 1/1991 | Murakami et al. | |
| 4,999,461 | A | 3/1991 | Murakami et al. | |
| 5,028,745 | A | 7/1991 | Yamanami et al. | |
| 5,038,023 | A | 8/1991 | Saliga | |
| 5,059,749 | A | 10/1991 | Murakami et al. | |
| 5,195,133 | A | 3/1993 | Kapp et al. | |
| 5,511,148 | A | 4/1996 | Wellner | |
| 5,576,502 | A | 11/1996 | Fukushima et al. | |
| 5,589,856 | A | 12/1996 | Stein et al. | |
| 5,600,105 | A | 2/1997 | Fukuzaki et al. | |
| 5,672,852 | A | 9/1997 | Fukuzaki et al. | |
| 5,679,930 | A | 10/1997 | Katsurahira | |
| 5,691,748 | A | 11/1997 | Fukuzaki | |
| 5,751,229 | A | 5/1998 | Funahashi | |
| 5,801,628 | A | 9/1998 | Maloney | |
| 5,878,403 | A | 3/1999 | DeFrancesco et al. | |
| 5,988,908 | A | 11/1999 | Kageyama et al. | |
| 5,997,200 | A | 12/1999 | Kageyama et al. | |
| 6,005,555 | A | 12/1999 | Katsurahira et al. | |
| 6,064,426 | A | 5/2000 | Waterman | |
| 6,075,441 | A | 6/2000 | Maloney | |
| 6,195,005 | B1 | 2/2001 | Maloney | |
| 6,204,764 | B1 | 3/2001 | Maloney | |
| 6,232,876 | B1 | 5/2001 | Maloney | |
| D444,331 | S | 7/2001 | Maloney | |
| 6,262,664 | B1 | 7/2001 | Maloney | |
| 6,317,044 | B1 | 11/2001 | Maloney | |
| D456,852 | S | 5/2002 | Maloney | |
| 6,392,543 | B2 | 5/2002 | Maloney | |
| 6,407,665 | B2 | 6/2002 | Maloney | |
| D460,782 | S | 7/2002 | Hudson | |
| 6,424,260 | B2 | 7/2002 | Maloney | |
| 6,427,913 | B1 | 8/2002 | Maloney | |
| 6,501,379 | B2 | 12/2002 | Maloney | |
| 6,587,841 | B1 | 7/2003 | DeFrancesco et al. | |
| 6,611,810 | B1 | 8/2003 | Kolls | |
| 6,693,538 | B2 | 2/2004 | Maloney | |
| 6,707,380 | B2 | 3/2004 | Maloney | |
| 6,707,381 | B1 | 3/2004 | Maloney | |
| 6,727,817 | B2 | 4/2004 | Maloney | |
| 6,812,838 | B1 | 11/2004 | Maloney | |
| 6,867,695 | B2 | 3/2005 | Prado et al. | |
| 6,891,473 | B2 | 5/2005 | Maloney | |
| 6,906,694 | B2 | 6/2005 | Iwamoto et al. | |
| 6,933,928 | B1 | 8/2005 | Lilienthal | |
| 6,958,698 | B2 | 10/2005 | Maloney | |
| 6,966,495 | B2 | 11/2005 | Lynggaard et al. | |
| 7,005,984 | B2 | 2/2006 | Maloney | |
| 7,046,145 | B2 | 5/2006 | Maloney | |
| 7,049,961 | B2 | 5/2006 | Maloney | |
| D522,235 | S | 6/2006 | Kell et al. | |
| 7,109,864 | B2 | 9/2006 | Maloney | |
| 7,116,228 | B1 | 10/2006 | Singleton | |
| 7,152,802 | B2 | 12/2006 | Kell et al. | |
| 7,202,785 | B2 | 4/2007 | Maloney | |
| 7,250,865 | B2 | 7/2007 | Maloney | |
| 7,317,393 | B2 | 1/2008 | Maloney | |
| 7,336,174 | B1 | 2/2008 | Maloney | |
| 7,342,494 | B2 | 3/2008 | Maloney | |
| 7,420,546 | B2 | 9/2008 | Abdallah et al. | |
| 7,965,190 | B2 | 6/2011 | Maloney | |
| 8,194,045 | B1 | 6/2012 | Maloney | |
| 8,228,299 | B1 | 7/2012 | Maloney | |
| 8,531,424 | B1 | 9/2013 | Maloney | |
| 8,547,356 | B2 * | 10/2013 | Maloney et al. | 345/173 |
| 2001/0022552 | A1 | 9/2001 | Maloney | |
| 2002/0075154 | A1 | 6/2002 | Maloney | |
| 2002/0087555 | A1 | 7/2002 | Murata | |
| 2002/0145520 | A1 | 10/2002 | Maloney | |
| 2002/0153418 | A1 | 10/2002 | Maloney | |
| 2003/0132297 | A1 | 7/2003 | McCall et al. | |
| 2003/0184525 | A1 * | 10/2003 | Tsai | 345/173 |
| 2003/0201321 | A1 | 10/2003 | Maloney | |
| 2003/0210229 | A1 | 11/2003 | Nishimura et al. | |
| 2004/0021570 | A1 | 2/2004 | Maloney | |
| 2004/0036663 | A1 | 2/2004 | Bevers et al. | |
| 2004/0095241 | A1 | 5/2004 | Maloney | |
| 2004/0111323 | A1 | 6/2004 | Niederland et al. | |
| 2004/0229560 | A1 | 11/2004 | Maloney | |
| 2005/0040232 | A1 | 2/2005 | Maloney | |
| 2005/0243073 | A1 | 11/2005 | Hashimoto et al. | |

FOREIGN PATENT DOCUMENTS

| | | |
|---|---|---|
| WO | WO 00/16281 | 3/2000 |
| WO | WO 00/16282 | 3/2000 |
| WO | WO 00/16284 | 3/2000 |
| WO | WO 00/16564 | 3/2000 |

OTHER PUBLICATIONS

Route One speed.access.simplicity, “Get your dealership on the right route” 11 pages.
PCMAG, “Hands on With ‘Microsoft Surface’: The Coffee-Table PC”, May 2007, 14 pages.
www.quickmenusolutions.com, Mar. 2005, 4 pages.
Coin Financial Systems, Inc., An Introduction to Coin, 1988, 152 pages (front & back).
Picture of Pac-Man game, 1 page.
APC, “Biopod Quick Installation Guide”, 2003, American Power Conversion, 4 pages.
Intuos (WACOM), “For the Serious Photographer, Designer, and Artist”, 2 pages.
“The evolution of the notebook PC”, 2005, Microsoft Windows XP Tablet PC Edition, 2 pages.
Creative Webcam Notebook, 2003, Creative Technology Ltd., pp. 1-5.
WD Passport, Mar. 2005, Western Digital, 6 pages.
“GPS 18 OEM”, Apr. 2005, Garmin Ltd., 2 pages.
User’s Manual, Digital Writing System 2004, Logitech io2, 12 pages.
Digital Notebook, 2003, MeadWestvaco Corporation, 23 pages.
Motion Computing M1400 Tablet PC User Guide, 2004, Motion Computing, Inc., 89 pages.
“Deal Jacket” dated Jul. 2001.

* cited by examiner

Transaction Log

| Document ID (Location Coded Dot Pattern ID) | Document Description | Time/Date Printed | Time/Date Retrieved from Scanning Pen | Status |
|---|---|---|---|---|
| ZFD893 | Simpson, Disclosure | 1:15 pm Aug 9, 2003 | | Expired |
| ABC456 | Smith, Contract Page 1 | 4:52 pm Oct 1, 2003 | 5:15 pm Oct 1, 2003 | Completed |
| BDC242 | Smith, Contract Page 2 | 4:53 pm Oct 1, 2003 | 5:15 pm Oct 1, 2003 | Completed |
| DGF013 | Smith, Disclosure Page 1 | 4:54 pm Oct 1, 2003 | 5:16 pm Oct 1, 2003 | Completed |
| ZFD893 | Jones, Contract Page 1 | 5:01 pm Oct 1, 2003 | | In Use |
| YDR792 | Jones, Contract Page 2 | 5:01 pm Oct 1, 2003 | | In Use |
| TRE543 | Jones, Disclosure Page 1 | 5:01 pm Oct 1, 2003 | | In Use |
| ABC456 | Johnson, Disclosure | 5:30 pm Oct 1, 2003 | | In Use |

Figure 23

Forms Log

| Document ID (Location Coded Dot Pattern ID) | Document Description | Status |
|---|---|---|
| ABC456 | Contract Page 1 | Used |
| ZFD893 | Contract Page 1 | Used |
| BDC242 | Contract Page 2 | Used |
| YDR792 | Contract Page 2 | Used |
| POT982 | Contract Page 2 | Not-Used |
| RTF216 | Contract Page 2 | Not-Used |
| DGF013 | Disclosure Page 1 | Used |
| TRE543 | Disclosure Page 1 | Used |
| QTR456 | Disclosure Page 1 | Used |
| HGF389 | Disclosure Page 1 | Not-Used |

Transaction Log

| Document ID (Location Coded Dot Pattern ID) | Document Description | Customer | Time/Date Printed | Time/Date Retrieved from Scanning Pen | Status |
|---|---|---|---|---|---|
| TRE543 | Disclosure Page 1 | Simpson | 1:15 pm Aug 9, 2003 | | Expired |
| ABC456 | Contract Page 1 | Smith | 4:52 pm Oct 1, 2003 | 5:15 pm Oct 1, 2003 | Completed |
| BDC242 | Contract Page 2 | Smith | 4:53 pm Oct 1, 2003 | 5:15 pm Oct 1, 2003 | Completed |
| DGF013 | Disclosure Page 1 | Smith | 4:54 pm Oct 1, 2003 | 5:16 pm Oct 1, 2003 | Completed |
| ZFD893 | Contract Page 1 | Jones | 5:01 pm Oct 1, 2003 | | In Use |
| YDR792 | Contract Page 2 | Jones | 5:01 pm Oct 1, 2003 | | In Use |
| TRE543 | Disclosure Page 1 | Jones | 5:01 pm Oct 1, 2003 | | In Use |
| QTR456 | Disclosure Page 1 | Johnson | 5:30 pm Oct 1, 2003 | | In Use |

Figure 24

1. Deal Gets entered into F&I system

2. Deal gets stored in In-house accounting system/Dealership management system (DMS)

3. ECDU session begins and a Deal number, stock number, or other Deal identification is entered 4. ECDU sends a request to the Data Handling system 5. Data Handling System (DHS) copies deal information from In-House Accounting System 6. Either the ECDU or data Handling system determines from the deal information which contract and disclosures are required.

7. These electronic contracts and disclosure are received or downloaded from the appropriate Contract and Disclosure provider, i.e. Manufactures, Financial Institutions, insurance company, Repository, or Contract Disclosure originator/supplier.

8. These electronic disclosures and contracts are completed on ECDU, i.e. Agreed to, Disclosed, executed, data captured, and session recorded. If any of the electronic Contract and disclosure is not completed or rejected, this particular session is aborted and ECDU returns back to the beginning point of the overall ECDU session.

9. Optionally or required, the ECDU outputs a copy, i.e. printed hard copy, soft copy saved to DVD/CD, and/or transmitted soft copy to personal intelligent device.

10. Optionally or required, the ECDU transmits the completed ECDU session data i.e. completed contracts, disclosure, captured data, and recorded data, selections, calculations, to the Data Handling system and/or DMS in whole or in part.

11. The ECDU and/or Data Handling System stores and transmits the Session data, through the Internet to a Data Repository 12. The Data Repository System receives and stores the session data in a secure database.

13. Data Repository systems normalizes and formats data if needed

14.Session data is made available in whole or in part to any authorized entities, i.e. financial institutions, financial participants, contract parties, manufactures, credit Bureaus, follow-up services, suppliers, and vendors as authorized in whole or in part.

Figure 39

1. Deal Gets entered into F&I system

2. Deal gets stored in In-house accounting system/Dealership management system (DMS)

3. Data Handling System (DHS) copies deal information from In-House Accounting system/ Dealership Management System (DMS)

4. ECDU session begins and a Deal number, stock number, or other Deal identification is entered 5. ECDU sends a request to the Data Handling system 6. Either the ECDU or Data Handling System determines from the deal information which contract and disclosures are required.

7. These electronic contracts and disclosure are received or downloaded from the appropriate Contract and Disclosure provider, i.e. Manufactures, Financial Institutions, insurance company, Repository, or Contract Disclosure originator/supplier.

8. These electronic disclosures and contracts are completed on ECDU, i.e. Agreed to, Disclosed, executed, data captured, and session recorded. If any of the electronic Contract and disclosure is not completed and/or rejected, this particular session is aborted and ECDU returns back to the beginning point of the overall ECDU session.

9. Optionally or required, the ECDU outputs a copy, i.e. printed hard copy, soft copy saved to DVD/CD, and/or transmitted soft copy to personal intelligent device.

10. Optionally or required, the ECDU transmits the completed ECDU session data i.e. completed contracts, disclosure, captured data, and recorded data, selections, calculations, to the Data Handling system and/or DMS in whole or in part.

11. The ECDU and/or Data Handling System stores and transmits the Session data, through the Internet to a Data Repository 12. The Data Repository System receives and stores the session data in a secure database.

13. Data Repository systems normalizes and formats data if needed

14.Session data is made available in whole or in part to any authorized entities, i.e. financial institutions, financial participants, contract parties, manufactures, credit Bureaus, follow-up services, suppliers, and vendors as authorized in whole or in part.

Figure 40

1. Deal gets entered into the integrated F&I/ECDU system

2. Deal gets stored in In-house accounting system/Dealership management system (DMS)

3. ECDU/F&I system copies any additional deal information needed from In-House Accounting system/ Dealership Management System (DMS)

4. Contract and Disclosure session begins

5. The ECDU determines from the deal information, which contract, and disclosures are required.

6. These electronic contracts and disclosure are received or downloaded from the appropriate Contract and Disclosure provider, i.e. Manufactures, Financial Institutions, insurance company, Repository, or Contract Disclosure originator/supplier.

7. These electronic disclosures and contracts are completed on ECDU, i.e. Agreed to, Disclosed, executed, data captured, and session recorded. If any of the electronic Contract and disclosure is not completed and/or rejected, this particular session is aborted and ECDU returns back to the beginning point of the overall Contract and disclosure session for different package/ option selection.

8. Optionally or required, the ECDU outputs a copy i.e. printed hard copy, soft copy saved to DVD/CD, and/or transmitted soft copy to personal intelligent device.

9. Optionally or required, the ECDU transmits the completed ECDU session data i.e. completed contracts, disclosure, captured data, and recorded data, selections, calculations, to the Data Handling system and/or DMS in whole or in part.

10. The ECDU and/or the Data Handling System stores and transmits the Session data, through the Internet to a Data Repository 11. The Data Repository System receives and stores the session data in a secure database.

12. Data Repository systems normalizes and formats data if needed

13.Session data is made available in whole or in part to any authorized entities, i.e. financial institutions, financial participants, contract parties, manufactures, credit Bureaus, follow-up services, suppliers, and vendors as authorized in whole or in part.

Figure 41

1. Deal gets entered into F&I system

2. Deal gets stored in Dealership management system (DMS)

3. Optionally or required, the Credit application is captured and Verified (Tablet, Scanning Pen or scanner) by ECDU, F&I, or other dealership systems.

4. Optionally or Required, Credit Application is transmitted to financial participants and/or Data repository 5. ECDU Menu session begins 6. Deal information is re-entered or received from F&I/DMS/in-house accounting system 7.Menu session is completed, i.e. Presented, Disclosed, Calculated (if required), agreed to, executed, session recorded. If calculations are required, the calculation can be performed by ECDU (Factor based calculation and/or Formula based) or can be performed on the F&I/DMS.

8. The calculated results are saved back into the relevant systems (i.e. F&I and/or DMS)

9. The Contract and disclosure and other required docs like odometer, manufacture statement of origin (MSO), Tag and Title, insurances policies, credit life, extended warranty and any other purchased products are printed if needed. These Documents are printed using one or more of the appropriate systems (ECDU, F&I, and/or DMS).

10. These printed Contracts and disclosures and other required contracts are completed on Coded documents using the scanning pen, i.e. Filled-out, Agreed to, Disclosed, executed (i.e. signed), data captured, and session recorded.

11. The scanning pen transfer the captured handwriting to the ECDU and/or F&I system.

12. The Documents are reviewed on the ECDU and/or F&I system. System analyses and insures all paper documents required have been scanned. If any of the documents aren't complete or missing, the system will prompt and wait for the completion or missing documents.

13. Optionally or required, the ECDU outputs a copy, i.e. printed hard copy, soft copy saved to DVD/CD, and/or transmitted soft copy to personal intelligent device.

14. Optionally or required, the ECDU or F&I/DMS transmits the completed ECDU session data i.e. completed contracts, disclosure, captured data, and recorded data to the Data Handling system or the designated financial participant in whole or in part.

15. Session Data is transmitted through the Internet to a Data Repository.

16. The Data Repository System receives and stores the session data in a secure database.

17. Data Repository systems normalizes and formats data if needed. Analysis is performed on received session data if desired.

18. Session data is made available in whole or in part to any authorized entities, i.e. financial institutions, contract parties, manufactures, credit Bureaus, follow-up services, suppliers, and vendors as authorized in whole or in part.

Figure 42

1. Transaction get entered into POS system

2. If a Contract and/or Disclosure is necessary a ECDU session begins

3. Either the POS or ECDU determines from the Transaction information, which contract and disclosures are required.

4. These electronic contracts and disclosure are received or downloaded from the appropriate Contract and Disclosure provider, i.e. Manufactures, Financial Institutions, insurance company, Repository, POS Corporate System, or Contract Disclosure originator/supplier.

5. These electronic disclosures and contracts are completed on ECDU, i.e. Agreed to, Disclosed, executed, data captured, and session recorded. If any of the electronic Contract and disclosure is not completed or rejected, this particular session is aborted and ECDU returns back to the beginning point of the overall Contract and disclosure session for different package/ option selection.

6. Optionally or required, the ECDU outputs a copy, i.e. printed hard copy, soft copy saved to DVD/CD, and/or transmitted soft copy to personal intelligent device.

7. Optionally or required, the ECDU transmits the completed ECDU session data i.e. completed contracts, disclosure, captured data, and recorded data, selections, calculations, to the Data Handling system and/or in-house accounting system in whole or in part.

8. The ECDU and/or Data Handling System stores and transmits the Session data, through the Internet to a Data Repository 9. The Data Repository System receives and stores the session data in a secure database.

10. Data Repository systems normalizes and formats data if needed

11.Session data is made available in whole or in part to any authorized entities, i.e. financial institutions, financial participants, contract parties, manufactures, credit Bureaus, follow-up services, suppliers, and vendors as authorized in whole or in part.

Figure 43

| Deal Label | Purchase (Y/N) | Parties (#) | Consumer Stylus Interaction Time (s) | Employee Stylus Interaction Time (s) | Product Segment Time (s) | Consumer Speaking Time (s) | Employee Speaking Time (s) | Glossary lookups (Item) | AD Eye Focus Time (s) | Biofeed Back (peak pulse) |
|---|---|---|---|---|---|---|---|---|---|---|
| ABC123 | Y | 1 | 32 | 43 | 320 | 32 | 127 | Powertrain | 145 | 72 |
| BGD478 | Y | 1 | 35 | 40 | 489 | 27 | 121 | | 159 | 80 |
| CFY5653 | N | 2 | 16 | 45 | 250 | 45 | 135 | | 51 | 95 |
| GHI334 | Y | 2 | 40 | 38 | 289 | 63 | 127 | Powertrain | 167 | 70 |
| TGW276 | N | 1 | 17 | 67 | 198 | 34 | 92 | | 38 | 103 |

Figure 97

Script Builder

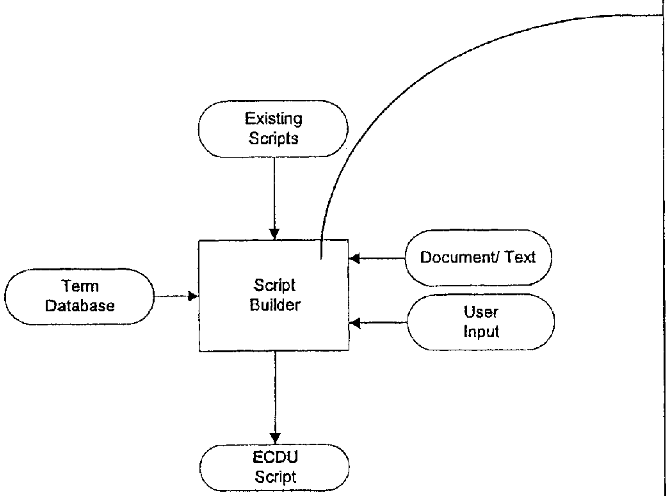

- AutoFormat
- Create Blank Script, Load Existing Script, or Template
- Import Text
- Apply Default Formatting
- Auto Build Glossary Based on Term Database
- Edit Glossary
- Format Text
- Insert Biometric Tool
- Insert Signature Tool
- Insert Still Picture Capture
- Insert Video Tool capture
- Insert Popup Window
- Insert Video Conference tool
- Preview ECDU Script
- Insert Magnifier Tool
- Insert Audio Tool
- Insert Alternative Language tool
- Activate Script Wizard
- Insert Graphic Capture Tool
- Insert OCR Capture Tool
- Insert Text Capture Tool
- Insert Timer Tool
- Insert Voice Capture Tool
- Insert Bio Feedback Tool
- Insert Scanner Tool
- insert Video AD Tool
- Insert Information Tool
- Insert Informational Video Tool
- Insert AD Tool
- Insert Hard Copy Tool
- Insert Comprehension Tool
- Insert Progression Tool
- Insert GPS capture
- Insert Stylus Setup
- Insert Motion Capture
- Insert Scanning Pen Capture

Figure 98

ECDU Session Transaction

ECDU DATA

| | 1 | 2 | 3 | 4 | Next |
|---|---|---|---|---|---|
| Type | Type | Type | Type | Type | |
| Fingerprint | Fingerprint | Fingerprint | Fingerprint | Fingerprint | |
| Pulse | Reading | Reading | Reading | Reading | |
| Signature | Signature | Signature | Signature | Signature | |
| Signature Speed | Speed | Speed | Speed | Speed | |
| Picture | Picture | Picture | Picture | Picture | |
| Voice Name Print | Speech | Speech | Speech | Speech | |
| Disclosure Rate | Rate | Rate | Rate | Rate | |
| Contract | Contract | Contract | Contract | Contract | |
| Driver's License # | Data | Data | Data | Data | |
| Location | Location | Location | Location | Location | |
| Voice | Sound | Sound | Sound | Sound | |
| ECDU Serial ID | Data | Data | Data | Data | |
| Phone Number | Number | Number | Number | Number | |
| Other | Data | Data | Data | Data | |

Figure 101

TRANSACTION AUTOMATION AND ARCHIVAL SYSTEM USING ELECTRONIC CONTRACT DISCLOSURE UNITS

RELATED APPLICATIONS

This application is a continuation of U.S. Non-Provisional application Ser. No. 13/273,268, filed Oct. 14, 2011; which application is a continuation of U.S. Non-Provisional application Ser. No. 12/559,675, filed Sep. 15, 2009, now U.S. Pat. No. 8,194,045; which application is a continuation of U.S. Non-Provisional application Ser. No. 11/339,812, filed Jan. 25, 2006, now abandoned; which application claims the benefit of U.S. Provisional Application Nos. 60/647,569, filed Jan. 27, 2005; 60/663,801, filed Mar. 21, 2005; 60/675,116, filed Apr. 27, 2005; 60/691,681, filed Jun. 17, 2005; and 60/734,546, filed Nov. 8, 2005, the entire contents of these applications being hereby incorporated by reference as if presented herein.

TECHNICAL FIELD

This invention relates generally to commercial transactions and more particularly to the automation, logging, and archiving of the stages of commercial transactions such as the closing of vehicle sales at automotive dealerships, and to control of the collaborative space within which parties to a transaction participate. The invention incorporates a transaction automation and archival system and methodology, the heart of which is the electronic contract disclosure unit, referred to herein as the "ECDU."

BACKGROUND OF THE INVENTION

Currently, customers and businesses complete transactions in a very manual, informal, rushed, often incomplete fashion except for the signed document. At the center of such transactions are contracts and disclosures. An example of such a transaction is the closing of a vehicle sale at an automotive dealership, although many other types of transactions are contemplated herein. Contracts and disclosures are manually prepared prior to the transaction typically using pre-printed forms, are manually presented to the consumer in a paper format, and are manually executed by the parties by initialing and signing various locations. During this execution of the contract, it is common that a lot of informal communication occurs that is not recorded or preserved. Because these documents are often long, complicated, utilize small print, and depend upon hard to understand legal language, the business employee managing the transaction often endeavors to simplify and speed up the process by explaining the content verbally. Invariably, such verbal explanations lack the formal content and legally required disclosures in the written document and no record is kept of the explanations to prove otherwise. Additionally, the business employee often is not adequately trained to explain the contract and disclosures, thus leading to misrepresentations, frequent disputes about what was or was not disclosed, and generally poor customer satisfaction. Because no record of this manual and verbal informal transaction is made, the business is compelled to spend a lot of time and money training the employees to represent products, contracts, and disclosures in an accurate, consistent, and fair manner. Even then, misrepresentation, misunderstanding, and disputes can and do occur.

In a society dominated by ever increasing legal complexity—agreements required to document transactions between parties, especially of the preprinted variety, are difficult to understand and are frequently 'explained' or 'disclosed' by legally unqualified individuals. Additionally, preprinted paper documents are prone to revisions that either become out of date or improperly used or completed. At the same time, many transactions, such as consumer installment loans, now require even more specific explanation and disclosures due to increasingly restrictive and complex legal regulations. Also, agreements increasingly are being disclosed to individuals from whom English is not their first language or where cultural differences make verbal requests for simpler explanations difficult and unlikely.

Clearly, providing qualified legal advice in a multitude of languages isn't practical or even possible with the volume of transactions that take place on a daily basis. Even where transactions are properly disclosed and documented, disagreements can later arise where a party claims something did or did not take place relying on recollection and/or completed documents to 'refresh' poor memories. Further, even as technology is more frequently used to eliminate the problems of paper-based documentation, that same technology introduces yet a new generation of problems and legal challenges. Examples of electronically created issues are authentication of the parties, verification of technical abilities of signatories, and even documenting the willingness of parties to accept and use technology. Examples of some of the new regulations include the E-Sign Law, Federal Reserve Regulation B, Universal Electronic Transactions Act (UETA), and the Gramm-Leach-Bliley Act. Lastly, technological alternatives to paper-based methodologies require increasingly complex networks, storage and retrieval methods, and present a host of security and fraud issues. There is a need to address these and other problems and shortcomings.

The prior art includes various attempts, devices, software packages, and methodologies for addressing bits and pieces of the formidable problems and shortcomings inherent in historical and traditional ways of managing a commercial transaction. In the automotive industry, for instance, software packages such as an e-contracting system known as "Dealer Track" are used to help arrange financing and electronically capture signatures for loan and lease contracts at automotive dealerships. For the most part, these systems implement web-based applications on a traditional computer used by automotive dealership personnel to obtain, print out, present, and/or have executed the variety of documents and disclosures involved in the sale and financing of a vehicle. In some cases where signatures are captured electronically, these systems may incorporate an electronic signature pad for capturing and digitizing a purchaser's signature at various junctures during the transaction, but the pad is merely a blank area where a user signs to have his or her signature captured. However, much of the process is still paper based, the transaction is not captured and archived for later review or confirmation, and lacks insurable consistency from transaction to transaction.

More specifically, the Dealer Track e-contracting software mentioned above is a web-based application that prints out contracts and disclosures on paper, which are then reviewed by a purchaser and perhaps explained by a salesman in the traditional way. A purchaser then indicates his understanding and agreement by signing a stand alone blank electronic signature pad. A computer captures the signature, applies it electronically to the document to which it pertains, and prints out the document again with the electronic signature applied. Clearly, such a methodology retains many of the problems of traditional paper documents, and also introduces problems of its own. For instance, paper is still the medium of presentation and explanation, the problems with inaccurate and incomplete verbal explanations still exists, and the paper documents are required to be printed twice. In addition, the purchaser has no assurance that the signature that is scribed on the electronic signature pad is in fact being paired with or properly applied on the document for which it is intended, which is confusing and can lead to misunderstanding and disputes.

The prior art also generally includes electronic pads typical of those found at retail establishments. These pads may include a card swipe slot and a touch screen and are coupled to the cash register, and thereby to a retail establishment's central accounting computer. Such electronic pads are used to allow a customer to pay for merchandise with a debit or credit card by swiping the card, confirming a transaction amount, selecting among various options such as "cash back," and confirming the transaction by signing the screen. The customer's signature is digitized as authorization to charge his or her credit card. Such systems are rudimentary and provide very little in the way of disclosure management and nothing in the way of contract document management and transaction archiving. These systems are used for the simplest of transactions where there is a single agreement with a single signature approval response, no options from which to choose, and little or no room for misunderstanding or erroneous disclosure.

The prior art further includes devices and methods for digitizing portions of a paper transaction. These devices and methods include, for example, digitizer pads and position-coded paper for use with a scanning electronic pen. With digitizer pads, a piece of paper to be written or drawn upon can be secured atop the pad and then written or drawn on with a traditional or special pen. The underlying digitizer pad has a sensor array that continuously detects the position of the pen tip and digitizes writing, check marks, or signatures of the individual filling out the paper form. This information can then be transferred to an electronic version of the paper form for electronic storage and retrieval. U.S. Pat. No. 6,906,694 of Iwamoto et al. and assigned to Wacom Co. of Japan discloses an example of a prior art digitizer pad.

In contrast to digitizer pads, position-coded paper solutions include paper documents that are printed with a background of small, almost imperceptable, dots arrayed in unique recognizable patterns. An electronic pen is used to fill out the document. As the electronic pen moves over the surface of the paper, a small camera in its tip "watches" the dot pattern moving under the pen. From the dot pattern, it can be determined where on the paper the pen tip is at any moment. This electronic information, then, can be used to recreate the motions of the pen and thereby digitize all information applied in writing to the paper by the user of the pen. In some cases, the electronic pen is connected to a computer for near real time digitization of written information, and in other cases a docking station is provided that retrieves stored information from the pen after use to recreate and digitize writing previously applied to the coded surface paper. An example of this technology may be found in U.S. Pat. No. 6,966,495 of Lyggaard et al, which is assigned to Anoto AB. Also, the LogiTech 102 Digital Writing System available from LogiTech Designs of Fremont, Calif. is an example of a prior art digitizer pen input system of this type.

The prior art also includes devices and methodologies for recording all or a portion of a financial transaction. Everyone is familiar, for example, with ATM machines that include video cameras. The cameras usually are positioned behind a glass plate and capture a video image of each person who approaches and uses the ATM machine. Such systems generally are very rudimentary in that the video is not linked electronically to the transaction and, if needed, is recovered by a time search of the video data. ATM machines also generally include only button initiated responses and are not suitable for transactions requiring even a small amount of sophistication.

The prior art, of course, has long included paper and computer menus, which can be used to present options and/or disclosures to a user, such as the purchaser of a vehicle, in a consistent way. However, there is no assurance or confirmation with such menus that a customer actually reads them, or that if they are read, that they are understood. In fact, it has been observed that many people when presented with a menu of disclosures or options does not read them at all. This can be detrimental in a complex transaction such as the sale and purchase of a vehicle where, in many cases, the salesperson skips quickly through such menus and they are not read. Many disputes arise later when it is claimed by a purchaser that certain required disclosures or options were not adequately presented during the transaction.

Still further, the prior art includes tablet and laptop personal computers (PCs) and other electronic devices for general use in a wide variety of applications. Some more recent computers are provided with a fingerprint reader that is used for identification and verification of a user attempting to log on to the system. To the best of the inventor's knowledge, however, the fingerprint readers of such machines are not used for any other purposes. For example, they are not used as a general input device that can be integrated into software applications to, for example, indicate acceptance or rejection of an option or proposition while simultaneously verifying identity. No machine is known that incorporates more than one fingerprint reader. Fingerprint readers also are provided as stand alone input devices for computers that can be connected, for instance, via USB port. Such readers traditionally are used for identification and log-on purposes, just as the built-in readers of more recent laptop computers.

A wide variety of electronic F&I (finance and insurance) management systems exist in the prior art, particularly for use by automotive dealerships and banks, one such system having been offered for many years by Coin Financial Systems located in the State of Georgia, U.S.A. Such systems typically are centered around an extensive data base of various forms, legally required disclosures, promotional offers, add-on package presentations, and the like. While these systems aid in organizing and selecting appropriate forms, they nevertheless are rather unsophisticated and do not themselves direct and manage a transaction. Further, there have been no provisions for insuring that a customer is actually presented with all required options, proper disclosures and documents, or that they are read and understood. Transactional archiving is limited to raw data and/or documentation with no audit trail to insure sales persons acted appropriately.

Increasingly, tablet computers are being used by professionals such as doctors in their offices to input information about patients in real time. The information is then catalogued, indexed, and organized for easy access and cross referencing with other data bases such as a patient's history, allergy records, current medications, and the like. However, such uses only automate an otherwise manual process and are not used to control, manage, or aid in the transaction between two individuals.

From the forgoing, it can be seen that there has been progress in the simplification and automation of financial and other types of commercial transactions, particularly since the advent of the personal computer. That progress has been generally limited to administrative support of a single user. However, there is still a need for a comprehensive transaction automation system for complex commercial transactions such as the closing of a sale, lease, and/or financing of a vehicle at an automotive dealership. Such a system should have the capability to control and manage the entire transaction, including the presentation of legal disclosures, contracts, lease agreements, financing arrangements, and the various options related thereto to a buyer. It should generally provide for a highly interactive shared workspace between all parties to the transaction and positively identify and verify these parties. This should be done in a completely consistent and proven manner to insure that all information is provided to the buyer utilizing best practices. The system should insure that each document presented to the buyer is read and understood by the buyer in order to prevent later disputes involving a buyer's claim that certain terms, conditions, and/or disclosures were not provided. The entire transaction should be recorded and archived for potential use at a later date to reconstruct exactly what occurred during the original transaction. The system also should integrate automatically with third party participants, such as finance companies and insurance companies, so that transactions have the benefit of real time accurate information upon which decisions are to be made. It is to the provision of a transaction automation, real time transaction logging, and archival system that provides these and many more beneficial features and advantages that the present invention, in its various embodiments described below, is primarily directed.

BRIEF SUMMARY OF THE INVENTION

Briefly described, the present invention, which may be manifested in many embodiments, is a comprehensive and all encompassing transaction automation, real time logging (recording in real time), and archival system and methodology for precise management of a complex commercial transaction, such as the sale of a vehicle. In one embodiment, the heart of the device of the invention is a tablet PC that is programmed to carry out accurately, completely, and in the correct order, all stages of the commercial transaction. The tablet PC may be enclosed or encased in a housing that includes a wide variety of accessories, the combination of which gives rise to the system of the invention. For instance, the housing preferably includes at least two fingerprint readers adjacent areas of the PC screen where options are presented. Options are selected or questions answered by placing a finger on the appropriate reader. This action both answers the question and confirms via fingerprint that it is, in fact, the customer answering the question. Other accessories may include a video camera and/or microphone for recording the transaction, an audio speaker for reading documents out loud, a card swiper, a scanner, a printer, a wireless unit, and others, all described in detail below. During a transaction, the unit may slide between the participants. All documents of the transaction are presented on the screen, signatures are captured on the screen, options are presented on the screen, and legally required disclosures are presented on the screen. Any or all of these also may be read aloud. The entire transaction is captured via video and audio for future use if necessary. It will thus be seen that an entire commercial transaction is managed, properly completed, and recorded and archived by the transaction automation and archival system of the present invention. The system is described more fully as follows.

The collaborative transaction volume (CTV) is a three-dimensional space between or within which the parties to a transaction participate; typically a business employee and a customer. FIG. 1 portrays the CTV 11 of an Electronic Contract Disclosure Unit (ECDU) 10 according to this invention. In the preferred embodiment, the ECDU 10 is used to control, standardize, improve and record activities or events that occur within the CTV 11. The ECDU 10 controls and standardizes the CTV 11 by electronically presenting the transaction materials (e.g. advertisements, menus, contracts, disclosures, etc) to the participants in the transaction (e.g. a consumer and business employee) in a consistent manner. In fact, the entire transaction between a business employee 13 and a customer 14 within the CTV 11 is controlled by the ECDU 10. Further, remote participants such as financial institutions, insurance companies, and add-on suppliers are brought virtually into the CTV via the Internet. The interactivity of the ECDU 10 improves the transaction by providing language translation capability, standardized help and glossaries, graphical visual aids and multimedia support. The connectivity of the ECDU 10 allows additional parties to the transaction to be virtually present within the CTV. These additional parties include insurance companies, financial institutions, manufacturers, etc. The complete ECDU record contains a wealth of information that benefits all parties to the transaction. This complete record includes the identity of the parties, the environment (audio, video, temperature, position, demeanor, etc), the presented material, and the executed documents. The record allows the transaction to be virtually recreated. For example, the business can review the transaction to insure that business representatives are following policies and procedures and effectively using the sales tools. The customer's response to the sales tools can be used to evaluate products and how they are offered, explained, and advertised. Product vendor/manufacturers can review the customer complete reactions to their products.

One embodiment of the present invention relates to data capture using specialized data entry technology, like electronic tablets, scanning pens, digitizers, ultrasonic pens, and other capture devices, or any future devices with such capabilities, and/or data extracted from one or more systems used to 'fill in the blanks' of preprinted and/or electronic forms. Most importantly, the captured data includes signatures, biometrics, camera images and/or video, and audio of one or more parties to a transaction.

A person inputting information in one embodiment is biometrically authenticated using one or more means and/or answering questions using one or more separate devices. The ECDU 10 includes devices for biometric authentication comprising fingerprint reader(s), camera(s), microphones or other voice capture devices. Other forms of authentication include password entry devices, signature capture devices, etc.

A person executing contracts and disclosures using one embodiment of the present invention may validate that each screen was read and understood. The validation process uses one or more biometric devices comprising fingerprint readers, camera(s), microphone capture, password entry, signature capture, etc. In one embodiment, multiple biometric readers are used to simplify the validation process—one for biometric 'accepts/agrees/ok,' and one for biometric 'declines/disagrees/no.' Specifically, two fingerprint readers are deployed for this function in one embodiment of the present invention.

Contracts and disclosure statements are displayed in one embodiment using emphasis tools to highlight important information (e.g. important terms and conditions) in contractually or legally binding agreements. Translated versions are available to non-native speakers, audio outputs (read-out-loud) functionality may be available to assist visually impaired users or others.

Further documenting a transaction by recording and/or preserving environmental and/or transaction derived metrics such as time spent on various documents or sections within documents, physical metrics of the device user such as pulse, eye blinks or movement, eye focusing point, or facial expressions are used in one embodiment of the invention.

Storing and securing all transaction based information and metrics taken or derived enables 'replicating' transaction circumstances, 'state of mind' information, or the surrounding environmental information at a later date.

Another embodiment of the present invention relates to a system designed to build, maintain, and distribute documents that utilizes technology for simplification or highlighting (emphasized) information necessary to more fully understand and/or complete transaction documents.

One embodiment involves a centralized repository processing system (RPS) that acts as a single-stop, computerized location for interfacing ECDUs to participants (e.g. lenders, suppliers, etc.).

In order to verify understanding, such as monitoring screen interaction to ensure the user has spent adequate time on each screen, processes are carried out by prompting the user to circle key information (e.g., number of payments) to insure that he understands the key information contained in the agreement. In addition, the user is required to verify information by re-entering it via typing, writing, or speaking key information.

The present invention in one embodiment relates to a hardware device that performs the electronic disclosures and aids in executing and completing contracts between parties while capturing and recording both data and session metrics.

Embodiments of the invention also relate to the integrated, electronic flow of contracts and disclosures and storage in data repositories for those disclosures.

Disclosures and contracts are converted into an active (dynamic not static) format suitable for use on the hardware device in one embodiment.

Script builder software available to perform translation of paper contracts and disclosures is utilized in one embodiment of the present invention, which allows the conversion of paper contracts and disclosures into a format that is easily distributed and secured and displayed using devices with variable display real estate.

The ECDU 10 provides uniformity across contract and disclosure procedure without the need for extensive and/or costly training of personnel. The contract and disclosure procedure is defined in an electronic format at the time of creation in one embodiment.

ECDU output in one embodiment incorporates the executed contract and disclosures along with captured and recorded session data. In one embodiment, the whole session can be replayed to evaluate, measure, and review for quality control and real-time feedback.

In one embodiment, the ECDU 10 supports integrating menus of standard package offerings with contract and disclosure completion. This feature both provides additional product sales opportunities, and also notifies the consumer of all the options that are available.

In another embodiment, product advertisements are integrated into the menus, such that the consumer is made aware of the advantages of specific products, leading to increased potential sales for these products. The effectiveness of particular advertisements is monitored from ECDU session data and then documented, such that the sales cost of a given advertisement is calculated based on the placement and format for the advertisement.

In another embodiment, the interactive advantage of the ECDU is utilized in providing the consumer with a large number of choices for various financing packages and terms. For example, it can show the various payment frequencies as including not only monthly payments structures, but also annually, bi-monthly, bi-weekly, pseudo bi-weekly (monthly paid every two weeks), weekly, daily, or even quarterly. Where any of the financing packages require additional contracts and disclosures, the ECDU has the capability of automatically presenting them to the consumer, as well as executing them, if needed.

In another embodiment, the ECDU 10 provides credit application assistance. The ECDU assisted credit application process saves time, eliminates mistakes and cost of re-keying applications, and reduces risk of inadvertent disclosure of consumer financial data.

The ECDU 10 in one embodiment provides tight integration of the sales process from credit application, to package item selection and pricing, to automated disclosures, and finally to authentication of contract parties.

BRIEF DESCRIPTION OF THE DRAWINGS

FIG. 23 illustrates a dot-pattern usage and transaction log.

FIG. 24 illustrates a forms log and transaction log for pre-encoded forms.

FIG. 39 illustrates a dealership deal flow with an ECDU.

FIG. 40 illustrates a dealership deal flow with ECDU and automatic data handling system.

FIG. 41 illustrates a dealership deal flow with an integrated ECDU/F&I system and F&I system with an ECDU peripheral.

FIG. 42 illustrates a dealership deal flow with scanning pen based ECDU/F&I system.

FIG. 43 illustrates a point-of-sale (POS) transaction flow.

FIG. 97 shows ECDU product analysis metrics.

FIG. 98 illustrates a script builder.

FIG. 101 is an ECDU data pattern diagram for a single user.

DETAILED DESCRIPTION

The invention will now be described in detail, with reference being made to the above drawing figures, which illustrate preferred embodiments consider by the inventors to be the best mode of carrying out the invention disclosed herein. Several terms used in the description of the invention will first be described and/or defined to facilitate a better understanding of the invention and related discussions.

ECDU Description

Figure 2:
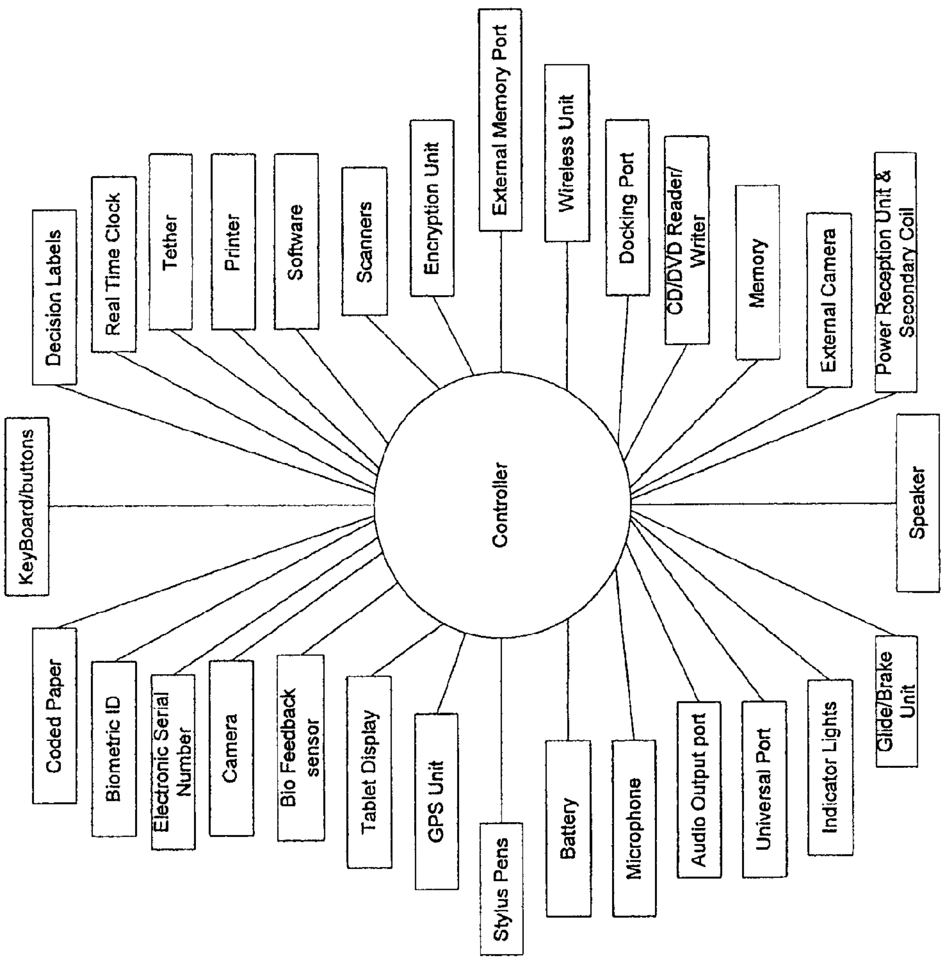
FIG. 2 is a functional component diagram of an ECDU of the invention.

The component diagram, FIG. 2, shows, in functional schematic form, some key components of the electronic contract disclosure unit (ECDU), described in substantially more detail below. The overall functional description of major components are described as follows with reference to FIG. 2.

Controller: The controller is a computer or micro-controller with its associated electronic components for basic operations (such as memory, a bus controller, etc.).

Tablet Display & Stylus Pen: The contracts and disclosures in one embodiment are made visible on the tablet display. The tablet display is composed of two major parts: the display and the digitizer. The display is either color or monochrome. The display has the typical features of computer displays—it shows text, pictures, graphics or video in nearly unlimited ways. For example, text can be highlighted using color or reverse video, text is emphasized using size and font changes, graphics is used to provide further understanding of conveyed information, etc. The tablet display in conjunction with the stylus pen or pens performs an interactive input function in one embodiment of the present invention. Specifically, the user can select, point, write, draw, or navigate with the stylus pen and tablet display to interact with software. For example, the software captures a user's signature when he/she signs the tablet display using the stylus pen. In addition, multiple tablet displays are useful in many situations; e.g. when greater visual space, multiple consumers, multiple page viewing, etc. are involved in a transaction. Moreover, both internal and external tablet displays can be used.

Multiple Stylus Pens: In one embodiment, the ECDU provides a single stylus & tablet display. In another embodiment, the ECDU is configured to recognize and allow multiple stylus pens for input. For example, one is used by the customer and another by an employee of the business who is directing a transaction. Each stylus is functional with the ECDU displaying and logging the activity of the respective pen. The allowable actions of each pen is limited by the ECDU. For example, it may be determined that only the consumer pen is allowed to sign the contract, only the business pen is allowed to activate the flip tool, navigate, etc. In one embodiment, the pens are either pre-assigned or inferred from usage. In a further embodiment using multiple stylus pens, one is used for the consumer, one for the salesman or other employee, and one for his supervisor, etc. In another embodiment, the pens are assigned by function instead of person; e.g. one pen for navigation, one pen for data entry, agreement and signing.

In one embodiment, a commercially available stylus and digitizer of the type used in tablet displays is used in the ECDU of the present invention. One provider of such components is WACOM Technology Corporation, located at 1311 SE Cardinal Court, Vancouver, Wash. 98683, USA (www-.wacom.com). It is known in the art that such commercially available stylus pen tips contain a resonant circuit at frequency $f_o$ that is sensed by a digitizer grid of electronics behind the screen. The digitizer grid electronics are complex enough to sense the difference between different resonant frequencies. In fact, the eraser at the other end of the standard commercially available stylus pen is configured with a shifted resonant frequency, $f_1$. The second stylus pen in one embodiment of the ECDU is implemented by adjusting the resonant frequency of the second pen to the $f_1$ of the eraser, and then modifying the software to interpret eraser inputs as inputs from a second stylus pen. The eraser function can also be implemented using a stylus selectable software tool (see FIG. 45). Alternatively, in further embodiments, other frequencies are used depending on the range of tablet measurable frequencies.

Alternate embodiments include a stylus with expanded functionality. Fingerprint readers are added to the stylus to capture the identity of users and perform required authentications during the ECDU session. Buttons are added to the stylus to enable advanced functions such as changing the function of the stylus from writing, to highlighting, to erasing. The stylus can communicate to the ECDU using wireless protocols such as Bluetooth, etc. During the ECDU session initialization, the user can swipe the fingerprint reader to initialize the stylus. The stylus can then transmit the biometrics information (e.g. fingerprint information) along with the stylus resonant frequency information to the ECDU. The stylus is thus assigned to the user for the duration of the session, that is, the customer can initialize one stylus and the business employee can initialize another stylus. Alternately, the stylus may communicate with the ECDU through the tablet display using modulation of the stylus resonant frequency. For example, this modulation can be a frequency shift keying (FSK) where the stylus changes between two resonant frequencies to transmit data to the ECDU.

Keyboard & Buttons: A keyboard is an input device that allows the entry of alphanumeric information. Embodiments of the present invention include use of physical, wireless, and wired keyboards, and a virtual keyboard on the tablet display. The physical keyboards embodiment includes built-in keyboards, retractable keyboards and external keyboards. Buttons are an input device that allows selection of prompted choices. The buttons can be physical buttons on the ECDU or virtual buttons on the tablet display.

Biometric ID: A biometric ID (also referred to as biometric sensor or biometric reader) is a device that provides identification using traits of an individual. A typical biometric ID is a fingerprint reader, retinal scanner, hand geometry or a voice or facial recognition device. This invention contemplates use of biometric ID. For example, a fingerprint reader can be used to document the identity of the user by recording his or her fingerprint during a session using the ECDU. For privacy/security, systems do not actually store the fingerprint image, but store an encrypted representative value based on the fingerprint image and an encryption key. Another means of recording identity in one embodiment is to record the users face and/or voice during the use of the ECDU. To facilitate use of the ECDU, a biometric device (i.e. fingerprint reader) can incorporate a switch mechanism that triggers biometric scan. Additionally, external inputs such as tablet inputs or a button press can trigger a biometric scan. With the advent of a national database of biometric IDs (e.g. fingerprints), a traceable authentication process becomes possible in one embodiment of the present invention. One provider of biometric ID is AuthenTec, Inc., of Melbourne, Fla. (www.authentec.com) that manufactures both swiping and non-swiping fingerprint reader sensors. In one embodiment, a pseudo signature biometric based on stroke characteristics including speed, pressure, direction, etc., is used.

Indicator Lights: Indicator lights in one embodiment of the ECDU are lights placed near biometric IDs or buttons to prompt the user when usage is appropriate. These lights can be LEDs or distributed, illuminated areas. Lights are activated when biometric IDs are active and ready for use. For example, in one embodiment, lights near and/or around the "Agree" biometric ID are green and those near and/or around the "Disagree" biometric ID are red. Other colors can be used depending on other factors such as local customs. The use of a color is chosen specifically to assist the user in selecting the correct biometric ID. For example in the above discussion, red, which is the universal color for stop, is associated with "Disagree", and green, which is the universal color for go, is associated with "Agree".

Decision Labels: Decision labels are labels placed near two biometric IDs. In one embodiment of the ECDU, one decision label uses affirmative words such as "Agree", "Accept", "Confirm", "Yes", "Acknowledge", "Next", etc. The other uses labels with non-affirmative words such as "Disagree", "Decline", "Deny", "No", "Unacknowledge", "Cancel", etc. Which biometric ID is "Agree" or "Disagree" can be changed based on factors such as local customs. The decision labels are fixed or are electronically changeable in various embodiments. Electronically changeable display labels (e.g. through the use of LCDs) allow the decision labels to change with the user's selected language. The design labels are colored using the same colors as the indicator lights to further aid in selection of the appropriate biometric ID.

Camera: A camera is device that records visual information. This information can be single frames or multiple frames or video. The visual information may include both visible wavelengths and non-visible wavelengths (i.e. infrared). For example, a digital camera or web cam can be used to provide this functionality, and multiple cameras can be utilized together. The camera will record the identity and activities (i.e. attention, reaction and demeanor) of the user during the ECDU session. A more specialized camera is used to record multi-spectral information. The camera in conjunction with other components can be used to provide video conferencing. In one embodiment, the camera includes advanced face tracking algorithms as well as a fish eye or wide angle lens. Even panoramic, 360 degree cameras are can be used in embodiments of the ECDU. Such fish eye, wide angle lens and/or 360 degree cameras can be used to record the conditions, influences, and environment during the ECDU session. In one embodiment the camera is also used to capture images of documents (e.g. drivers license, power bills, cancelled checks, etc). There are many camera manufacturers such as Logitech of Fremont, Calif. (www.logitech.com) that manufacture a subset of these cameras.

External Camera: In one embodiment of the ECDU, one or more additional cameras can be located external to the ECDU device, but still utilized as an integrated component. The views from the multiple cameras in one embodiment are combined to provide a panoramic view of the ECDU session. The use of both the ECDU built-in cameras and external cameras in one embodiment greatly increases the ability of the ECDU to record the conditions, influences, and environment of the ECDU session. For example, external wireless cameras placed at strategic places can be used to capture the whole ECDU session from a birds eye view, including both the setting and the various participants. Linksys, of Irvine Calif., (www.linksys.com) as well as other companies manufacture such wireless camera units.

Microphone: A microphone is a device that is used to capture sound. The microphone in one embodiment can be a small embedded microphone (e.g. like in cell phones) or an external microphone (e.g. sold at electronics stores). The microphone can record the identity and responses of the user during the ECDU session. Also, it can record any other comments or directions given verbally by others (e.g. salesman or employee) in the proximity of the ECDU. The microphone in conjunction with other components is used to provide video conferencing in one embodiment. Multiple microphones can be utilized to record environmental sounds in another embodiment. Use of voice recognition algorithms and microphones in one embodiment enables voice to be used as an input device for filling in forms, for navigation, and for acceptance/decline in selected languages.

Speaker: A speaker is a device that is used to reproduce sound. The speaker in one embodiment is an embedded speaker (e.g. AM/FM radio speaker) and/or an external speaker(s) (e.g. headphones or speakers). The ECDU can audibly read the contract and disclosure text and convey instructions to the user through the speaker, because some users may have difficulty reading due to vision or education. The speakers are also used for auditory feedback, i.e. to confirm the selection made. Changes in sound characteristics (e.g. tonal or sound levels) can be used to emphasize importance to the user. Directional speakers also can be used in one embodiment to focus sound for user privacy. Also, the speakers are an integral part of the informational videos and/or advertisements and as part of video conferencing capabilities of the ECDU.

Auxiliary I/O ports: Commonly, electronic devices provide an option to use external microphones and headphones using auxiliary jacks or plugs. For example, a noisy automotive dealership environment can be dealt with by using headphones and a clip-on microphone in one embodiment of the present invention.

Bio Feedback Sensor: A bio feedback sensor is a device that measures the current status of the user's condition in one embodiment. For example, pulse, temperature, blood pressure, and respiratory rate can be recorded. This biodata is used to indicate the user's state of mind (e.g. level of attention, interest, reaction or general stress level) during the ECDU session. A pulse rate sensor can be embedded in the ECDU handles like on exercise equipment on one embodiment. In other embodiments, the biofeedback sensor is integrated into a scanning pen or stylus. Specifically, if the user becomes agitated during the sessions, biometric indicators such as his pulse rate most likely will increase. Additionally, biofeedback can be used to ensure reception of information or to record the reaction to events (e.g. ads, video, presentation, etc.). For example, if the biodata indicates that the user was distracted or lost attention, the ECDU can repeat information or re-emphasize important subjects.

Motion Detector: A motion detector is a hardware device that is used in various embodiments to monitor the motion of the ECDU or to detect motion in the area around the ECDU device. In one embodiment, ECDU motion is monitored using chips that measure acceleration, such as chips used in car airbag deployment systems to sense the rapid stopping of the car that indicates an accident. The motion detector device can be used to detect the inactivity of the ECDU which can lead to an automatic log off. Inactivity is the lack of nearby motion within a pre-configured period of time. This process enhances security of data collected during an ECDE session.

In one embodiment, motion is detected in the area surrounding the ECDU device using acoustic or IR sensors. Acoustic sensors have long been used on cameras and robots to measure the distance to objects. If people are moving near the ECDU, the acoustic sensors observe changes. If the ECDU is left idle, then the acoustic sensors measure constant returns and then the ECDU can auto log off and secure the data. IR sensors can similarly be used to monitor the surroundings.

Glider/Brake Assembly: A glider/brake assembly is a controllable hardware device that has at least a "glide" mode and a "brake" mode. In the glide mode, the assembly slides or rolls easily across a surface. In the brake mode, the assembly does not slide or roll easily. In one embodiment, the brake mode is activated during user interaction with ECDU; e.g. during stylus interaction. When the assembly is in glide mode, the ECDU easily slides or rolls around between participants to a transaction.

Electronic Serial Number: An electronic serial number is a machine-readable sequence of symbols that is unique to each device. Approximately 4 billion devices can be individually identified by using a 32 bit number structure. In one embodiment, unique serial numbers are uploaded and applied to all of the major components for the various ECDU embodiments disclosed. These serial numbers can be used to provide an ECDU address/identifier to ensure data (e.g. contract and disclosures) is coming from registered, authorized equipment.

Real Time Clock: A real time clock is a synchronized clock that is automatically set from an external reference source. For example, the US government (National Institute of Standards and Technology (NIST) in Fort Collins, Co) transmits radio frequency (RF) signals that clocks can use to stay synchronized. In one embodiment of this invention, tamper resistant, real-time embedded clock modules are used. The ECDU can record the time/date of each significant event (e.g. contract execution) or sub-event to capture the ECDU session-time progression.

GPS Unit: A Global Positioning Satellite or GPS unit is a device that can accurately determine location to within a few meters or better of a GPS equipped device. The GPS unit determines location (space and time) from signals received from multiple, orbiting satellites. In one embodiment, the ECDU is equipped with a GPS unit so that the location and local time of the ECDU is logged during ECDU use, and operation is allowed or denied based on location. In another embodiment, assisted GPS units are used to enable operation in poor GPS reception areas. For example, ECDU use can be limited to the premises of an automobile dealership. Also, accurate logging of transaction location is useful in determining what legal jurisdiction transactions occurred in and to aid in fraud prevention. For example, in an application for the door-to-door insurance sales industry, ECDU can determine which specific forms are required for the jurisdiction in which the salesperson is located. Also, if the ECDU is stolen or lost, the GPS equipped ECDU can potentially notify the owner or authorities of its location if it is connected to the internet or even in the presence of wireless access points. USB based GPS receivers are commercially available from Garmin, Ltd. located in Olathe, Kans. 66062 (www.garmin.com).

Scanner: Multiple types of scanners exist and are used with embodiments of the present invention, including credit card type scanners that read the magnetic stripe (or strip) on the back on the card, optical scanners that read bar codes like a UPC code or 2D bar code like on some state driver's licenses, and optical scanners that digitize images such as commercially available business card scanners. As technology changes other scanners will become available and will be incorporated to read the new media. Specifically, in point-of-sale applications, a magnetic strip reader can be used to capture credit card information for credit card transactions. With increasing legal requirements, picture ID is often required and the optical scanner(s) can record a picture ID. In the future, driver's license requirements may be superceded by the need to verify passports and/or national ID cards.

A driver's license scanner is configured in one embodiment to retain the user's driver's license or other ID until the end of the session. This provides useful to force the consumer to authenticate electronically that a receipt was received, that required notices explaining why credit was denied were supplied, etc.

Optical Document Scanner: An optical document scanner is a device used for scanning sheets of paper and converting them to digital images, and may be used in embodiments of the present invention. There are two broad classes of optical document scanners: paper-port scanners, with which documents are moved across stationary scanning components to perform a scan, and flat-bed scanners, where the scanner components move across the stationary document to perform the scan. A paper port scanner is compact device that scans a sheet of paper by pulling the sheet across an optical scanning mechanism. Paper port scanners are thus more integrateable than large flat-bed type scanners. However, flat-bed scanners are nonetheless compatible for use. These digital images can be stored as is and/or converted into text using optical character recognition (OCR) algorithms or machine readable formats are read such as barcodes or other machine coding. A paper port scanner is a type of optical scanner that is commercially available for use with personal computers. A paper port scanner can be incorporated internally or externally in various embodiments of the ECDU and is useful for digitizing handwritten credit applications, pay stubs, checks, tax documents, rental or lease agreements, utility bills for proof of residence purposes, or various financial documents. Scanners are available from Visioneer, Inc. of Pleasanton, Calif. 94588 (www.visioneer.com).

Scanning Pen: A scanning pen is a device used to capture a user's handwritten responses, selections and input. Scanning pens are well known in the art and are commercially available as peripherals for PCs from manufacturers such as Logitech Incorporated, which manufactures the io2 scanning pen, and which is located at 6505 Kaiser Drive, Fremont, Calif., 94555, USA. In one embodiment of the ECDU, a scanning pen is used to digitize the consumer's handwritten data entered onto traditional paper based forms such as credit applications, printed contracts and other disclosures that include special location codes. The captured data may include all types of data entry from handwritten entries (such as address and phone numbers), menu selections (such as package selection), user signatures and interactive commands (such as requests for glossary definition, help, or informational videos, etc.). After a consumer completes a form, the consumer's digitized handwritten responses can then be transmitted to the ECDU using several different techniques, such as a scanning pen docking port or a wireless interface. Multiple scanning pens are used in one embodiment, such as one for the consumer, one for the business employee, and even special purpose pens for highlighting, etc. To prevent loss or theft, scanning pens can be tethered to the ECDU or to a clipboard in one embodiment. In one embodiment, a slide mechanism is incorporated in the tethering means, to allow the position of the scanning pen to shift between a position ideal for right-handed users and another position ideal for left-handed users. The tether is further constructed using a spring-loaded, position-locking mechanism.

Scanning pens in one embodiment, relay captured handwritten responses and selections via a buffered batch interface (using the docking station) or in near real-time using a wireless or wired interface. A wired scanning pen interface also serves the dual-purpose as a tether to prevent loss or theft. Real time use of the scanning pens, via wireless or wired interfaces, enables an interactive combination of scanning pen and ECDU functionality. For example, the user selecting a special informational video with the scanning pen can cause the ECDU to display a multimedia informational video that, for example, explains a product or service in more depth. Scanning pens using a batch mode docking station interface indicate to the user via vibration, chirping, or some other fashion that the pen requires placement in the docking station.

Enhanced scanning pens are used in one embodiment by including additional ECDU components. For example, biometric fingerprint readers can be included for user authentication, a camera can be included to photograph session participants and setting, a microphone to record verbal discussion/navigation, a speaker to provide audio prompting, a biofeedback sensor to sense user state-of-mind, an accelerometer to record gestures and motion, etc. The capabilities of the auxiliary functions are each discussed at length below. The electronics in the scanning pen can study the device data in real time for feedback and communication to the ECDU.

Multi-function scanning pens can be constructed in a double ended form in one embodiment. One end is for writing and the other end is for whiteout or highlight (selectable with a mode switch). If the whiteout mode is selected, then using the other end of the pen can simultaneously dispense physical whiteout while digitally recording that the user was whiting out (possibly erasing a previous entry). If the highlight mode is selected, then using the other end can simultaneously effect a physical highlighter (typical colors are bright yellow or green) while digitally recording the location of the highlight. This digital recording of whiting out and/or highlighting can be reflected in the ECDU session log. A single ended embodiment can be used with a function switch to change the mode from writing, to help mode, to erasing, to highlighting. In help mode, the pen state relays the next document location scanned to the ECDU for a help response. The response might be a glossary lookup or an informational video depending on context.

Special Location Coded Forms: The scanning pens discussed above require documents that include special embedded location codes. These location codes are patterns of small symbols (e.g. dots) printed on the page. In one embodiment of the present invention, the dot pattern and encoding technology of Anoto Group AB, located in Sweden (www.anoto.com) can be utilized. These patterns are codes read by the scanning pens. Some codes are coordinates on the page, while other codes are special purpose (e.g. action triggers). In the ECDU, these triggers can be used to request further information, help, glossary lookup, navigation, etc. Specifically, the Anoto dot pattern may be printed on a credit application, menuing area, signoff sheets, contracts and disclosures, or policies to enable the scanning pen to record handwritten responses (signatures, form data, selection, interactive requests, etc.).

Digitizer Grid: A digitizer grid also known simply as a digitizer is a device for capturing the location of a stylus pen within the grid. In general, there are two main approaches: passive digitizing and active digitizing. In active digitizing, the stylus contains electronics as well as the sensor grid, whereas in passive digitizing, only the sensor grid contains electronics. One embodiment uses an active, electromagnetic digitizer and compatible stylus. Electromagnetic digitizers useable with a stylus are available from WACOM Technology Corporation, located at 1311 SE Cardinal Court, Vancouver, Wash. 98683, USA (www.wacom.com).

An alternate embodiment uses an ultrasonic digitizer controller sensor and corresponding ultrasonic stylus. The ultrasonic digitizer controller sensor determines the location of the ultrasonic stylus pen by calculating the location changes in terms of sound. These components are available from Pegasus Technologies LTS of Azoor, Israel (www.pegatech.com).

Other passive digitizing technologies are used in other embodiments. These technologies comprise infrared technology, near-field imaging technology, and capacitive technology.

Wireless Unit: The wireless unit provides ECDU connectivity in one embodiment to other computers or the internet without the need for a direct wire connection. Wireless units are available as adapters (e.g. PCMCIA cards) or incorporated into the system. The ECDU connectivity includes audio, visual, data, and information exchange. For example, the ECDU exchanges contract and disclosures with connecting systems and provides video conferencing services, etc.

Printer: A printer is a device for outputting information on paper including both human and machine readable forms like bar codes and location coding dots. Printers are commercially available using multiple technologies; e.g., laser, ink-jet, and impact printers. The printer can be used to generate a hardcopy of a contract and disclosure for the user in this invention. The printer also can print on blank paper or preprinted paper forms. All paper can include the embedded coordinate codes or be printed on-the-fly by the printer. The hardcopy can include ECDU session recorded information; e.g. signatures, fingerprints, time stamps, pictures, etc. The printer can be internal or externally connected in various embodiments. External printers include those available via connectivity (i.e. LAN connected printers or systems with printers). In addition, the printer may print a machine readable document ID code onto printed pages.

Document ID Reader: A document ID reader is electronic device for reading machine readable codes or ID that identifies documents and/or unique dot papers. Electronic ID readers are commercially available; e.g. laser barcode scanners, RFID scanners, digital camera, etc. In one embodiment, the document ID reader is placed on/near the printer and the reader records the ID of each document as it is printer. In another embodiment, the document ID reader is on the ECDU digitizer units for capturing the document ID during use.

CD/DVD Reader/Writer: A CD/DVD Reader/Writer is a device that retrieves or stores data from or to disk media, respectively. Current disk formats include CD or DVD format. This reader/writer can be used to provide the user with an archival, electronic copy of the ECDU session. This disk also can include software to allow the user to review the ECDU session in a like format on his/her personal equipment (e.g. home PC). This software can mimic the graphical, video, and audio outputs of ECDU device that existed during the user ECDU session, with the full suite of interactive, help, language, glossary, and tools being made available, as well.

External Memory Port: An external memory port is a device for transferring data to or from external memory devices. For example, this can be a multi-format flash-memory media reader/writer. Also, general purpose USB ports can be used in one embodiment to interface with USB memory sticks and hard drives. This external memory port can be used to provide the user with an archival electronic copy of the contract and disclosure information. The external memory devices also can include software to allow the user to review the ECDU session in a like format on his/her personal equipment (e.g. home PC). This software can mimic the graphical, video and audio outputs of ECDU device as they existed during the user's ECDU session, with the complete availability of the full suite of interactive, help, language, glossary, and tools, etc.

Universal Port: A universal port is a general purpose I/O communication port. Standards in electronic and personal equipment change quickly; for example, serial & parallel ports, infrared, USB ports, fire-wire, USB version 2.0, etc. Over time, specific technology may change, but the purpose of the universal port will remain in various embodiments of the invention. For example, the universal port can allow a user to have an archival, electronic copy conveyed to his personal electronic device. Examples of these devices include PDAs, laptops, cell phones, IPODs, MP3 players, etc.

Docking Port: A docking port provides multiple services in one embodiment of the present invention. These services include wired connectivity to other computer systems and the internet, power for operation and battery charging, physical storage of the ECDU, and wired connections to additional peripherals.

Battery: A battery is a device that supplies stored electrical power. The ECDU and connected peripherals can draw power from the battery included in the ECDU in various embodiments. The battery is charged using external power sources, wired or wireless.

Encryption Unit: An encryption unit is a hardware device or software process used to encrypt and decrypt data. Typically, public or private key algorithms are utilized. An encryption unit can be integrated into one embodiment of the ECDU, and the encryption unit can be implemented in hardware or software. Hardware encryption units may be faster at performing encryption and decryption, while software units may have the advantage of lower cost. Hardware encryption units are commercially available in form factors that include PCMCIA cards. Additionally, hardware encryption avoids one of the major weaknesses of software based approaches; i.e. that passwords or keys can be copied or given away. Encryption products are available from CopyTele, Inc of Melville, N.Y. 11747 (www.copytele.com).

Figure 3:
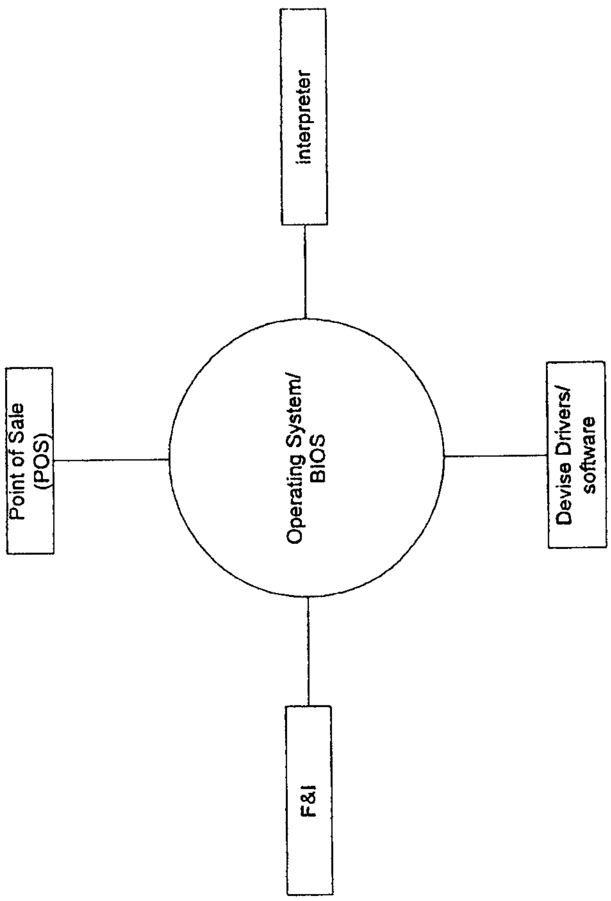
FIG. 3 is a functional base operational software component diagram of an ECDU.

Software: The ECDU contains software for low level device control, operating system software for controlling the ECDU, and application software for performing the functionality of the electronic contract disclosure. The software components are shown in the software component diagram FIG. 3. The application can run as a stand-alone application on the ECDU devices, a personal computer, and/or as a web application in whole or in part.

The various software components in embodiments of the ECDU includes:

- Operating system (OS)
- Interpreter (e.g. Browser)
- POS application (e.g. F&I)
- Device drivers and software (e.g. Tablet Display, Stylus Pen Software, Video conferencing)
- Scanning pens (e.g. handwriting capture, form data conversion to text, data & signature merging with forms)

Figure 4:
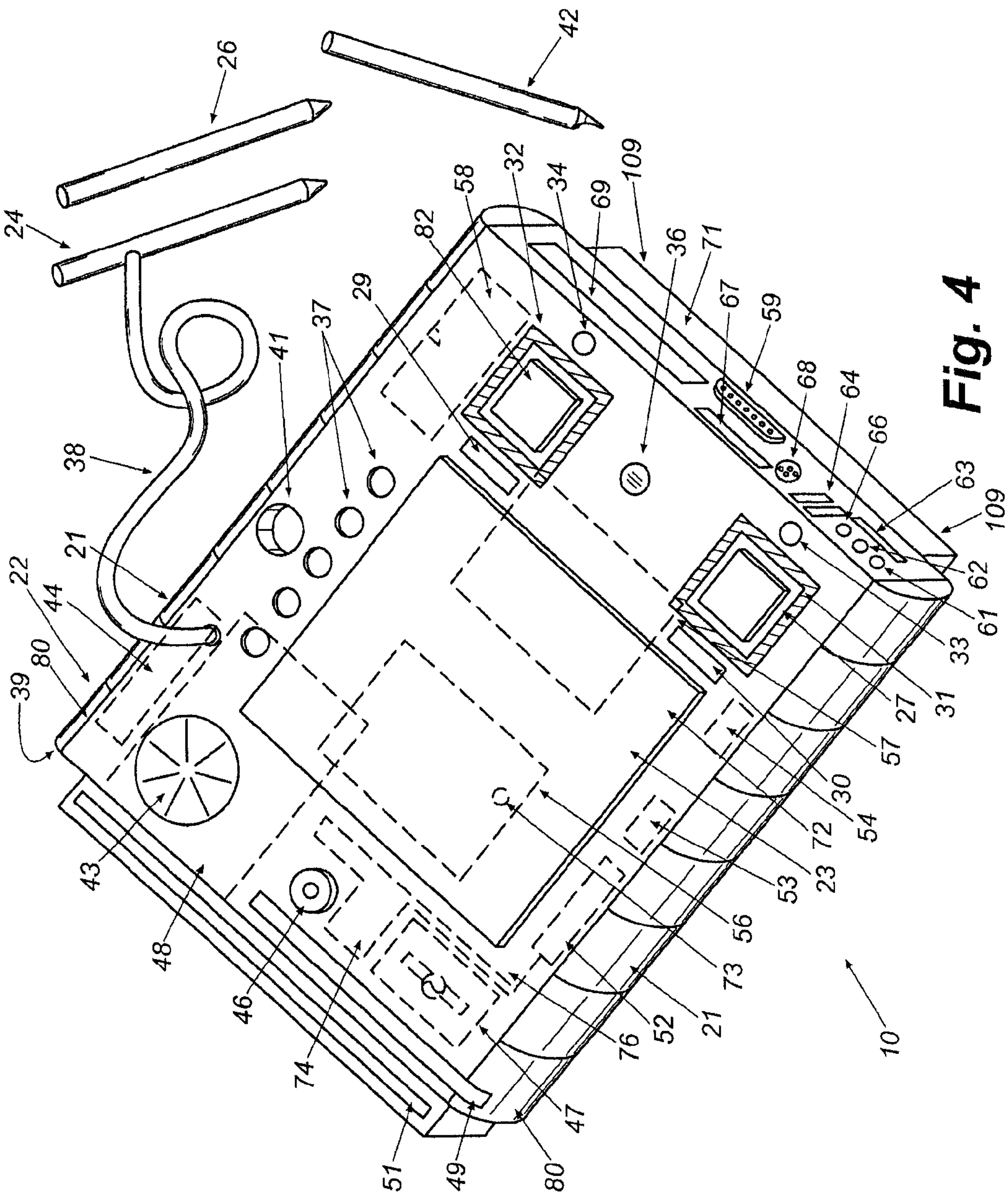
FIG. 4 is a perspective illustration of one embodiment of an ECDU according to the invention.

ECDU Embodiments:

Specific embodiments of the invention incorporating some or all of the components discussed above will now be disclosed in detail. One embodiment of the ECDU is shown in FIG. 4. As shown in the figure, the ECDU of this embodiment is a hand held, portable device. This embodiment includes all of the ECDU functionality shown in FIG. 1 and described briefly above.

The ECDU shown in FIG. 4 comprises a book sized unit that has rounded handles 80 on its sides. These handles serve multiple functions, including the obvious function of physical support, but also incorporated into the handles 80 are bio feedback sensors 21. The bio feedback sensors 21, as discussed above, monitor a user's state of mind via blood pressure, pulse, etc. The ECDU is constructed using a case/housing 22 that carries components of the ECDU and provides surfaces on which these components are accessible. Alternately, the ECDU can be embedded into desk, larger size version, or other object.

The majority of the frontal area in this embodiment is used for the tablet display 23. The tablet display 23 is used to display contracts and disclosures to users. The graphical features of the tablet display include color, blinking, etc., which are used to emphasize important information to the user. In concert with the stylus pens 24 and 26, the tablet display 23 is also used to capture the user's signature both for completing contracts and disclosures and as an additional biometric input for authentication and/or acceptance.

Around the periphery of the tablet display are located auxiliary input/output devices. Below the tablet display are located two fingerprint readers 27 and 28. In operation, these fingerprint readers are used to record a user's agreement or disagreement with contracts and specific disclosure terms.

Above the fingerprint readers in one embodiment are decision labels 29 and 30. These labels indicate the function of their associated fingerprint reader. These labels are either fixed or electronically changeable depending on the embodiment. Further, around each fingerprint reader is placed an illuminated ring (31, 32) and/or an LED (33, 34). The illuminated ring and/or LED is illuminated to indicate that the fingerprint readers are active and ready for use. For example, in one embodiment, the illuminated ring and LED of the "Agree" fingerprint reader is green, and those for the "Disagree" fingerprint reader are red, as discussed in more detail below.

Between the two fingerprint readers (27, 28) is an embedded microphone 36. In use, the microphone 36 is invaluable in recording the user's voice for authentication and other voices (e.g. business employees) and surrounding sounds, for verbal navigation, and also as a part of the video conferencing capability of the ECDU.

Along the side of the tablet display are five buttons 37 in one embodiment. These buttons are used for user input selection. Moreover, the functionality of these buttons preferably is context sensitive, with the context dependent functions being displayed to the left of each button on the tablet display. Five buttons 37 are shown for clarity, but more or less could easily be deployed. If required for data entry, a virtual keyboard can be rendered on the tablet display.

Above the reconfigurable buttons is the stylus pen attachment point 165. Because the tablet display and stylus pen are used in concert to capture user signatures, etc., the pen preferably is tethered to the ECDU with a tether 38 to prevent loss. A stylus storage slot 39 is shown at the top right of the ECDU. This storage slot is used to hold the stylus pen between usage sessions. The tethered stylus pen in one embodiment is used by a consumer during an ECDU session.

The second stylus pen 26 is used by the employee of the business in one embodiment of the ECDU. The ECDU can distinguish between inputs from the various stylus pens. Specifically, in one embodiment, the ECDU will log the inputs of each stylus pen. Also, the ECDU can restrict the actions of each stylus pen, such that, for instance, only the consumer stylus pen 24 will be allowed to sign the contract and only the business employee stylus pen 26 will be allowed to navigate, flip the display. While multiple stylus pens are used in one embodiment, the ECDU can fully function with a single stylus pen.

Also located on the right in one embodiment is the scanning pen docking port 41. A scanning pen 42, as discussed above, is a device used to capture a user's handwritten responses. In one embodiment of the ECDU, the scanning pen 42 is used to digitize the consumer's handwritten data. After a consumer completes a form, the consumer's digitized handwriting is then transmitted to the ECDU using one or more of several different techniques, such as a scanning pen docking port 41 or a wireless interface. After the pen 42 is used to fill out a form, the pen is then placed in the scanning pen docking port 41 to transfer the captured handwriting to the corresponding electronic form. The scanning pen 42 is shown on the far right hand side on FIG. 4. In alternate embodiments, the pens are wireless, and the docking station is useful for recharging and to insure the pen is returned.

In the top right of the ECDU is an embedded speaker 43. The embedded speaker 43 provides the ECDU the capability to use audio prompting of questions, to read screens in single or multiple languages to users, and also as a part of the video conferencing capability. Also, the speaker can provide audio feedback on selections and play audio for information videos and advertisements. The speaker is driven using an audio amplifier 44 to provide a strong audio output.

At the top center of the ECDU is an embedded camera 46. The camera is used to record single frame or multi-frame (video) pictures of a user during authentication and/or to record visually the whole session. For example, the user's photo can be taken during signature capture and fingerprint authentication events. Moreover, the entire session can be recorded as a movie using the multi-frame capability (video).

In the top left of the ECDU is the embedded wireless unit 47 of one embodiment. Typically, wireless units consist of an embedded chipset and antenna elements. The wireless unit provides connectivity to neighboring systems during the ECDU session. For example, user selections during the ECDU session may require retrieval of additional disclosure forms, and the wireless unit can provide this connectivity.

Located behind the speaker 43 is an optical scanner 48 in one embodiment. For example, the optical scanner 48 is suitable for scanning drivers' licenses. Automatically scanning a driver's license, military ID, government ID, national ID, passport or ID in general and is useful for accurately and efficiently capturing the user's name/address/etc.

Located in the top left corner is a magnetic card reader 49 in one embodiment. For example, the magnetic card reader 49 is suitable for reading credit card information. Point-of-sale (POS) applications usually require the capability to read credit card information and/or IDs.

Located at the top of the ECDU, in one embodiment, is an optical document (e.g. paper port) scanner 51. The optical document scanner 51 is used for digitizing handwritten credit applications and/or digitizing other consumer supplied financial documents. Eliminating the costly re-typing of handwritten applications as well as eliminating paper copies of consumer financial documents are important aspects of the ECDU.

In one embodiment, an encryption unit 52 is located on the left side towards the top. The encryption unit 52 is a device that performs public and/or private key encryption of data. The protection of a consumer's financial data is an important benefit provided by the ECDU.

Also located on the left side is the GPS unit 53 in one embodiment. The GPS unit 53 is used to provide ECDU location information. For example, accurate location information is used to document legal jurisdiction during contract execution, prevent use at non-allowed locations, detect lost or stolen units, and to help to detect fraud in one embodiment.

Below the GPS unit 53 in one embodiment is the motion detector 54. The motion detector 54 is used to determine if the ECDU is being used or has been left idle. Idle units can automatically be logged off to prevent unauthorized access to sensitive data, such as a consumer's financial data.

Inside the ECDU of one embodiment, shown as dashed lines in the center of FIG. 4, is a controller 56. The controller 56 is the electronic brain that runs the ECDU. The controller is typically a micro-controller or microprocessor based system such as used in a PC or PDA. Also, the memory system 57, including stored software, is indicated using a dashed line in FIG. 4. The memory system consists of the both volatile (e.g., RAM) and non-volatile storage (e.g. hard drive, flash etc.). The ECDU software that the controller executes is stored in this memory system and/or may be web based.

Also inside the ECDU, shown as a dashed line in the bottom right of FIG. 4, is the battery system 58. The battery system 58 is used to power the ECDU during normal operation. The battery system is sized to allow the ECDU to operate for a sufficient time interval to allow one or more complete ECDU assisted transactions to be completed between recharging. The battery system 58 is recharged via the docking port connector 59 shown on the bottom edge in the center. The docking cradle, shown in FIG. 29, will be discussed below. Alternately, the ECDU can be recharged directly from a wired connection instead of a cradle. In one embodiment, the recharging is performed using a wireless approach, shown in FIG. 18.

Located along the bottom edge of the ECDU are various input-output (JO) ports. From left to right these are audio jack 61 and microphone jacks 62, external memory (memory stick) reader/writer 63, USB ports 64, external keyboard jack 66, PCMCIA card port 59, docking port 68, CD/DVD reader/writer 69, and input power Jack 68.

In one embodiment, the printer 71 is integrated into the bottom of the ECDU. The printer 71 provides the capability to generate hardcopies of the contract and disclosures. Also, the ECDU can print to other external printers connected to the ECDU or available on a connected network. Stylus pen capture technology 72 (for example the digitizer of the tablet display) is embedded in or behind the screen of the ECDU and the controller 56 is provided with an electronic serial number 73, for purposes described in more detail below. A reception power unit 74 and secondary coil 76 also preferably are provided FIG. 4 describes one embodiment based on dual fingerprint readers 27 and 28. In other ECDU embodiments only one or no fingerprint readers are used. These alternate embodiments are based on separating the acceptance and authentication functions. For example, a consumer can indicate acceptance using actual or virtual buttons, typical windows navigation techniques, signature or initials capture, etc. The authentication function can be implemented using a single fingerprint reader, or replaced by one or more other observables such as the consumers photograph captured by the camera, the consumers signature and/or initials captured by the tablet, the recorded consumers voice using the microphone, etc.

Figure 5:
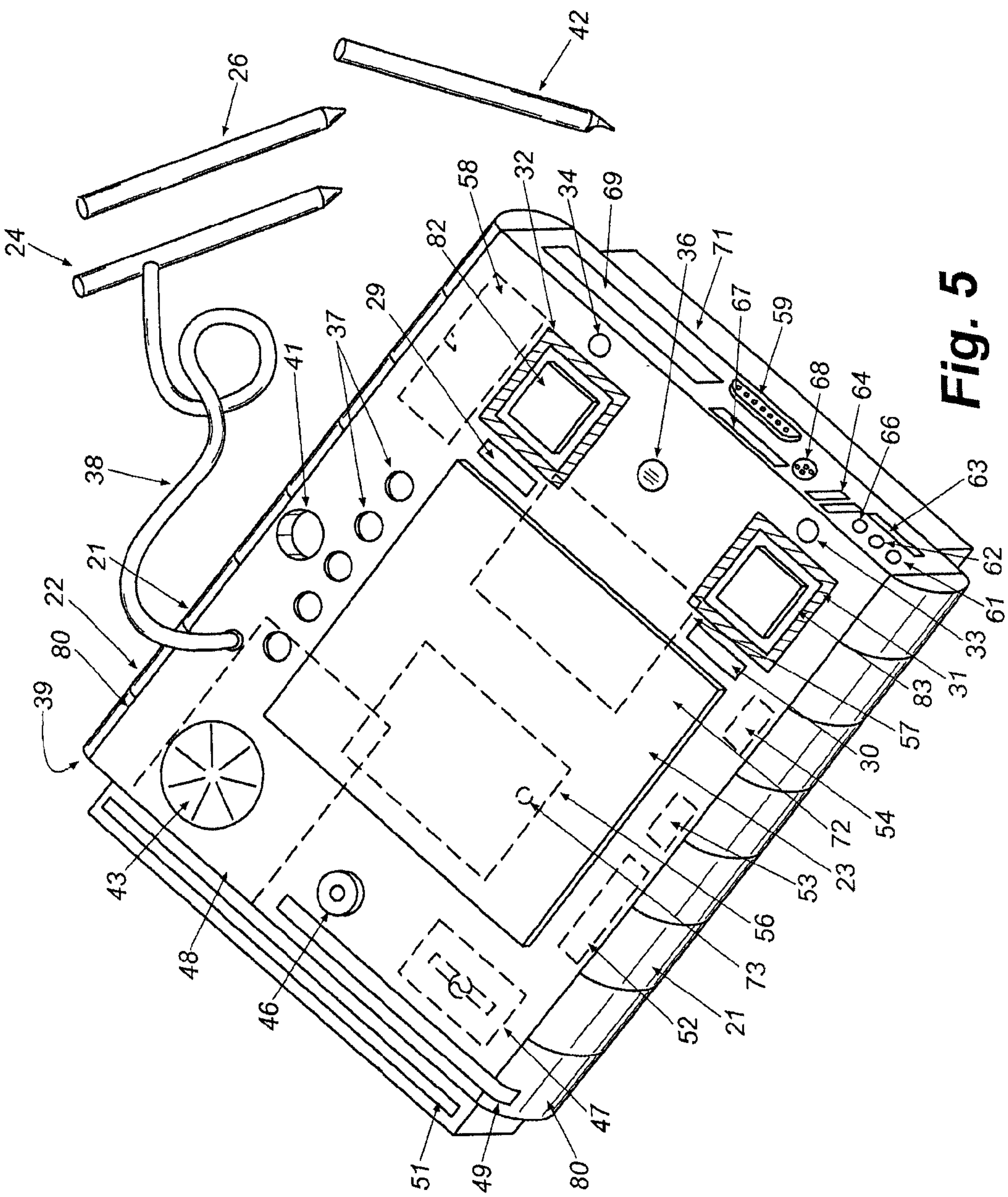
FIG. 5 is a perspective illustration of an ECDU with decision buttons.

FIG. 5 shows an alternative embodiment based on two physical decision buttons 82 and 83. The two decision buttons 82 and 83 are located at the locations of the missing fingerprint readers. The decision buttons are surrounded by indicator lights. Alternatively, the decision buttons can be illuminated buttons.

Figure 6:
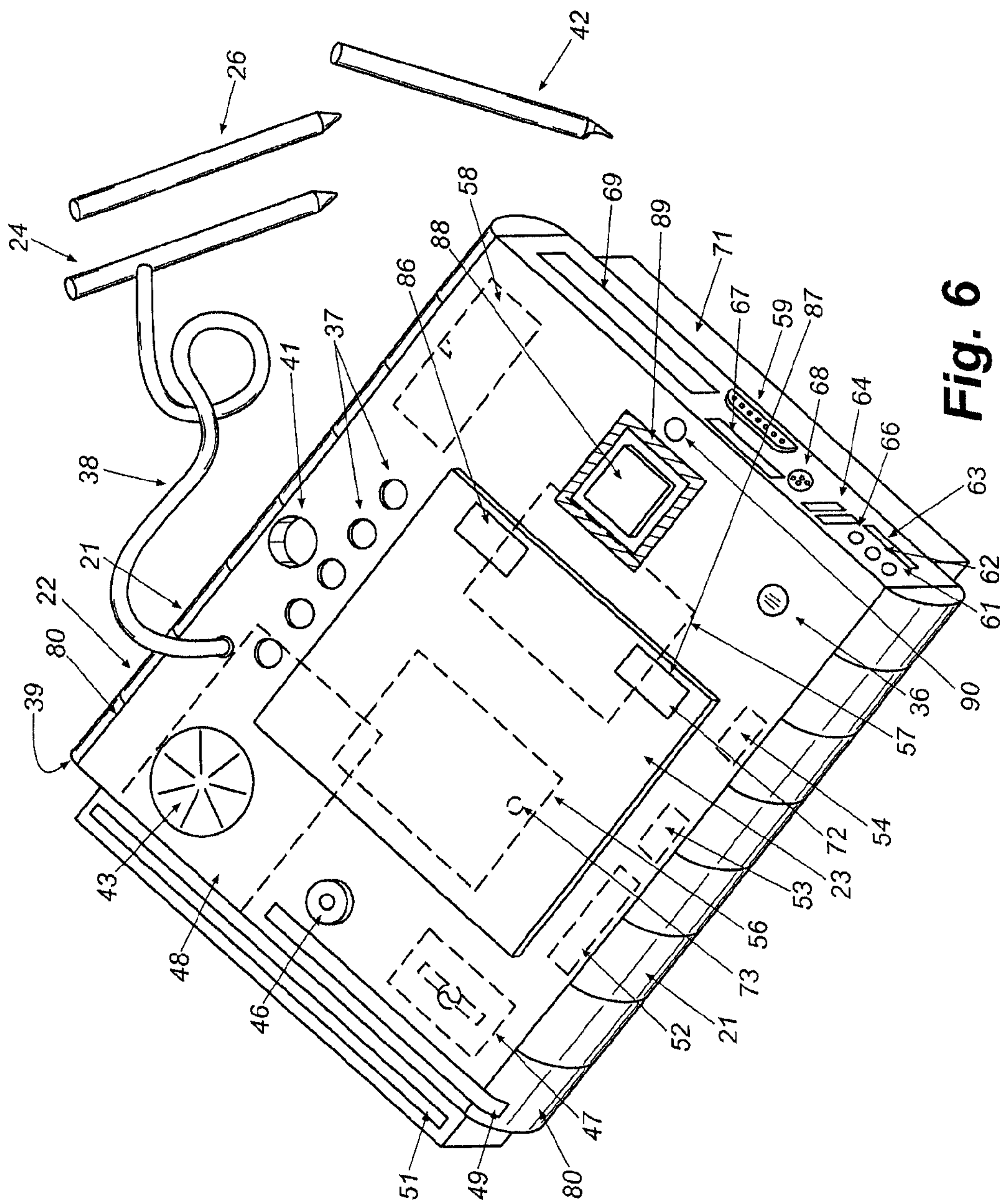
FIG. 6 is a perspective illustration of an ECDU with single fingerprint reader.

FIG. 6 shows an alternative embodiment based on a single fingerprint reader 88 and virtual decision buttons 86, 87. The virtual decision buttons are located in the bottom corners of the display 23 and a single fingerprint reader 88 is located below the tablet display 23. An illuminated ring 89 surrounds the fingerprint reader 88 in this embodiment to indicate when the reader is active and waiting for input. In one embodiment, the color of the illumination of the ring is coordinated with the virtual decision. For example, if the virtual acceptance button is selected the illuminated ring 89 will be green and if the decline virtual button was selected it will be illuminated red. Additionally, LED 90 provides a similar visual indication as described for the illuminated ring 89. In use, the consumer could be prompted to swipe the fingerprint reader after selecting either virtual decision button to authenticate his selection and confirm his identity as the individual making the selection.

Figure 7:
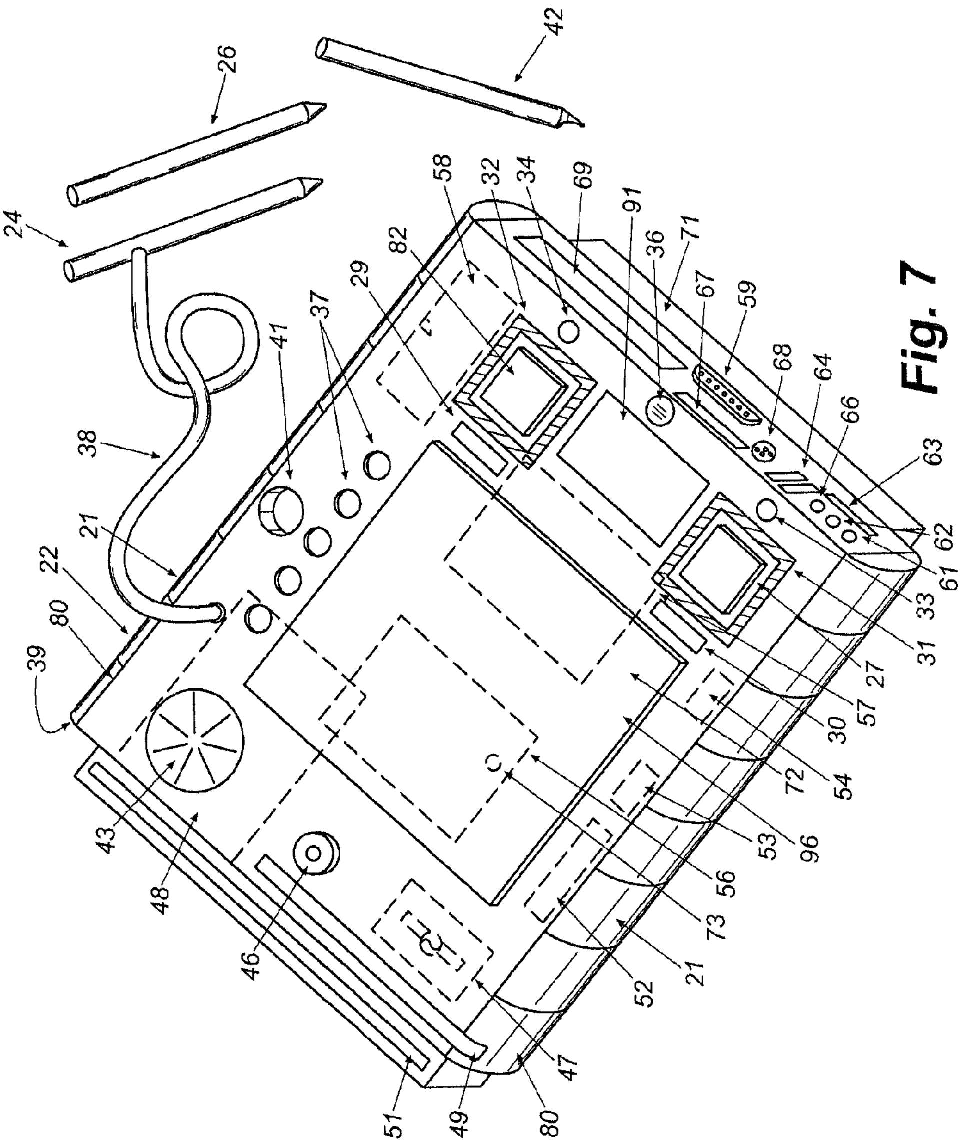
FIG. 7 is a perspective illustration of an ECDU with separate signature pad.

FIG. 7 shows the separate display and signature block ECDU embodiment. The ECDU shown in FIG. 7 shares nearly all of the components discussed above in FIG. 4 with the exception of the tablet display. In this second embodiment, the display is a non-tablet display 96. A digitizer/signature pad 91 is incorporated between fingerprint readers 27 and 28 to record pen input; e.g., record user signatures. The non-tablet display 96 still contains the graphical capabilities; e.g., color, blinking, etc., used to emphasize important information. Other pen input devices are used in substitution for the embodiments described above (e.g. RF pens that capture handwriting using special grid paper). Other alternate embodiments include use of touch screens such as those found on PDAs, to include signature functionality in the screen or as a small auxiliary screen.

Figure 8:
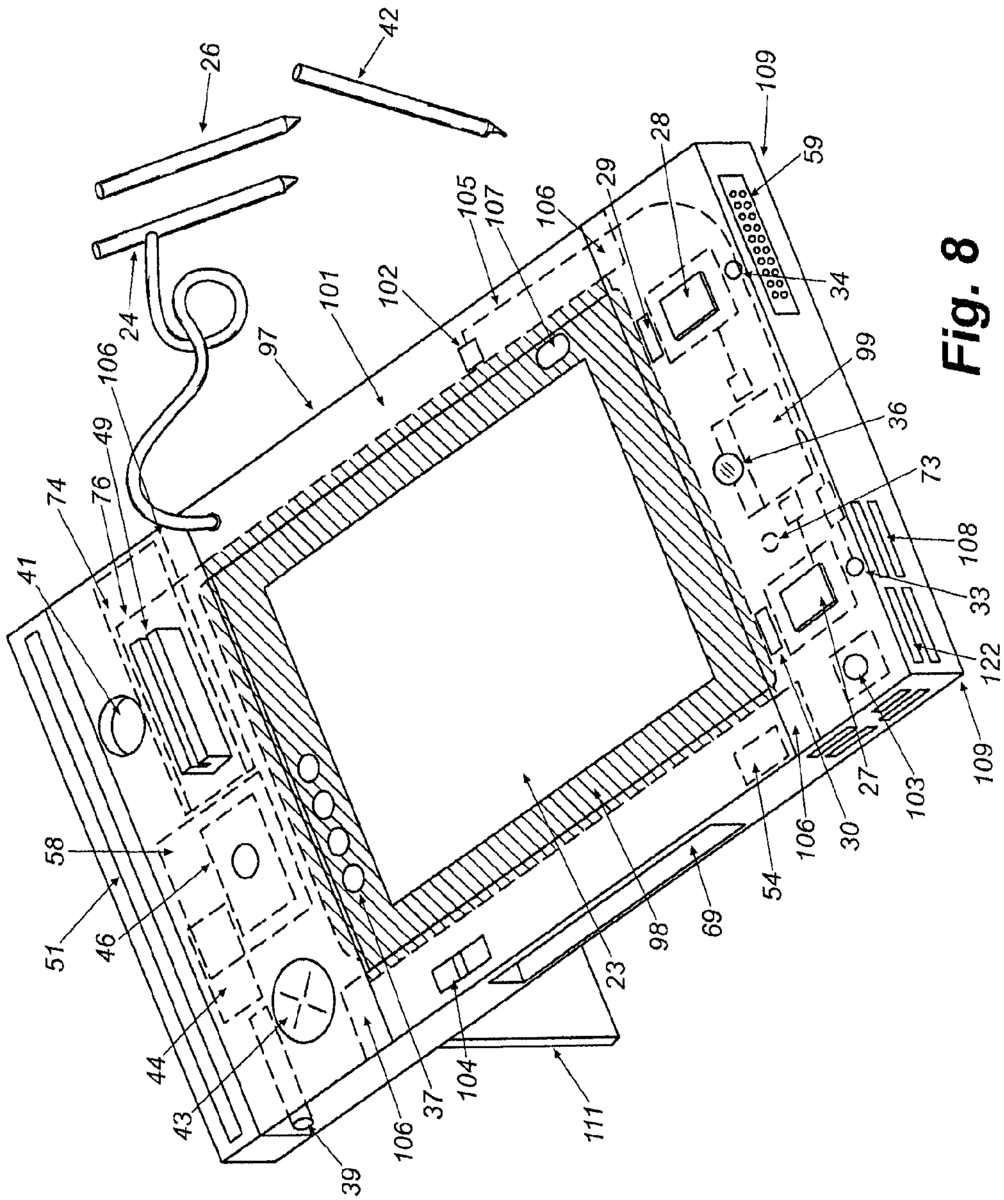
FIG. 8 is a perspective illustration of a framed tablet PC-based ECDU.

FIG. 8 shows a tablet PC based ECDU embodiment. This embodiment is based on building an ECDU from a commercially available tablet PC and using external hardware devices (e.g., camera and fingerprint readers) to implement ECDU functionalities that are not available in the marketed tablet PCs.

Specifically, FIG. 8 shows how, in this embodiment, an ECDU frame 97 is placed around a commercially available tablet PC 98 in a picture-frame-like-manner. This ECDU frame 97 contains the required additional ECDU functionalities. This ECDU frame is an adjustable, plastic (or other material; e.g. aluminum) frame that fits snuggly around the tablet PC 98. Embedded into this frame are USB based devices. In situations where the number of USB devices exceeds the number of available USB ports, a USB hub 99 is incorporated into the ECDU frame. The ECDU frame contains channels or ducts 101 for routing the various USB cables from the devices to the hub and from the hub to the USB ports 102 on the tablet PC. Alternately, printed circuit boards can be used to replace the various USB cables 105, and/or components.

Located in the bottom portion of the ECDU frame are two fingerprint readers 27 and 28. These are USB based devices that are connected via the USB hub to the tablet PC. These fingerprint readers are used to validate agreement and disagreement as discussed above. In addition, these fingerprint readers are used to capture the ID of the parties.

Located at the bottom left corner of the ECDU frame is the bio feedback sensor 103. This sensor can be a pulse/heart rate type sensor that is commonly incorporated into exercise equipment. For clarity, only the connections of the fingerprint readers to the USB hub is shown; however, the majority of devices located in the ECDU frame preferably connected to the tablet PC via the USB hub.

Located at the top of the ECDU frame is an USB based camera 46. This camera is a USB based webcam capable of both single frame and multi-frame (movie) capture. Located at the top right is a magnetic card reader 49 suitable for reading credit cards. Located at the top left is an external speaker 43. This speaker can be connected to the tablet PC via the audio amplifier and external speaker jacks on the tablet PC. The speaker 43 is driven using an audio amplifier with accessible volume controls 104.

On the left side of the ECDU frame, a large opening is provided to allow the CD/DVD 69 of the tablet PC 98 to be useable with the ECDU frame installed. On the right side, the stylus pen 24 is tethered to prevent loss of the stylus. Also, a stylus storage slot 39 is provided in the top right corner. Other openings are provided to allow access to other ports/devices on the enclosed tablet PC 98.

The frame 97 is constructed with an adjustable overlap 106 for capturing the tablet PC 98 and a power switch 107 is provided in the frame, as is a microphone 36 and air vents 108. Glide/brake units 109 are provided in the frame for allowing the frame 97 to slide easily on a surface when desired but to be firmly anchored when sliding is not desired. These are detailed below. The frame can incorporate a deployable stand 111 if desired to tilt the ECDU upward at an angle.

Figure 9:
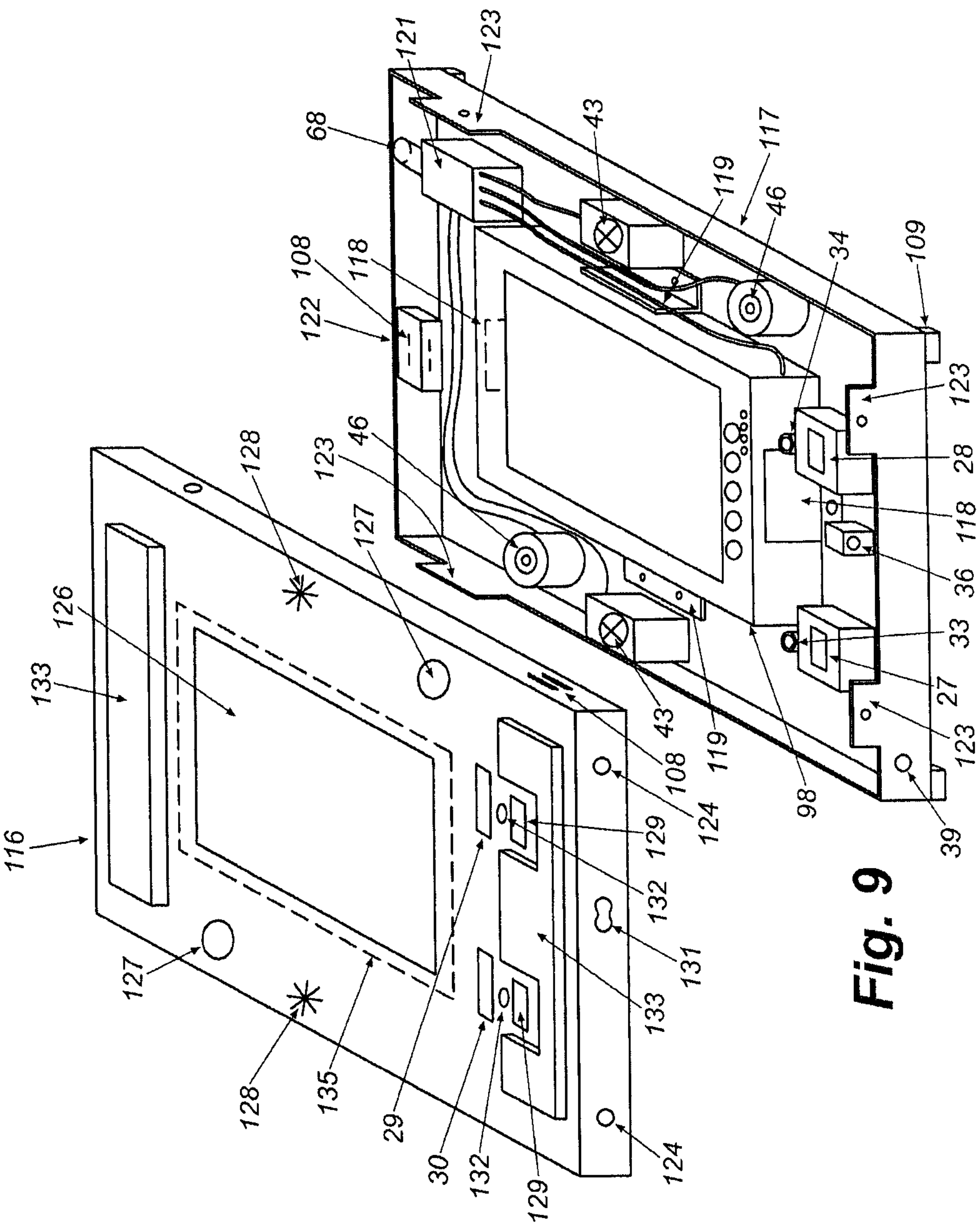
FIG. 9 is a perspective illustration of a frame cased tablet PC-based ECDU.

Alternatively, the frame may be constructed from two clamshell pieces of injection-molded plastic or metal, shown in FIG. 9. The two pieces, the top shell 116 and bottom shell 117, preferably mount around the tablet PC 98 enclosing the tablet PC 98 except for the tablet screen surface and small opening for cables and external devices. The connected two pieces form an internal cavity for mounting the external devices and routing the wires. The bottom shell 117 has one or more vertical alignment brackets 118 and one or more horizontal alignment brackets 119 to ensure the tablet PC 98 is properly alignment to the rest of the clamshell. The bottom shell holds the frame power supply and device controller 121, one or more cameras 46, one or more speakers 43, the dual fingerprint readers 27 and 28, one or more LEDs 33, 34, the microphone 36, power connector or jack 68, and cooling fan 122. Along one or more edges of the bottom shell 117 are fastening tabs 123 that are used with the fastener 124 to secure the top shell 116 to the bottom shell 117. In addition, the top shell 116 contains one or more openings called the display aperture 126, the camera aperture 127, speaker aperture 128, the biometric aperture 129, the microphone aperture 131 and LED aperture 132. These apertures are aligned with the placement of the corresponding device in the bottom shell 117. Located on the outer surface of the top shell 116 are one or more cushion wrist supports 133 and the decision labels 29 and 30. Located near the perimeter of each aperture on the top sheet 116 is a rubber seal 135 to seal the frame from liquids.

In fact, a physical frame is not actually required. The various devices and wires can be taped or glued to the tablet PC 98. Even the USB hub that is needed when more devices than ports exist can be simply taped or glued to the tablet PC 98. However, the reliability, security and appearance of exposed wires and devices is less preferred.

Also, further embodiments are configured. For example, modular plug-in assemblies of external devices needed to configure an ECDU are constructed and attached to an available tablet PC 98. These external devices can be group into one or more stand-alone units 246 (also referred to as Peripheral Unit) that attach to the tablet PC 98 via USB, IR, wireless, etc.

Figure 10:
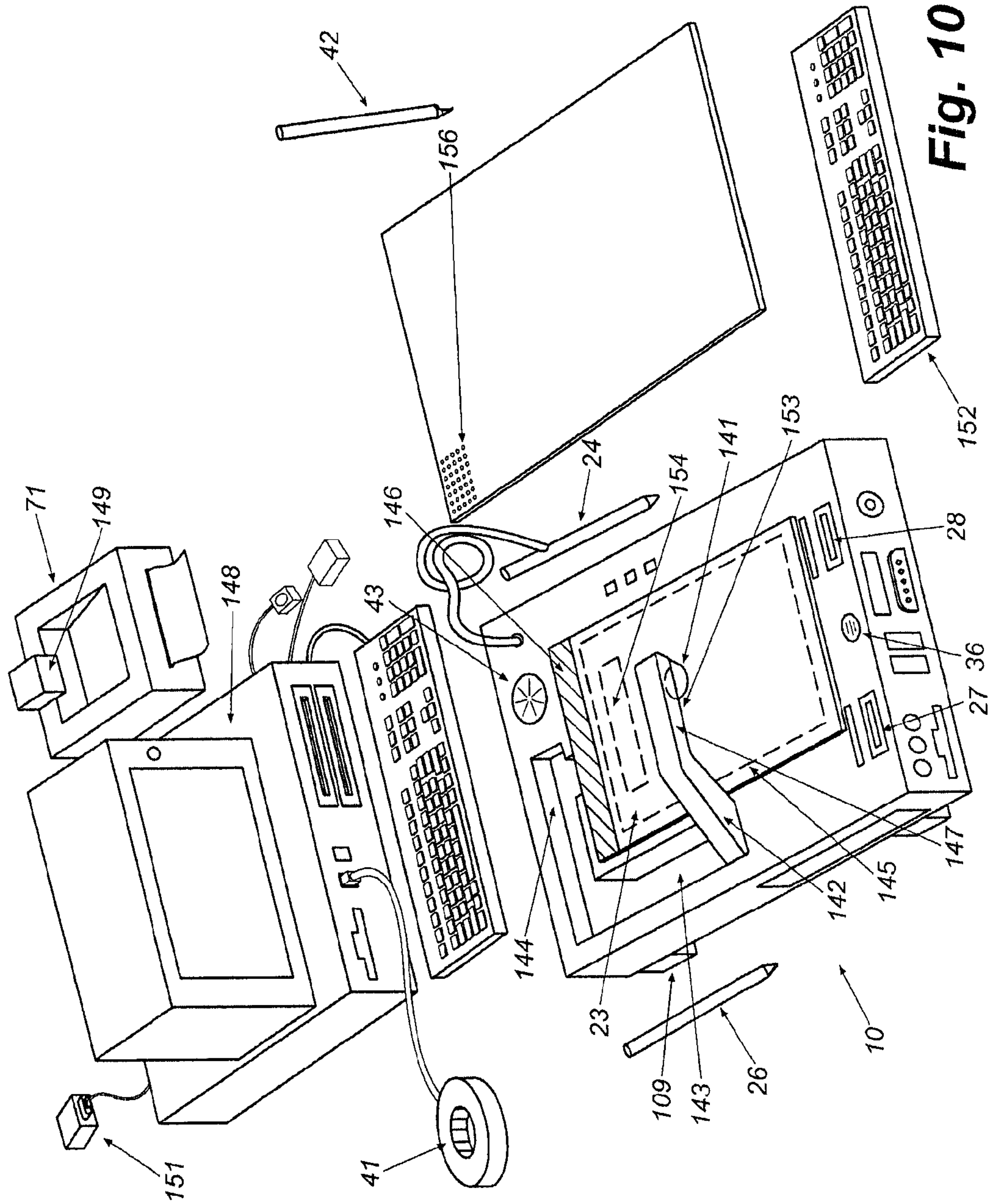
FIG. 10 is a perspective illustration of an ECDU with swing arm camera.

FIG. 10 shows another alternate ECDU 10 embodiment. In this embodiment, the camera 141 is placed on a camera swing arm 142 that allows the camera to pivot thorough a range of look angles. When the swing arm 142 is fully deployed, the camera is directed down at the surface of the ECDU to image and digitize paper documents placed on the ECDU within the document digitizing area 145. A camera angle adjustment 147 is provided to adjust the camera look angle When the swing arm 142 is stored in the storage slot 143, the camera rests on the camera automatic angle adjuster 144 that ensures that the camera is pointing in the predetermined direction. In addition, as shown at the top of the ECDU display, a portion of the display is constructed with a view filter 146 to allow viewing from only a restricted range of viewing angles. Typically, this range of angles is set from the dealership employee's direction and thus the ECDU shows sensitive information, e.g. profit, rates, private messages, etc in this region when disclosure to the customer is not desired. In one embodiment, this view filter is an opaque material in a fence-like configuration. In another embodiment, this view filter is constructed from optical materials that only allow light to pass in specific directions. In yet another embodiment, the whole ECDU display is constructed from dual view material (e.g. Sharp Dual-View LCD) such that each participant (e.g. dealership employee and customer) is presented with unique images from the same screen from different view angles.

The embodiment of the ECDU in FIG. 10 is configured differently than prior embodiments and includes a personal computer (PC) 148, a document ID reader 149, and an external camera 151, all discussed above. An ECDU wireless keyboard 152 is shown for additional method of entering data into the ECDU 10. A light 153 illuminates documents for imaging by the camera 141 and a wireless power unit 154 is provided in the ECDU 10. FIG. 10 also depicts the coded document paper 156 (discussed above) for use with the scanning pen 42.

Figure 11:
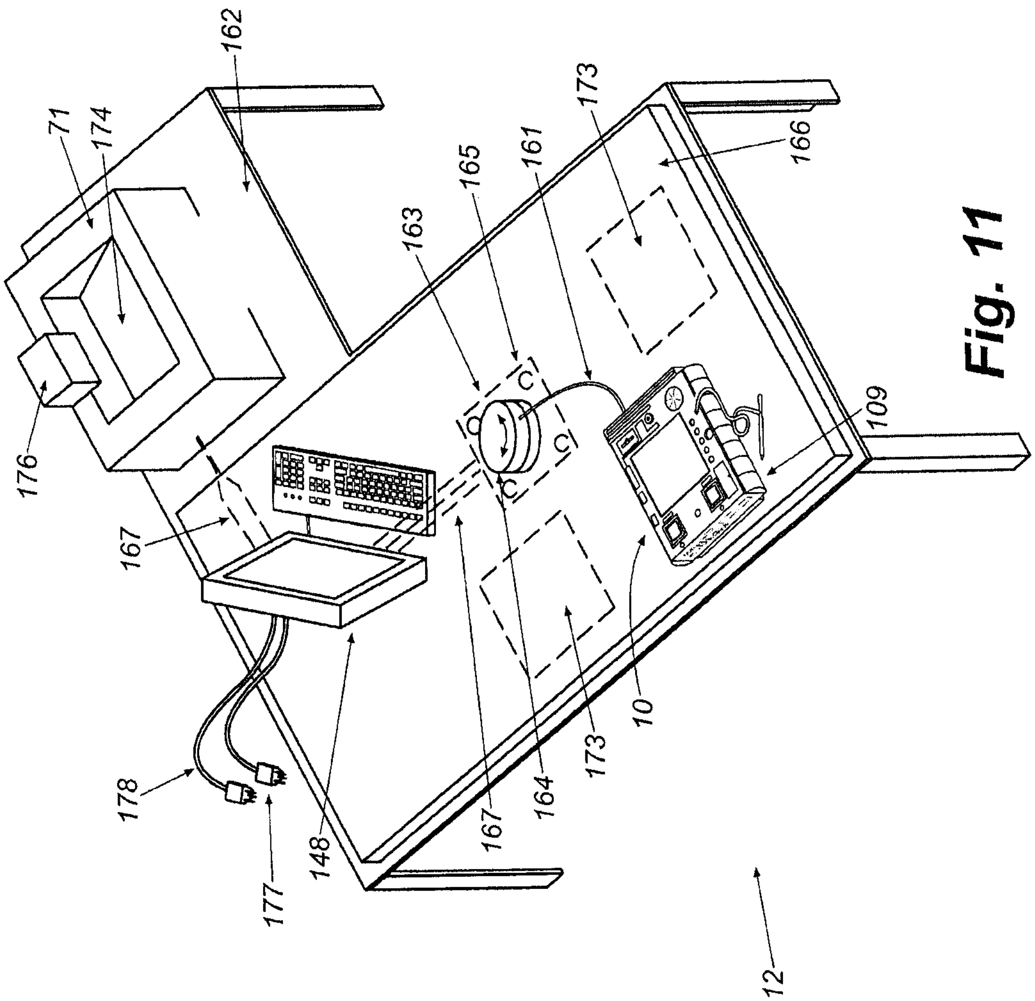
FIG. 11 is a perspective illustration of an ECDU with retractable cable assembly and cover pad.
Figure 12:
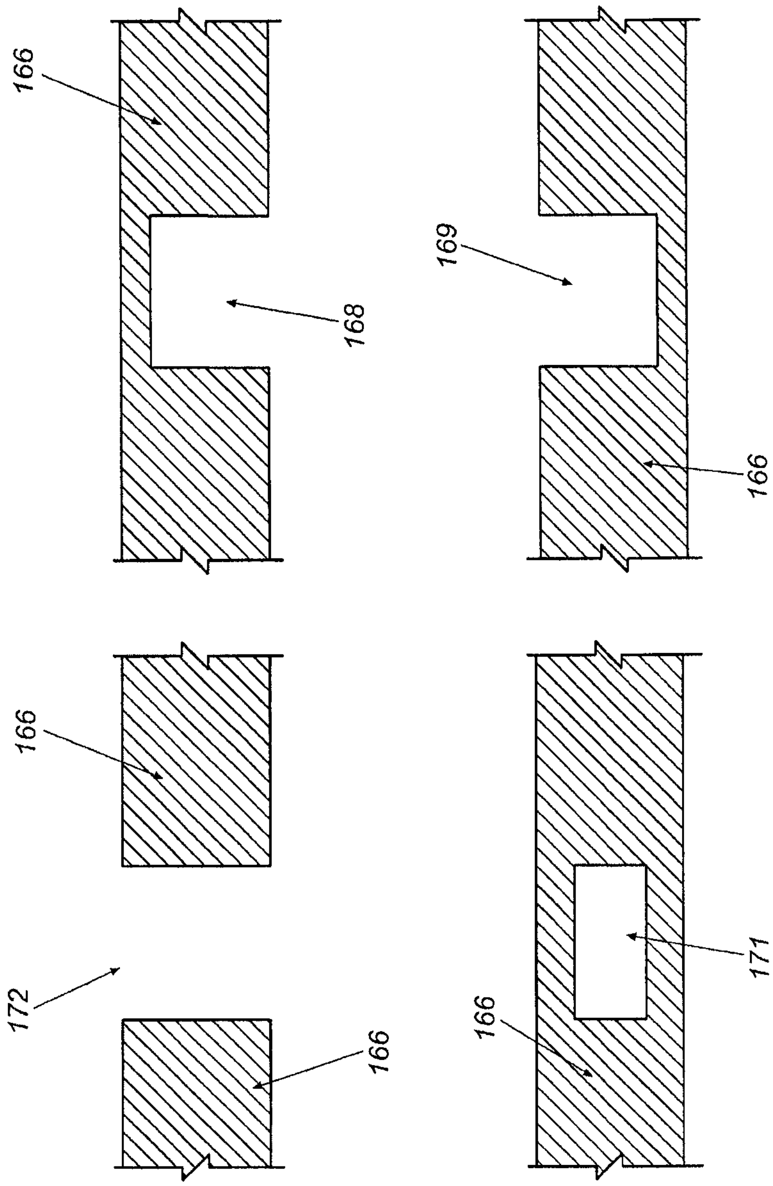
FIG. 12 is a perspective illustration showing cover pad raceways.
Figure 13:
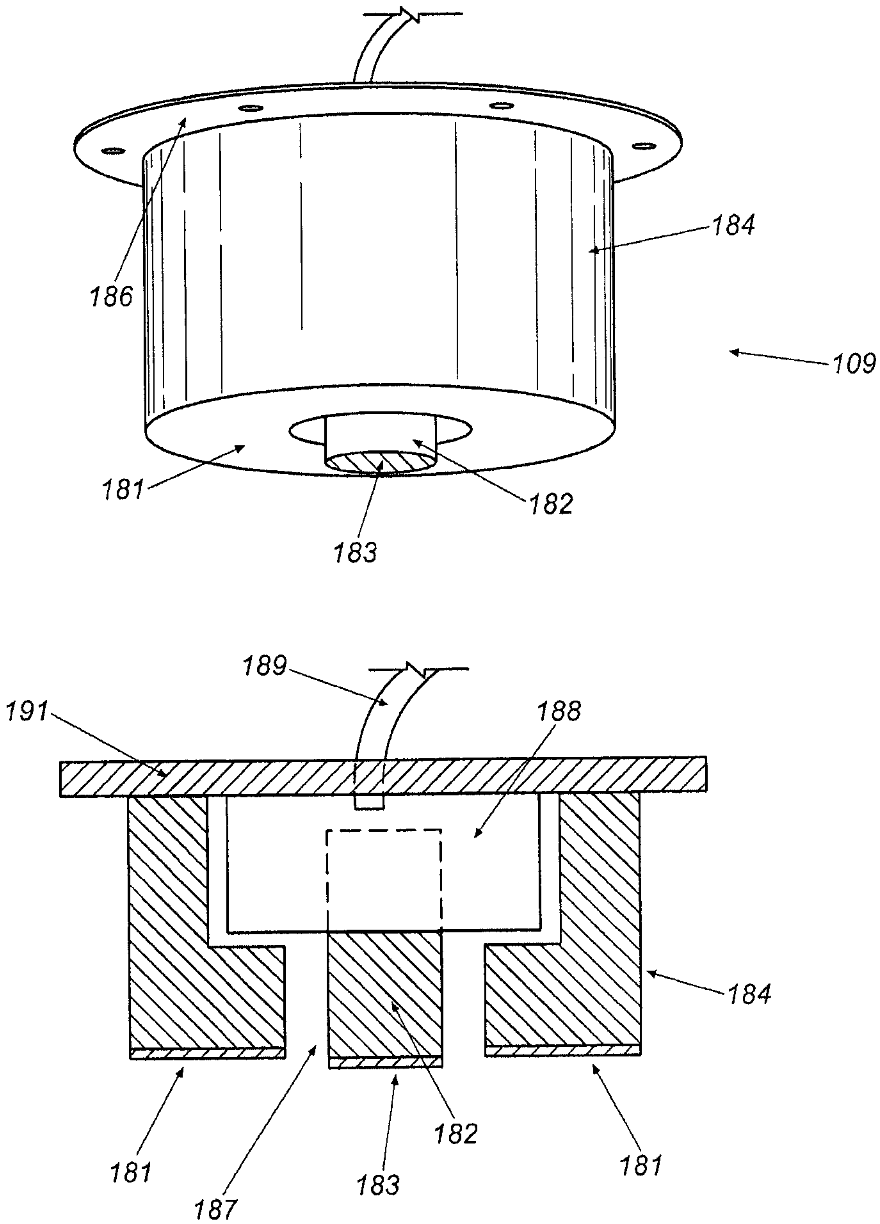
FIG. 13 is a perspective illustration of a plunger based glide/brake unit according to the invention.
Figure 14:
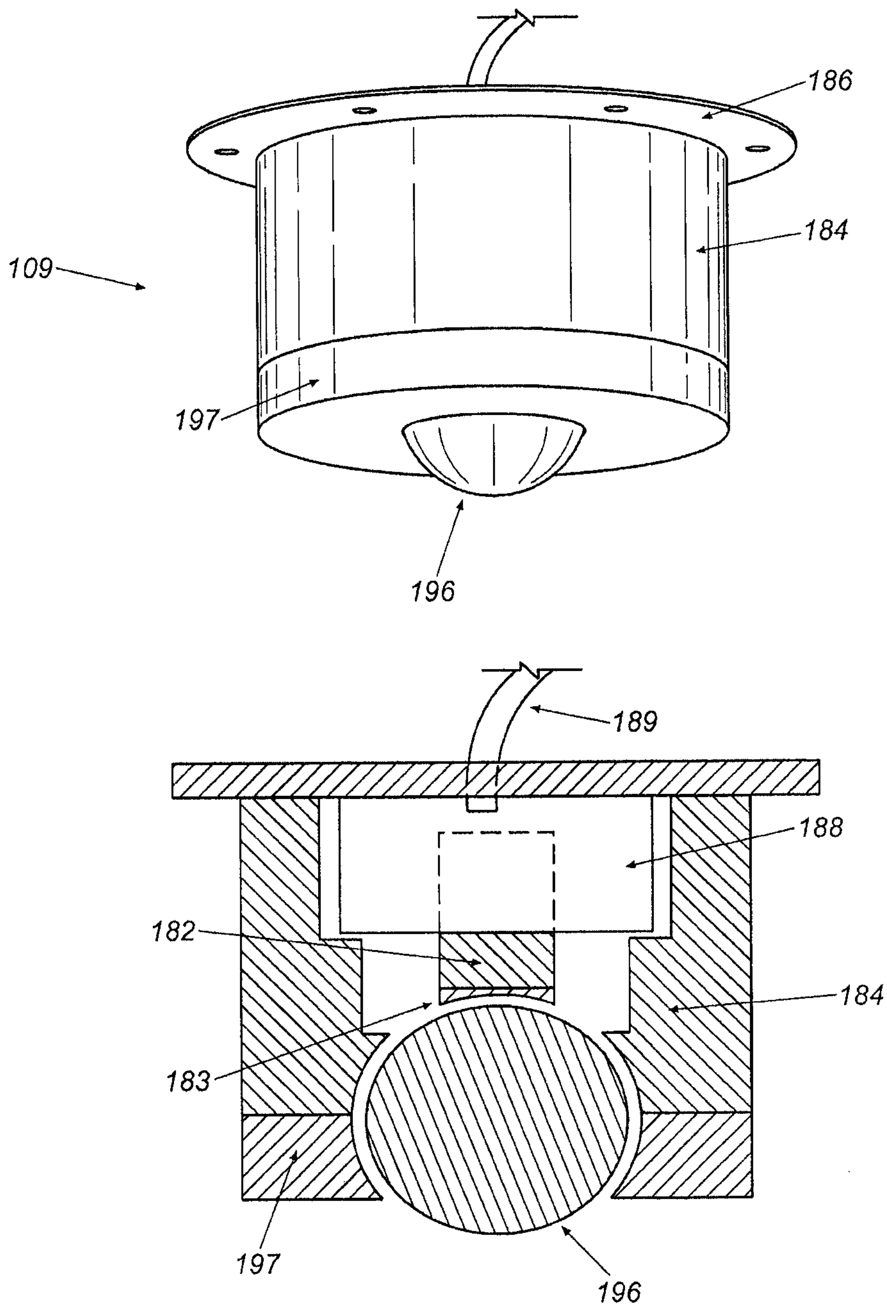
FIG. 14 perspective illustration of a roller based glide/brake unit.

FIG. 11 shows an embodiment of an ECDU station 12 made up of several components or devices as shown in the figure. A retractable harness or cable assembly 161 is placed on the surface of the desk 162. This assembly contains a retracting mechanism for retracting the harness 161 into the assembly housing. Also, the assembly rotates on its base or anchoring plate 163 by means of a rotating connectivity hub 164 to minimize cable clutter. The anchoring plate 163 is attached to the desk 162 using the attachment points 165. The anchoring plate of the assembly and the desktop surface are protected by a cover pad 166. In addition to protecting the surface, the cover pad 166 also contains one or more cable raceways 167 for routing the various cables to/from the retractable cable assembly. The cover pad 166 is constructed from an electrostatic discharge material (ESD). The cable raceways preferably are formed as a hidden channel 168, an exposed channel 169, a duct 171, and/or a slit 172, as shown in FIG. 12. Also, the cover pad 166 contains one or more transparent insert areas 173 where inserts (e.g. brochures or advertisements) can be placed and viewed. The ECDU 10 contains one or more glide/brake assemblies 109 to allow the ECDU to slide easily around the cover pad between participants and to resist motion during ECDU usage. The printer 71 has an output paper tray 174 and an output document ID reader 176 for reading a coded ID on an output document. The PC 148 has a power cable 177 and an Ethernet communications cable 178. FIG. 13 shows one embodiment of a glide/brake assembly 109. The outer ring, the glide member 181 (also known as a slider), provides a low friction surface. At the end of the actuated plunger 182 is a plunger gripper 183 which provides a high friction surface (e.g. rubber). The glide brake assembly 109 has a housing 184 that can be mounted by a flange 186 and that defuses a plunger cavity 187 within which the plunger 182 moves. An actuator 188 and associated wiring 189 can be engaged to extend the plunger when it is desired to anchor the ECDU. An access cover 191 provides access to the actuator and plunger. The glide/brake assembly uses an electric actuator 188 to deploy or retract the plunger 182. In one embodiment, the actuator is an electrical solenoid with spring. When it is desired to anchor the ECDU, the plunger is extended to engage the surface on which the ECDU sits to provide frictional resistance to movement of the ECDU. The forgoing description includes both a glide member for easy sliding movement of the ECDU and a gripper for selectively anchoring the ECDU. Of course, the ECDU can be provided with only the gliding function and not the gripping function. In such an embodiment, a tether or harness (e.g. 161 in FIG. 11) might function to limit motion of the ECDU. FIG. 14 shows an alternate glide/brake assembly embodiment. In this alternate embodiment, the ECDU glides easily when the plunger is retracted, but when the plunger 182 is engaged, the plunger gripper 183 provides high friction to retard any rotation of the roller ball 196 within the roller cover 197 thus resisting motion of the ECDU. The roller ball 196 is also constructed from a high friction material to prevent slippage when the roller ball is braked.

Figure 15:
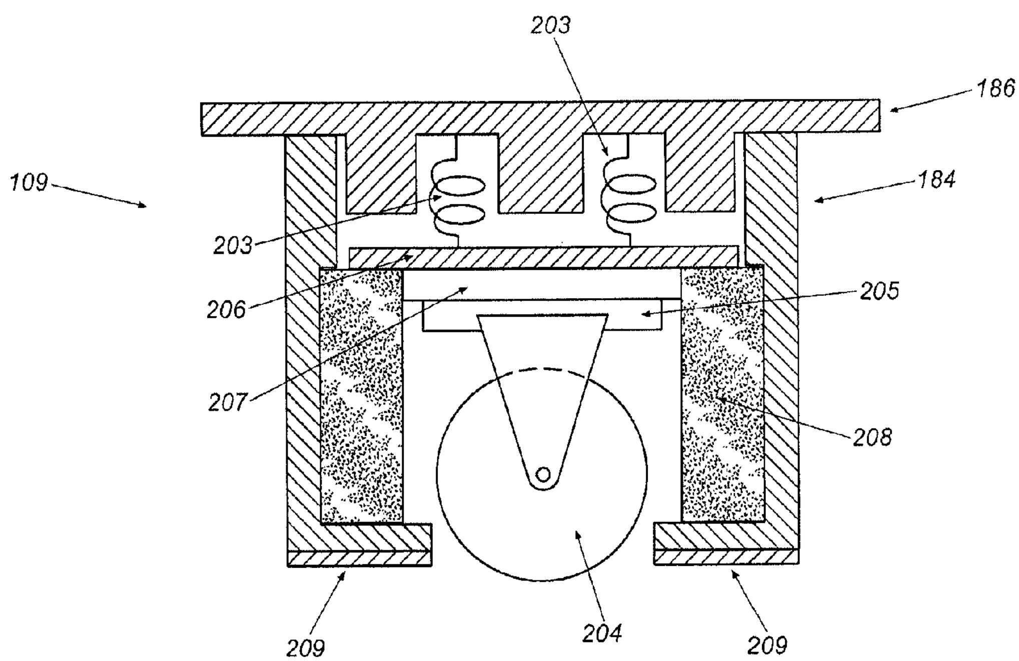
FIG. 15 is a perspective illustration of a caster wheel based glide/brake unit.

FIG. 15 shows another alternate embodiment of glide/brake assembly. In this alternate embodiment, the ECDU is mounted to one or more of these caster wheel based glide/brake units via the mounting flange 186. The mounting flange 201 is located at the top of the glide/brake housing 184. The weight on the ECDU is supported by one or more springs 203 when the unit is not being used allowing the ECDU to move easily via the caster wheels 204. The Caster swivel plate 205 is attached to the caster plate 206 with the caster bearing bracket 207. The caster swivel plate 205 allows the unit to easily rotate. When a user begins to use the ECDU, for example, using the stylus to make selections, the extra weight of the user compresses the springs 203 resulting in the caster wheel 204 moving up into the glide/brake housing 202. The alignment guide 208 ensures that the caster wheel maintains the proper orientation during spring compression changes. When the caster wheels 204 are retracted, the gripper 209 engages the surface of the desk or table. The gripper 209 is a high friction material that prevents the ECDU from moving during usage.

Figure 16:
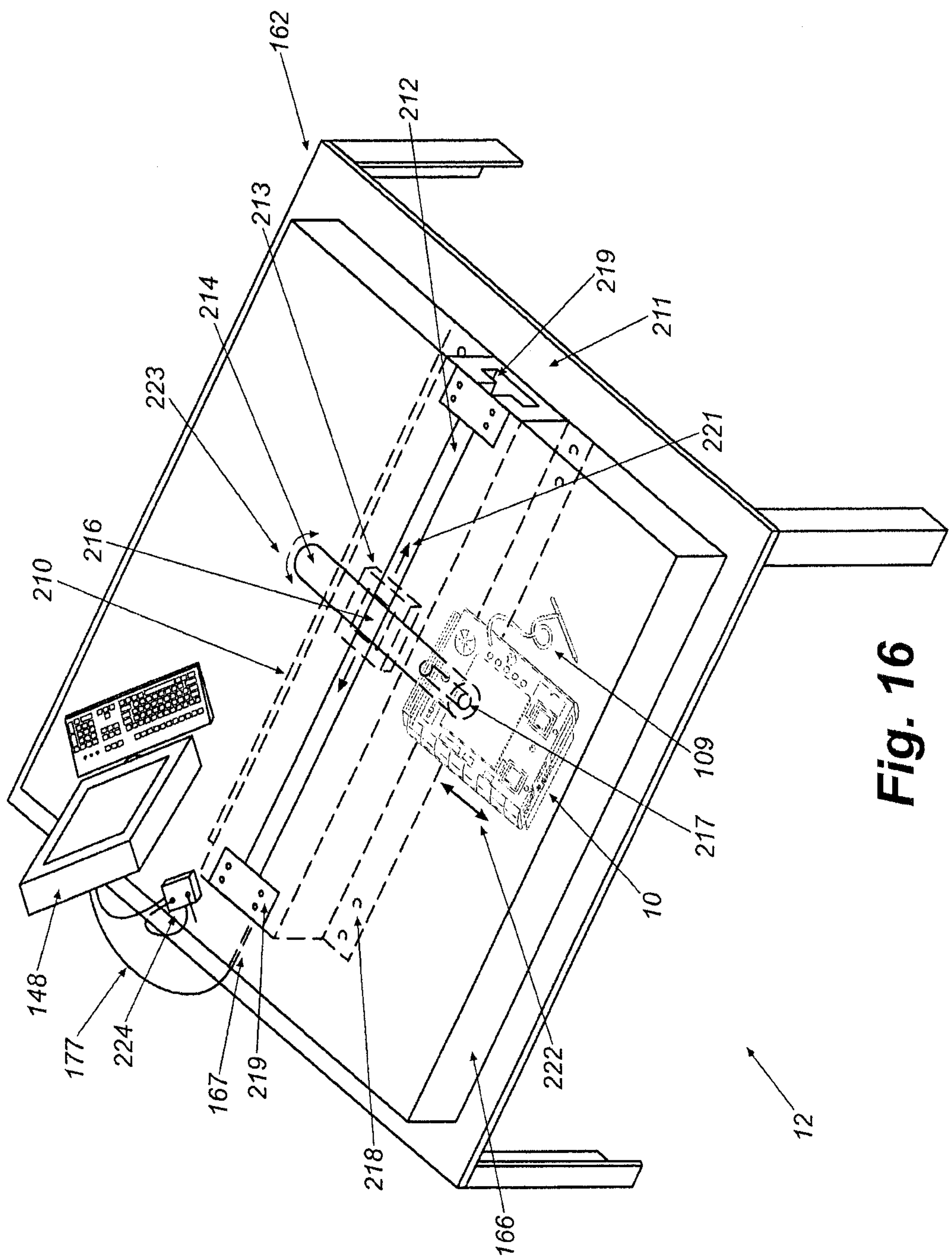
FIG. 16 perspective illustration of an ECDU t-slot unit according to the invention.

FIG. 16 shows another embodiment of an ECDU station 12 with a T-slot member 210. A T-Slot groove assembly 211 is placed on the surface of the desk 162. The T-slot 212 in concert with the T-slider 213 provides one axis of motion. The Outer Slide member or carriage 214 is attached to the T-Slider 213 at a pivot joint 216. The ECDU 10 is attached to the inner slide member 217. The inner slide member 217 in concert with the outer slide member 214 gives a second axis of motion. The pivot joint 216 allows the outer member to rotate 360 degrees about the T-slider 213 providing additional freedom of motion. The T-Slot groove assembly mounting flange 218 and top surface of the desk 162 are protected with a cover pad 166. The cover pad contains cable raceways 167. T-slot stops 219 limit movement of the slider in the lateral direction 221. The ECDU 10 can move in a transverse direction 222 and can rotate in an angular direction 223. A wireless adaptor 224 provides internet connectivity.

Figure 17:
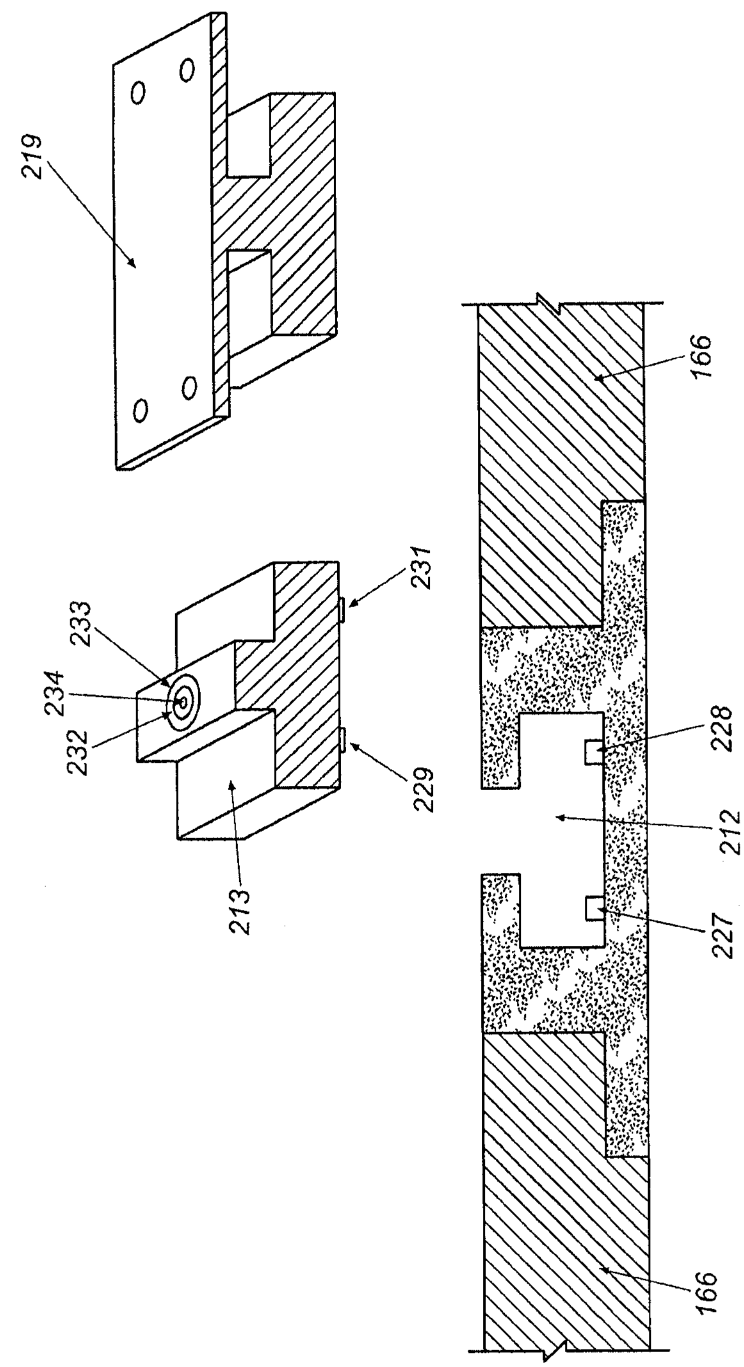
FIG. 17 is a perspective illustration showing details of the t-slot unit of FIG. 16.

FIG. 17 shows the details of the T-slot 212, T-slider 213 and T-stop 219. The T-stop 219 is used to stop the T-slider 213 from exiting the T-Slot 212. The T-slot is constructed from an insulating material and electrical spring rails 227, 228 are used to transfer power to the T-slider 213. For example, one rail is ground and the other rail is power. The T-slider 213 is also constructed from insulating material and has electrical rails 229, 231 for receiving power from the T-slot. Surfaces of T-slider 213 are made of or coated with low friction material to enable ease of motion. Again, one rail is ground and the other rail is power. The rails are connected to circular contacts 232, 233 surrounding the pivot joint 234 to transfer power to the slide members. Similarly, the outer slide member contains electrical spring rails, and the inner slide member contains electrical rails for receiving the power for transfer to the ECDU via a cable.

Figure 18:
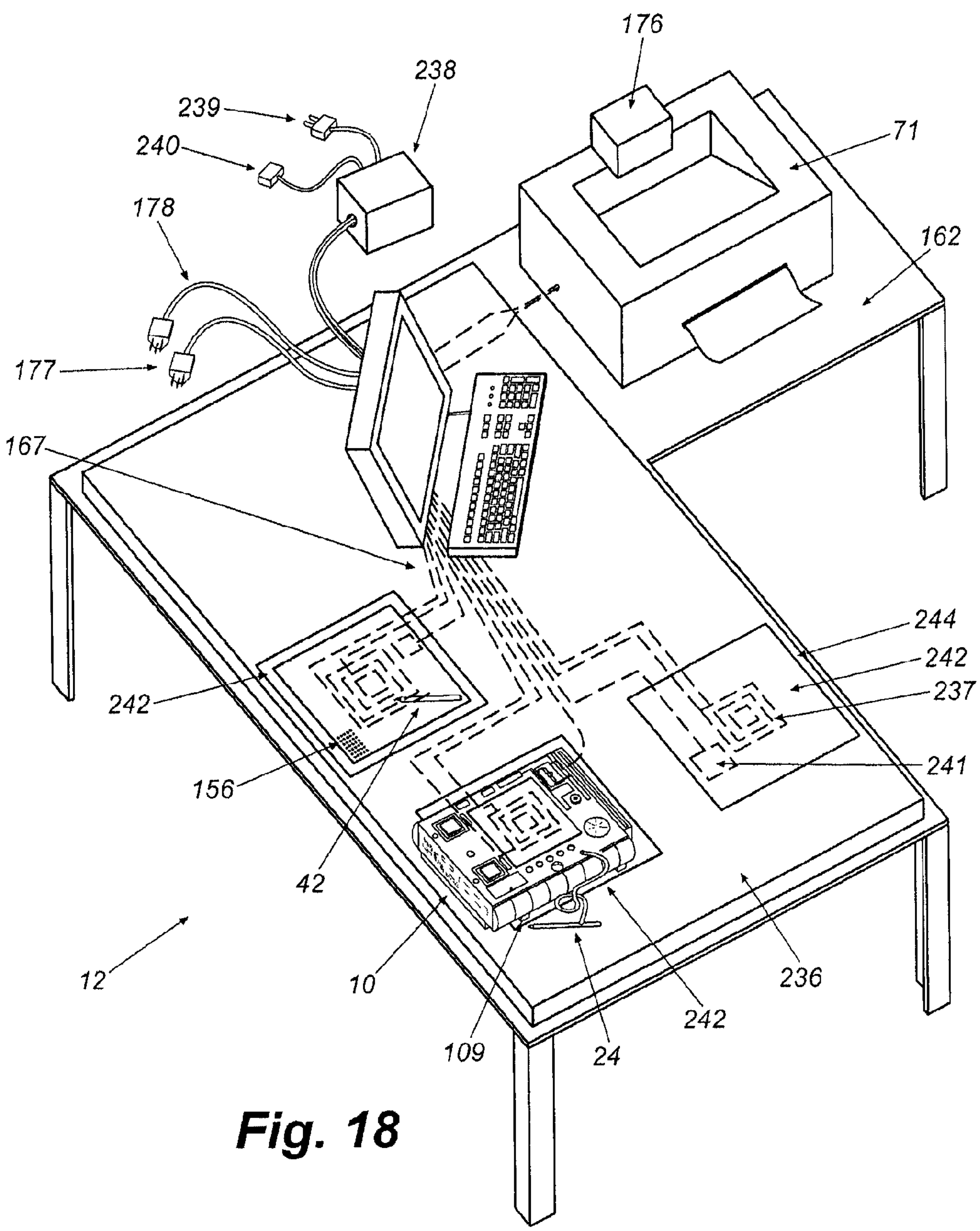
FIG. 18 is a perspective illustration of an ECDU with an overlay unit.

FIG. 18 shows another embodiment of an ECDU station 12. The top surface of the desk 162 is covered by the overlay unit 236. The overlay unit 236 contains one or more inductive primary coils 237 of wire that are powered from an external power supply in the overlay controller 238, which also has input power 239 and Ethernet connections 240. The ECDU 10 contains a secondary coil 76 of wire and the power reception unit 74. The primary 237 creates an alternating magnetic field that transfers power to the secondary coil 76 which is converted to DC power by the power reception unit 74 to power and/or recharge the ECDU unit. Together the secondary coil 76 and the power reception unit 74 form a wireless power unit 154 (363 in FIGS. 30 and 31). This primary/secondary coil configuration is, in effect, a functional open air transformer. The overlay unit also contains a wireless communication device 241 and associated Ethernet connection 240 for enabling ECDU connectivity to peripherals and/or the Internet. This device may be a wireless Ethernet protocol, Bluetooth or a similar short range wireless communication approach. The overlay unit also contains cable raceways 167 for routing cables to the embedded primary coils and to the wireless communication device. The overlay controller 238 contains electronic circuitry to monitor periodically the impedance of the primary power coils to sense the presence of an ECDU within an active zone 242, and thus provide full power only when an ECDU is present, and to enable the short range communication unit only when ECDUs are present. This smart monitoring leads to power savings, and to enhanced data security. The overlay unit also contains insert areas where advertisements, brochures, etc are displayed. Coded document paper 156 and scanning pen 42 also can be used in an active zone 242. More than one active zone 242 is provided for the ECDU to be moved to other locations on the top of the desk 162. These active zones are preferably visually outlined 244 on the surface of the desk 162.

Figure 19:
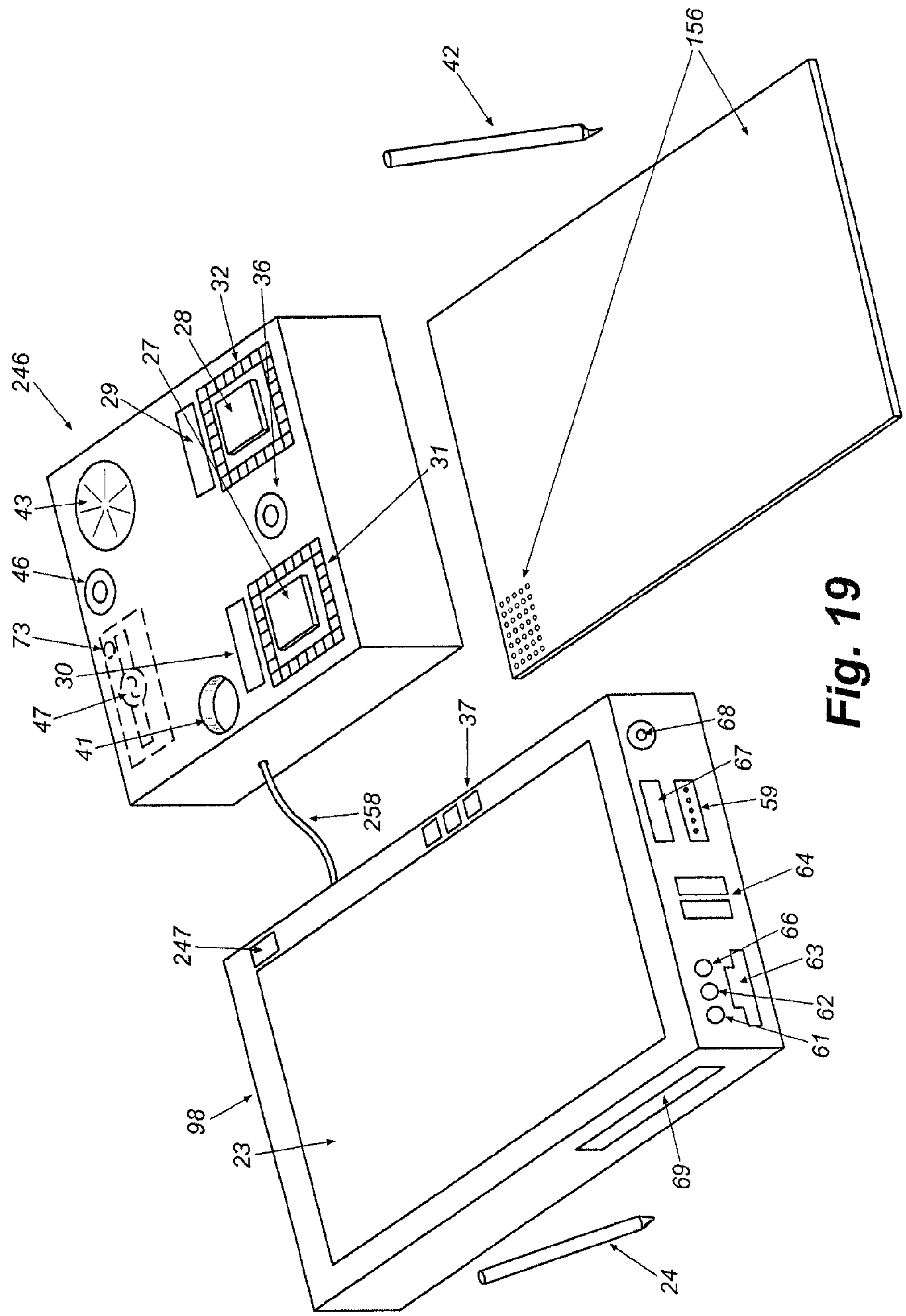
FIG. 19 is a perspective illustration of an tablet PC-based ECDU with stand alone peripheral unit.

FIG. 19 shows another ECDU embodiment. In this embodiment, a commercially available tablet PC 98 with power switch 247 is connected to a stand-alone unit 246 that contains the additional required ECDU devices such as biometric fingerprint readers 27 and 28 with an illuminated rings 31 and 32 and decision labels 29 and 30, microphone(s) 36, speaker(s) 43, camera(s) 46, scanning pen port(s) 41, wireless unit 47, internal optical scanners and internal controller. The stand-alone unit 246 is connected to the tablet via a communications interface 258 which can be any appropriate interface including USB, IR, wired networking, wireless networking, etc. The inclusion of both the tablet PC 98 and the one or more scanning pens 42 allows tremendous flexibility in the ECDU session. The user can complete the ECDU session using screens on the tablet PC and/or using the scanning pen 42 with forms (i.e. credit application, menuing, contracts and disclosures) containing special location codes 156. As discussed above, scanning pens are capable of recording a user's signature, handwritten form data (e.g., address, phone number) or interactive commands (e.g., glossary lookups or requests for informational videos or advertisements).

Figure 20:
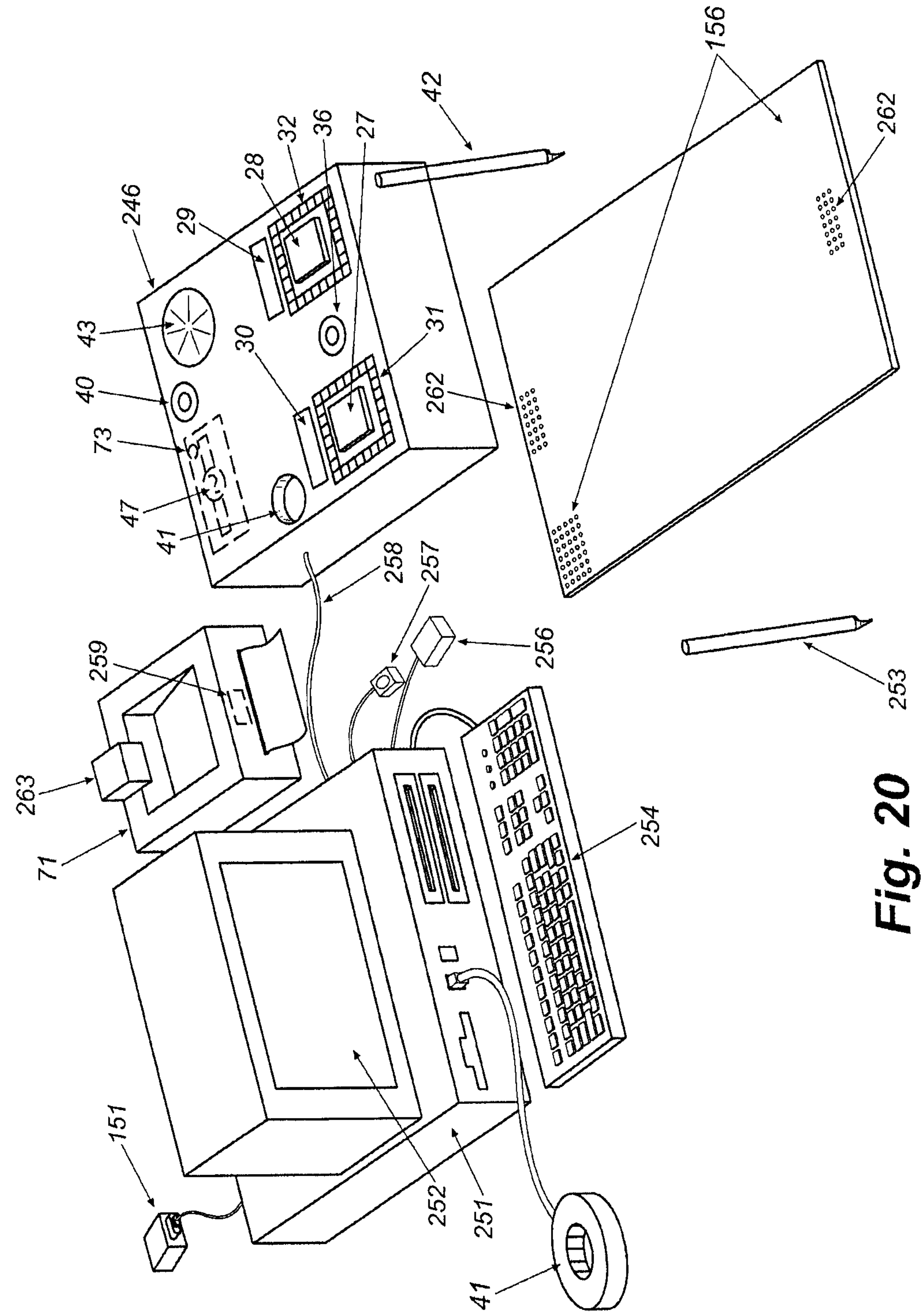
FIG. 20 is a perspective illustration of a PC-based ECDU with stand alone peripheral unit.

FIG. 20 shows another ECDU embodiment. In this embodiment, a commercially available PC 251 with mouse 256 and keyboard 254 is connected to the stand-alone unit 246 that contains the additional ECDU devices, such as biometric fingerprint readers 27 and 28 with illuminated ring 31 and 32 and decision labels 29 and 30, microphone(s) 26, speaker(s) 43, camera(s) 46, scanning pen port(s) 41, wireless unit(s) 47, internal optical scanners and internal controllers. The stand-alone unit 246 is connected to the PC via a communications interface 258 which can be any appropriate interface including USB, IR, wired networking, wireless networking, etc. The PC 251 can be a stand-alone PC or the F&I PC. The PC executes the ECDU software. Also, a separate scanning pen port 41 is directly connected to the PC for added flexibility via USB, IR, wireless, etc. interfaces. The PC is also connected to a printer 71 to allow the printing of forms, contracts, disclosures, etc. during the ECDU session. A document ID reader 263 preferably is placed on the printer to capture the machine readable ID code 262 of each document and/or pre-printed paper during printing. The scanning pen 42 allows the customer to complete paper-based coded forms 156 (i.e. credit application, menuing, contracts and disclosures) while electronically capturing the handwritten responses using the special location codes included on the forms. The captured responses include the user's signature, required form data (e.g. address, phone number, etc.), and/or interactive commands (i.e. glossary lookups or requests for informational videos or advertisements). A second scanning pen 253 is available for use by the business employee. A second scanning pen 253 allows the ECDU to record and identify handwriting from both the customer (e.g. signature, etc.) and from the business employee (e.g. underlining of key points, etc.) Additional scanning pens are assigned as required.

FIG. 20 shows one embodiment of the ECDU (electronic contract and disclosure unit) with separated peripheral unit 246, printer 71 with its document ID readers 263, 259 (known simply as document ID reader printer). In this embodiment, contract and disclosures are completed and captured using special location coded forms and a scanning pen 42. In one embodiment, coded forms 156 incorporate special location encoded symbol technology (i.e. dot patterns) of Anoto Group AB, located in Sweden (www.anoto.com). The document ID for Anoto encoded paper is the location of this dot pattern range within the larger dot pattern space. Logically, Anoto describes an individual page by specifying its location in a larger, available dot pattern.

Figure 21:
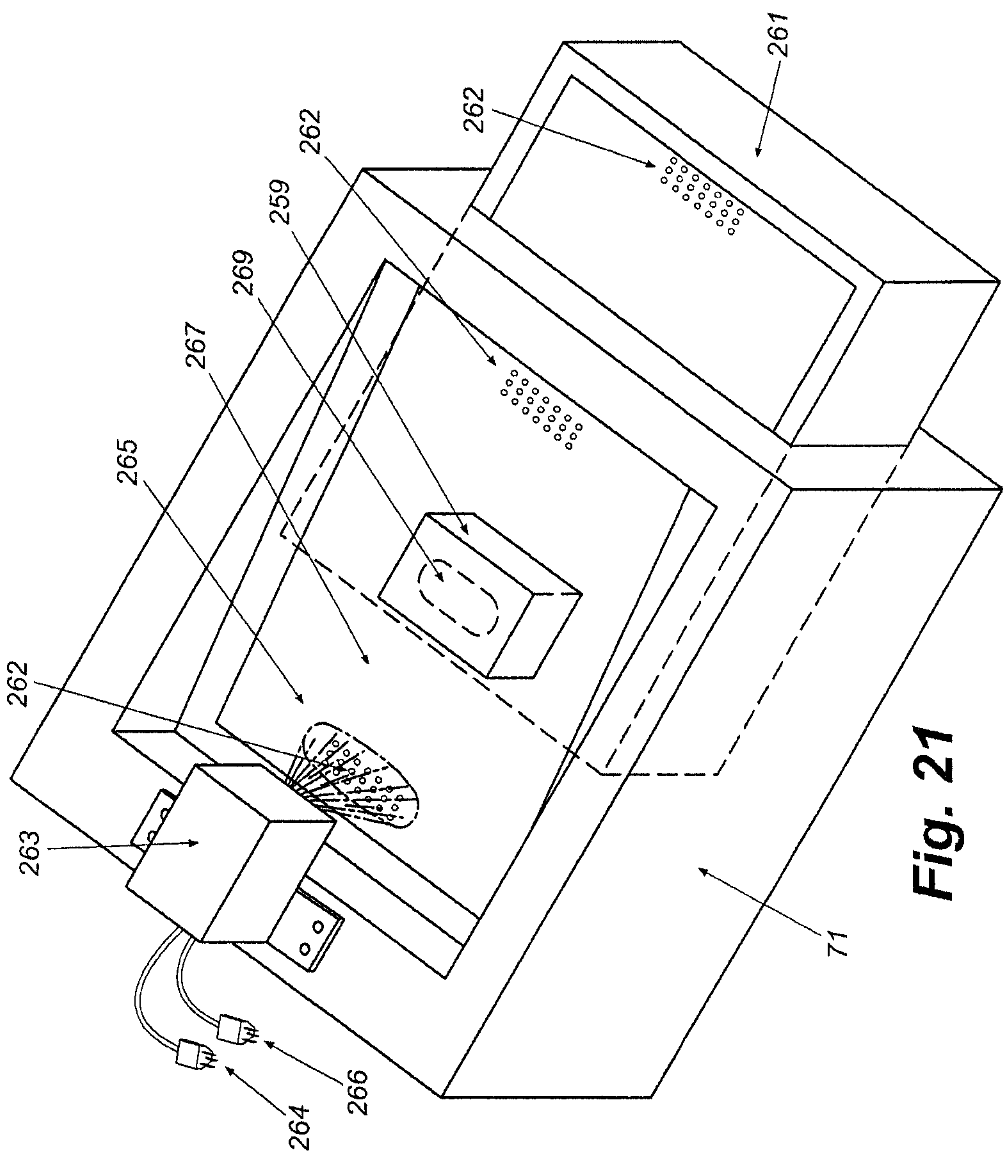
FIG. 21 is a perspective illustration of special location code document ID reader printer.

The document ID reader printer of the present invention consists of a printer and two document ID readers 263, 259, as shown in FIG. 21. The reader 263 is capable of reading a machine readable ID 262 within a specified capture area 265. The reader 259 is capable of reading a machine readable ID 268 within a specified capture area 269. One reader 259 is mounted inside the printer in the printer tray 261 area to capture the document ID 262 of each page prior to printing. The second reader 263 is mounted on the top of the printer to capture the document ID of each page after printing. USB cables 264 and 266 provide communication with the readers 259 and 263 respectively. After printing, the pages are ejected into the output paper tray 267.

Three approaches to printing these special location coded forms are covered by this invention. First, contract and disclosures are printed on-demand by the printer on blank paper. In this embodiment, the printer prints both the special location coded patterns of symbols (e.g. Anoto dot patterns) and the text/graphics of the contract or disclosure. As each page is printed, the document ID (e.g. Anoto page ID associated with the portion of the special location coded dot pattern utilized) is stored in the transaction log along with the document description and time/date printed, as shown in FIG. 23. As each contract or disclosure is completed using the scanning pens and retrieved using the pen docking port, the transaction log is updated to reflect the time/date retrieved. After a document is retrieved from the scanning pen, the status in the transaction log is changed from "in use" to "completed". During dealership usage, forms will be printed and not used for various reasons, after a pre-determined interval the status of these uncompleted forms is changed to "expired". After a document is marked "completed" or "expired" then this page of the special location coded pattern is available for re-use on a subsequent on-demand printing. One benefit of this tracking of document completion and expiration is the reduction in the number of unique special location coded patterns required. Without tracking which special location coded patterns are currently "in use", the same pattern might be used a second time resulting in confusion when the scanning pen data is retrieved.

In a second embodiment, the printer prints the text/graphics of the contracts or disclosures onto pre-printed, location coded paper. Prior to printing each page, the document ID reader located inside the printer tray scans the pre-coded paper to determine the document ID of the pre-coded paper. The transaction log, as shown in FIG. 23, is used to determine if this document ID (e.g. portion of the special location coded pattern) is already "in-use", if so, then the printer is sent a form-feed to eject this page without printing, and then the next page is checked. Once an unused portion of the special location coded pattern is located, the contract or disclosure is printed and the transaction log is updated to reflect the new document. Ejected pages are not waste and are placed back into the paper tray for future use. The process continues as described in the previous paragraph.

In a third embodiment, contract and disclosures are printed on pre-printed contract or disclosure forms. These forms already contain the special location coded patterns and a generic contract or disclosure such as contract text and field labels, and the printer is simply adding the session specific data such as name, address, phone number, price, terms, etc. When the forms are pre-printed, a forms log is created as shown on the left in FIG. 24. The forms log contains the mapping between document ID (e.g. location coded dot pattern ID) and the form type. Prior to the printer adding deal specific information, the internal document ID reader scans the pre-coded forms to determine the document ID. Using the forms log, the form type can be verified prior to printing to avoid erroneous printing. If the form type is wrong or the document ID code is "in-use" then the form is ejected and saved for future use. After each form is printed, the form log is updated to reflect that the form was used. The process continues as described two paragraphs earlier.

Alternate embodiments include placing the document ID reader 263 on the exterior of the printer near the paper exit (e.g. on the. top surface of the printer as shown in FIG. 21). In these external reader embodiments, document ID 262 codes are captured after printing. The ECDU system prompts the dealership personnel to discard any forms that are printed on "in-use" document ID codes (e.g. portions of the special location coded patterns that are still in-use). In another embodiment, both internal input document reader 259 and external output document ID reader 262 are used. The internal input reader 259 checks the document ID prior to printing and the external output reader 263 checks the document ID after printing. This pre/post printing check is also useful to catch multiple page paper feed errors.

The above embodiments describe using the document ID readers to capture the document ID by observing a portion of the special location coded Anoto dot paper. A camera with suitable illuminator is used to capture or read the Anoto dot pattern. This camera is similar to the one embedded into a scanning pen.

Figure 22:
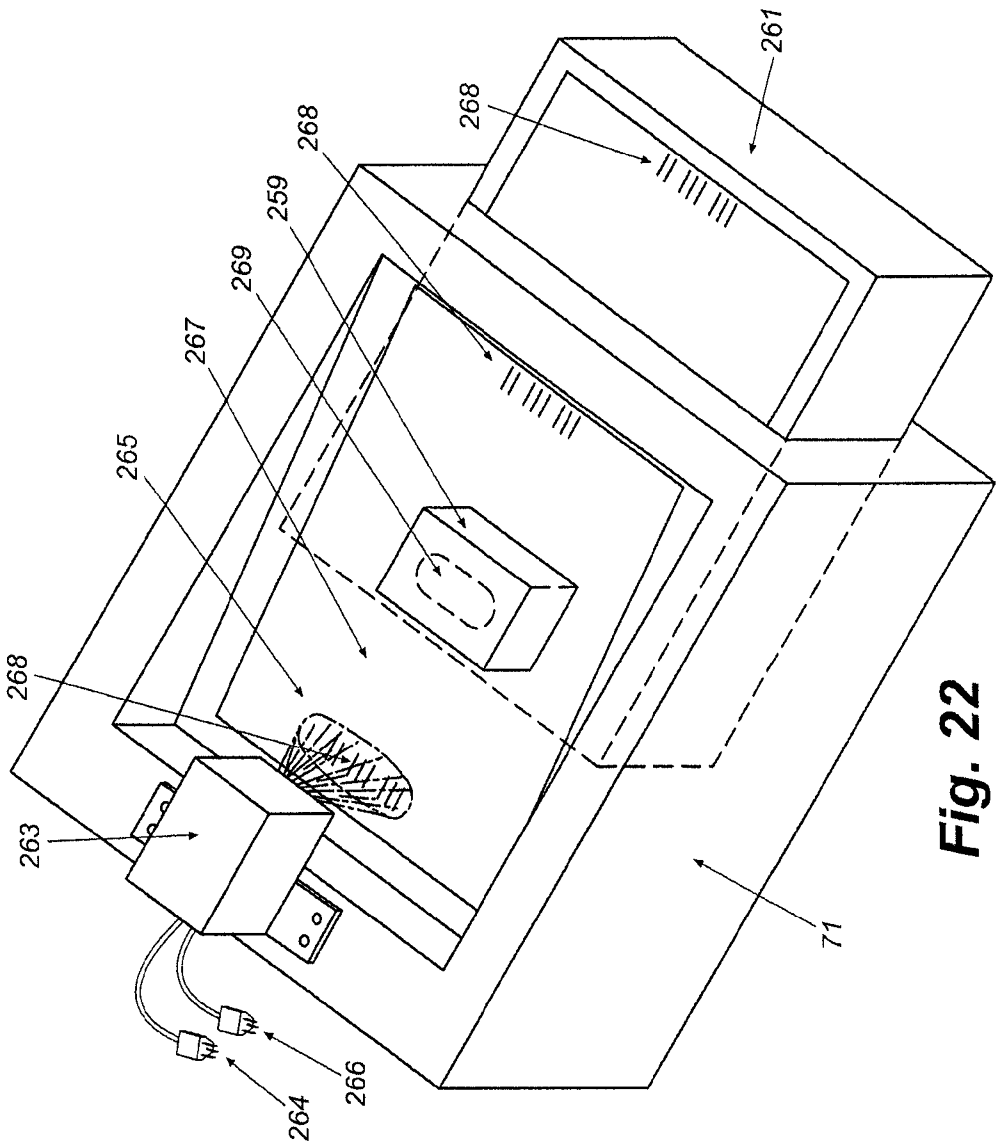
FIG. 22 is a perspective illustration of a barcode document ID reader printer.

Alternately, the document ID is rendered on top of the special location coded pattern paper in bar-code format, see FIG. 22. The bar-code 268 is read using commercially available bar-code scanners (259, 263). In another embodiment, machine readable alphanumeric labels are rendered on top of the special location coded paper and optical character recognition routines in combination with an optical scanner capture the document ID. In another embodiment, the document ID is rendered using 2D bar-code formats. In another embodiment, the document ID is embedded into the paper using RFID and the document ID reader can be an RFID reader.

The external and internal document ID readers 263 and 259 respectively are USB devices that are connected back to the ECDU and/or ECDU station PC. In another embodiment, these readers are integrated into the printer.

In both the scanning pen ECDU embodiments, the ECDU continues to record the whole ECDU session. ECDU sessions continue to record biometrics, pictures, videos, sounds, etc. along with all selections and answers in the ECDU session log.

The interactive nature of the ECDU is maintained through the use of special trigger spots encoded into the document, or through the use of trigger actions, such as bouncing the pen over an area. These special encoded regions trigger communications to the attached system via a wireless or wired communications interface. The communication can include writing captured data as well as commands. These commands include ECDU commands such as help, information, lookup, etc. The documents have embedded codes to capture document type as well as version number. Scanning pen embodiments can be used to capture credit applications, sign off inspection sheets, menu selections and sign offs, executed contracts and disclosure statements, and lease and/or rental agreements, vehicle completion forms, odometer disclosures, service contracts, etc.

Figure 25:
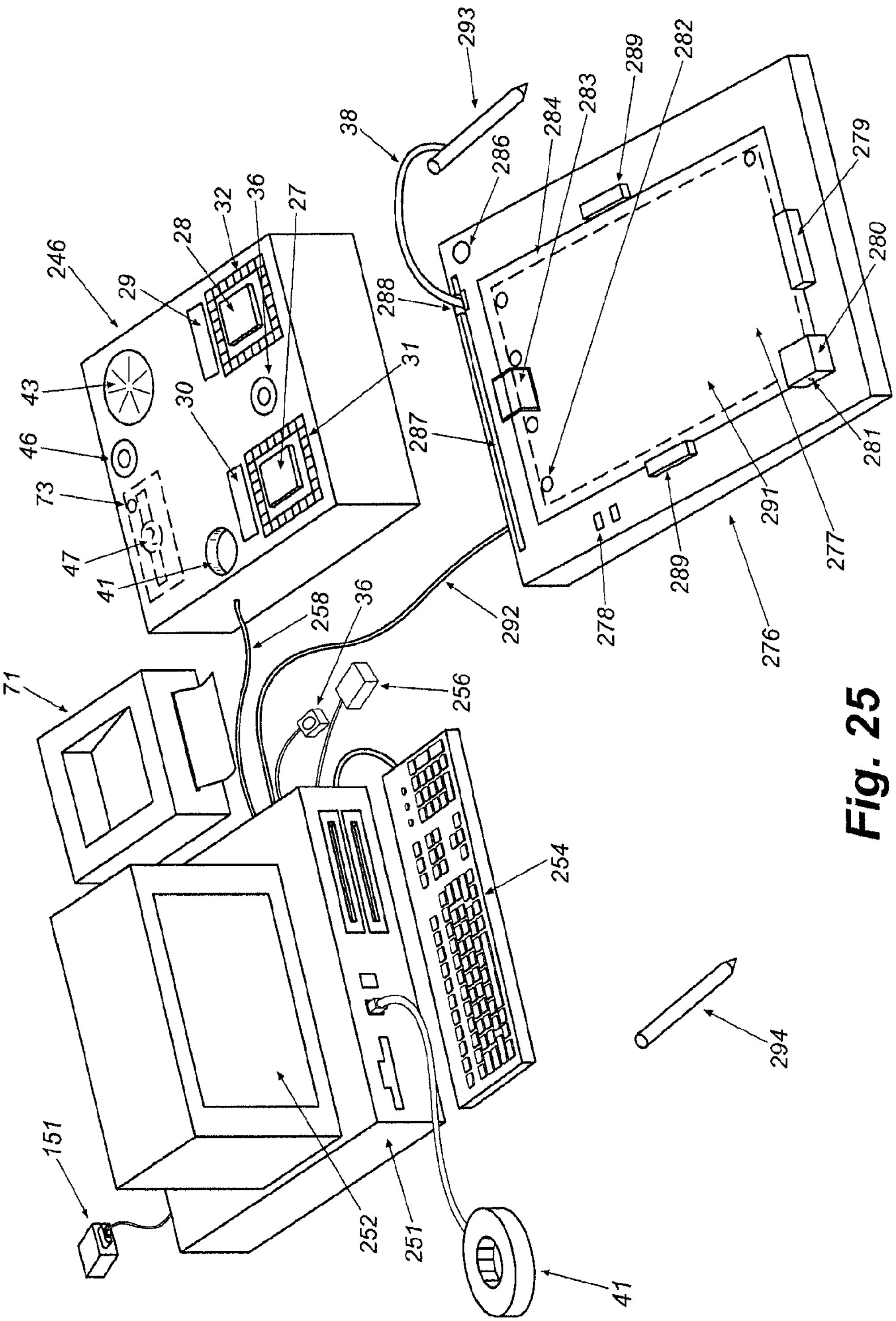
FIG. 25 is a perspective illustration of a PC-based ECDU with stand alone peripheral unit and digitizer unit.

FIG. 25 shows a digitizer grid ECDU embodiment. In this embodiment, a commercially available PC 251 is connected to a digitizing unit 276, which contains the digitizer grid 277, etc. The PC is also connected to the stand-alone unit 246 that contains the additional ECDU devices, such as biometric fingerprint readers with illuminated ring and decision labels, microphone(s) 36, speaker(s) 43, camera(s) 46, scanning pen port(s) 41, wireless unit(s) 47, internal scanner(s) and internal controllers as discussed above relative to FIGS. 19 and 20. The stand-alone unit 246 is connected to the PC via a communications interface 258 which can be any appropriate interface including USB, IR, wired networking, wireless networking, etc connections. This PC can be a stand-alone PC or the F&I PC; it can execute the ECDU software, and also can be connected to a printer 71 to allow for the printing of forms, contracts, disclosures, etc during the ECDU session. The digitizer unit 276 allows the customer to complete paper-based forms (e.g. credit applications, menuing, contracts and disclosures, etc) while electronically capturing the handwritten responses using the stylus ink pen 293 and digitizer grid 277, and without requiring special coded paper. The captured responses include the user's signature, required form data (e.g. address, phone number, etc.), and/or interactive commands (i.e. glossary lookups or requests for informational videos or advertisements). A second stylus ink pen 294 is available for use by the business employee. The second stylus allows the ECDU to record and identify handwriting from both the customer (e.g. from his/her signature, etc.) and from the business employee managing the transaction (e.g. from his/her underlining of key points, etc.) via the use of multiple stylus.

In one embodiment, the digitizing unit contains the digitizer grid 277, status LEDs 278, alignment brackets 279, document ID reader 281, alignment studs 282, holding clip 283, document alignment channel 284, stylus holder 286, one or more stylus ink pens 24, 26, one or more stylus tethers 38, a tether slide channel 287, sliding tether mount 288, and alignment brackets 289. The digitizing unit holds a document 291 that contains a document ID 280 and communicates with the PC through communications link 292.

The document ID reader captures the document ID 280, that is, a machine-readable identification code (e.g. bar code) printed on each document 291 (e.g. contract, disclosure, or menu). This identification code on the form identifies the document type, revision, and its unique identifier, which allows the ECDU to differentiate between two copies of the same form. The form type enables the ECDU to capture the stylus pen stroke into the electronic form of the same type. In use, as the user writes on the form, the ink records onto the paper while the digitizer grid captures the writing and the ECDU records it onto the corresponding electronic form. Because accurate registration of the digitizing process is important, alignment brackets and/or alignment studs are utilized to secure the forms on the digitizer unit, to ensure repeatable, constituent placement. The clip is used to retain the form after placement. In another embodiment, the form information (type, revision, unique identifier) is entered manually via writing on the form, or through keyboard entry, tablet stylus, touch screen, verbal entry, etc. In another embodiment, the form identification information is contained in RFID labels and read by an RF reader.

Figure 26:
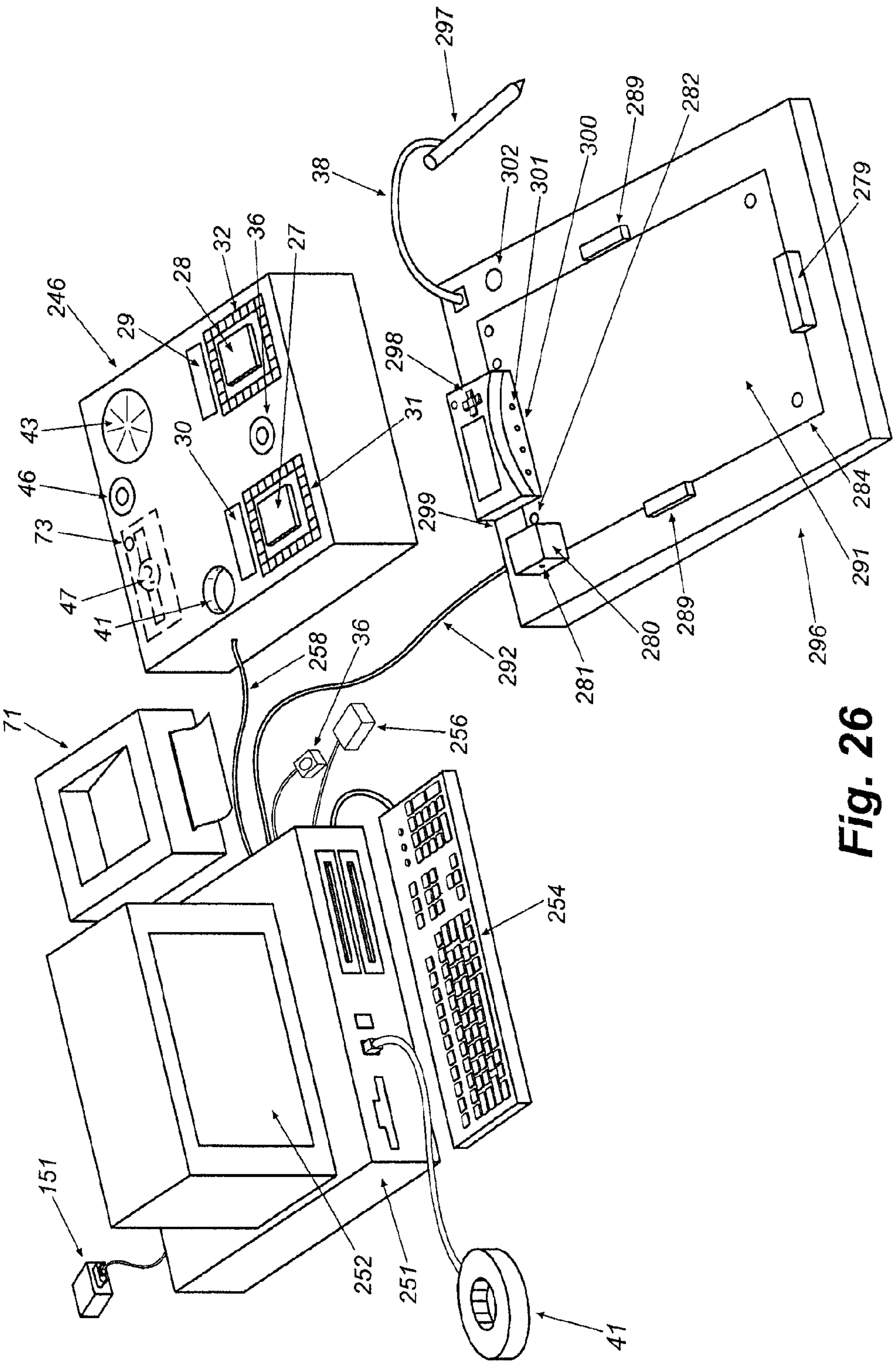
FIG. 26 is a perspective illustration of a PC-based ECDU with stand alone peripheral unit and ultrasonic digitizer unit.

FIG. 26 shows an ultrasonic, digitizer grid ECDU embodiment. In this embodiment, a commercially-available PC 251 is connected to an ultrasonic, digitizing unit 296 rather than an electromagnetic digitizing unit 276. Functionally, the ultrasonic digitizing unit 296 provides the same location information as with the electromagnetic digitizing unit 276 discussed above in FIG. 25. The PC 251 is also connected to the stand-alone unit 246 that contains the additional ECDU devices, such as biometric fingerprint readers 27 with illuminated rings 31,32 and decision labels 29,30, microphone(s) 36, speaker(s) 43, camera(s) 46, scanning pen port(s) 41, wireless unit(s) 47, internal scanners and internal controllers. The stand-alone unit 246 is connected to the PC 251 via a communications interface 258 which can be any appropriate interface including USB, IR, wired networking, wireless networking, etc. connections. The PC 251 can be a stand-alone PC or the F&I PC, and it can be used to execute the ECDU software. The PC is also connected to a printer 71 to allow the printing of forms, contracts, disclosures, etc. during the ECDU session. The ultrasonic digitizer unit 296 allows the customer to complete paper based forms (i.e. credit applications, menuing, contracts and disclosures) while electronically capturing the handwritten responses using the digitizer grid, as mentioned above. The ultrasonic stylus ink pen 297 interacts with the ultrasonic digitizer controller sensor 298 to determine the location of handwriting on the document 291. The ultrasonic digitizer controller sensor determines the location of the ultrasonic stylus pen by calculating the location changes in terms of sound. The spring controller hinge 299 provides a means for the hold clip 300 to hold the document 291 securely during operation. Additionally, alignment studs 282 are provided to align the document 291. Ultrasonic ink pen virtual buttons 301 are located along the front of the ultrasonic digitizer controller sensor 298. Also, the ultrasonic stylus ink pen 297 is attached to the ultrasonic digitizer unit 296 with a tether 38 and a ultrasonic ink pen holder 302 is located on the top right of 296.

Figure 27:
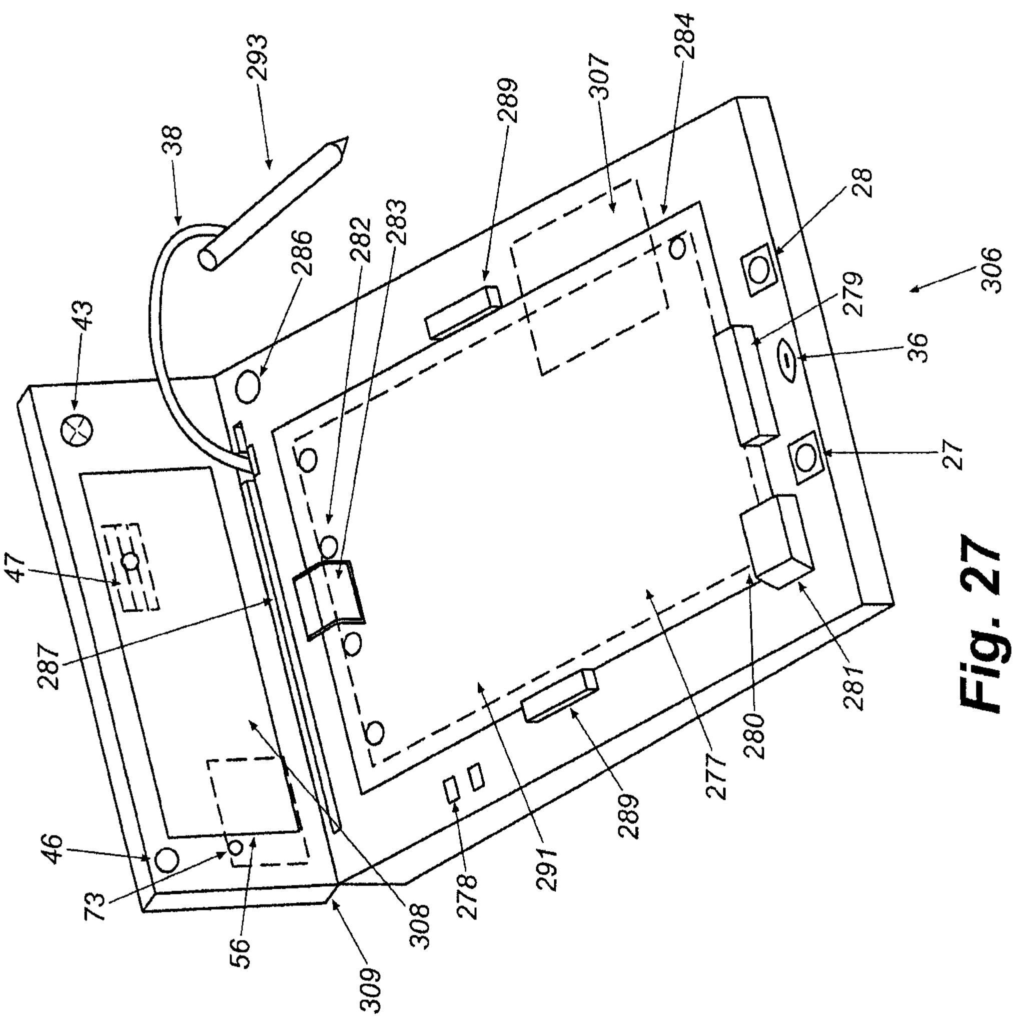
FIG. 27 is a perspective illustration of a stand alone display and digitizer grid ECDU.

FIG. 27 shows a separated display and digitizer unit ECDU embodiment. As shown in the figure, the digitizer unit 306 contains the alignment brackets 289 and alignment studs 282, as well as the holding clip 283 used for consistent placement of the document 291 on the digitizer grid 277. The document 291 contains a document ID 280. The periphery contains the biometric fingerprint readers 27 and 28, microphone 36, document ID reader 281, status LEDs 278, stylus ink pen 293, stylus holder 286, stylus tether 38, tether slide channel 287, speaker 43, camera 46, etc. Inside the ECDU are the controller 56, wireless unit 47, battery 307, etc. Located at the top of this ECDU embodiment is the separated display 308. The display 308 is used to convey interactive content, comprising, for instance, glossary lookups, updated pricing, informational videos, product advertisements, etc. The display 308 is attached to the pad via a hinge 309.

Figure 28:
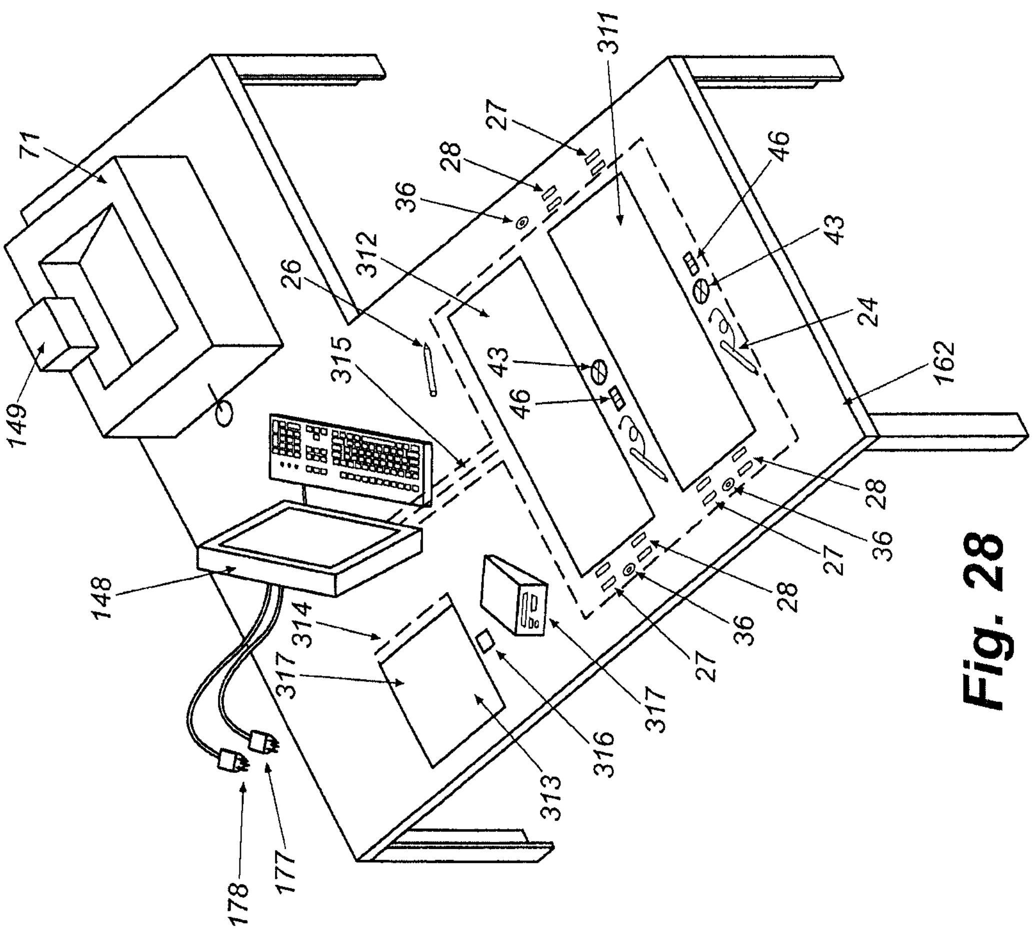
FIG. 28 is a perspective illustration of a dual tablet display ECDU integrated in a desk.

FIG. 28 shows another alternate embodiment of an ECDU station 12. This embodiment consists of dual tablet display ECDUs integrated in a desk embodiment. The desk 162 also contains cable raceways 315 for routing cables. The PC 148 in this embodiment is the ECDU controller 56, although not integrated with the displays as FIG. 4. As shown in FIG. 28, the desk 162 contains two oversized tablet displays 311 and 312. Each tablet display is capable of displaying both the front and back of a contract or disclosure page at the same time. Two cameras 46 are integrated into the desk—one records the consumer side of the desk and one records the business employee side of the desk. Also, biometric fingerprint readers 27 and 28 are placed on both sides of the desk at the base of the tablet displays to allow the multiple deal participants (one or more consumers and business employee) to authenticate and/or acknowledge at appropriate locations in the ECDU session. Located on the far left of the desk, is a multi-purpose display 313. Mounted below the top piece of glass of the display 313 is an embedded scanner 314 having capture area 317, and below the scanner is a display area. The multi-purpose display is used for example to capture used supplied paperwork (e.g. utility bills, checks, etc) by placing the document face down and pressing the scan button 316. When the scan is activated, the embedded scanner moves across the embedded display and captures an image of the page placed face down. After each scan, the scanned image is displayed on the embedded display 313 or one of the tablet displays 311, 312 to allow the participants to check the readability/suitability of the scan. Between scanner usage, the multi-purpose display is used to display relevant graphical advertisements and/or multi-media videos. ECDU ports 317 are provided for input/output purposes. In an alternate embodiment, a controller 56 is integrated with the displays or located beneath or adjacent to the desk 162 and connected to the displays.

In an alternate embodiment, the whole desktop surface is replaced with a single large display. Portions of the display are transparent to allow subsurface camera and scanner to capture images of participants and/or images of presented paper documents. Software tools allow the consumer and/or business employee to drag contract and disclosure documents electronically around the large desktop display. For example, documents can be dragged from a to-do list to a completed document folder. Located around the perimeter of the desktop are the remaining ECDU devices (biometric fingerprint readers and decision labels, microphone, speaker, . . . . )

In another alternative embodiment, images can be displayed to video headsets worn by one or more of the participants. In this embodiment, biometrics fingerprint readers and like can be incorporated into the headset, or elsewhere.

Figure 29:
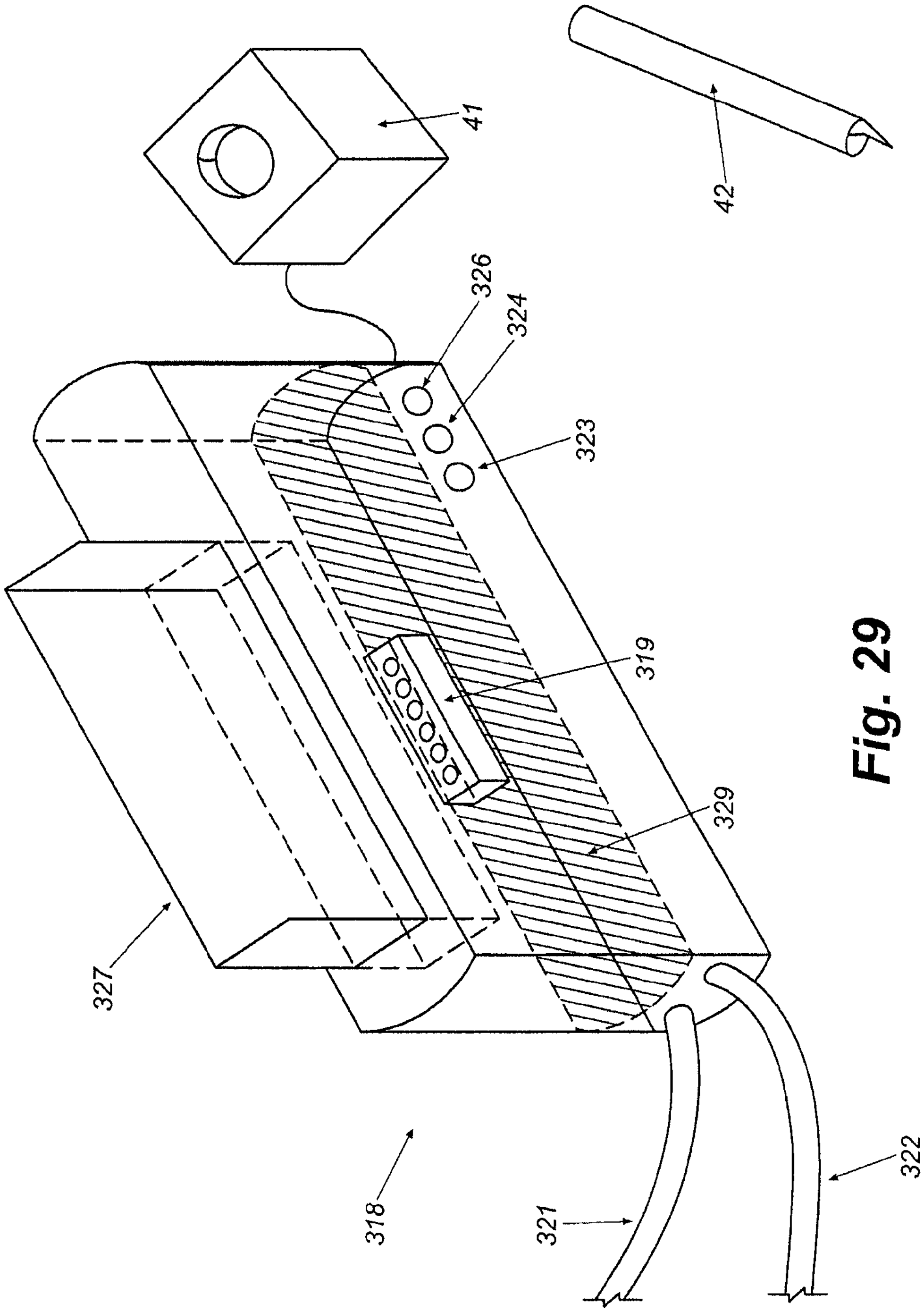
FIG. 29 is a perspective illustration of an ECDU cradle.

FIG. 29 shows the ECDU docking cradle 318 of one embodiment. The docking cradle 318 serves multiple functions; i.e., recharging, wired connectivity for uploading and downloading data quickly, and for storage.

The ECDU cradle 318 is shaped to comfortably support the ECDU unit 10 and includes an internal support plate 329. At the bottom of the cradle is the docking connector 319. This docking connector 319 provides electrical connection between the ECDU docking port 59 and the cradle. Power and ground are supplied using the docking connector 319 to power the unit and recharge the ECDU battery. The docking connector 319 also provides a wired data connection between the ECDU and the cradle. The cradle is shaped to allow the curved handles and bottom mounted printer to easily support the ECDU 10.

The cradle is connected to external power using a power cord 322. The cradle is connected to the local area network using an external cable 321.

The cradle has three indicator lights 323, 224, and 326 on the front face. These lights indicate ECDU status during docking. For example, the lights can show power, data transmission, and recharging status. The upper opening 327 is shaped to accommodate the ECDU 10 and a connected scanning pen docking port 41 is provided to support a scanning pen 42.

In various embodiments, the ECDU is powered or recharged via a power supply and is connected via cables to LAN and/or Internet without a cradle. The physical form factor could be designed for integration onto or into a desk, such as in the form of a desk overlay.

Figure 30:
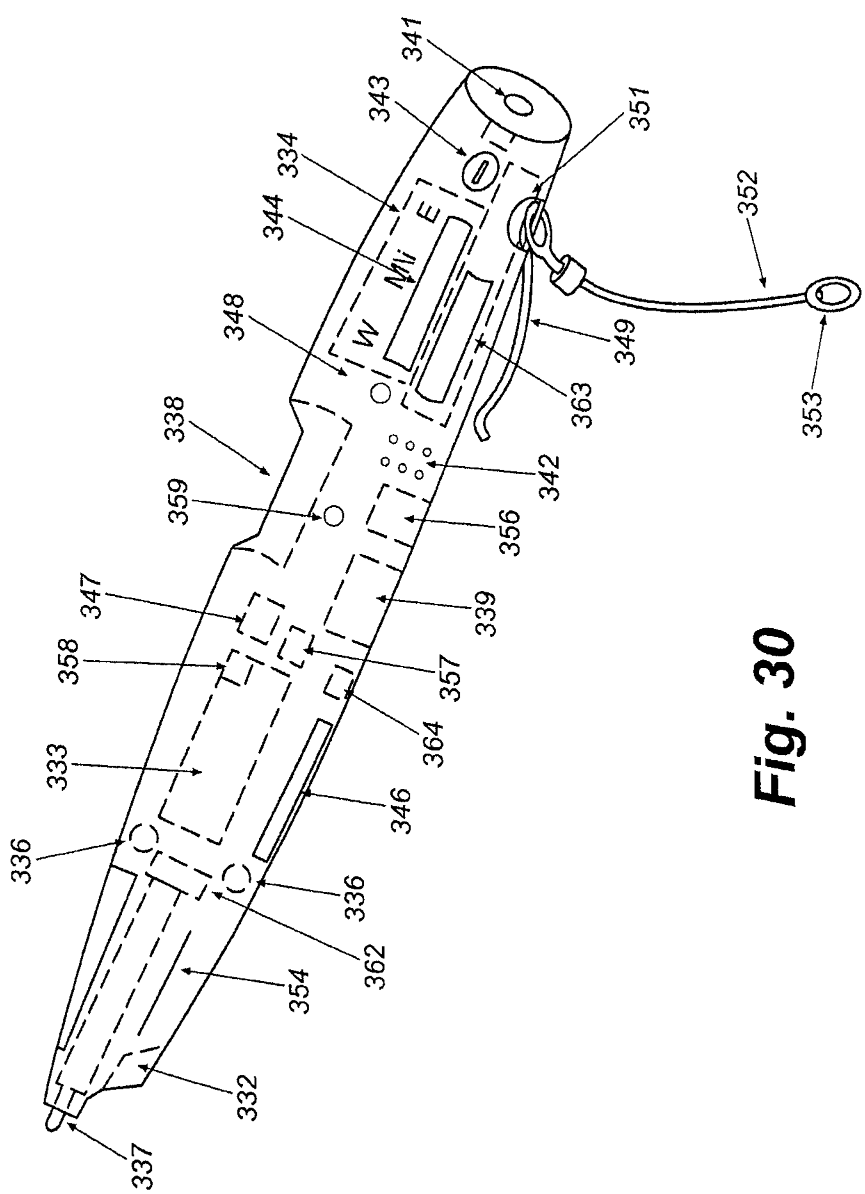
FIG. 30 is a perspective illustration of an ECDU scanning pen.

FIG. 30 shows one embodiment of a ECDU scanning pen. As discussed above, scanning pens are constructed by incorporating additional ECDU devices. FIG. 30 shows a scanning pen that includes the basic scanning pen equipment (infrared led & camera 332, controller electronics with software on a PCB 333, battery 334, on/off docking sensor 336, and pen-ink cartridge 337). In addition to the basics, the scanning pen also includes ECDU devices including a biometric fingerprint reader 338, wireless unit 339, camera 341, speaker 342, microphone 343, mode switch 344, docking connector 346, motion sensor 347, status led 348, clip 349, tether mounting loop port 351, tether 352 and tether mounting connector 353, biofeedback sensors 354, vibrator 356, encryption unit 357, and electronic serial number 358. The motion sensor 347 can be as simple as a mercury tilt switch or as elaborate as MEMS accelerometers. In one embodiment, the motion sensor 347 allows shutting the pen down when it has remained idle for a sufficient period of time in addition to the standard pen cap triggered shut down. The ECDU scanning pen also includes a biometric status LED 359, an on-off docking sensor 336, a writing pressure sensor 362, a power reception unit/secondary coil 363, and a reset switch 364.

Figure 31:
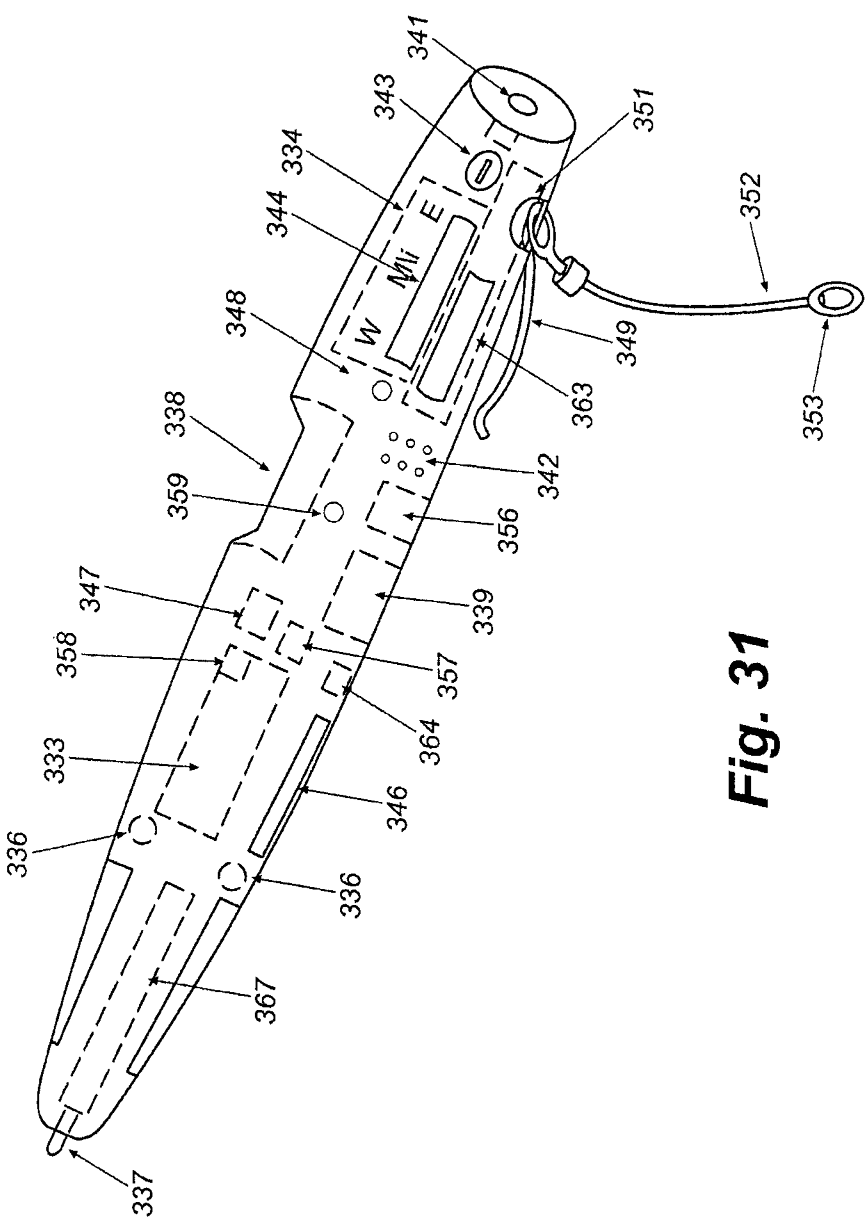
FIG. 31 is a perspective illustration of an ECDU stylus pen.

FIG. 31 shows another embodiment of a ECDU Stylus Pen. FIG. 31 shows a stylus pen that includes the basic stylus writing electronics (circuit board, EM sensor and components). In addition to the basics, the stylus pen also includes ECDU devices including a biometric fingerprint reader 338, wireless unit 339, camera 341, speaker 342, microphone 343, mode switch 344, docking connector 346, motion sensor 347, status led 348, clip 349, tether mounting loop port 351, tether 352 and tether mounting connector 353, biofeedback sensors 354, vibrator 356, encryption unit 357, and electronic serial number 358. The motion sensor 347 can be as simple as a mercury tilt switch or as elaborate as MEMS accelerometers. In one embodiment, the motion sensor 347 allows shutting the pen down when it has remained idle for a sufficient period of time in addition to the standard pen cap triggered shut down. The ECDU scanning pen also includes a biometric status LED 359, an on-off docking sensor 336, a writing pressure sensor 362, a power reception unit/secondary coil 363, and a reset switch 364.

In alternate embodiments, combo stylus/scanning pens are constructed in a similar fashion. In these combo pens, the pen tip contains both the basic stylus writing electronics 367 (circuit board, EM sensor and components) and the basic scanning pen equipment (infrared led & camera 332, controller electronics with software on a PCB, battery, on/off docking sensor, and pen-ink cartridge). The pen-ink cartridge 337 is retracted using a simple mechanical slide mechanism when the stylus pen mode is desired (e.g. during data entry/selection/navigation using the tablet display), and deployed when the scanning pen operating is desired (e.g. paper-based menus/forms are being disclosed and/or executed.)

Figure 32:
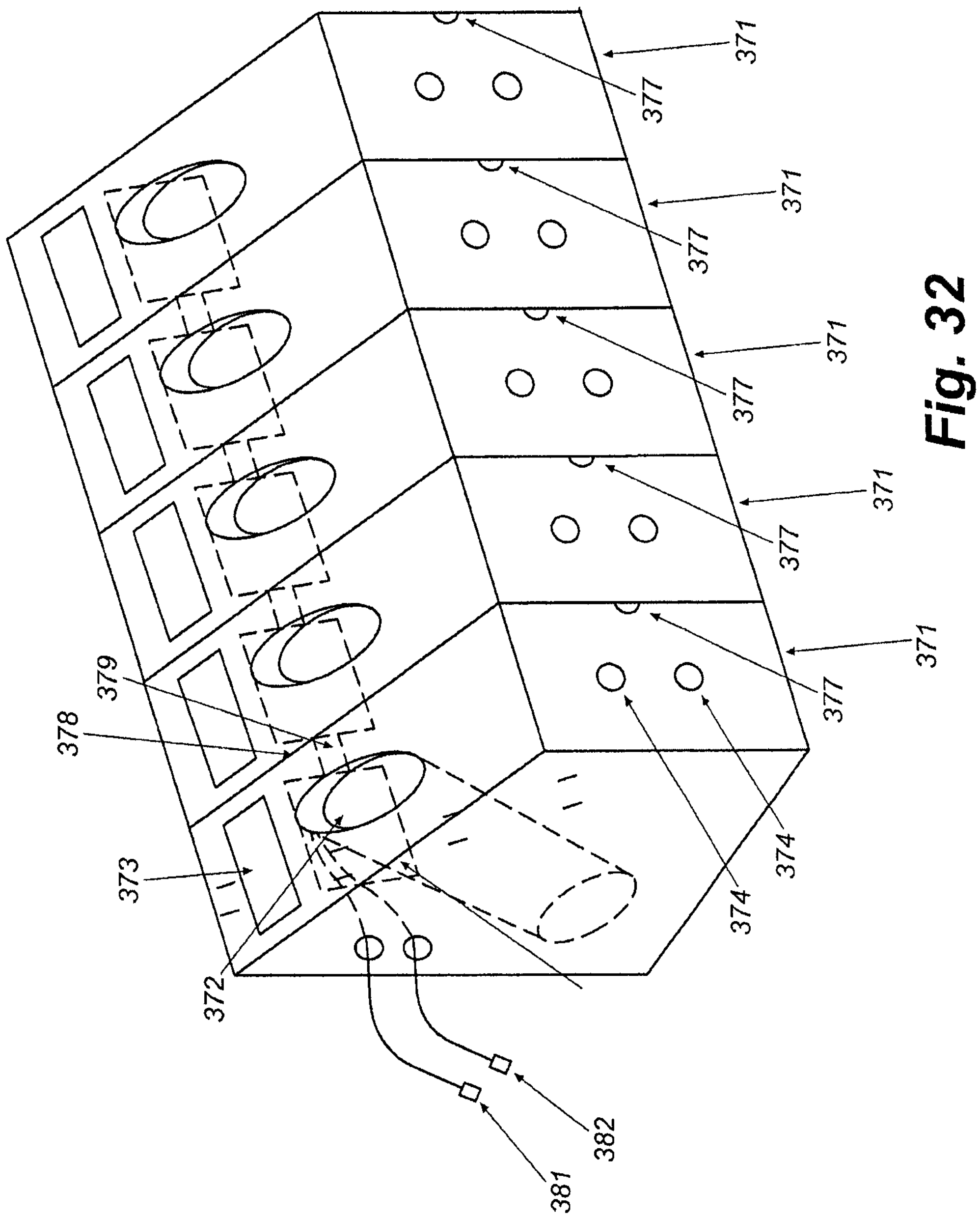
FIG. 32 is a perspective illustration of a multi scanning pen docking bank.

FIG. 32 shows an embodiment of a multi scanning pen docking bank. Each docking pen station or module 371 contains a single scanning pen docking port 372, a port label 373, and LEDs 374 to indicate status, a module controller 376 and keyed module interconnects 377 with power and USB connectors 378 and 379. The purpose of the module interconnects is to allow an arbitrary number of scanning pen docking stations to be physically and electrically daisy-chained (i.e. power, USB, etc). Power and USB jacks 381 and 382 are provided.

Figure 33:
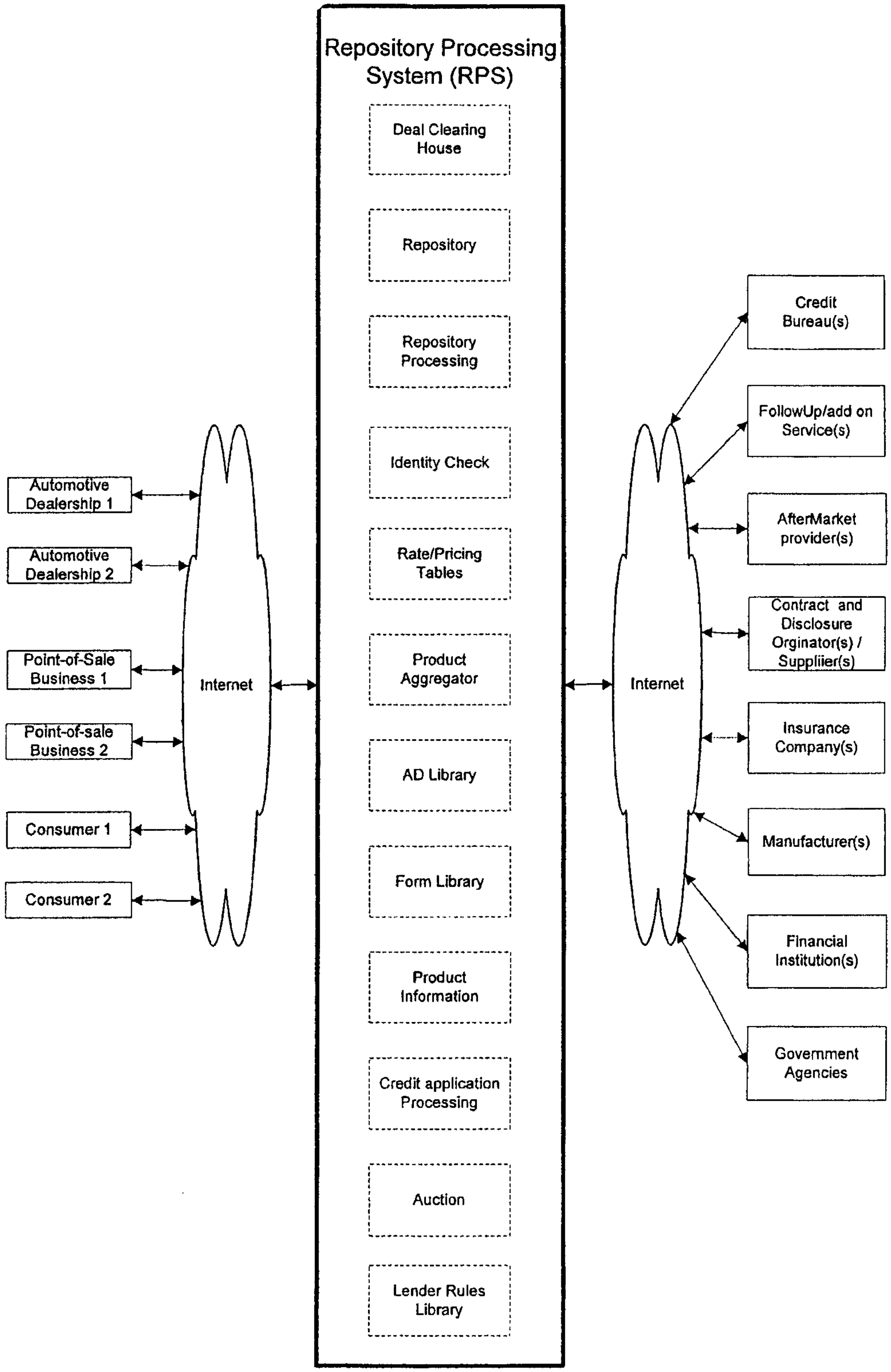
FIG. 33 illustrates a repository processing system (RPS).

FIG. 33 shows the Repository Processing System (RPS). The functionality of the RPS can be broken down for clarity into 12 major areas, as shown. The RPS simplifies the required connectivity by acting as a single, computerized point of access. Instead of ECDUs connecting to numerous (and potentially changing lists of) participants (e.g. credit bureaus, suppliers, lenders, insurance companies, warranty providers, after-market vendors, etc.), the ECDUs instead connect to the RPS and the RPS handles the numerous connections to these participants (e.g. credit bureaus, suppliers, lenders, insurance companies, warranty providers, after-market vendors, government agencies, etc.).

The first function in the RPS is the deal clearing house. At the completion of a car purchase or lease, for example, the completed ECDU session is sent to the RPS. The RPS processes the completed deal. This processing involves the distribution of relevant contracts and disclosures to the various participants (e.g. lenders, suppliers, etc.) that are involved in the deal. In addition, the RPS collects all funds and disperses funds to the relevant participants (car dealer, warranty provider, insurance company, etc.) preferably by wire transfer. In one embodiment, the ECDU session contains the deal closing statement supplied by the DMS and/or F&I systems at the dealership. The RPS uses the deal closing statement to distribute funds accordingly.

After processing the session, the RPS stores the completed ECDU session in the repository. The repository is a secured database. The repository provides financial participants a copy at any time, as needed.

The repository processing function is used to process the ECDU session data in the repository. This processing also may include the normalization of the data (e.g. standardization of terms, abbreviations and spelling).

The Identity check function is used to authenticate the identity of deal participants. In one embodiment, current biometric information is compared to stored biometric information in the repository to authenticate participant identity. In other embodiments, external databases are queried to check supplied addresses, phone numbers, etc.

The rate/pricing tables function is used to provide timely, updated pricing of product offerings. In one embodiment, the ECDU can query the “single-stop” (RPS) for current pricing information. For example, service warranties can be priced more accurately depending on actual car features, instead of through preprinted, group pricing schemes.

The product aggregator function is used to aggregate product purchases into packages, leading to volume pricing for participants. In one embodiment, after-market products are aggregated into packages to offer discounts to consumers based on combined volume discounts. Specifically, the RPS has large volume pricing power with suppliers, which is used for leverage power in obtaining the volume discounts. Since the RPS provides computerized distribution of advertisements and real-time pricing to the ECDUs, suppliers can offer specials in near-real-time to generate additional sales, if needed. Volume pricing power can extend to individual products, as well.

The Ad library is a repository of current product advertisements. These advertisements may be static, animated, multimedia, and/or video. In one embodiment, the ECDU queries the RPS to download demographically-targeted advertisements in response to users' queries for more information. Ad placement, size, degree, and multi-media format are selected according to the user's queries. These Ads are valuable in selling products and services to a consumer because of their prominent placement on the ECDU during the sales cycle.

The Form library is a repository of electronic contracts and disclosures for the various products and services offered by the participants. This centralized repository allows participants to replace out-dated forms and contracts, quickly at a single location. In one embodiment, the ECDU queries the RPS to download the relevant contracts quickly and disclosures for products and services during the ECDU session, in response to the customers' responses.

The product information function is a repository of relevant product information, comprising manuals, specifications, etc. In one embodiment, the ECDU queries the RPS to download up-to-date product information in response to users' queries for more detailed information.

The credit application processing function is used to manage the participant approval and lender selection process efficiently. Credit applications are merged with credit information and sent to financial institutions (e.g. lenders) for approval. In one embodiment, the institutions are prescreened based on credit scores. Moreover, the lender selection can be based on multiple criteria (e.g. lowest rate, simplicity to deal with, profit to dealership, etc.). In another embodiment, this function converts handwriting to text and checks data accuracy for the submitted applications.

The auction function is used to a select lender based on an auction format. In one embodiment, the RPS posts each credit application to an auction board. Each financial participant can then score each application independently and offer credit, if desired. The auction keeps track of the best offer to date. Lenders can then choose to offer lower rates based on their assessment of risk and/or their needs to make additional loans, etc.

ECDU Connectivity

Figure 34:
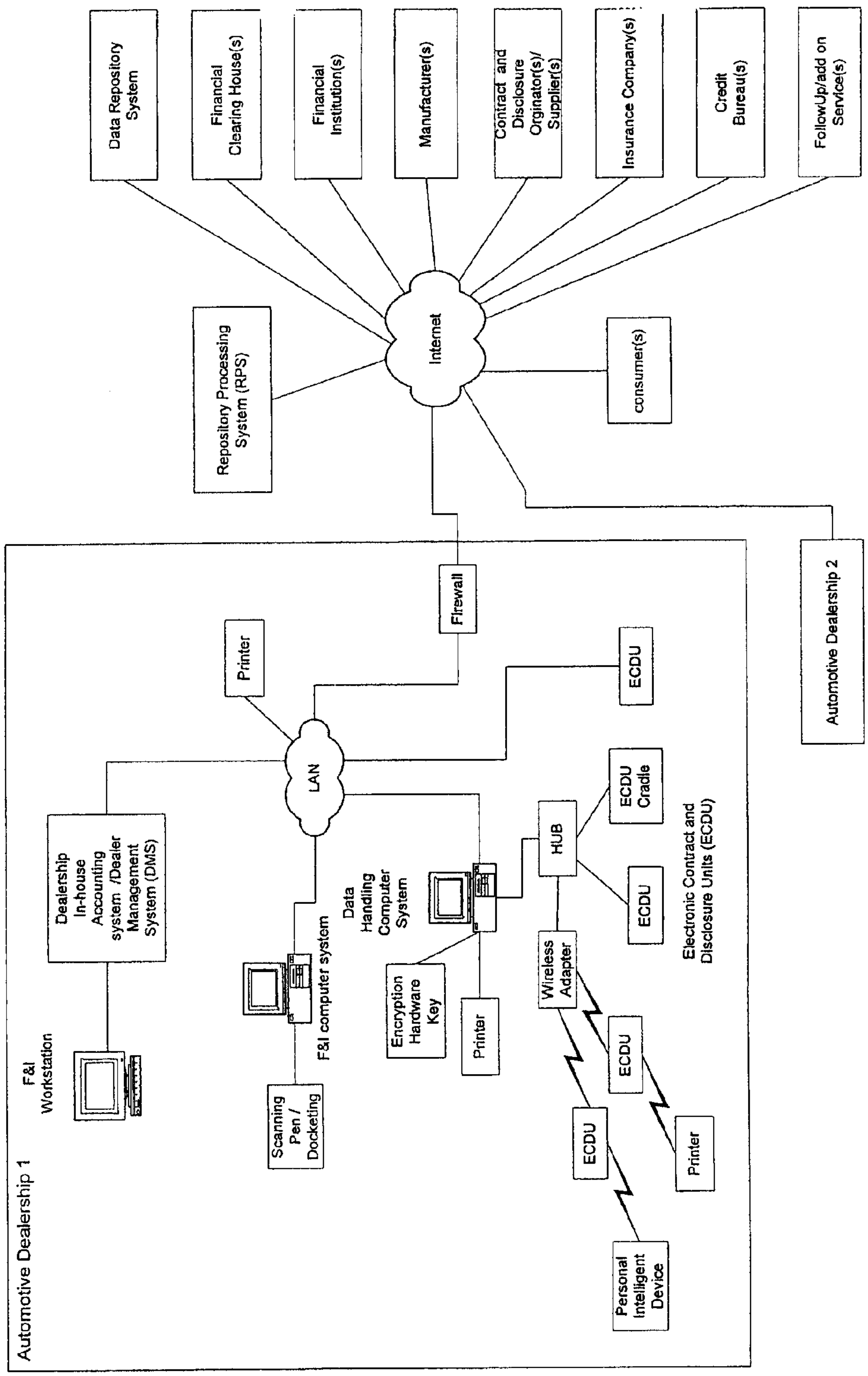
FIG. 34 is a dealership link diagram showing a DMS LAN configuration.

FIG. 34 shows one configuration of an ECDU in an automotive dealership environment. Modern car dealership accounting systems are configured using local area networks (LANs). The data handling computer is simply added to the LAN. The data handling computer is connected via wired and wireless interfaces to one or more ECDU systems. The data handling computer system is connected to the data repository system using the internet. The data repository system is queried by data users (e.g. FollowUp/add on services companies) via the internet.

Figure 35:
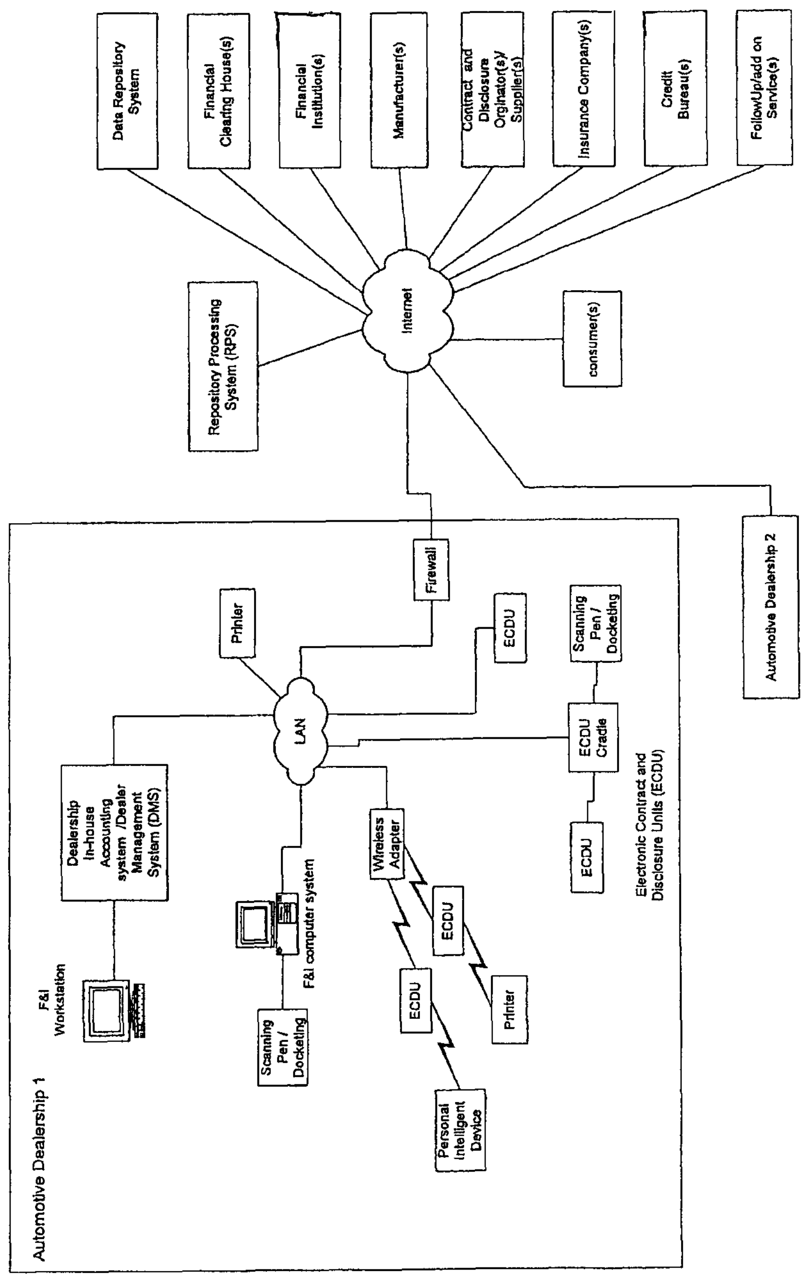
FIG. 35 is a dealership link diagram showing a DMS direct ECDU LAN configuration.

FIG. 35 shows an alternative embodiment where the ECDUs are only connected directly to the LAN without the need for the data handling computer. The functionality of the data handling computer system is included in the ECDU, in the F&I, in the DMS, or split between the three. Furthermore, the data repository can become the central server of data flow.

Figure 36:
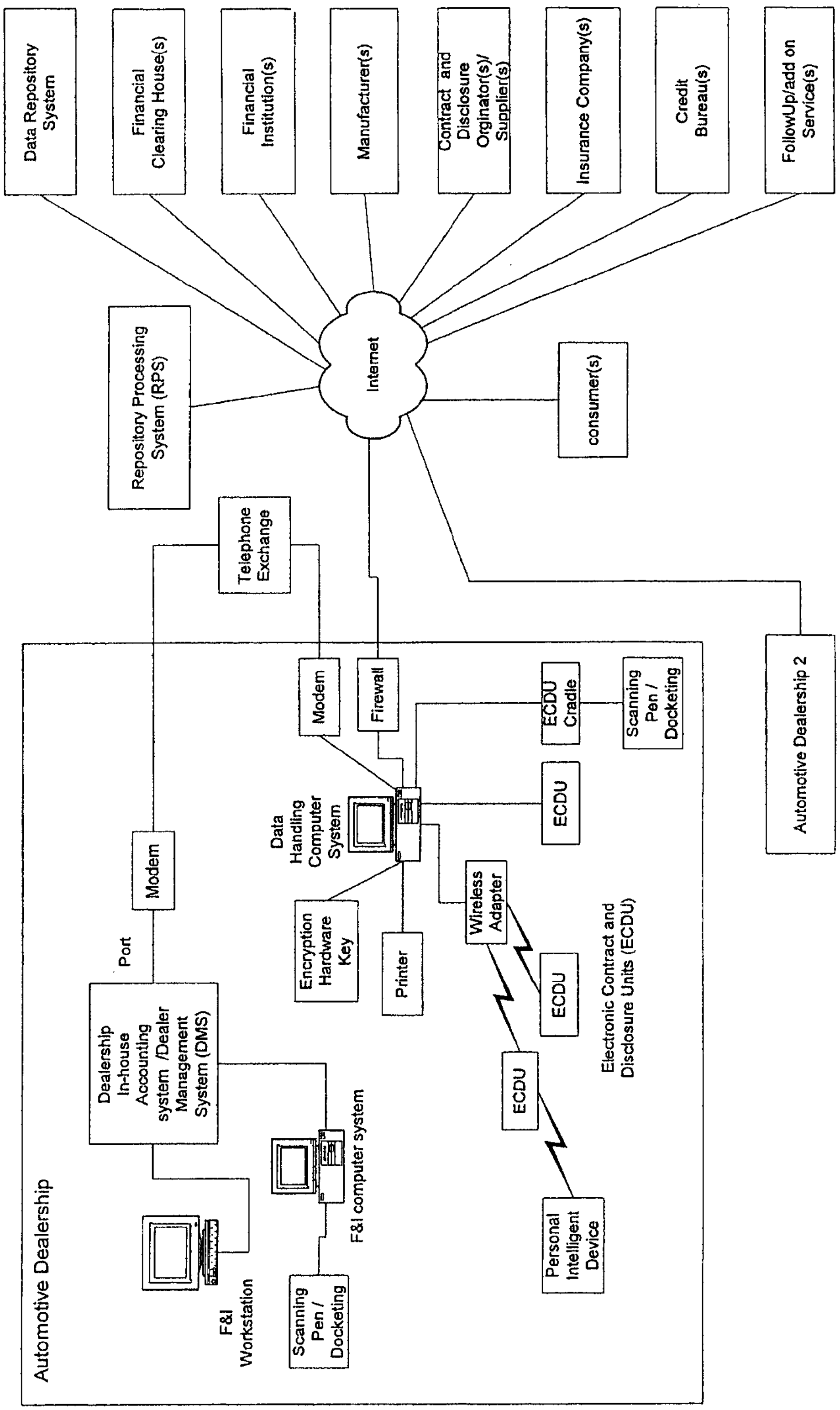
FIG. 36 is a dealership link diagram showing a DMS modem configuration.

FIG. 36 shows one configuration of an ECDU in an older car dealership environment. In some non-LAN, legacy dealership accounting systems, the connectivity to the accounting system is via hardware ports that require a modem or null-modem cable. For this configuration, the data handling system is connected using a dial-up modem attached to the maintenance port of the in-house accounting system. The data handling computer is connected via wired and wireless interfaces to one or more ECDU systems. The data handling computer system is connected to the data repository system using the internet. The data repository system is queried by data users (e.g. FollowUp/add on services companies) via the internet.

Figure 37:
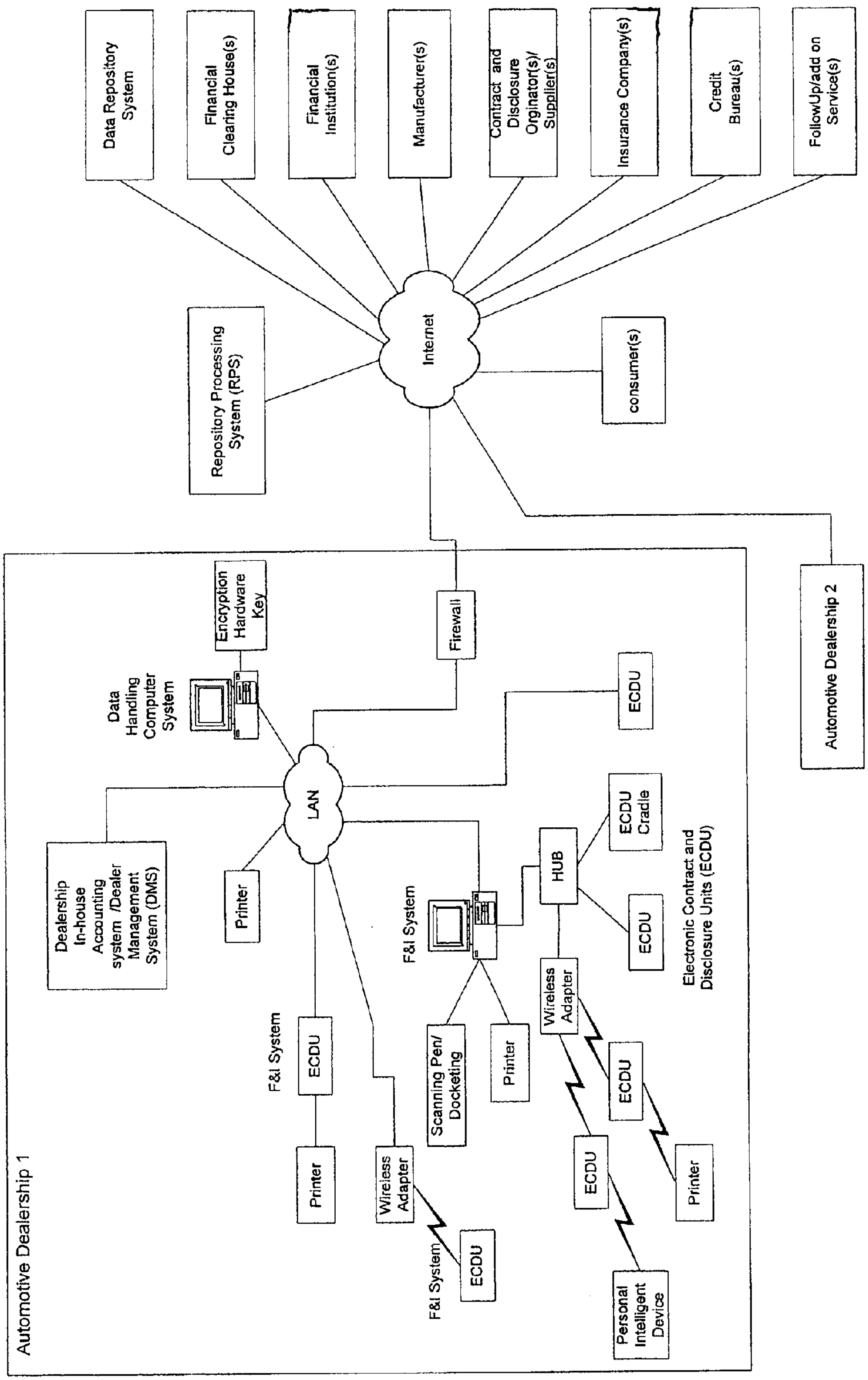
FIG. 37 is a dealership link diagram showing DMS LAN configuration and F&I connected to ECDU and F&I integrated ECDU.

FIG. 37 shows another embodiment of an ECDU in a car dealership environment. The Finance and Insurance (F&I) computer system is connected directly via wired and wireless interfaces to one or more ECDU systems. The F&I system is connected to the in-house accounting system via a LAN. The in-house accounting system is connected to external data repository systems using the internet (shown) or dial-up ports (not shown).

Also shown in FIGS. 34, 36, and 37, the ECDU is connected to the in-house accounting system/DMS without the need for the data handling system. This is accomplished by including the necessary data handling functionality into the in-house system/DMS, into the ECDU, and/or into the F&I system, or split between the three, as shown in FIG. 35.

Figure 38:
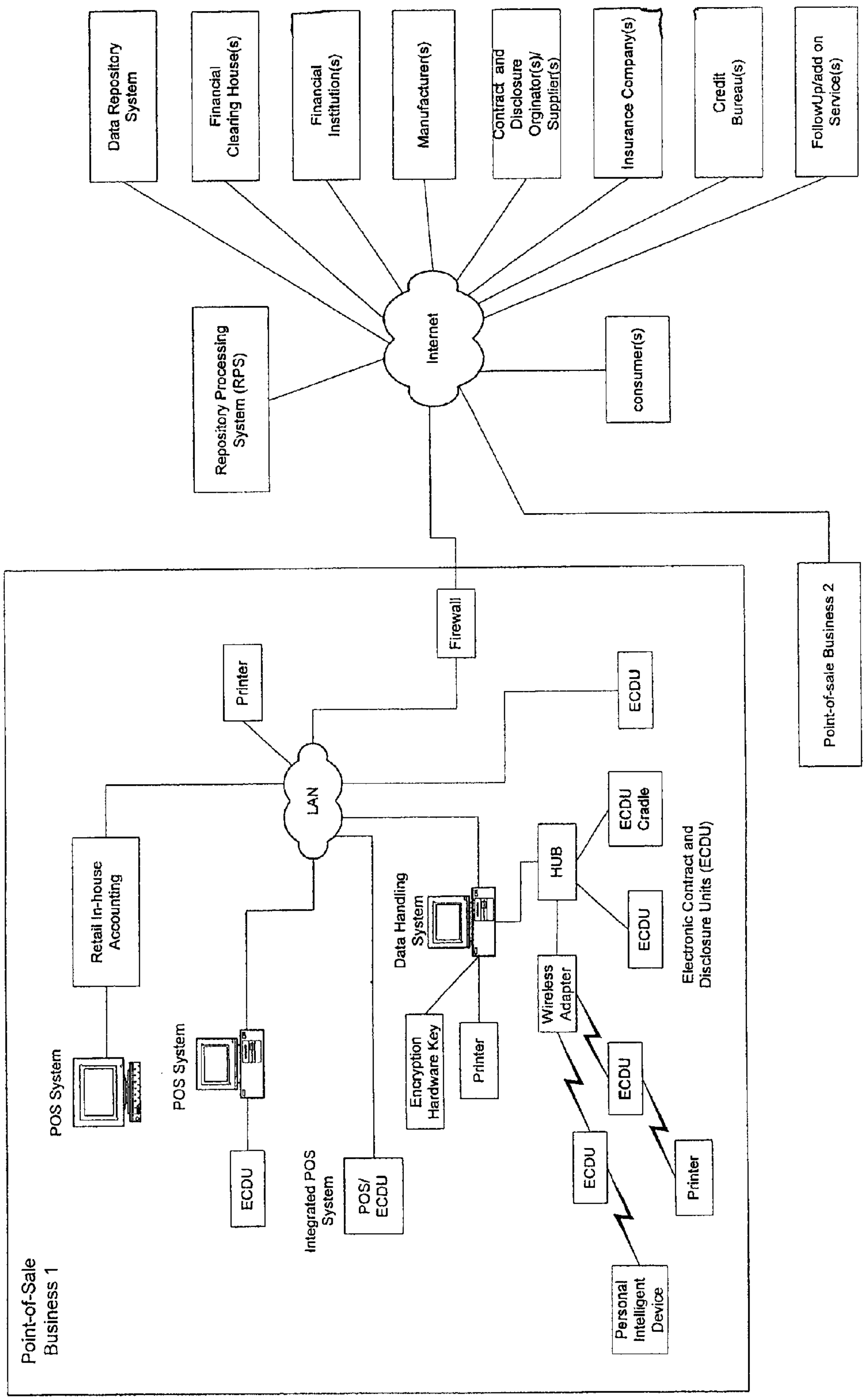
FIG. 38 is a point-of-sale (POS) link diagram.

In general, FIG. 38 shows a point-of-sale (POS) ECDU application such as a retailer (e.g. Sears selling appliances). The ECDUs are deployed to handle contracts and disclosures during the sales process. Similar to the dealership application, contracts and disclosures are received from designated providers, and the completed ECDU sessions are transmitted to the corporate office and/or data repository.

Also shown in FIGS. 34-38, all systems of the dealership or POS can communicate to the RPS as a single-stop interface. This RPS usage allows the dealership computers simply to connect to one external system rather than to a constantly-changing list of external participants. The consumer, one of the deal participants, is also shown in these Figures. The consumer can directly interface the RPS by pre-entering credit applications, looking at product Ads and pricing, accessing product information, pulling down completed contracts and disclosures after the purchase, etc.

Figure 1:
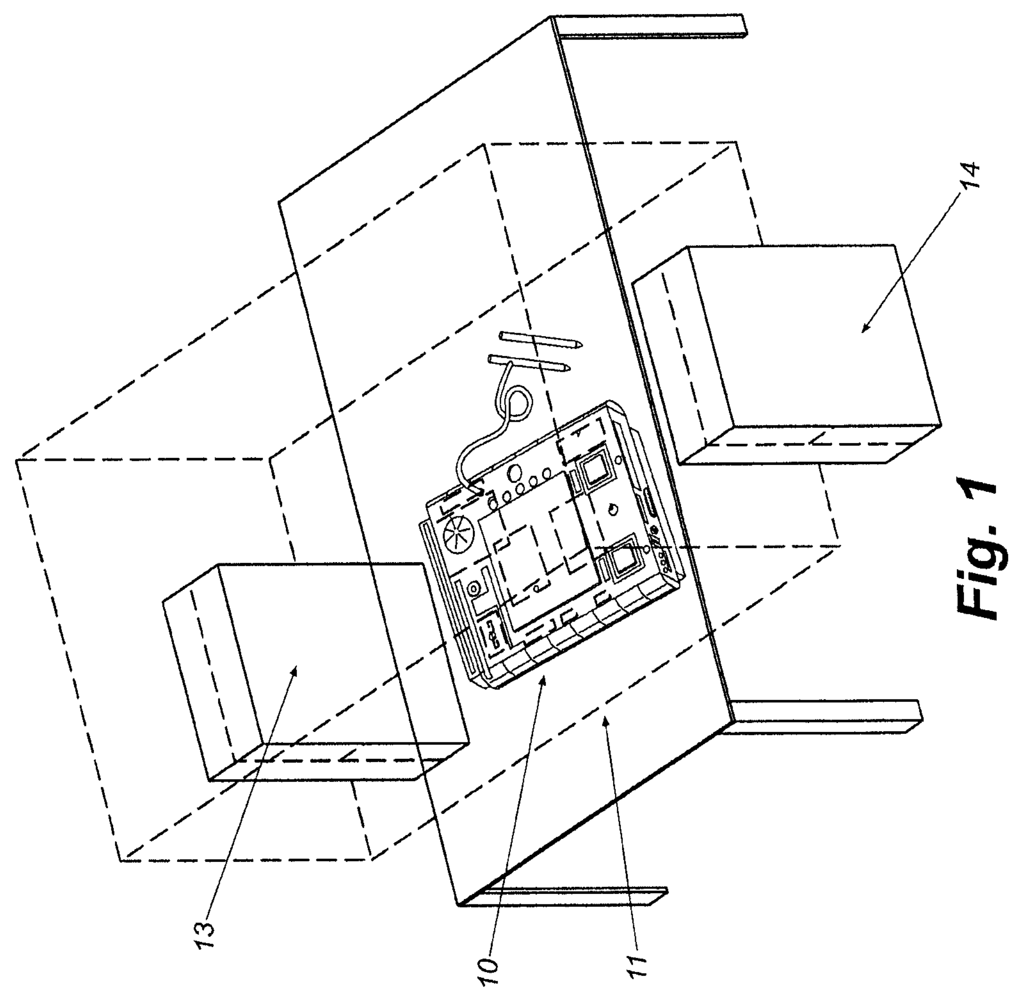
FIG. 1 is a perspective illustration of a collaborative transaction volume (CTV) of an electronic contract and disclosure unit (ECDU) according to the invention.

The capabilities and connectivity of the ECDU allows additional deal participants to be virtually present/represented in the CTV, see FIG. 1. For example, initially credit applications are shared with multiple sources of credit either directly via the internet or via the RPS. The selected source of credit becomes a virtual participant in the CTV. Other virtual participants may include suppliers of after-market items, providers of extended warranties, manufacturers, etc. As data is entered and relevant selections are completed during the ECDU session, updated session data is shared with the relevant virtual participants (e.g. lender). For example, the credit engine and policies of the lender are either accessed remotely via the Internet, indirectly via the RPS, from the RPS, from the local deal handling computer system DHS and/or locally from the ECDU. Similarly, legal constraints also affect the content and structure of the contracts and/or disclosures. For example, changes in a consumers residence data often requires different local sales tax rates, different disclosures and other local legal forms. Furthermore, marketing program eligibility affects the content and structure of the contracts and/or disclosures. For example, military personnel often qualify for special terms and conditions. While in the preferred embodiment, this functionality resides on the RPS, in alternate embodiments this functionality is stored locally on the deal handling computer system or even on the ECDU.

FIG. 39 shows the stages of an ECDU assisted deal flow in a car dealership in one embodiment.

FIG. 40 shows the stages of a modified ECDU deal flow in a car dealership in another embodiment. The primary difference is that the deal handling system is pulling the deal from the in house accounting system whenever the deal is available.

FIG. 41 shows the stages of an integrated ECDU, F&I system deal flow in yet another embodiment. This deal flow may be found in a dealership that uses an ECDU as a peripheral off of the F&I system or the ECDU performs the F&I function.

FIG. 42 shows the stages of a scanning pen based ECDU/F&I system deal flow. This deal flow may be found in a car dealership that uses paper based forms in the ECDU session.

FIG. 43 shows the stages of a POS transaction deal flow in one embodiment. The primary difference is that the ECDU is closely linked to the POS (i.e. cash register) instead of dealership F&I equipment.

ECDU Usage Illustration

In one embodiment, the ECDU is used in a car dealership, typically in the finance and insurance (F&I) department. Broadly, the terms contracts and disclosures include all legal agreements, contracts, policies, disclosures, menus, sales order, check lists, enlistments, etc. The following discussion illustrates the manner in which the ECDU may be used to improve the sales process and all related transactions. FIGS. 44-75, 77-87 and 90 show schematically the front view or screen of the ECDU during different stages of the sale process in various embodiments.

These illustrations show the ECDU's capabilities using the car dealership example, which is one preferred use. However, these capabilities also apply to more general point-of-sale (POS), rental industries, financial, and insurance applications in a broad range of industries; i.e., boats, recreational vehicles, mortgages, equipment leasing, insurance industry (car, home, life, liability, boat, etc.), banking products, military recruiting, drug screening, etc.

Figure 44:
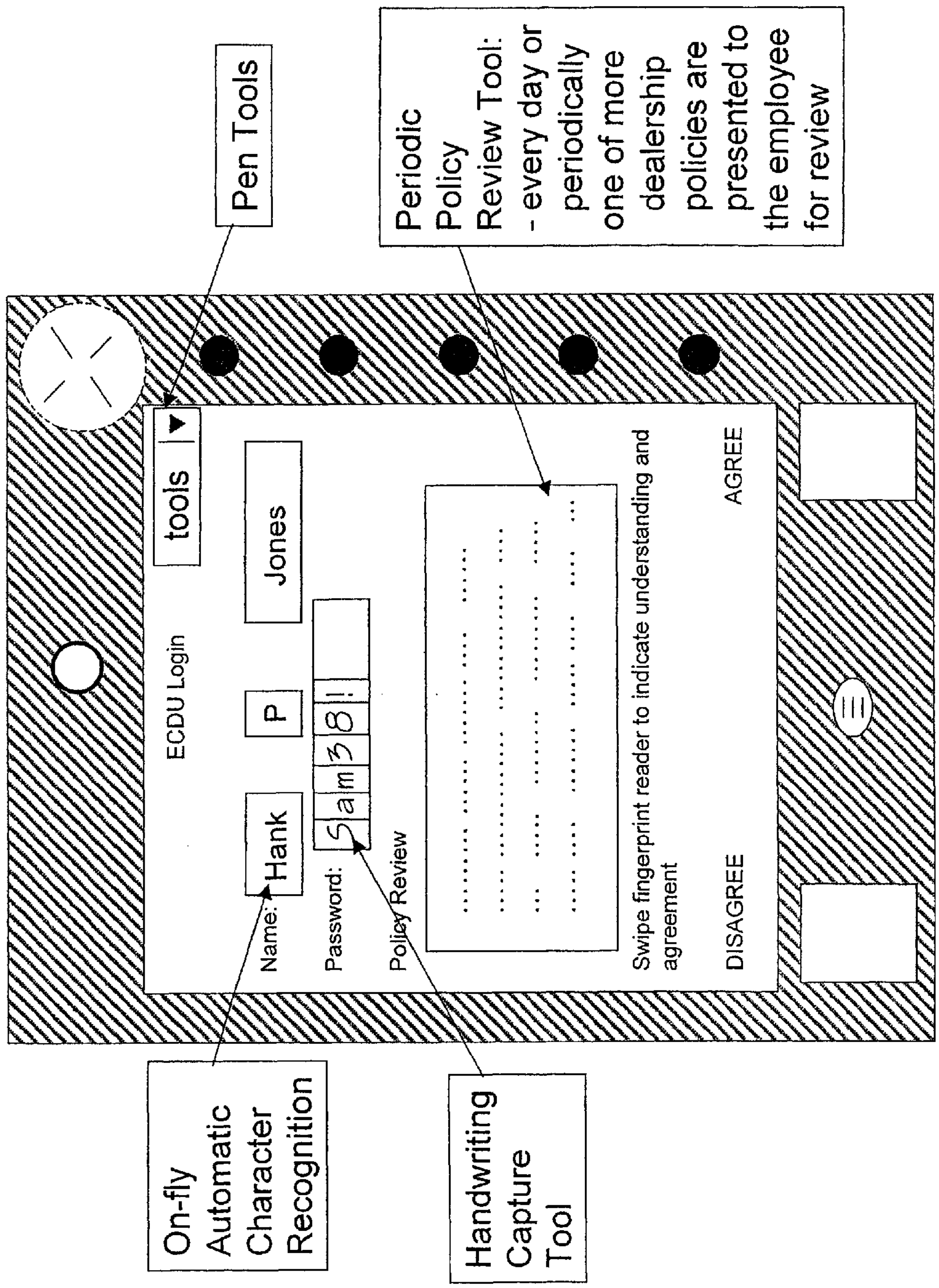
FIG. 44 is an illustration of an ECDU employee login screen.

FIG. 44 shows the ECDU Login Screen. The dealership employee enters the required information, such as name and password. Also, periodically one or more of the dealership privacy policies and regulations are displayed on the screen. The employee must read and indicate his understanding of these policies before the ECDU session will continue. This policy review happens periodically, perhaps during the first session after a prescribed number of days have past since the last verification of his understanding of the important privacy policies and regulations. The timing or frequency is determined by the requirements for review of standardized policies. The employee indicates his understanding and agreement to follow these policies using the biometric fingerprint readers.

Typically, the car customer, after selecting a car, agreeing on a price and signing a buyers order, is turned over to the F&I department to complete the sale. The sales contract and relevant disclosure agreements are loaded into the ECDU and the car customer begins the ECDU session with the ECDU initialization screen shown in the embodiment of FIG. 45. This screen has two functions. First, the car customer selects his preferred language using the stylus pen and the list of available languages. While in most jurisdictions, the official contract is in English, the contract is also available in a translated form for customers who speak a language other than English. If the customer chooses a language other than English, then later screens are either shown using a split screen format, see FIG. 78, or in a language switchable format, as in the embodiment of FIG. 77, or in an interleaved format, as seen in FIG. 79. For vision impaired customers, the enlarge and audio tools will enable these customers to receive the necessary disclosures.

Figure 45:
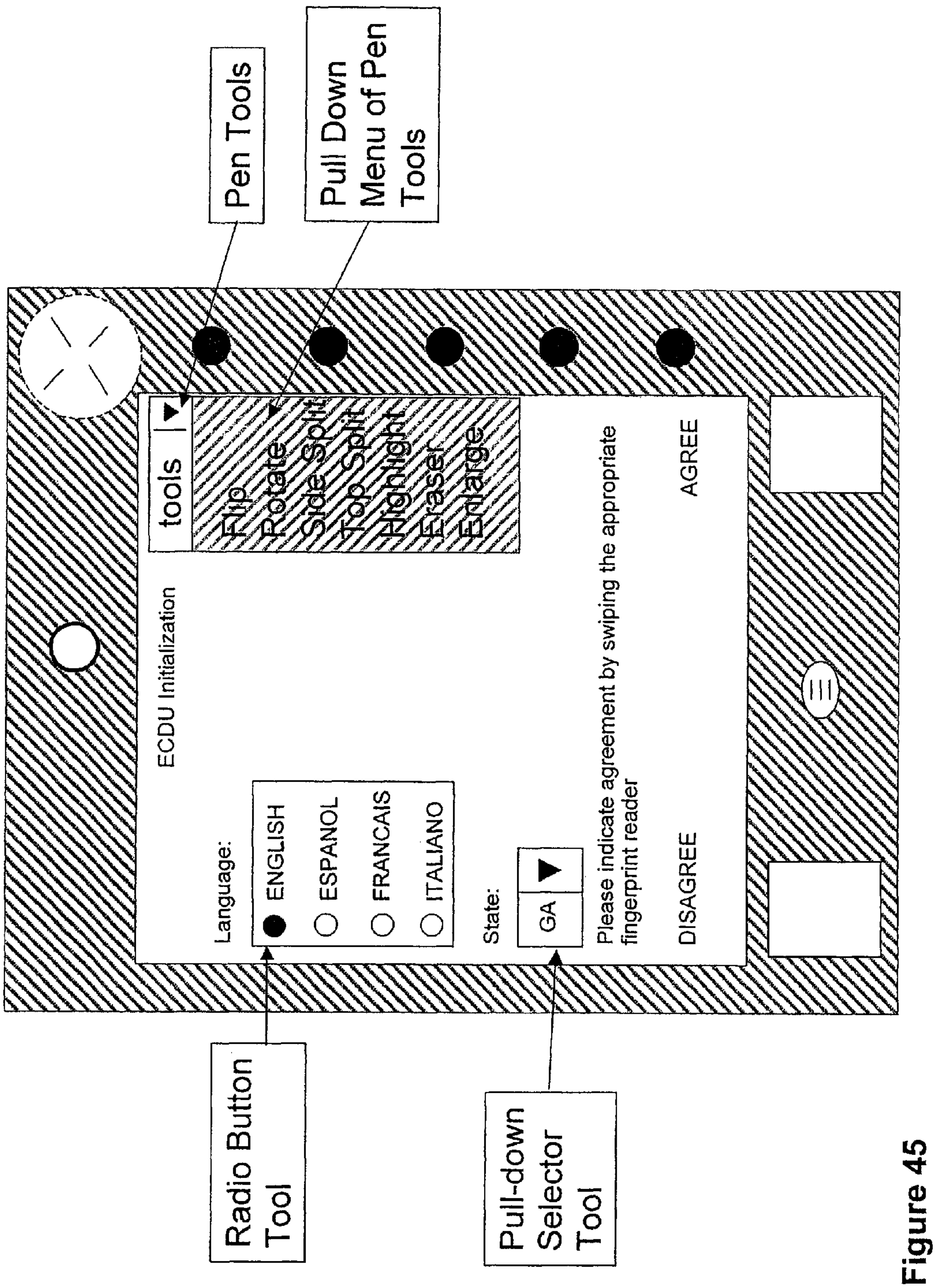
FIG. 45 is an illustration of an ECDU initialization screen.

While the user's (i.e. customer's) name, address, etc. have most likely already been captured into the F&I system, the ECDU verifies the user's State or Region prior to beginning the ECDU session, as shown in FIG. 45. If not already captured, the ECDU prompts the user to enter the required information. If desired, this information can be scanned from the customer's driver's license (or other ID) using the scanner incorporated in the ECDU or captured from the buyers order using scanning pens or optical scanners, or captured from credit application. This is important because contract requirements vary across jurisdictions and the ECDU displays the appropriate contract and disclosures.

After indicating the user's language preference and verifying the user's State or Region, the user swipes (actuates) the fingerprint reader below the AGREE label to validate these choices. While the user is swiping his fingerprint, the camera on the ECDU records his photo to document that the correct person's finger was swiping the fingerprint reader.

In many ECDU embodiments, fingerprint readers are used to authenticate screens quickly without the need for full signatures or initials. In effect, by swiping the fingerprint reader, the user agrees to substitute his fingerprint (biometric) for his signature. This also insures that only the customer is paging through the screens. In ECDU embodiments without fingerprint readers, the ECDU can use signature capture and/or other possible biometrics (i.e., face) on each screen to ensure that only the customer is paging through the screens. For example, corresponding agree and disagree buttons are displayed and selected with the stylus, and other authentication (e.g. biometrics, signature, initials, and/or photo captured) are used to validate each page. In some cases, multiple biometrics (e.g. fingerprint, voice, etc.) and signature captures can be used as required by the contract originator.

In addition to recording static photos during the ECDU session, the ECDU in one embodiment records the whole session by using the multi-frame capability of the camera to record a movie (video). Also, the microphone records audio during the whole session. The audio and video are useful to show that the correct user was using the ECDU, that the user and not the salesman was selecting the various choices, and to record any external prompting or Q&A with surrounding people. This audit trail provides invaluable evidence in settling disputes, evaluating training, etc.

Also, shown in the upper right hand corner of the display in the embodiment of FIG. 45 is the pen tools menu. This tools menu is generally available on all screens throughout the ECDU session. The tools menu contains many useful tools. Some of these tools are illustrated in FIGS. 46-48, 73, 78, and 79. The eraser tool is used in various embodiments to toggle the pen function from writing to erasing.

Figure 46:
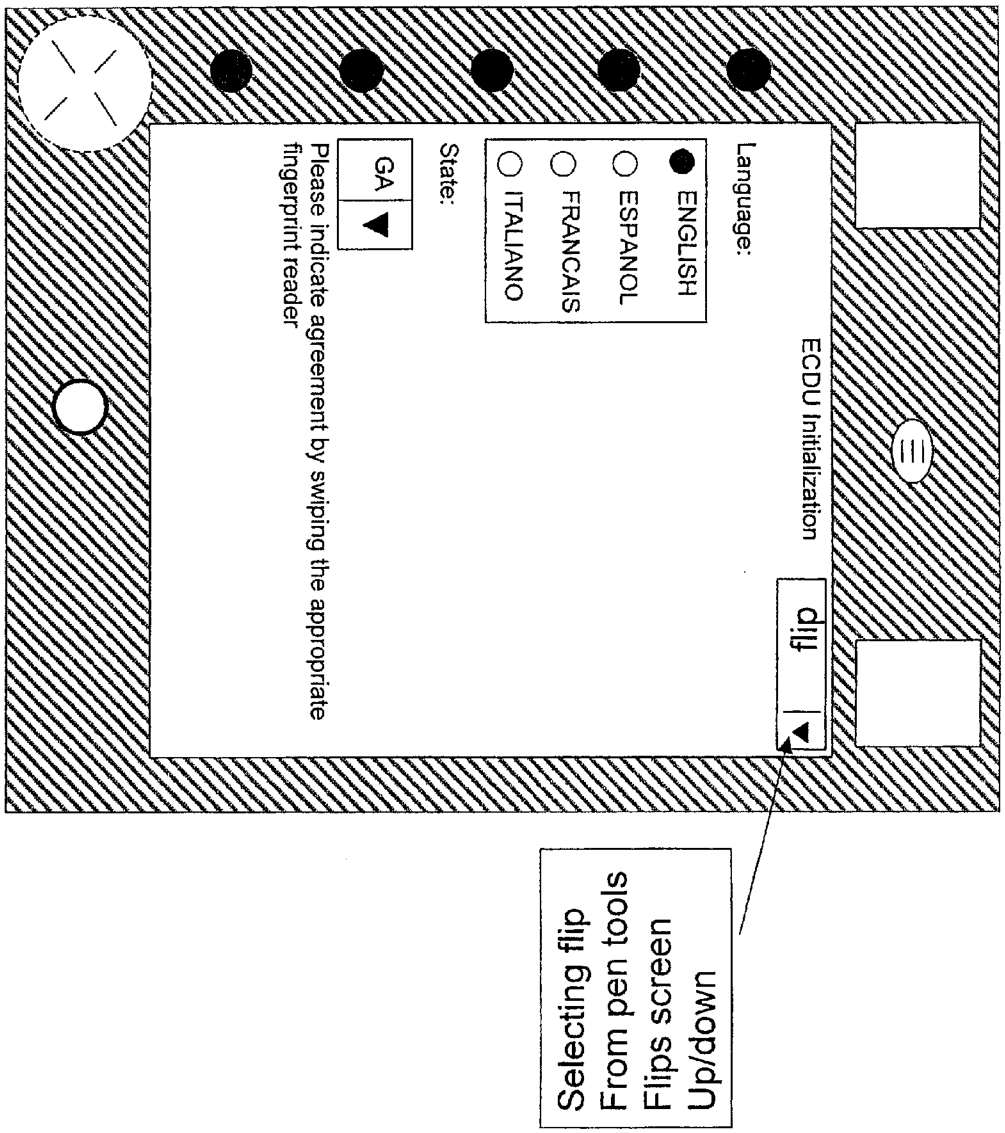
FIG. 46 is an illustration of an ECDU screen flip pen tool.
Figure 74:
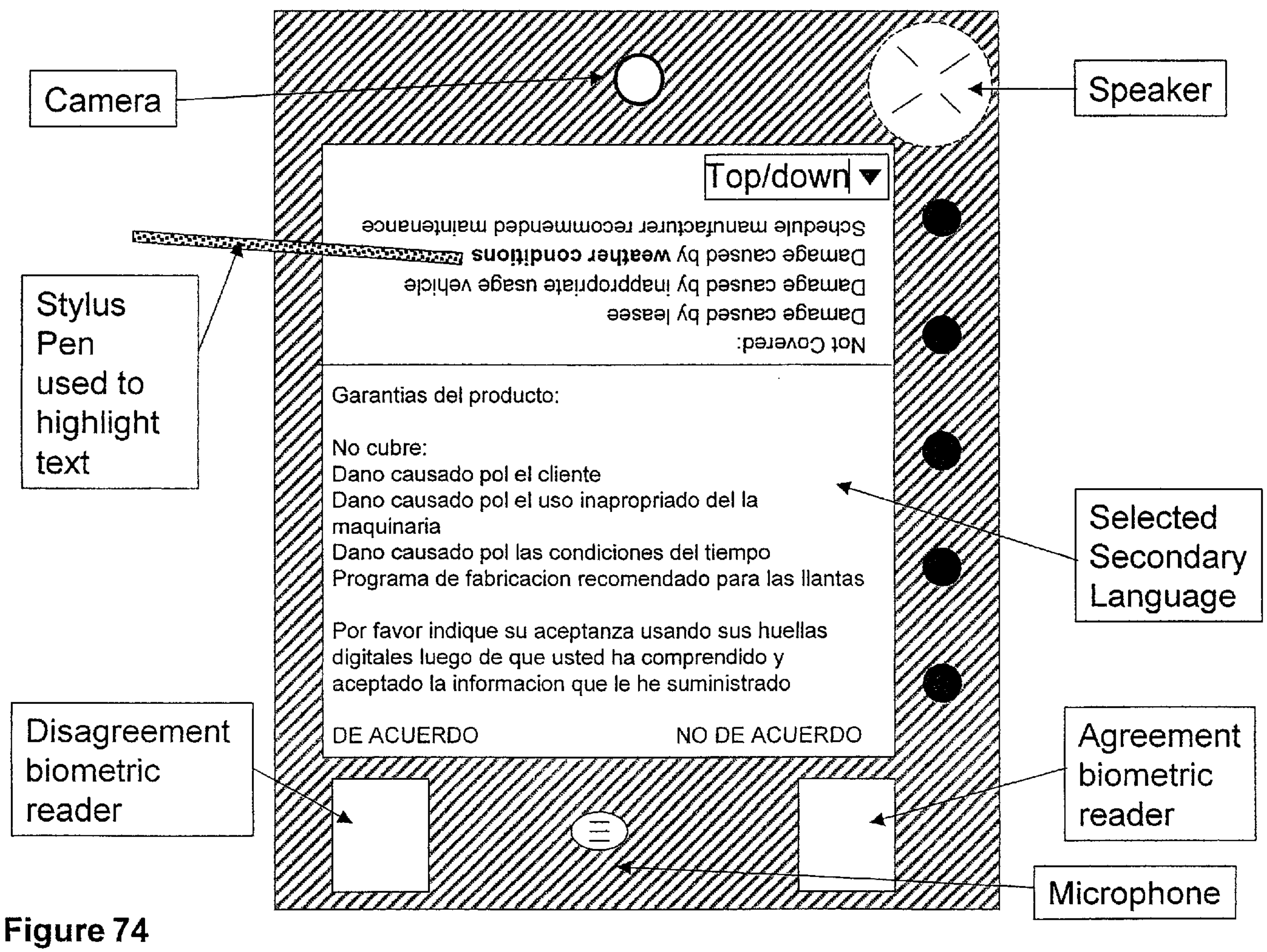
FIG. 74 illustrates an ECDU top/down split screen method with multiple languages.

FIG. 46 illustrates usage of the flip pen tool in one embodiment. In a car dealership environment the consumer and dealership employee typically sit across from one another on the opposite sides of a table, such that the flip tool allows the screen to be quickly flipped digitally to allow the dealership employee to read the screen easily. The flip tool is configured to flip the screen 180 degrees. This tool is powerful when combined with language translation tools. For example, FIG. 74 shows the dealership employee view (top portion) displaying English while the customer view (bottom portion) displays Spanish. Highlighting or emphasis tools are coordinated between the two windows.

Figure 47:
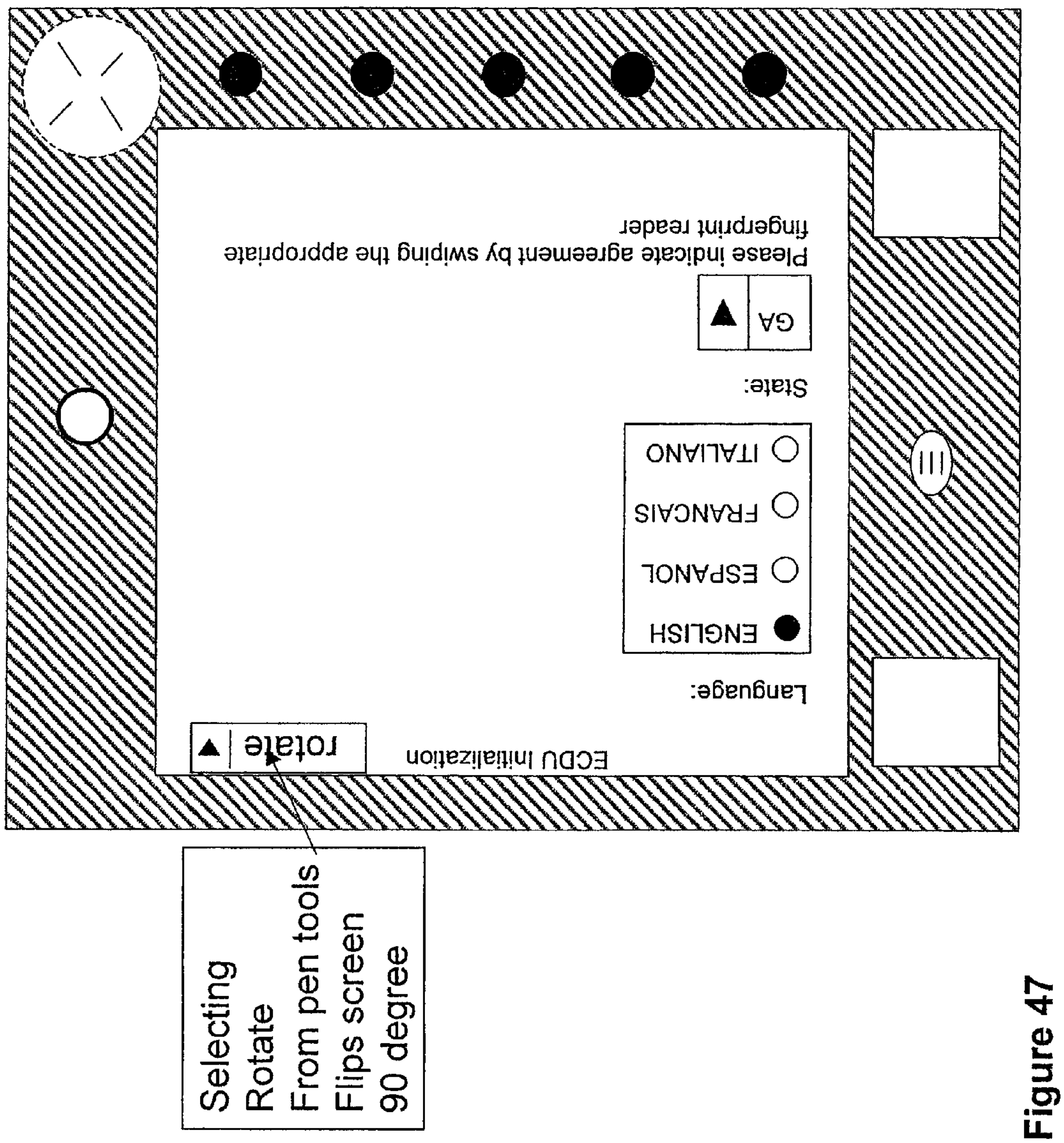
FIG. 47 is an illustration of an ECDU screen rotate pen tool.

FIG. 47 illustrates the usage of the rotate pen tool in one embodiment of the ECDU. Again, in a car dealership environment, the consumer and dealership employee customarily are on opposite sides of a table, and in this instance the rotate tool allows the screen to be quickly rotated digitally to allow the dealership employee to read the screen easily. The increments of rotate are multiples of 90 degrees. Variants of this tool are used to rotate the screen to any specified angle. In addition to the software rotate tool, hardware rotation embodiments are shown for example in FIGS. 11 and 16.

Figure 48:
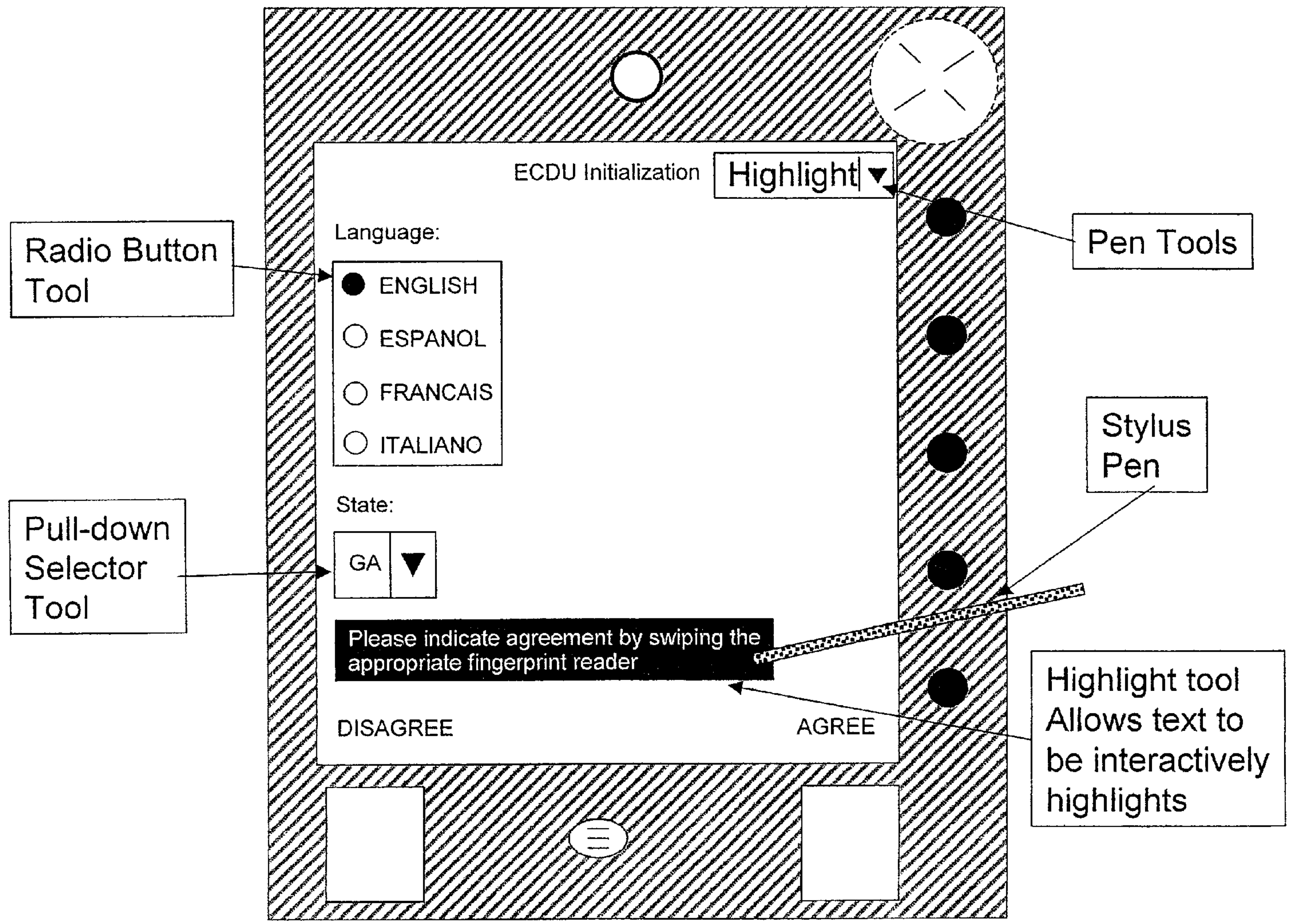
FIG. 48 is an illustration of an ECDU screen highlight tool.

FIG. 48 illustrates use of the highlight pen tool in one embodiment of the ECDU. In practice, dealership employees point to and/or circle terms on contracts to bring these areas to the attention of consumers. The highlight pen tool allows the pen mode to be changed into a highlight mode. The text in regions of the screen that are indicated by the stylus can change color, font size or style, background, etc. FIG. 48 shows the background changing to black and the font color changing to white. Alternate embodiments graphically change pixels to give the appearance that the stylus is a physical highlighter; e.g., transparent yellow can be digitally imposed above the areas indicated by the stylus.

In practice, all or most car customers are asked to fill out a credit application prior to finalizing the purchase. For customers who desire financing, this step is required, and even for customers paying with cash or check this may be desirable from the dealership's perspective. The dealership typically tries to convert some of the cash or check customers into financing deals. Also, the dealership may like or be required to verify the integrity and/or identity of customers before taking checks or to meet any applicable federal identity guidelines and regulations.

Figure 49:
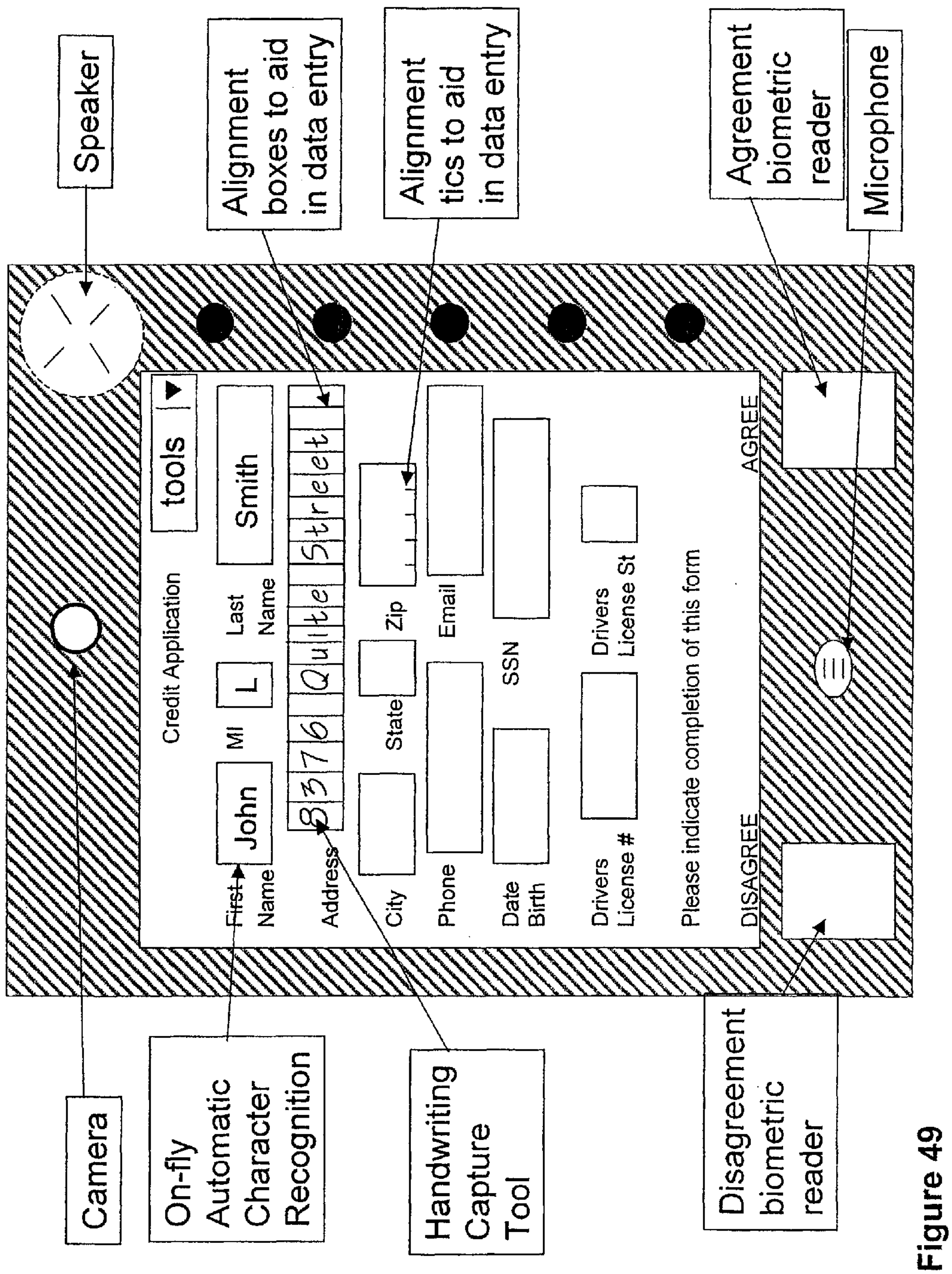
FIG. 49 illustrates an ECDU credit application.

The ECDU in various embodiments is used to automate this credit application process. FIG. 49 shows the ECDU session of a customer filling out a credit application. The customer uses the stylus pen to fill out the required information such as name, address, date of birth, social security number, etc. Since the ECDU has connectivity, some of this information is preloaded from other dealership computer systems, such as dealership management system, prospecting systems, etc. Handwritten entries are converted to text using automated character recognition tools. To aid in recognition of handwritten entries, character alignment boxes or tics can appear in the entry fields. Also, for completeness, the actual handwritten image is saved for later review to resolve instances of misinterpreted character recognition After completing the data entry in one embodiment, the user is asked to validate his entries. The user swipes (actuates) the fingerprint reader below the AGREE label to validate these entries. While the user is swiping his fingerprint, the camera on the ECDU records his photo to document that the correct person's finger was swiping the fingerprint reader.

Figure 50:
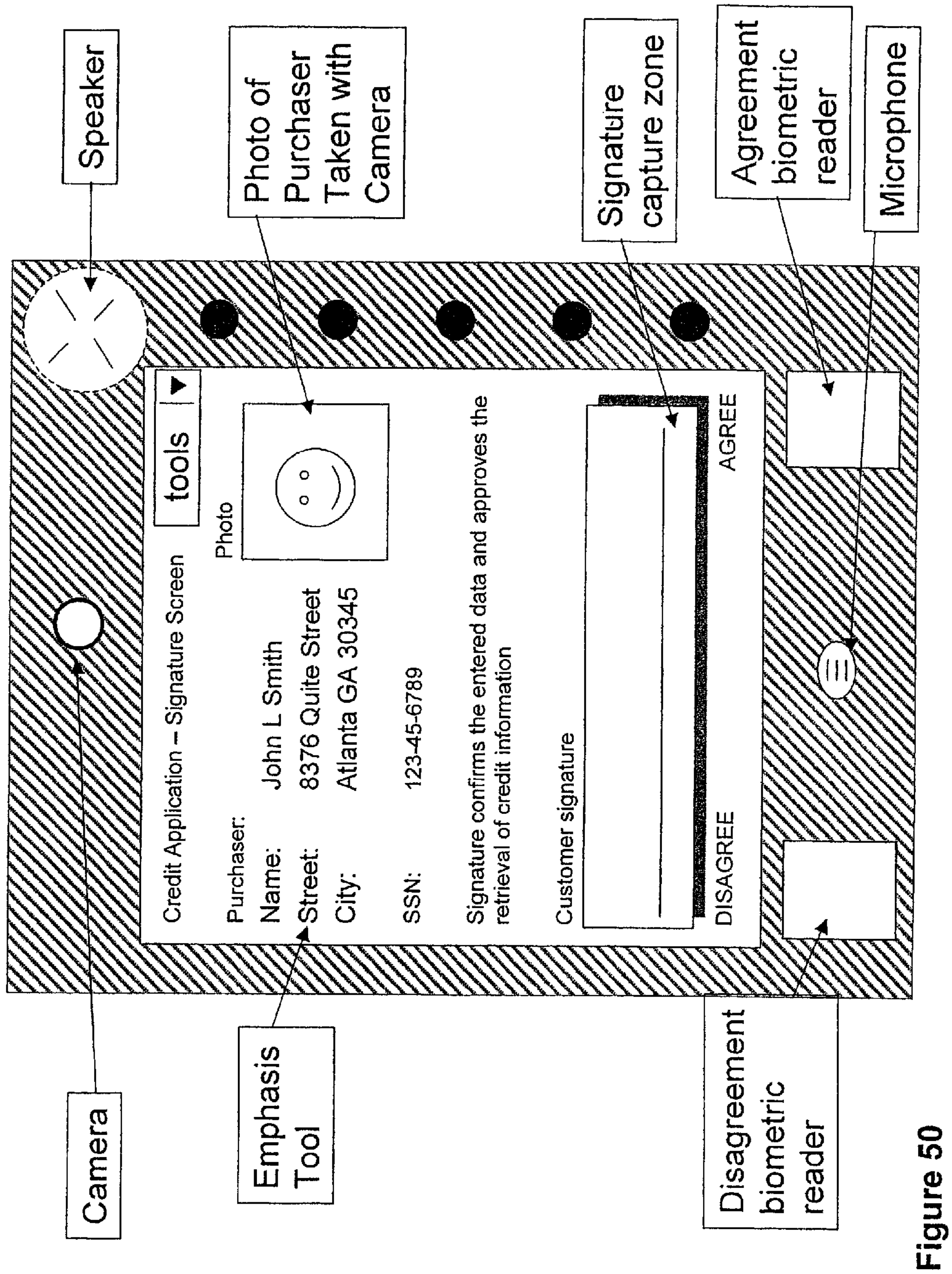
FIG. 50 illustrates an ECDU credit application signature screen.

After the user enters the credit application information, the ECDU shows the credit application signature screen, as seen in the embodiment of FIG. 50. This screen displays high level information, such as the user's name, address, and social security number, along with his photo captured using the ECDU camera. Finally, the user signs the credit application authorizing credit retrieval using the stylus pen. In one embodiment, the user's signature is captured and incorporated into the credit application. The user's signature completes the credit application and signifies the users granting of authority to pull credit reports to ascertain the credit worthiness of the customer. Additional biometric authentication information captured by the ECDU decreases the chance of fraud.

To safeguard private information, the ECDU may encrypt the credit application using various encryption methods, including public and private key cryptography. For example, if the ECDU is sending the credit application to financial institutions, the credit application can be encrypted with the financial institutions public key prior to sending the credit application across the internet. The financial institution uses their private key to decrypt the encrypted credit application. The financial institution's response is encrypted using the ECDU's public key prior to sending the response across the internet. The ECDU can then use its private key to decrypt the encrypted response. This protected communication may pass through and/or utilize other computer resources inside the dealership such as the data handling system, discussed above. The data encryption is offloaded to these other computer resources if desired; e.g. the data handling computer.

This public/private key encryption is preformed using software or hardware encryption units or keys in various embodiments. The hardware key unit has the advantage of preventing the copying and distribution of the private keys. If hardware keys are lost or stolen, then the other parties can simply stop using the matching public key for any future communication.

Specifically, in one embodiment, after the ECDU credit application is completed, the ECDU sends the encrypted credit application to both financial institutions and to the desired data repository. Copies can be kept on the local data handling computer if desired, or all copies can be retained on just the data repository system.

After sending the encrypted credit application in one embodiment, the ECDU can automatically delete the private information or wait for a receipt message from the financial institution prior to deleting the information. This reduces the risk of the business with regard to possible improper disclosure of the credit application. Because the credit application is electronically stored and secured in the data repository, this eliminates the risk associated with protecting paper copies of the credit application at the business.

This automated credit application process has benefits to the consumer, the dealership/business, and financial institutions. The following table summarizes some of the benefits of various embodiments of the ECDU used for credit applications.

| Consumer | Dealership/Business | Financial Institute |
|---|---|---|
| Privacy<br>Control paper application<br>Save time<br>Faster approval | Reduce risk<br>No storage problems<br>Save time<br>Reduces paper and form costs | Reduces errors<br>Reduces fraud risk<br>Speed |

In another embodiment, it might be desirable to continue to use paper based credit applications. This process is also electronically captured according to this invention using scanners. First, the completed credit application is optically scanned using the paper port scanner incorporated into the ECDU, as shown in the embodiment of FIG. 4. Specifically, the paper application is fed into the slot of the scanner, and the paper passes through the scanner as it is optically scanned. The scanned credit application is stored in image format and as text also after using optical character recognition (OCR) tools. The scanned image and OCR text are then encrypted and sent as discussed above. In an alternative embodiment, the credit application is printed on special location coded paper, seen in FIG. 51, and the scanning pen is used. Specifically, the credit application is integrated into or onto the special location coded paper so that the scanning pen can record the written credit application. As the consumer fills out the credit application of one embodiment with a scanning pen, the pen electronically records the writing as it is written by optically reading the embedded location coded coordinates (i.e. special location codes) that are incorporated onto the credit application with the writing. To aid in handwriting recognition, alignment boxes are used to prompt the user appropriately to separate the characters. The electronically-recorded writing is retrieved from the scanning pen using the scanning pen data port as shown in FIG. 4. In one embodiment, this scanning pen data port is included in the ECDU as shown in the embodiment of FIG. 4 for pens that require it. In other embodiments, scanning pens use wireless interfaces or are directly wired. This embodiment provides a real time communication link verses the batch communication of the docking scanning pen embodiment. This real time communication enables the scanning pen to transmit commands and data to the ECDU or connected system. The commands and/or data can trigger events/actions such as immediate verification or help.

If desired, in one embodiment, this electronic credit application capture process is a stand-alone station in the dealership or incorporated into other computer systems in the dealership. A stand-alone ECDU is shown in FIG. 35.

Figure 51:
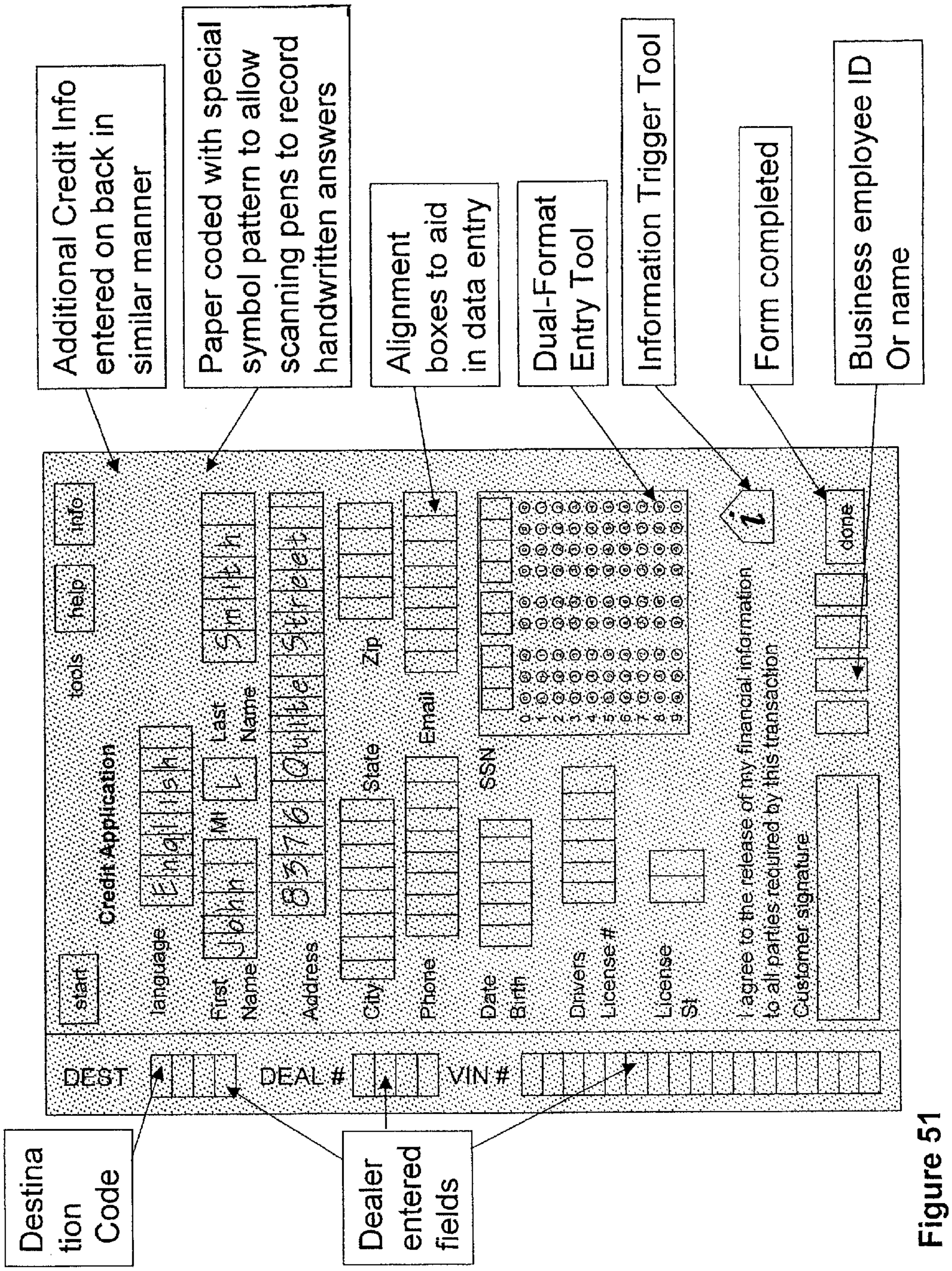
FIG. 51 shows a credit application on location coded paper.

One of main advantages of these alternative paper based embodiments such as that of FIG. 51 is the similarity to current practice. This similarity leads to little or no training costs for dealership personnel. Another advantage is that after electronically capturing the completed credit applications, the customer can keep the only paper copy for his own purposes. This existence of a paper copy is a potential risk to the business because it can be used improperly to disclose credit information to an unauthorized party. The above embodiment mitigates this risk by giving the only existing paper copy to the customer.

All of the above credit application embodiments lead to time/cost savings for the dealership or business. For example, automated data entry eliminates the time consuming (and costly) re-typing of information that is common in car dealerships and provides the ability to store electronically the completed credit applications in a secure facility which eliminates the potential costs of an improper disclosure of credit information.

Figure 52:
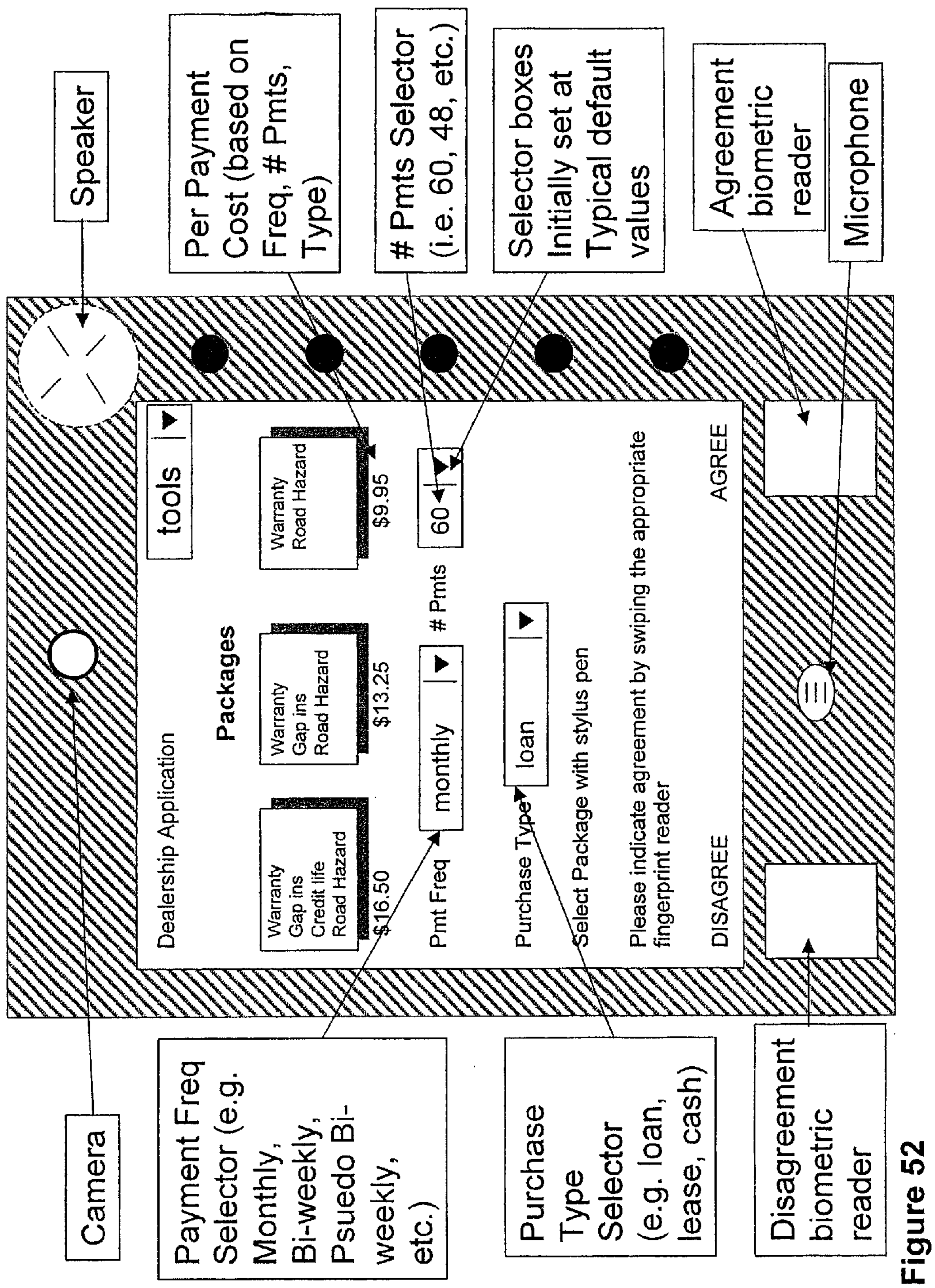
FIG. 52 illustrates an ECDU dealership application screen.

The next drawing, FIG. 52, shows the dealership application screen in one embodiment. In addition to completing the sales contract and disclosures, the F&I person up-sells the car customer such after-sale items as extended warranties, insurance, security products, etc. This menu screen provides the car customer multiple packages or products to choose from of common extra items. The menu screen standardizes the package and product offerings and options for all consumers. This example screen shows three package choices, labeled Platinum, Gold, and Silver. Inside each labeled button is a brief description of the major components of each package. Below each package is the cost per period. The selector boxes for the payment type, payment frequency, and number of payments are initially set at typical default values. The consumer can change these settings, for example, changing the payment frequency from monthly to bi-weekly, by using the payment frequency selector tool. For this illustration, the car customer chooses the Platinum package because he desires all four listed options. He selects the package by touching the screen with the stylus pen. To validate the selection, the user swipes (i.e. actuates) the AGREE fingerprint reader with his finger and the camera records the event. The ECDU records the list of displayed package options in the session record to document that he was offered other options. Selected package queues the required disclosures to be completed using the ECDU.

Figure 53:
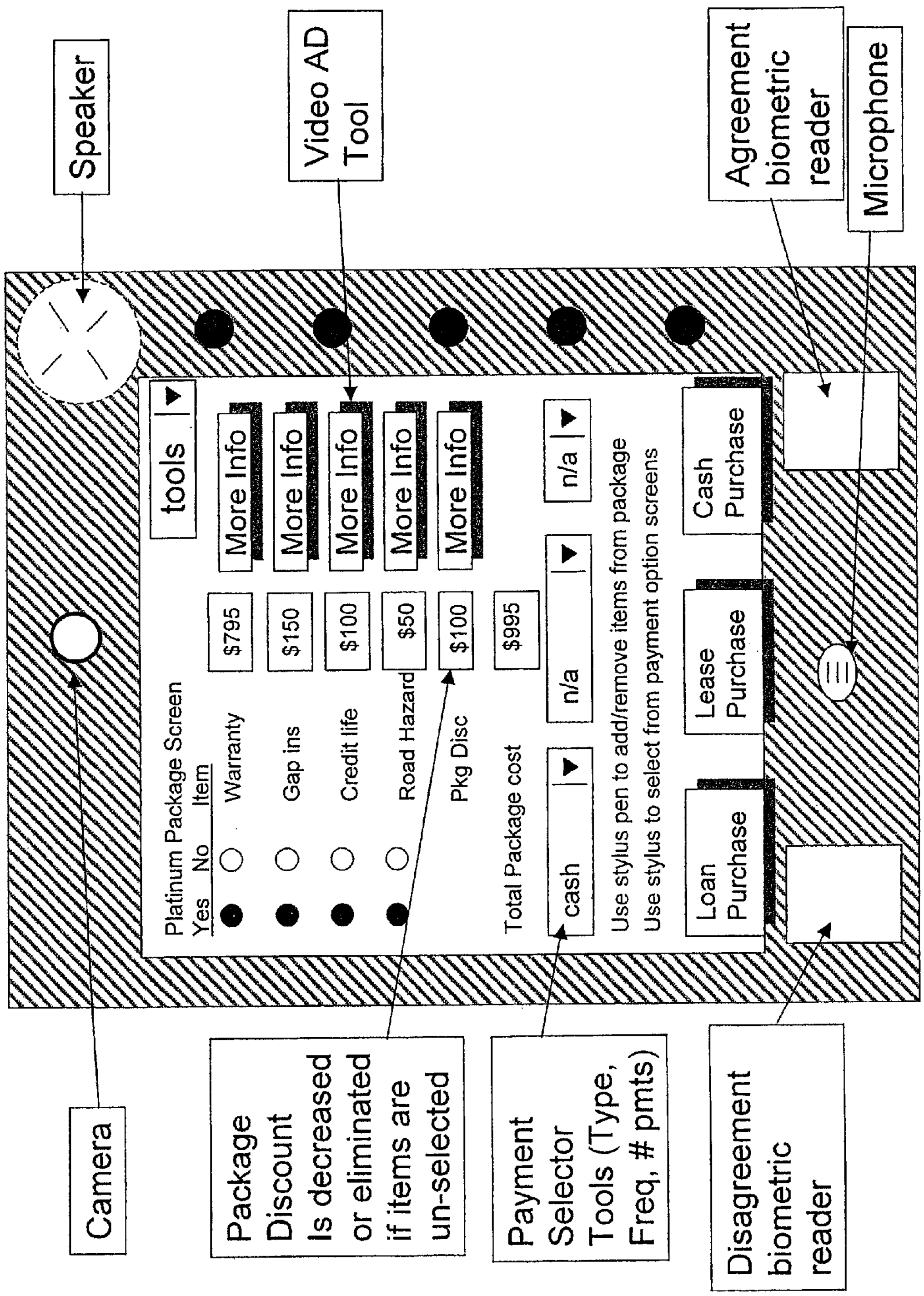
FIG. 53 illustrates an ECDU package item selection screen.

After selection of the package, the ECDU displays a summary of the items contained in each package, as shown in the embodiment of FIG. 53. FIG. 53 shows the Platinum Package screen. To the left of each potential package item is a radio button. The radio buttons allow the customer to remove or add items to the package as desired. To the right of each item is the retail cost. To the right of each cost is a button label "More Info." These buttons allow the customer to pull up additional screens and/or video ads to explain the benefits of the package item or compare between various choices; e.g. factory versus third party extended warranty. Below the list of items is the package discount label and amount. If the user removes any items from the package, the discount is reduced and/or eliminated. Below the package discount is the total package cost per period. The user can change the payment type, frequency, and number of payments using the payment selector tool. This example shows a hypothetical cash purchase. The ECDU can assist the consumer by comparing side-by-side features and costs using grid and other graphical based screens. These expanded interactive package item menus work in concert with the ECDU's connectivity to allow finer detailed pricing that benefits both the consumer and the suppliers (e.g. insurance companies). After the user has removed/added package items, the customer can press one of the buttons at the bottom of the screen to pull up a loan payment options screen, a lease payment option screen, or a cash purchase screen.

Figure 54:
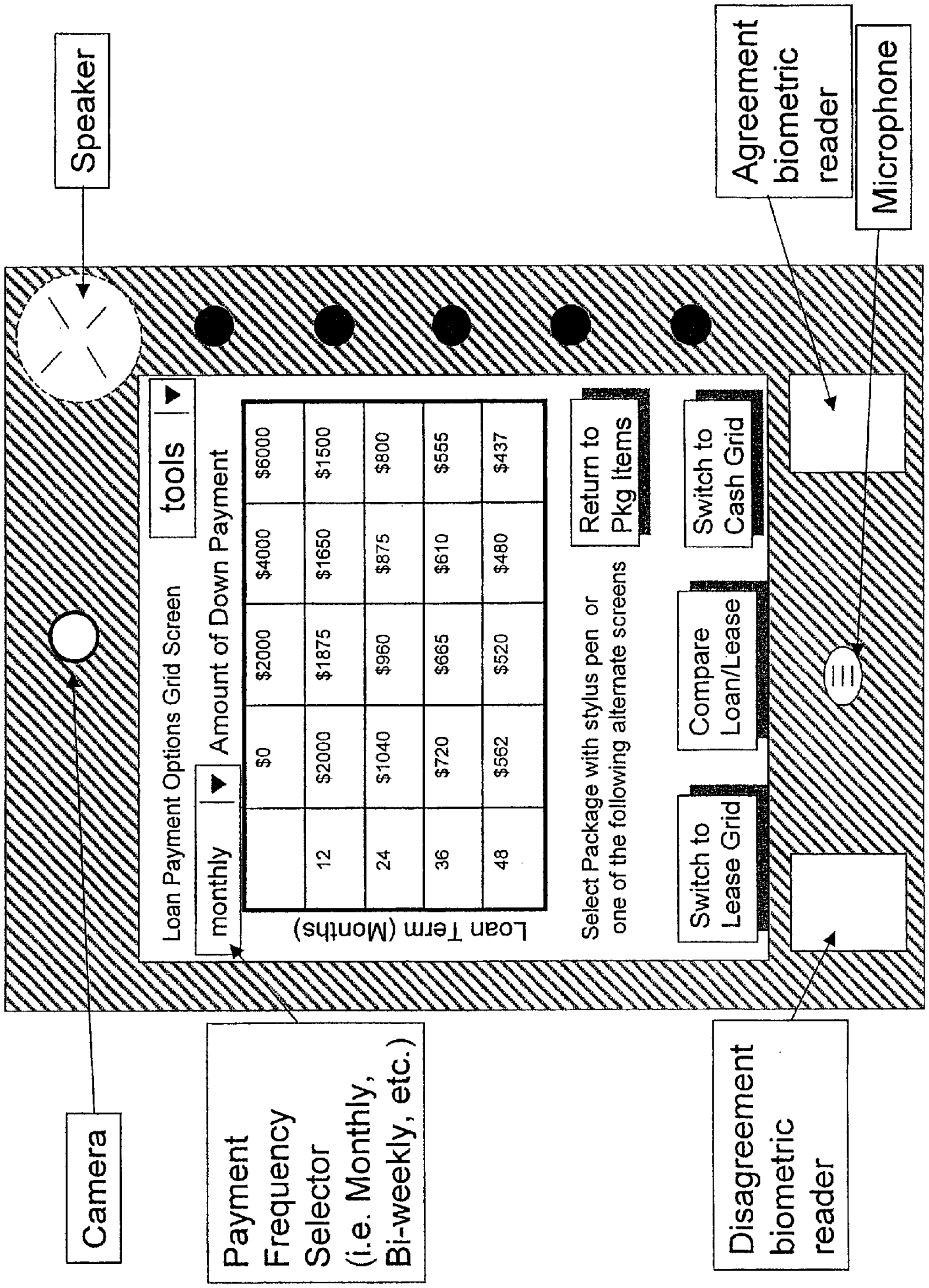
FIG. 54 illustrates an ECDU loan payment option grid screen.

In the embodiment of this illustration, the consumer wishes to finance the vehicle with a loan, so the next screenshot, FIG. 54, shows the loan payment option grid screen. This screen shows a grid of monthly payment options based on various term length and down payment amounts. The ECDU computes these payment values on-the-fly in one embodiment using payment calculation engines (or tables) located in the ECDU, on the F&I system, on the DMS system, or using linear factors, etc. The ECDU can also access external computer resources to compute pricing information in real-time for items such as credit life, extended warranties, etc. This on-the-fly pricing is more accurate because all available information is used to compute true risk based pricing. The ECDU can combine various monthly payments (e.g. for the vehicle and any optional insurance, etc) and show the customer the total monthly payment values. If the consumer sees a payment option (term and down payment) that is adequate, the consumer selects the appropriate square from the grid and proceeds through the rest of the ECDU session. As described above, the customer can use the payment frequency selector tool to change the payment frequency from monthly to bi-weekly (or any other potential option). This is beneficial to many consumers because matching the payment cycle to paycheck cycle eases budgeting, since larger payments are frequently separated into many smaller payments in order to make cars appear less expensive, and to help them judge or coordinate with there paycheck frequency, etc. After a payment frequency change, the ECDU re-computes the pricing grid. After selecting a payment option (term and down payment) for these alternative payment frequencies, the ECDU automatically adds additional screens, as required, to execute fully the terms and disclosures associated with these alternative payment plans, collect cancelled check for routing the payments, etc.

Figure 55:
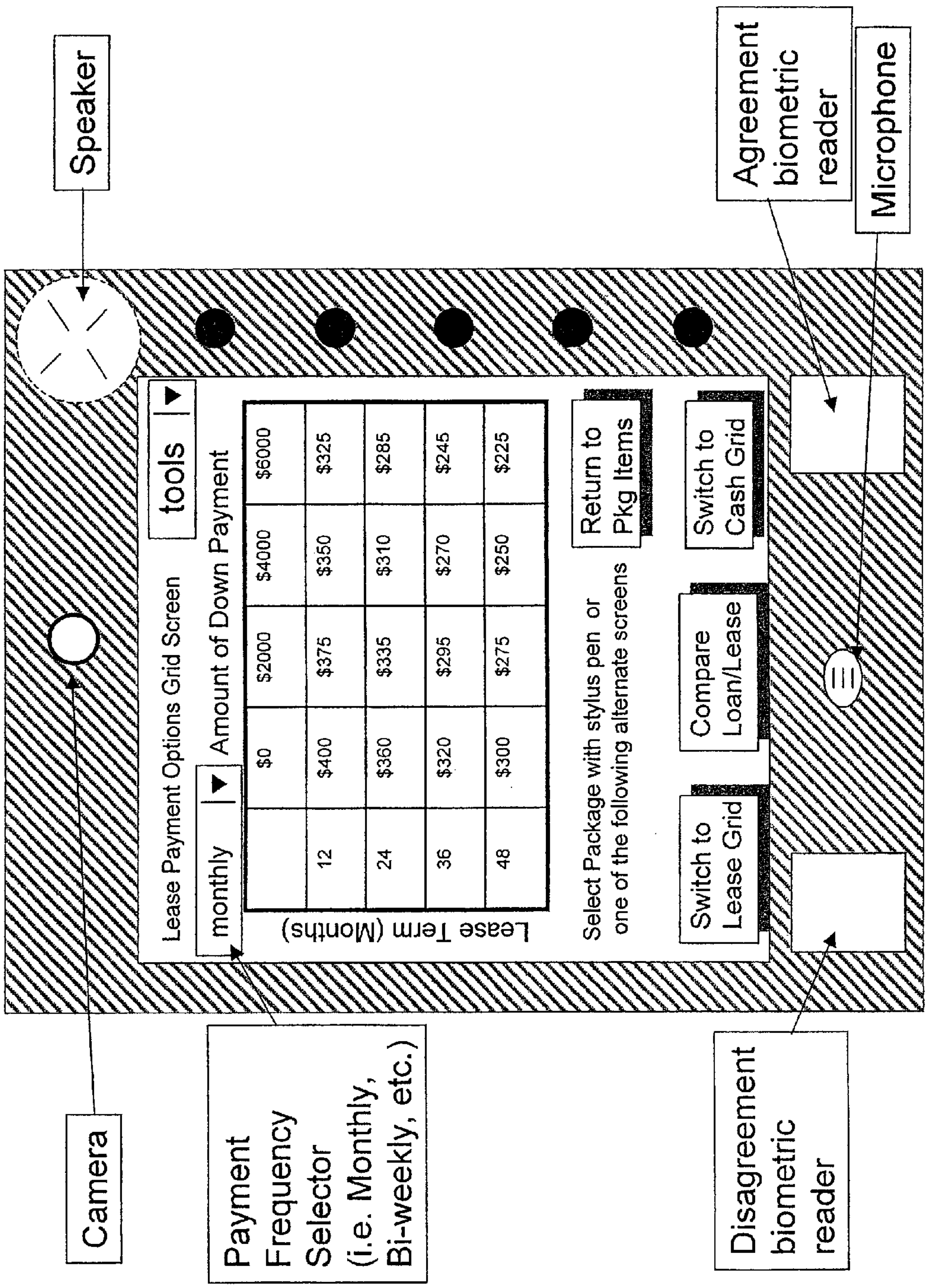
FIG. 55 illustrates an ECDU lease payment option grid screen.
Figure 56:
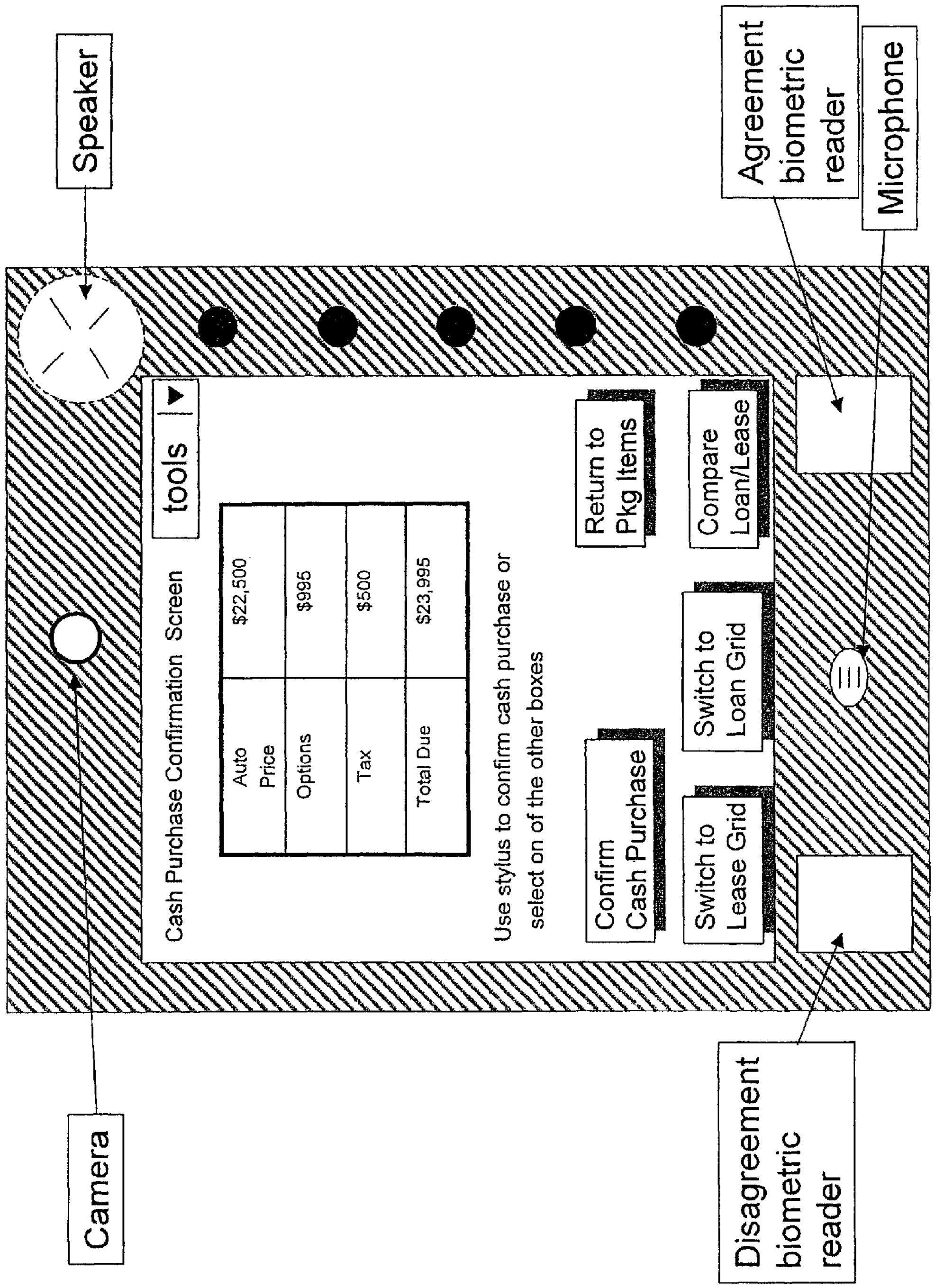
FIG. 56 illustrates an ECDU cash purchase screen.

Typically, the financing stage of a car sale is an iterative process. Suppose the consumer either cannot afford any of the purchase options on the loan screen or is just curious about leasing. After selecting the "Switch to Lease Grid" button on the bottom left of the screen, the ECDU will now compute payment values on-the-fly for various lease terms and down payment amounts using payment calculation engines (or tables) located in the ECDU, on the F&I system, on the DMS system, and/or on external computer resources. FIG. 55 shows the lease payment option grid screen of one embodiment. If the consumer sees a payment option (term and down payment) that is adequate, the consumer selects the appropriate square from the grid and proceeds through the rest of ECDU session. As with the loan screen, the user can change the frequency of the payments using the payment frequency selector tool. After changing the frequency, the ECDU can then re-compute the payment grid.

Figure 57:
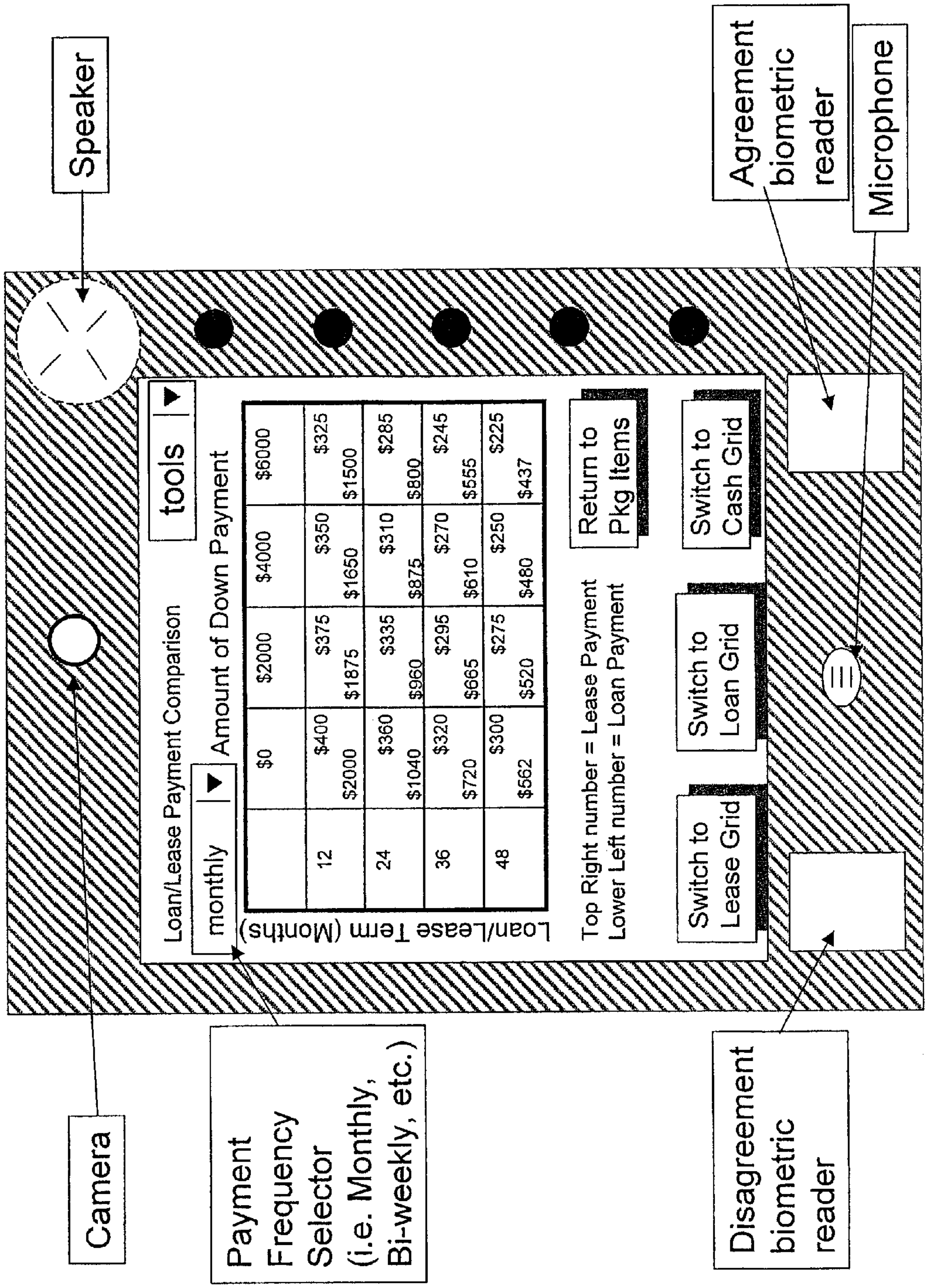
FIG. 57 illustrates an ECDU loan/lease payment comparison grid screen.

If the user wishes to compare the loan payment options to the lease payment options, the "Compare Loan/Lease" button is selected. FIG. 57 shows the Loan/Lease payment comparison screen of one embodiment. This screen shows a grid of payment options computed by the ECDU (as discussed above) showing the loan and lease payment amounts for each term. The number in the top right of each grid is the lease amount and the number in the lower left is the loan amount. This screen is informational; the user cannot select a payment option on this screen. If none of these payment amounts are acceptable, the user can select the "Return to Pkg Items" button to return to the Platinum package screen to change his selected package items. Assuming that one of these payment amounts is acceptable, the user can select one of the "Switch to . . . " buttons on the bottom row to bring up the desired screen. If the user selects, "Switch to Cash Grid", the ECDU displays the cash purchase confirmation screen, seen in FIG. 56.

For the embodiment of this illustration, assume the consumer chooses to lease the vehicle, due to the low payment amounts, and returns to the Lease grid screen, seen in FIG. 55. The consumer simply selects the grid containing the payment amount acceptable and the ECDU continues the sales process.

Figure 58:
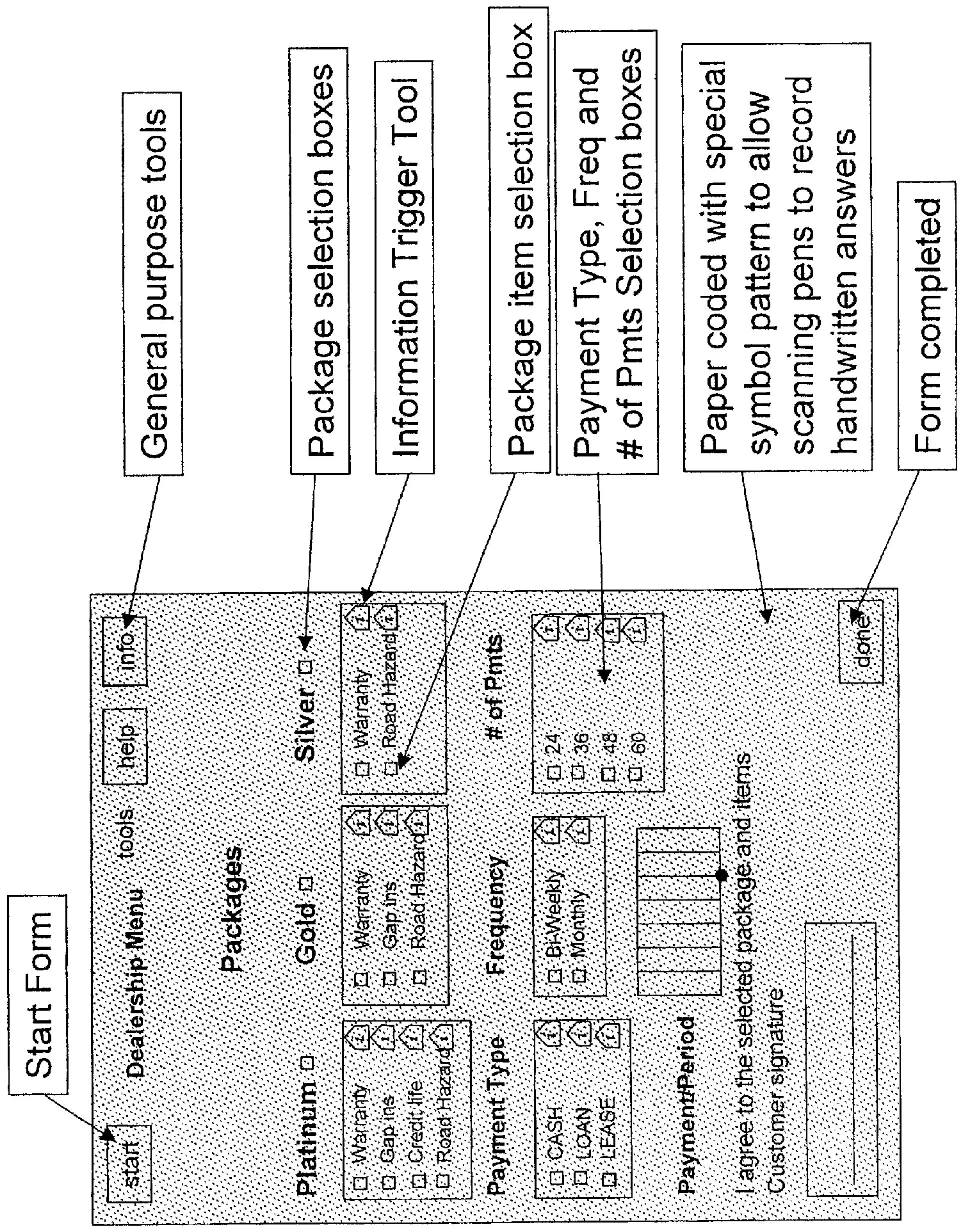
FIG. 58 shows dealership menuing on location coded paper.

In alternate embodiments, the scanning pen with special location coded forms is used to handle the package menuing and payment grid selections. The embodiment of FIG. 58 shows a dealership package menu printed on special location coded paper. The customer can select the start box with the scanning pen to begin the form. If unique coded patterns are used, the scanning pen can recognize the form without the need for first selecting the start form box. Even though this is a paper form, the customer has several interactive ECDU functions available. The customer can select the information trigger tools next to the package items to see a multimedia informational tutorial (e.g. ad, video, graphical displays) about the package item on the ECDU screen. The customer can select the help tool box and then select any word or item to see a glossary lookup on the ECDU screen. The customer can use the info tool box (top right) to request informational videos for any word or item on the screen (if available). This info tool box is especially useful on contracts and disclosure forms where the inclusion of many information trigger tool box into the text would clutter the form. The user can use the payment type, frequency and number of payments boxes to change the terms. After changing the terms, the new package prices are shown on the ECDU screen. The user can confirm the final selected terms by entering the monthly payment into the payment fields. The user selects the desired package (e.g. platinum, gold or silver) by checking the appropriate box with the scanning pen. The customer then confirms the package items by checking the various package item selection boxes. After completing the selection package, the customer signs the form in the customer signature box with the scanning pen and checks the done box (in the bottom right). If the user writes too much on the form or fills it out improperly, the business employee can give the customer a new sheet or the ECDU can print another.

Figure 59:
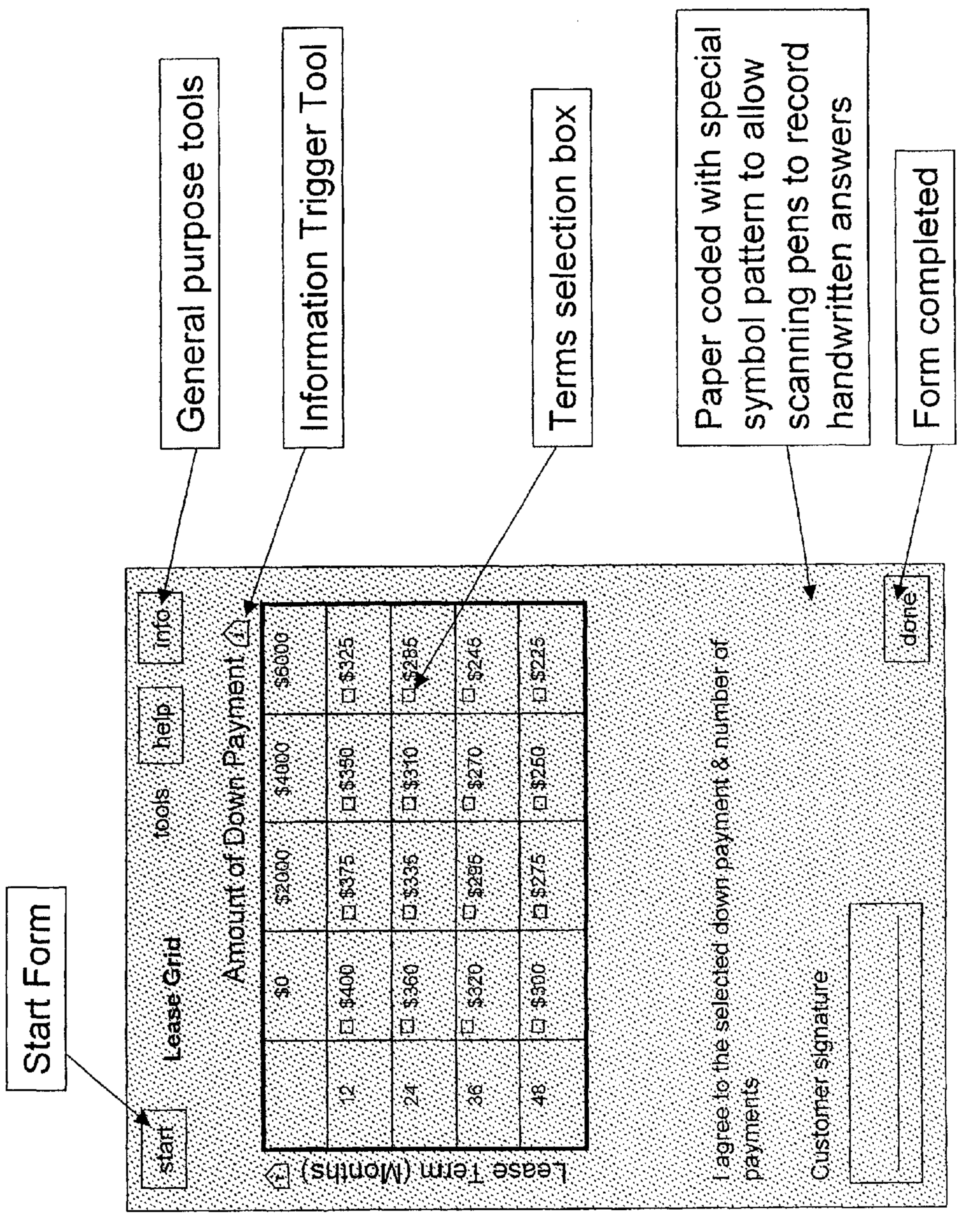
FIG. 59 shows a dealership lease payment grid on location coded paper.

The embodiment of FIG. 59 shows a lease payment grid printed on specially coded paper. The ECDU can query the relevant F&I or other dealership computers to compute a lease (and/or loan or cash) payment grid for the car with the chosen set of packages. This lease payment form also contains the start form, tools (help and info) and the done box. In general, these or similar tools are found on each specially coded paper form. The customer can chose a down payment amount and lease term by studying the table of monthly payments. The customer chooses a monthly payment that is satisfactory by selecting the check box with the scanning pen in the desired table square. The user can request interactive ECDU tutorial videos by selecting the information trigger tool symbols associated with for example down payment and/or lease terms. Also, the user can request interactive glossary lookups using the help box or other tutorial videos by selecting the info box with the scanning pen. After completing the lease payment terms selection, the customer signs the form in the customer signature box with the scanning pen and checks the done box (in the bottom right). If the user wishes to purchase the vehicle with a loan, the business employee can give the customer a form that contains monthly payments for a loan instead. If the user writes too much on the form, the business employee can give the customer a new sheet or the ECDU can print another. If all of the monthly payments are unacceptable on the lease or loan payment grid forms, the customer can return to the package selection form to choose less costly options.

Figure 60:
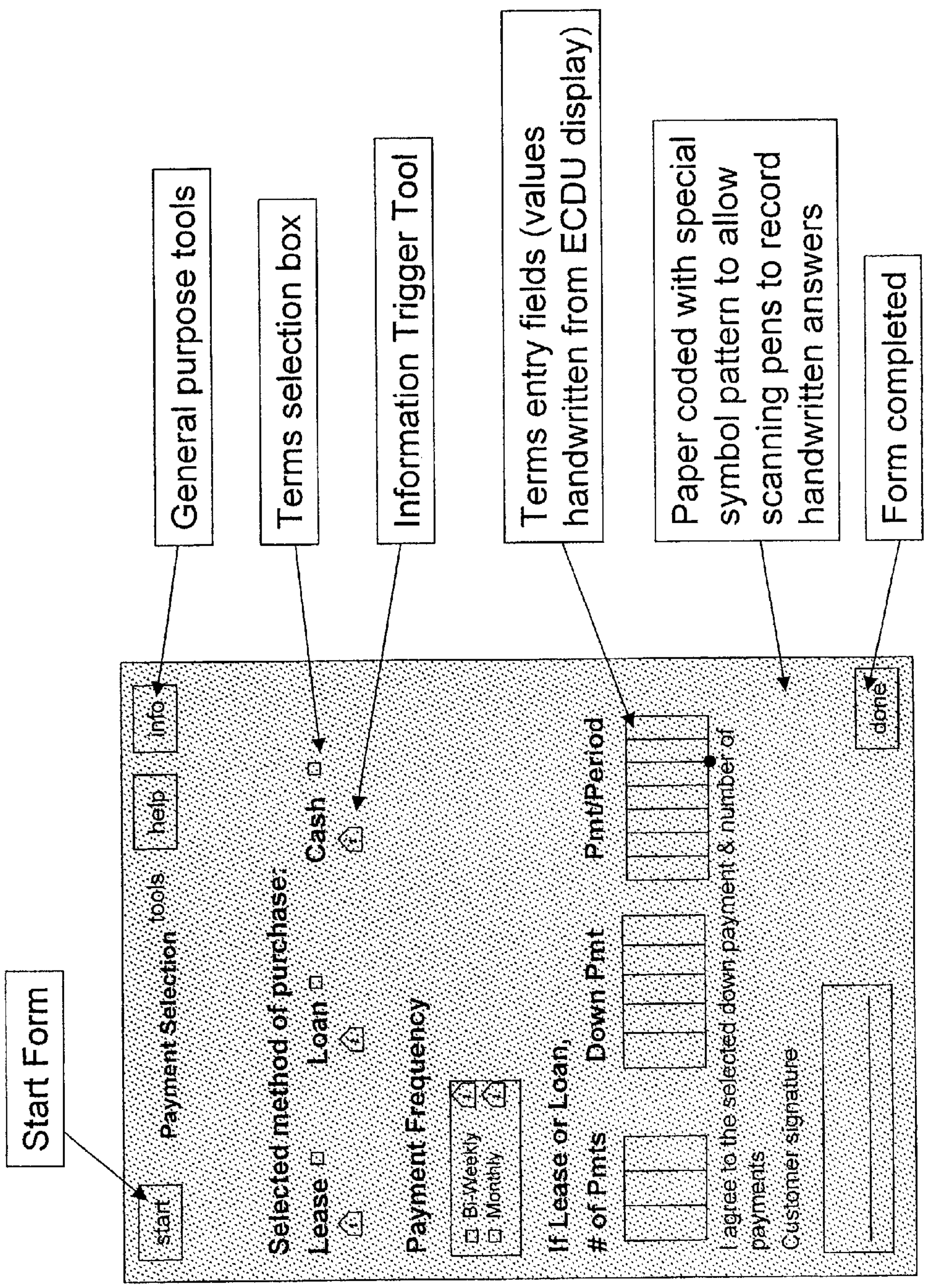
FIG. 60 shows a dealership payment option selection form on location coded paper.

In an alternate embodiment, the ECDU can display the lease, loan or cash purchase options on the ECDU screen. The customer can switch between screens until he settles on an acceptable combination of package options, down payment, term and type. The embodiment of FIG. 60 is used by the consumer to indicate the chosen method of purchase by selecting the appropriate selection box next to lease, loan or cash. If the purchase type is lease or loan, the consumer can handwrite the selected number of payments, amount of down payment and monthly payment amounts from the ECDU screen onto the terms entry fields. After completing payment selection form, the customer signs the form in the customer signature box with the scanning pen and checks the done box (in the bottom right). If the user writes too much on the form or otherwise fills it out improperly, the business employee can give the customer a new sheet or the ECDU can print another.

In these embodiments, the ECDU is recording the entire session. The record session logs show that the consumer was offered the option to pay cash or finance as a lease or loan, record which informational videos or glossary lookups were selected, etc. In one embodiment, the ECDU records less than entire session.

Figure 61:
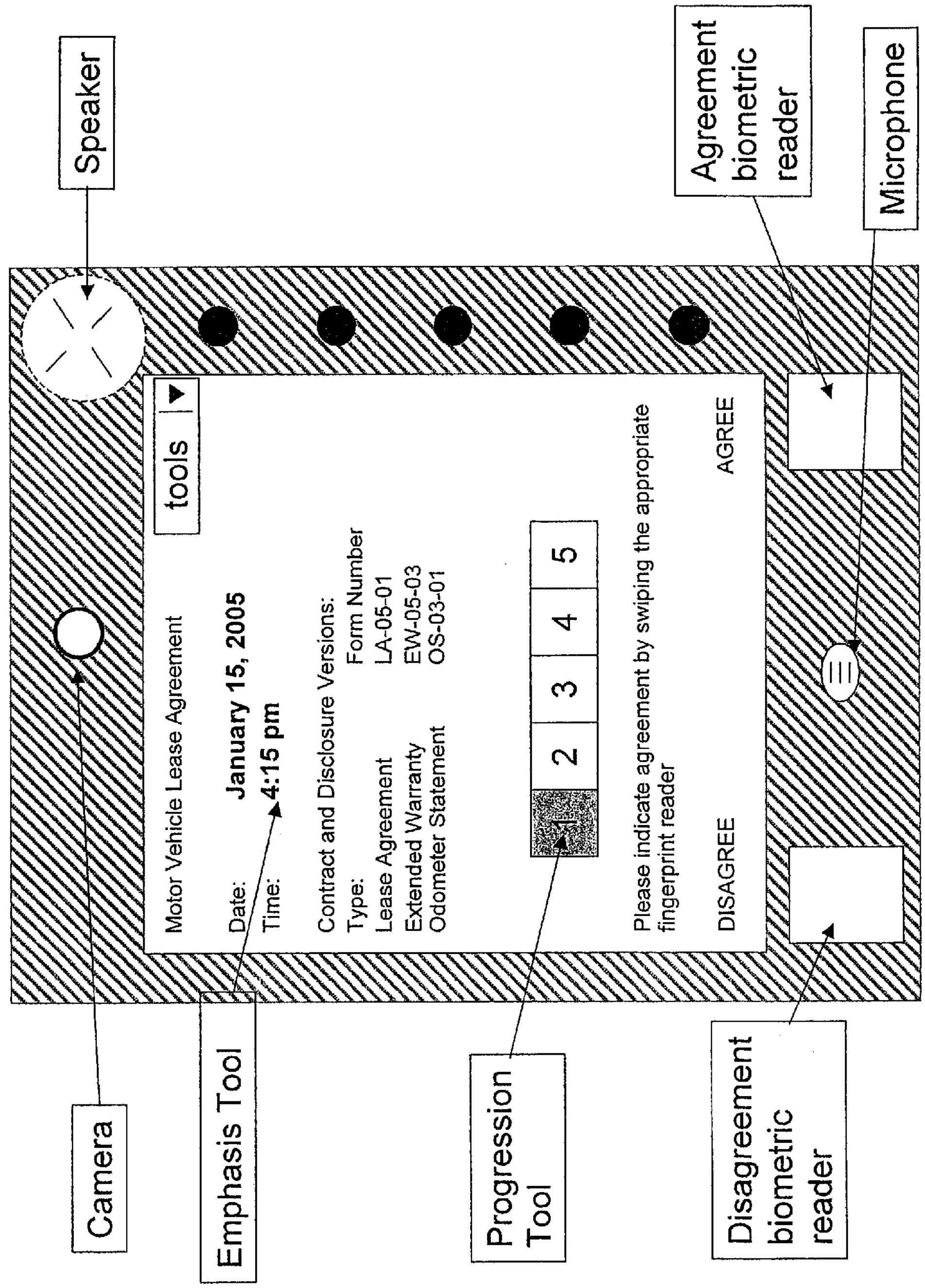
FIG. 61 illustrates an ECDU date/time validation screen.

After package item selection and determination of method of purchase, the ECDU can display the Motor Vehicle Lease Agreement screen, as seen in the embodiment of FIG. 61, for a lease deal or a similar screen for a loan or a straight purchase. The purpose of this screen is largely informational. The current Date and Time are displayed predominately using the Emphasis Tool. The Emphasis Tool is a functionality of the ECDU to show important information using a combination of larger fonts, bold, color, blinking or other graphical means. Also shown are specific form numbers for the contract and disclosures statements to be displayed during the ECDU session. The list of disclosure statements is automatically determined from the selected package items, etc. The user indicates agreement with this information using the AGREE fingerprint reader while the camera records the event.

FIG. 61 also shows the Progression Tool. The Progression Tool shows a graphic description of the stages of the contract and disclosure session. As each stage is completed the next box is shaded or colored to indicate stage completion. The progression tool is shown simply as a row of boxes in the embodiment of FIG. 61. Alternatively, each stage of the contract and disclosure session can be represented with a graphical icon. As each stage is successfully completed, each icon may for instance, turn green. For declined stages, the declined, stage icon is turned red. Once all stages are completed (all boxes or icons) and each icon has turned green, the consumer is allowed to proceed to contract completion. The progression tool can be used as a roadmap to the ECDU session allowing the user to jump around between sections by selecting the boxes (or icons) with the stylus. The ECDU manages the order of execution, to ensure the user executes the contract/disclosures in the proper order.

Figure 62:
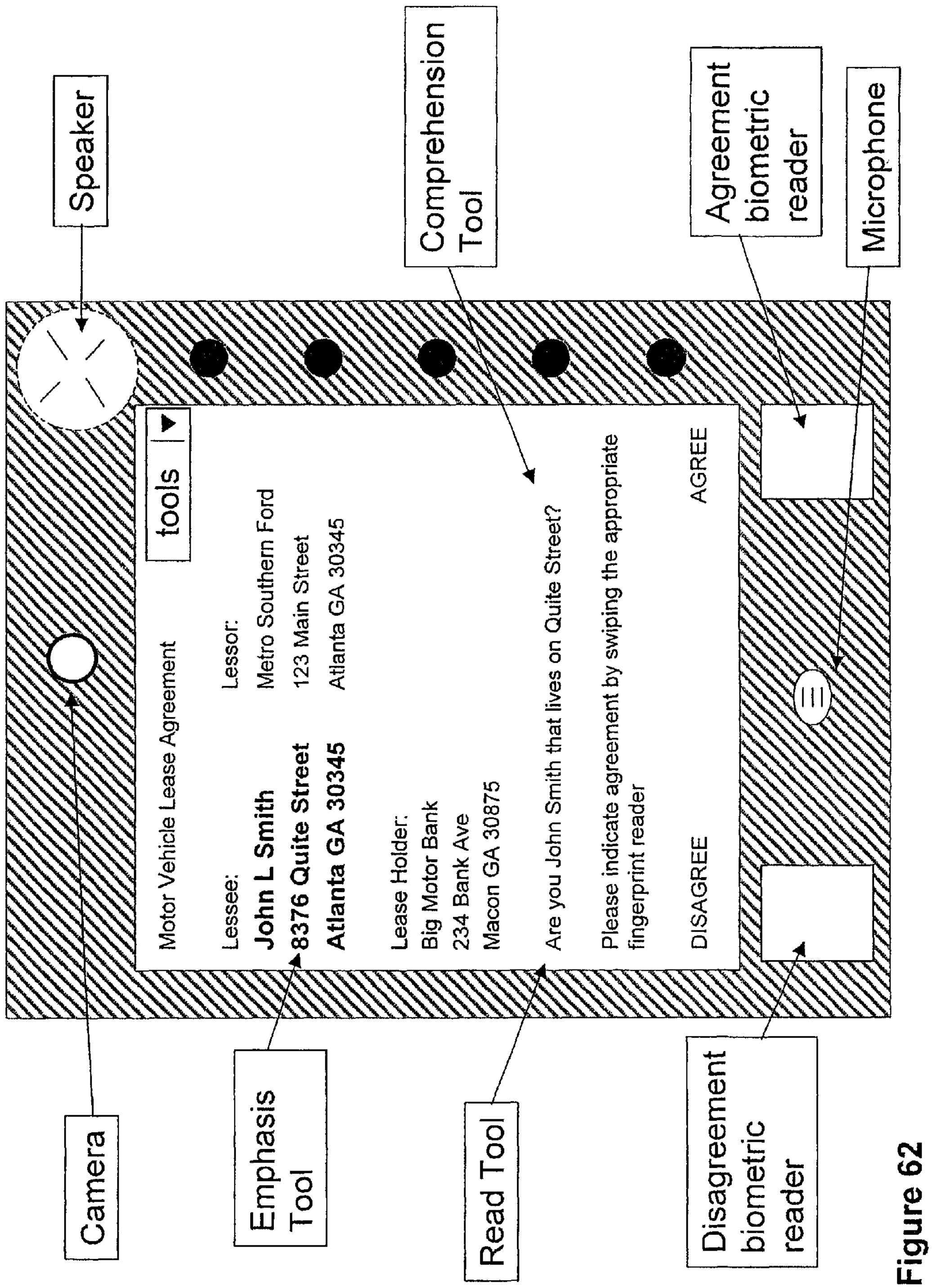
FIG. 62 illustrates an ECDU lease parties screen.

After validating the time & date, the ECDU displays the parties to the lease agreement screen, as seen in the embodiment of FIG. 62. Again, the Emphasis Tool is used to highlight the important information. This screen demonstrates the use of the Comprehension Tool. The purpose of the Comprehension Tool is to quiz the user on critical information on the screen. On FIG. 18, the Comprehension Tool asks the user to confirm his Name and Street. Moreover, the Read Tool is being utilized to ask the user verbally to confirm his Name and Street. The user indicates his agreement using the AGREE fingerprint reader while the camera records the event.

Figure 63:
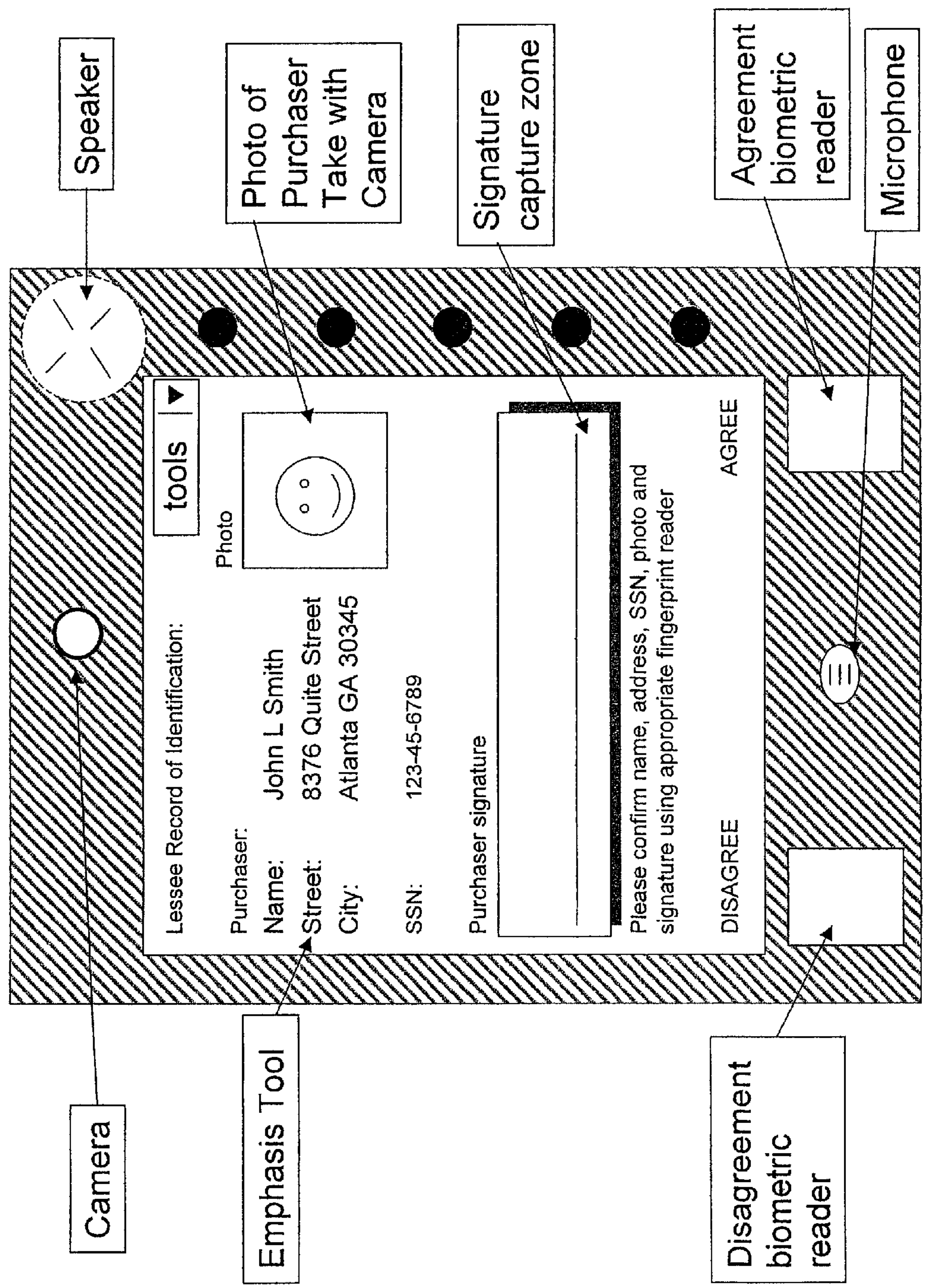
FIG. 63 illustrates an ECDU record of identification screen.

The embodiment of FIG. 63 shows the Lessee Record of Identification screen. The purpose of this screen is to get the user to confirm critical information (e.g. name, address, SSN), to confirm his captured photo, and to capture his signature. Specifically, this screen demonstrates the use of the Signature Capture tool. The purchaser can sign the tablet display using the stylus pen. The ECDU captures the signature and displays it on the tablet display inside the signature capture zone. Finally, the user validates the information displayed, the photo, and the signature by swiping the AGREE fingerprint reader with his finger while the camera records the event.

Figure 64:
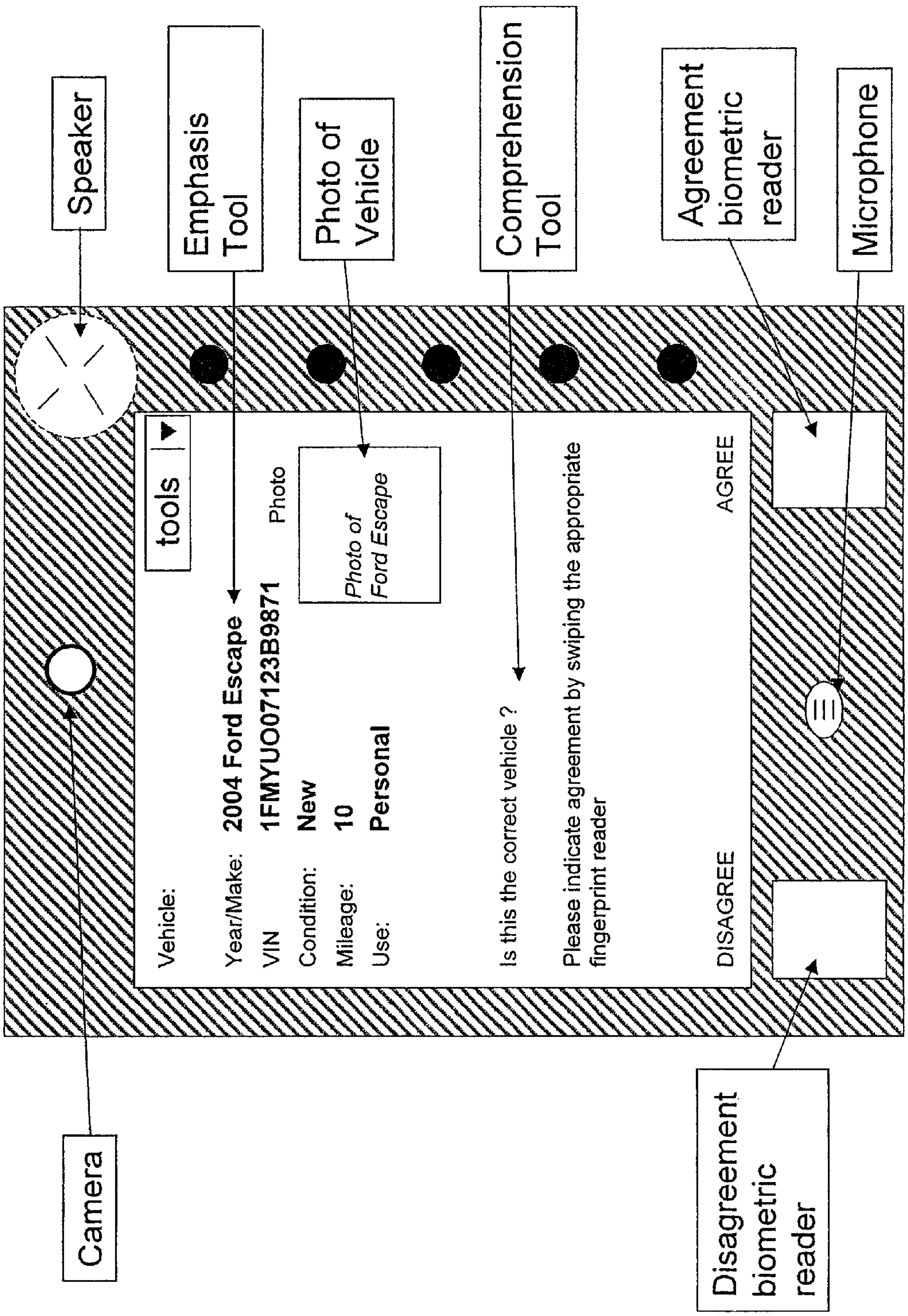
FIG. 64 illustrates an ECDU vehicle information screen.

The next screen, showing the embodiment of FIG. 64, is the Vehicle summary screen. Again, the Emphasis Tool is used to indicate important information. In this screen, this information is the specific vehicle make/year, VIN #, etc. Also, the photo tool is used to display a representative or actual picture of the specific vehicle. Moreover, the Comprehension Tool is used on this screen. The user is being asked if this is the correct vehicle. The user indicates his agreement using the AGREE fingerprint reader while the camera captures the event.

Figure 65:
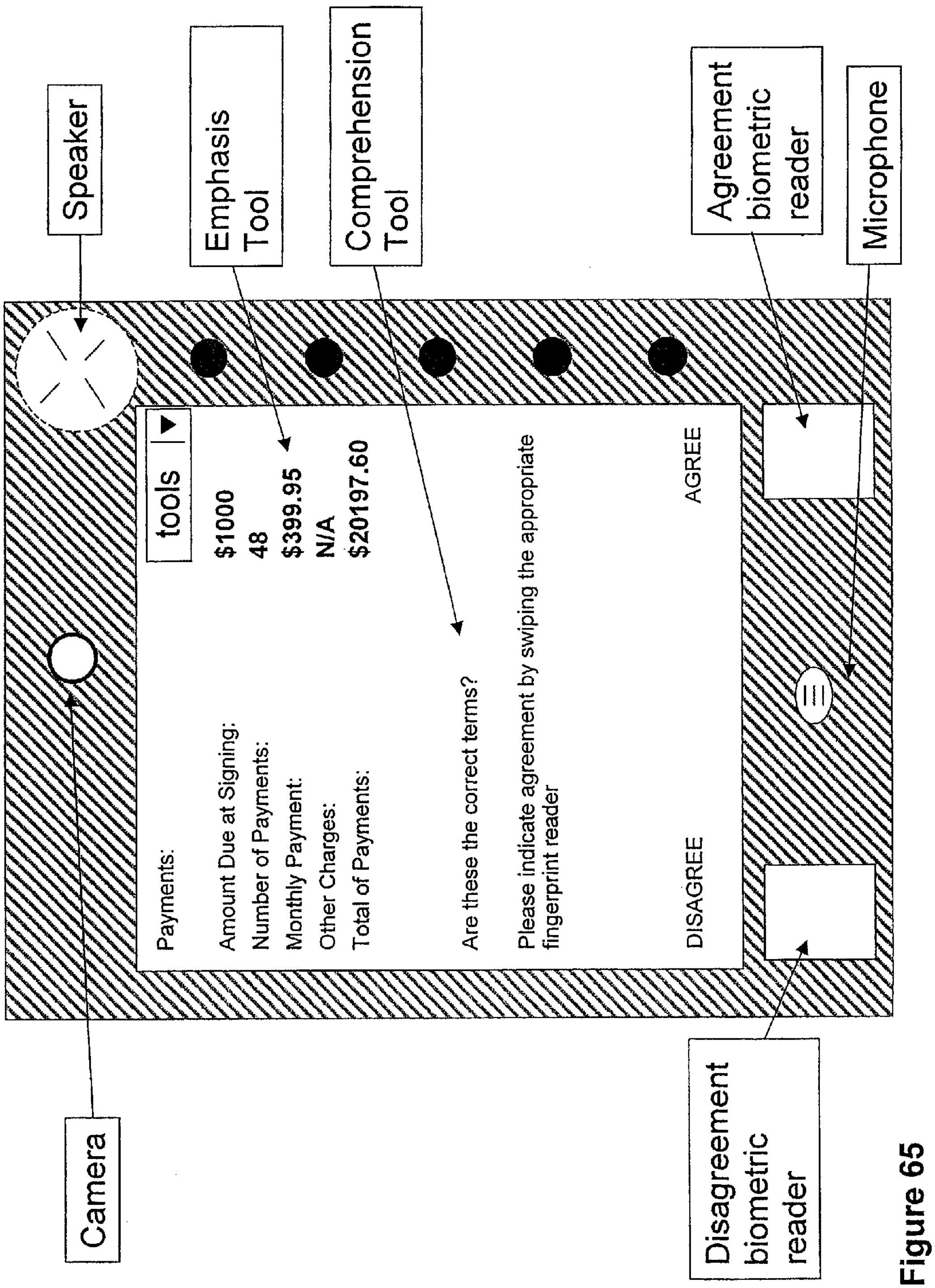
FIG. 65 illustrates an ECDU payment terms screen.

The next screen, FIG. 65, is the Payment summary screen. This screen uses the emphasis tool to highlight the important information (e.g. amount due at signing, number of payments, monthly payment, etc). Again, the comprehension tool is used to ask the user if these are the correct terms. The user indicates his agreement using the AGREE fingerprint reader while the camera captures the event.

Figure 66:
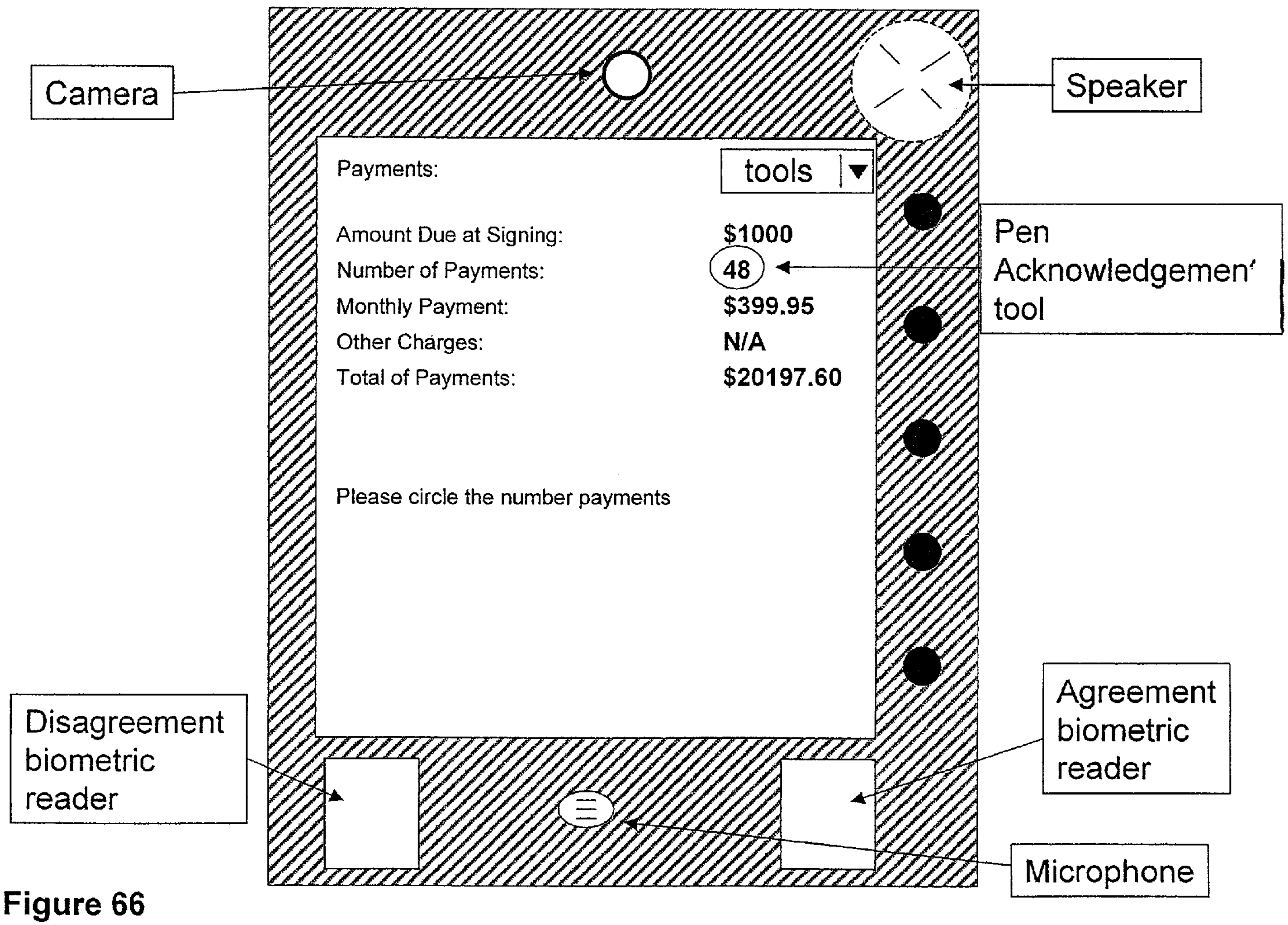
FIG. 66 illustrates an ECDU pen acknowledgement tool.

FIG. 66 illustrates the Pen Acknowledgement Tool of one embodiment. The Pen Acknowledgment Tool is another means used to ensure the user has read and understands important information. In FIG. 66, the ECDU asks the user to circle the number of payments using the stylus pen. The Pen Acknowledgement Tool can capture the users circling of the number of payments. If the user fails to circle the correct information, then the ECDU can prompt the user to try again. Alternately, the user can say the number of payments and the microphone captures and verifies the response to ensure the consumer understands. In various embodiments, the camera captures the event to document that the user and not someone else was using the stylus.

Figure 67:
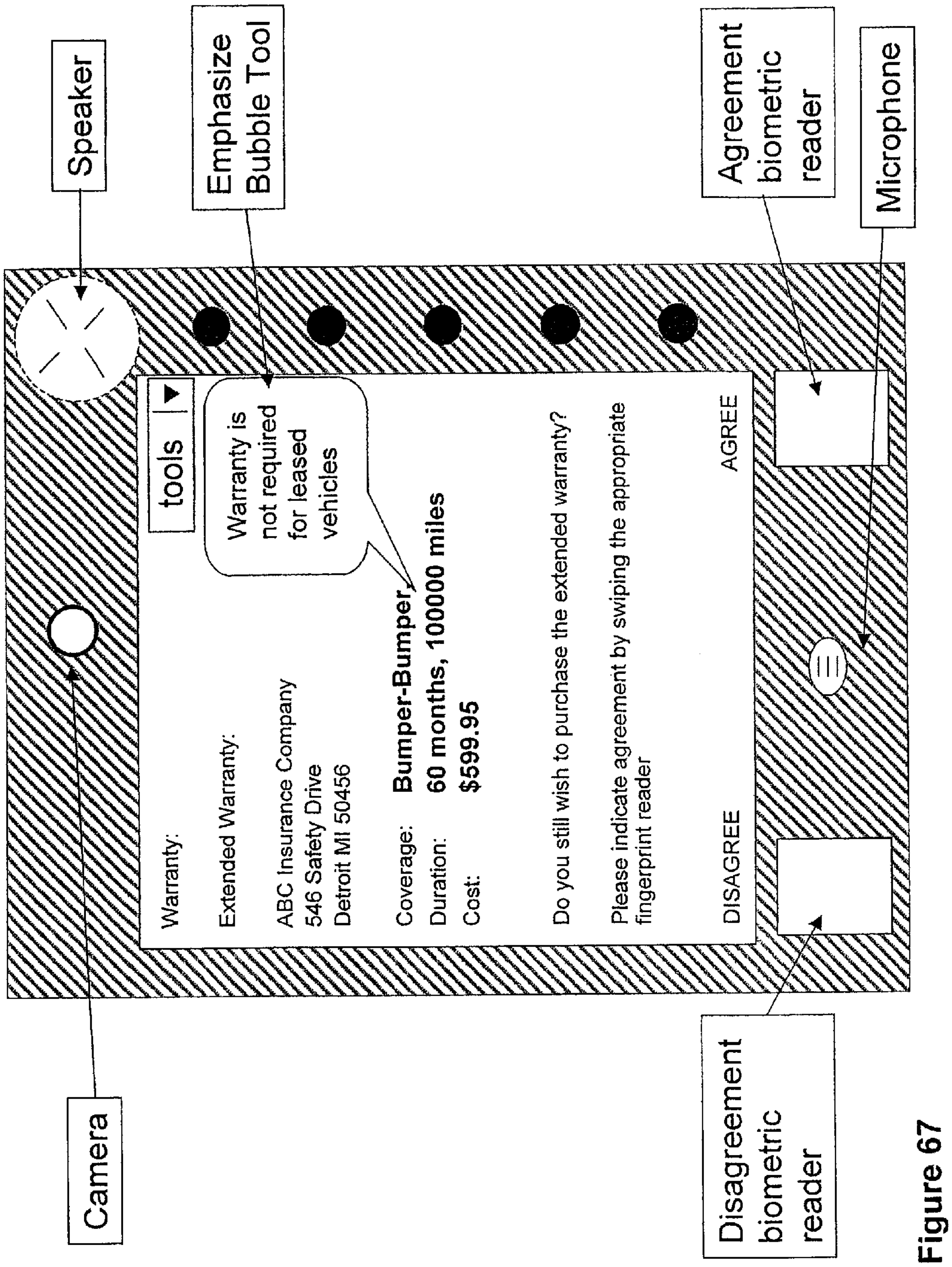
FIG. 67 illustrates an ECDU emphasis bubble tool.

FIG. 67 illustrates the Emphasis Bubble Tool. The ECDU is disclosing the provider of the extended warranty and the important terms using both the Emphasis Tool and the Emphasis Bubble Tool. The Emphasis Bubble Tool shows the user that he is not required to purchase an extended warranty. The user is asked to verify that the terms are correct and that he still wishes to purchase the extended warranty using the appropriate fingerprint reader. The customer confirms his continued desire to purchase the extended warranty by using the AGREE fingerprint reader while the camera captures the event.

If the customer has changed his mind about the warranty, he can indicate DISAGREE using the DISAGREE fingerprint reader. After indication of disagreement (or rejection), the current ECDU session is aborted and the customer is returned to the package selection screen, shown in FIG. 52. In general, the customer selects DISAGREE to indicate rejection of a contract term.

Figure 68:
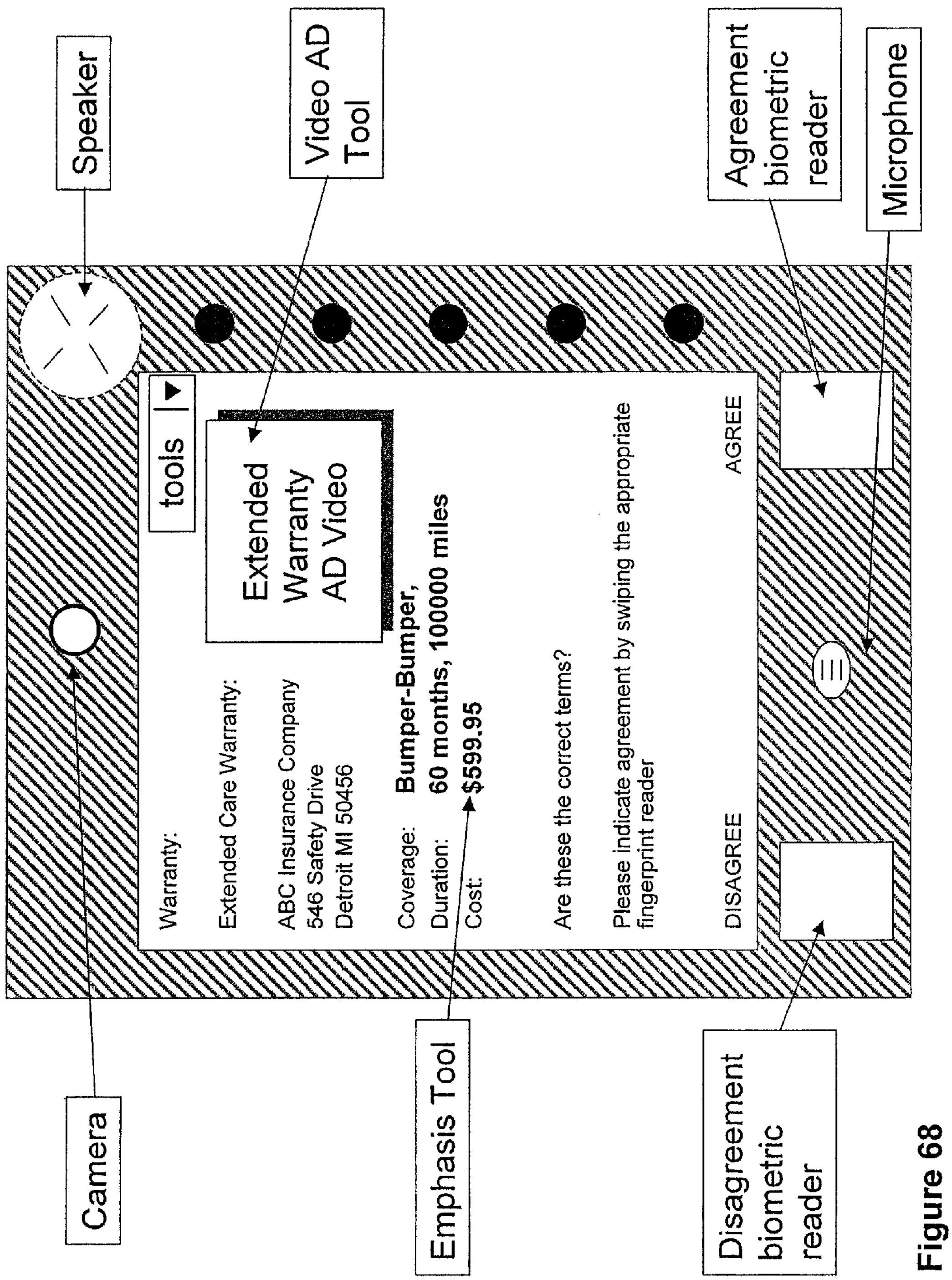
FIG. 68 illustrates an ECDU warranty terms screen.

The ECDU session continues, as seen in the embodiment of FIG. 68, by highlighting the important terms of the extended warranty and asking the user to confirm that he understands these terms. The customer validates these terms using the AGREE fingerprint reader while the camera captures the event. FIG. 68 also illustrates the use of the Video AD tool. In the upper right hand corner is a display window where a video can be shown to the user to highlight the features and further sell the warranty package. These videos are advertisements from simple text, graphical aids, and/or multimedia presentations. For example, they can be promotional videos, brochures, combinational graphics, web pages, feature comparisons, etc.

Figure 69:
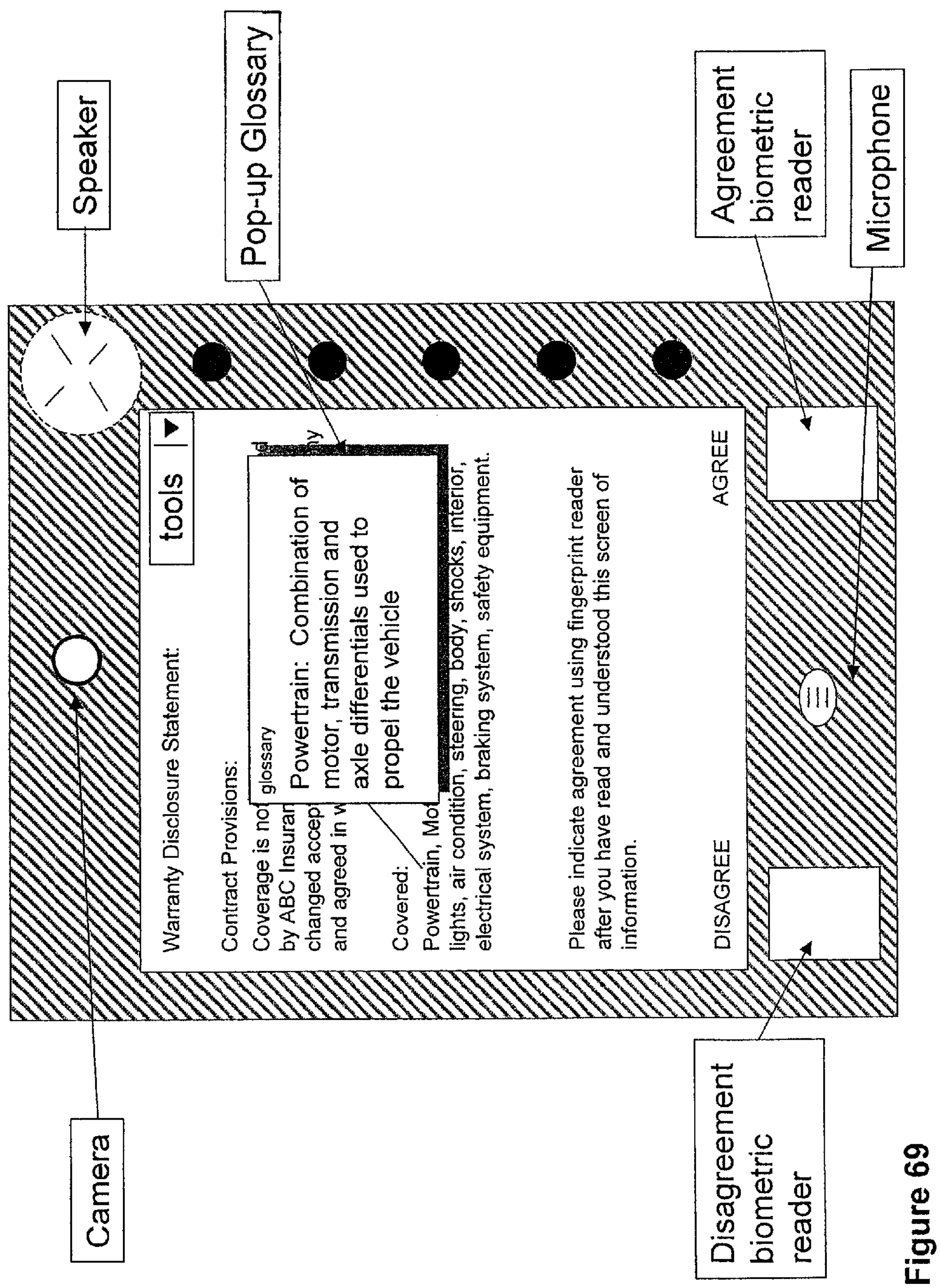
FIG. 69 illustrates an ECDU pop-up glossary screen.

One important feature of the ECDU is the inclusion of disclosure statements. For example, the customer can both lease a vehicle and purchase an extended warranty. The extended warranty also has a disclosure statement showing terms, conditions, etc. FIG. 69 shows the first screen of a warranty disclosure statement. The Pop-up Glossary Tool is available on all screens. The Pop-up Glossary Tool allows the user to obtain definitions of terms displayed on the ECDU by selecting the word with the stylus. FIG. 69 illustrates the Pop-up Glossary Tool providing the customer with the definition of the word "Powertrain." The customer validates that he has read each screen using the AGREE fingerprint reader while the camera captures the event.

Figure 70:
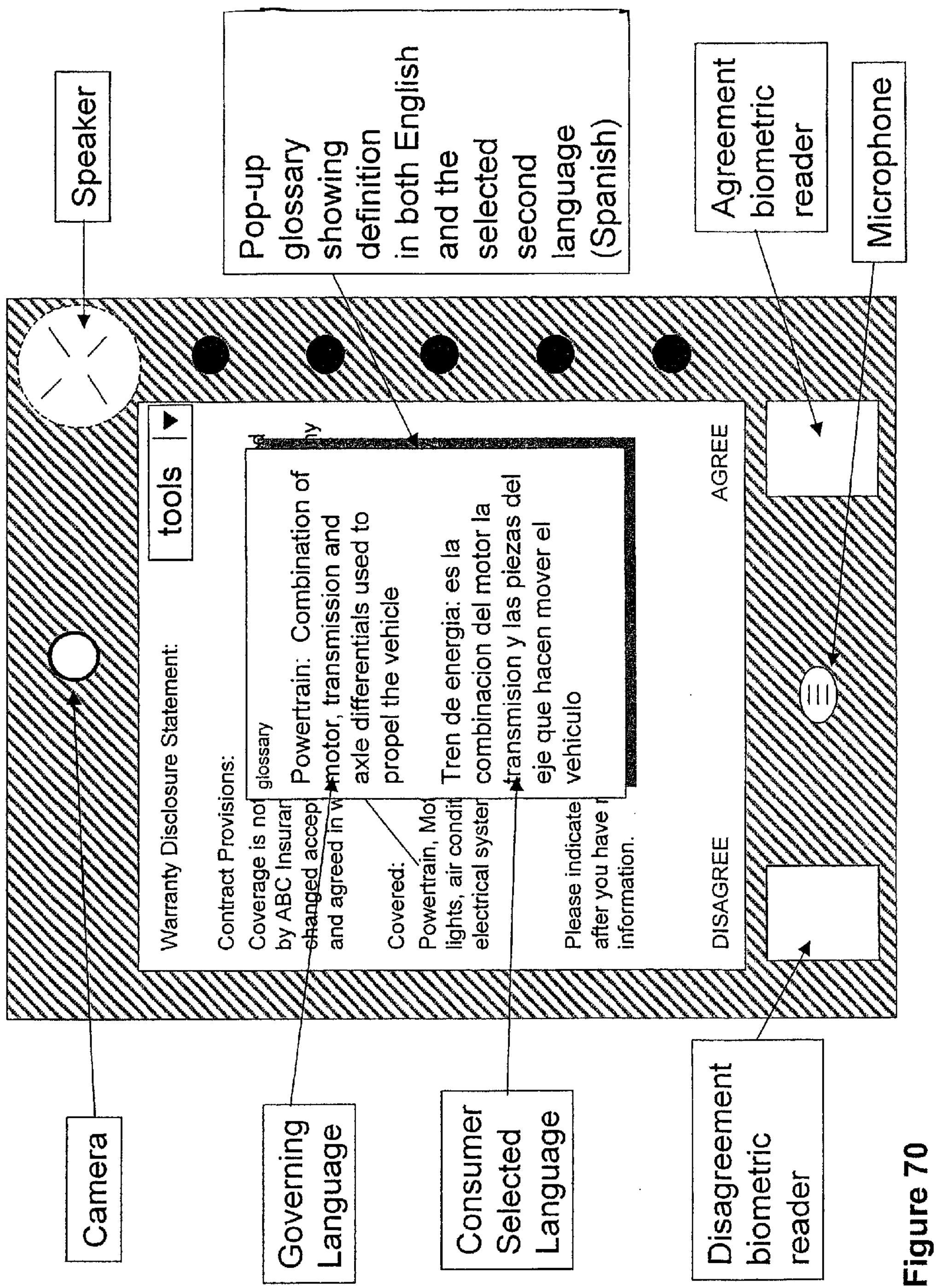
FIG. 70 illustrates an ECDU pop-up multiple language glossary screen.

As mentioned previously, the combination of tools can be a powerful component of various ECDU embodiments. For example, FIG. 70 illustrates the combination of the glossary tool and the language translation tool. This figure shows the Pop-up Glossary Tool displaying the definition of "Powertrain" in both English and the Spanish (i.e. the selected alternate language).

Figure 71:
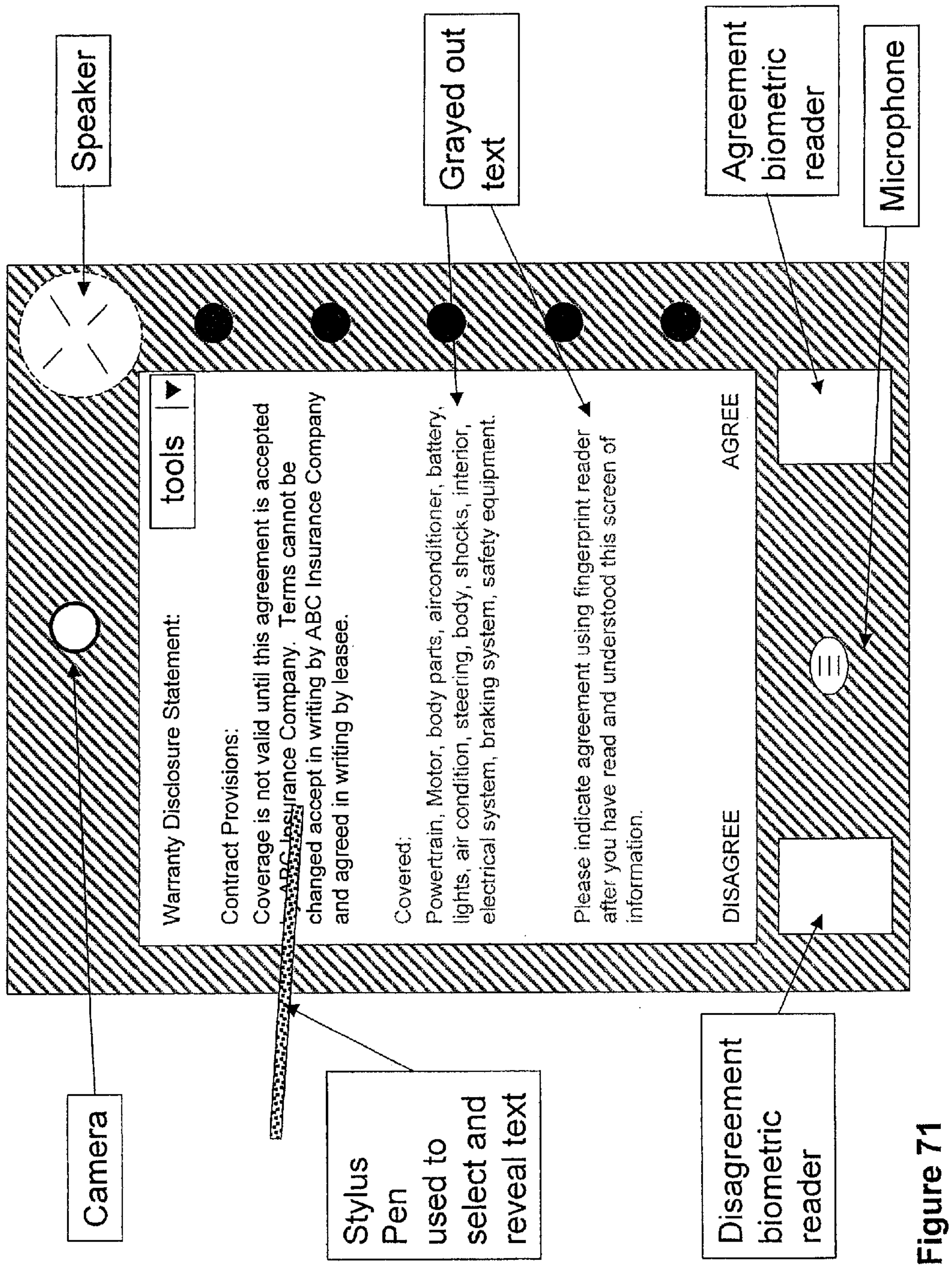
FIG. 71 illustrates an ECDU sweep and reveal tool.

The methodical display of disclosures to the consumer is a key feature of the ECDU. FIG. 71 shows the Sweep and Reveal Tool being used methodically to display the terms and conditions of the extended warranty. The sweep and reveal tool begins with all text being in a grayed-out state. As the dealership employee swipes each section with the stylus, the ECDU changes the section back to its non-grayed out state, and the dealership employee explains that section to the consumer. The ECDU captures and records the employee's description using the microphone.

Figure 72:
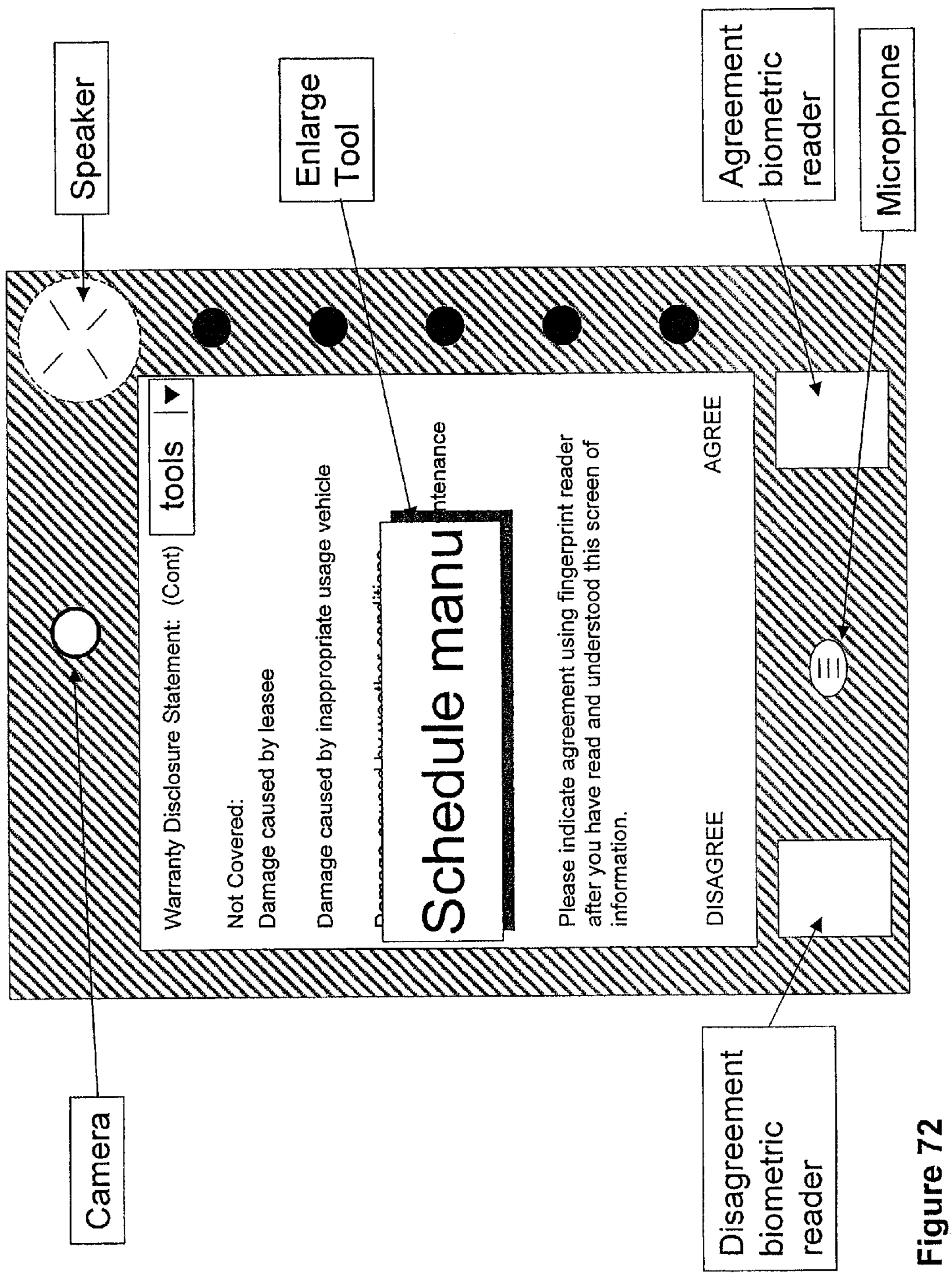
FIG. 72 illustrates an ECDU multi-screen disclosure.

In general, the fine print of the warranty is displayed across several screens. FIG. 72, shows the second screen of the warranty disclosure. For vision impaired consumers, the enlarge tool is provided. As shown in FIG. 72, the enlarge tool allows the user to enlarge sections of the screen by moving around the enlarge window. The customer validates that he has read each screen using the AGREE fingerprint reader while the camera captures the event.

Figure 73:
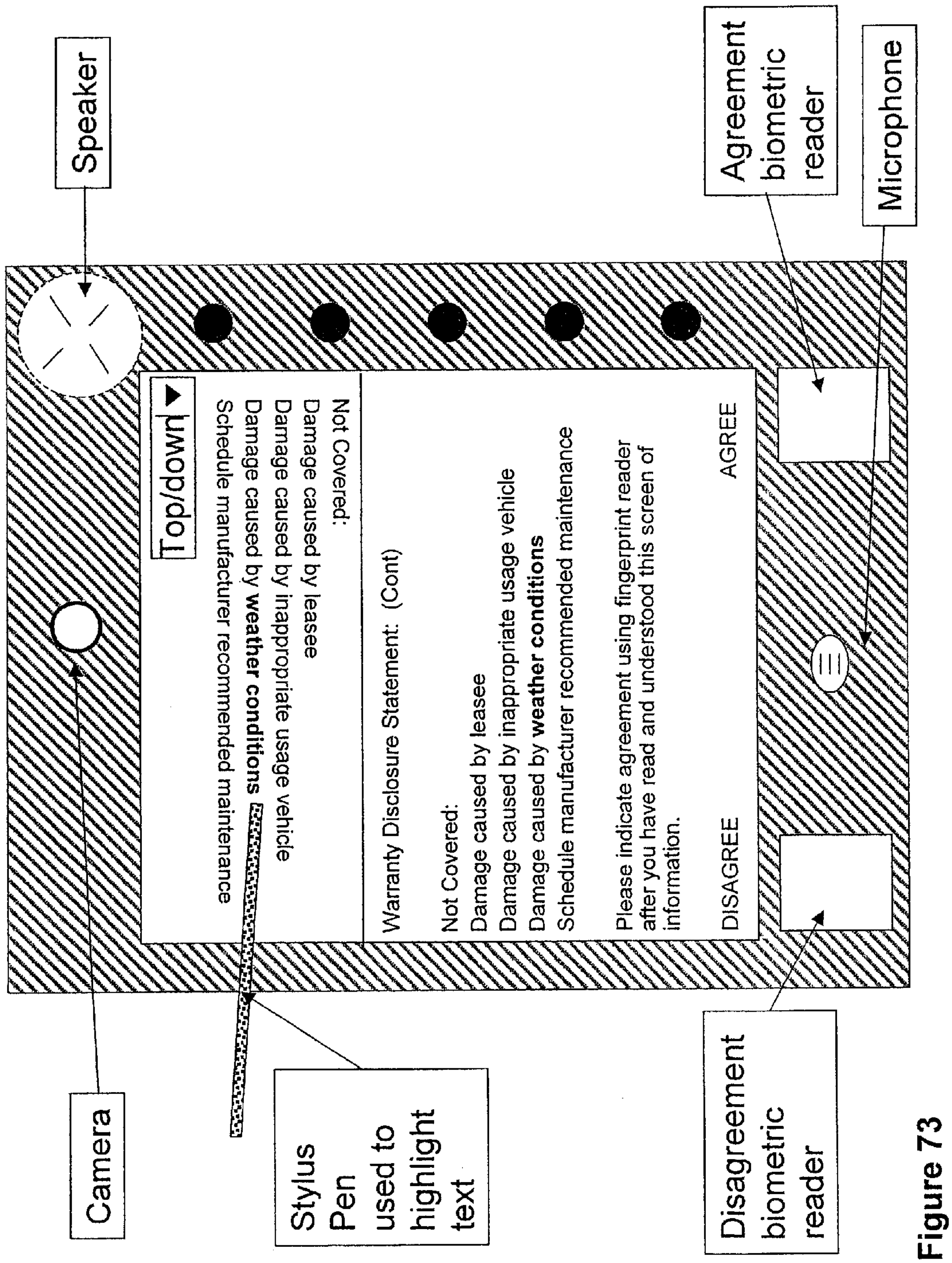
FIG. 73 illustrates an ECDU top/down split screen method.

Occasionally during the ECDU session, the consumer will ask the dealership employee for assistance or additional explanation. The embodiment of FIG. 73 illustrates the use of the top/down split pen tool. The top/down split pen tool switches the screen into two viewing areas: one for the consumer in the usual orientation, and a flipped version at the top for the dealership employee. Any highlighting of text by the dealership employee is shown in both viewing areas. FIG. 73 shows the dealership employee highlighting the words "weather conditions" with the stylus pen and these words are being highlighted in both views. All stylus inputs from both consumer and dealership employee are logged in the ECDU session and displayed on both sides of the split screen. This top/down split screen tool can be implemented to work with dual pens or single stylus pen. In a single stylus pen embodiment, the ECDU infers the pen user from stylus location and records the actual user with the camera. In a dual stylus pen embodiment, which pen is assigned to consumer and employee can be inferred from usage or be pre-assigned.

If the consumer has selected a language other the English, then the ECDU top/down split screen tool shows the consumer screen in Spanish (or one of the other available languages) while the employee screen is in English (default language), as shown in the embodiment of FIG. 74. Any words highlighted by the employee, for example "weather conditions", are shown in both viewing areas. The ECDU underlines the most appropriate portion of the translated text.

Figure 75:
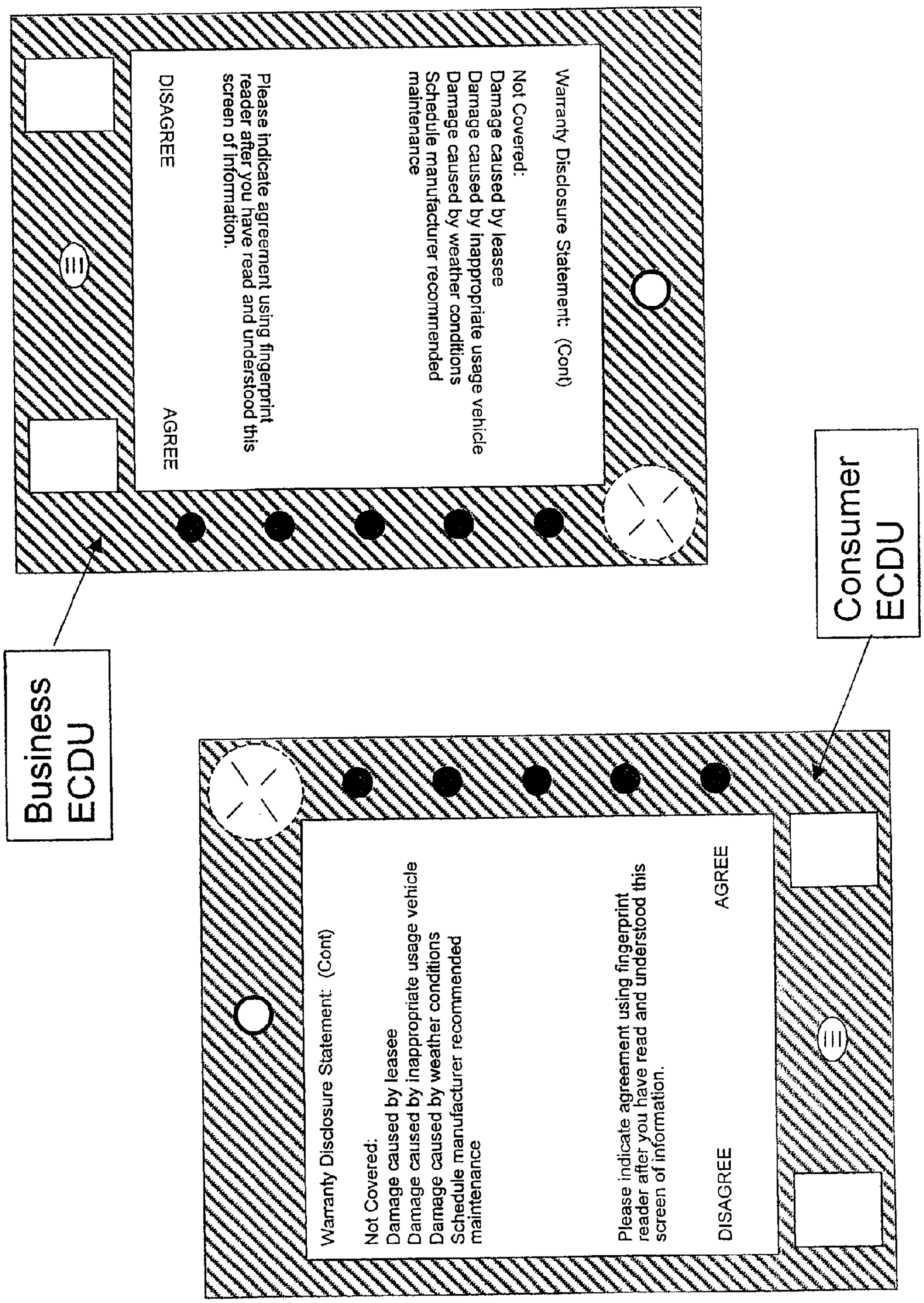
FIG. 75 illustrates a tandem ECDU configuration.

In an alternate embodiment, a tandem set of ECDUs can be utilized as shown in FIG. 75. One ECDU is used by the consumer and the other by the dealership (or business) employee. The ECDUs are connected using either wireless adapters or are directly wired together. In the tandem embodiment, stylus usage on one screen can be mirrored to the second screen. For example, this allows the dealership employee to read along and/or highlight important regions. All stylus inputs from both consumer and dealership employee are logged in the ECDU session.

Figure 76:
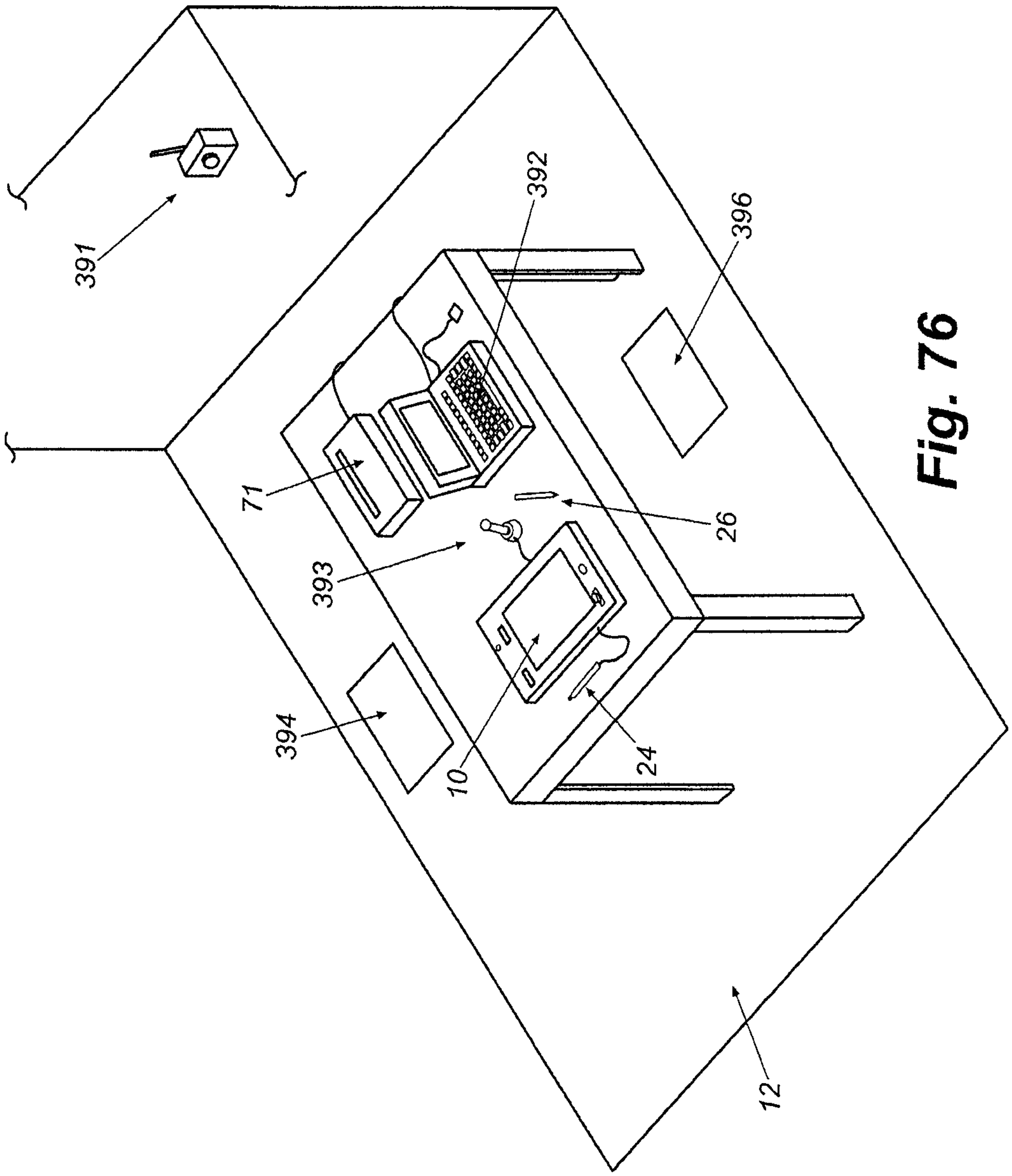
FIG. 76 illustrates an ECDU with tandem PC.

Another alternate ECDU station 12 embodiment is the ECDU 10 integrated with a desktop computer 392 with tandem ECDU software as shown in FIG. 76. The tandum software allows the desktop computer to set up and administer the ECDU session. Desktop computers are already in usage in the F&I department of dealership. In this embodiment, software on the desktop computer provides the dealership employee a view of the consumers ECDU session. Also, shown in FIG. 76 is an external wireless camera 391. The ECDU can interface this camera using the wireless adapter. For example, the external camera 391 is used to record all parties to the transaction along with the setting. The ECDU in FIG. 76 is a tablet display based ECDU (shown) with printer 71, or a digitizer grid ECDU, or an ultrasonic digitizer grid ECDU, or a special location coded paper document & scanning pen ECDU, or other ECDU embodiment. FIG. 76 also slows the location of a customer 394 and a business employee 396 who occupy the CTV 11.

Figure 77:
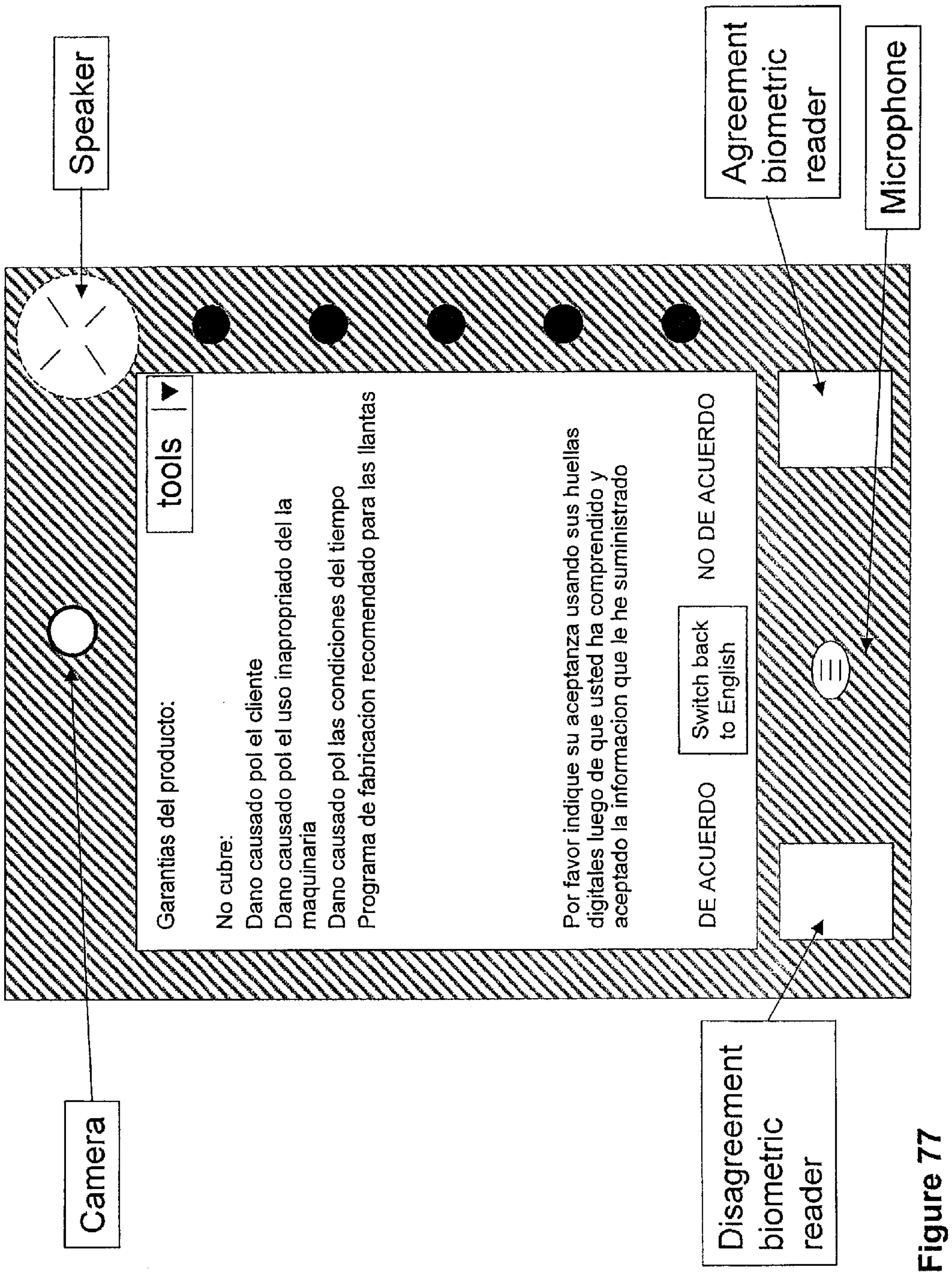
FIG. 77 illustrates an ECDU language toggle button.

FIG. 77 shows the ability of the ECDU to display translations of a contract. Assuming that the customer indicated Spanish during language selection on the initialization screen, then each screen can be toggled between English and Spanish using the language toggle tool located in the bottom center of the screen. Specifically, FIG. 77 shows the second page of the warranty disclosure in Spanish, and the language toggle tool button is used to toggle back to English.

Figure 78:
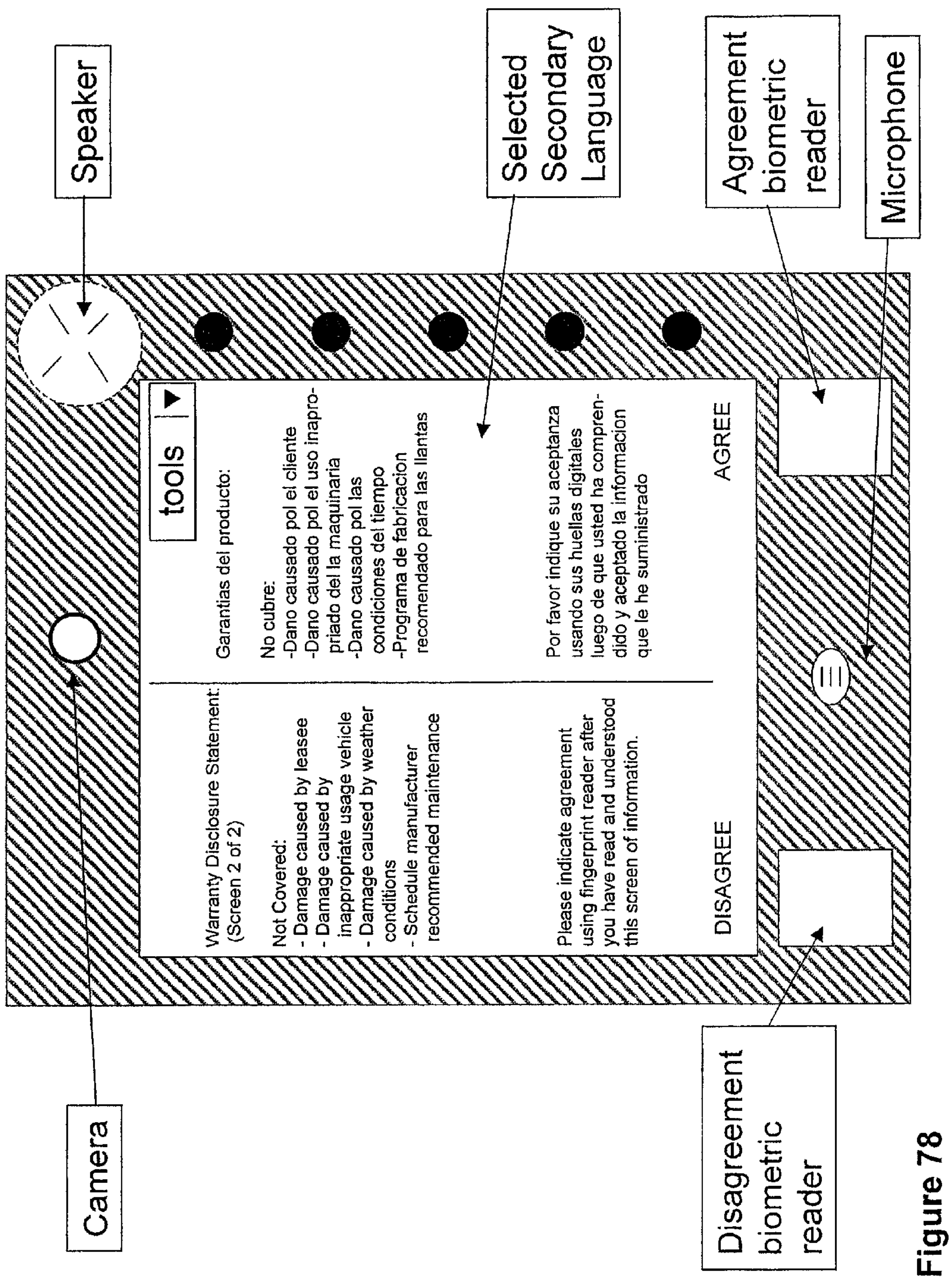
FIG. 78 illustrates an ECDU split-screen translation.
Figure 79:
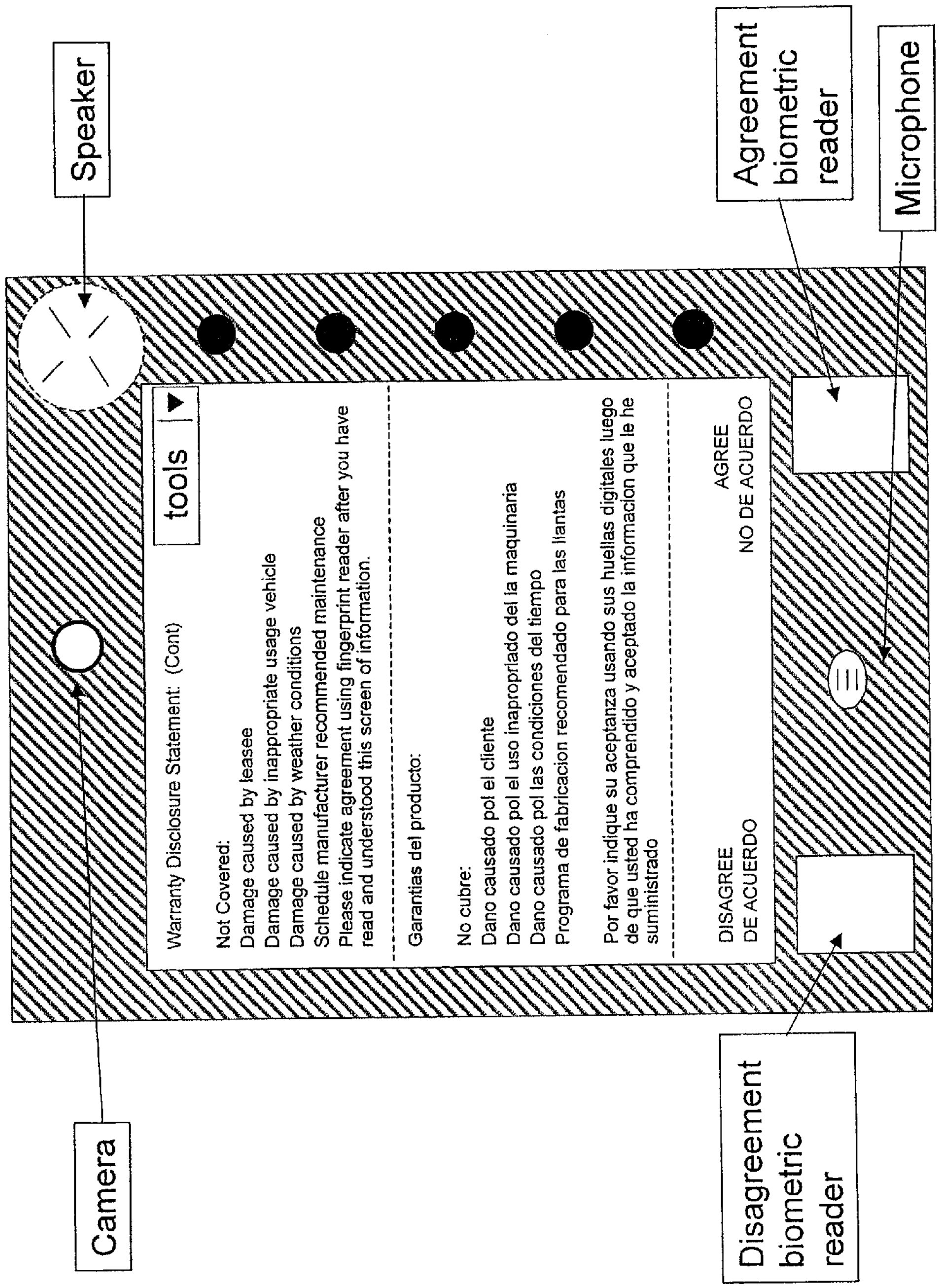
FIG. 79 illustrates an ECDU interleaved language disclosure.

FIGS. 78 and 79 show the split-screen dual language display capability of the ECDU. The left hand side of the screen is displayed in English while the corresponding translation (e.g. Spanish) is shown on the right hand side. Also, which language is on which side is changed depending on user feedback.

Figure 80:
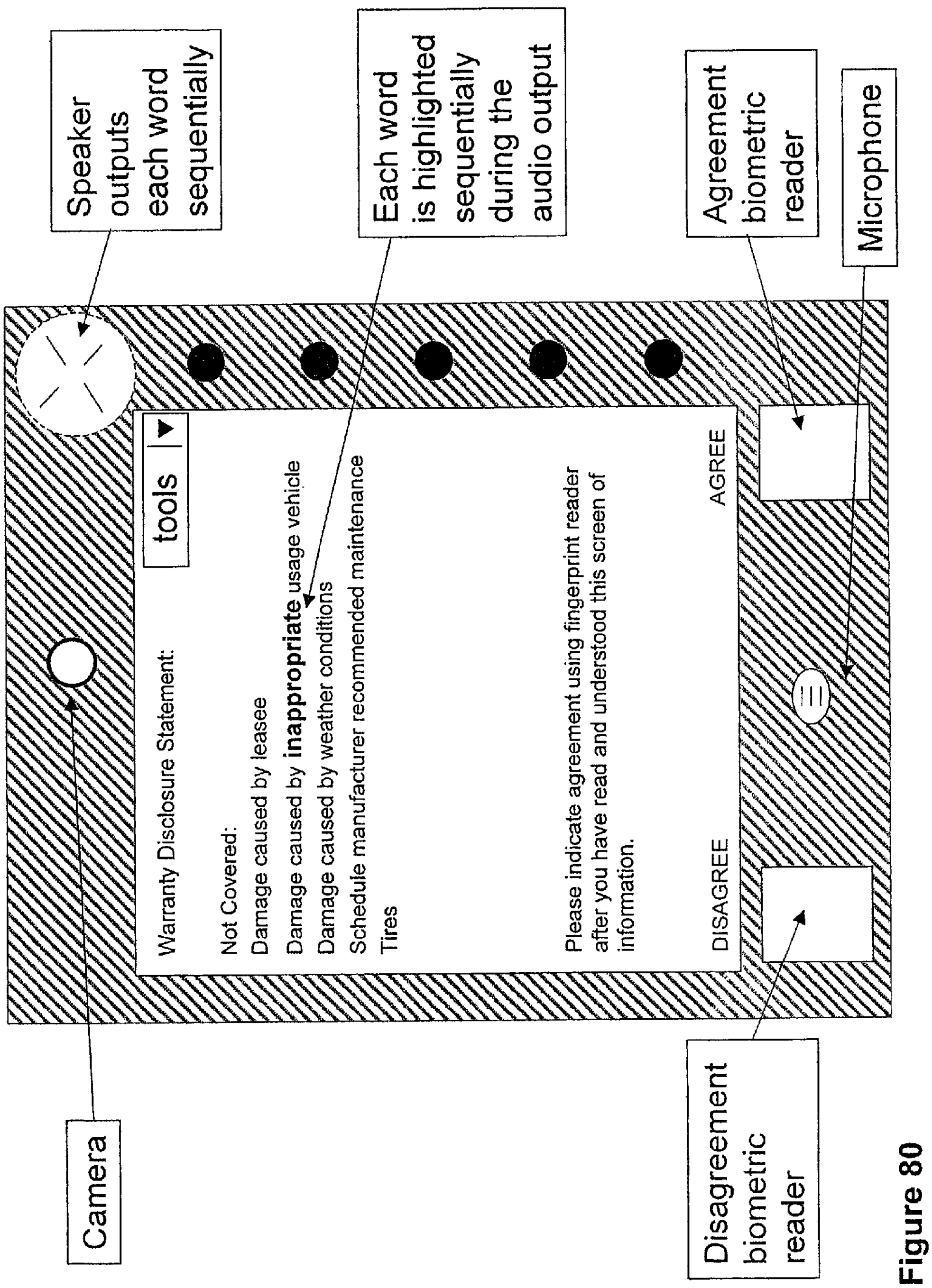
FIG. 80 illustrates an ECDU read-out-loud tool.

As mentioned above, the ECDU has the capability to use audio to convey the information on a screen to the customer. FIG. 80 illustrates this audio output process. The ECDU outputs each word sequentially using the Speaker while indicating which word is being output with a highlighting box. This highlighted box process is very similar to children's sing along tapes, or Karaoke machines. This read-out-loud capability when combined with the language translation tools allows the ECDU to output audio in user selected languages. Also, portions of the screen are highlighted with stylus to prompt the ECDU to output audio version of these phrases again.

Figure 81:
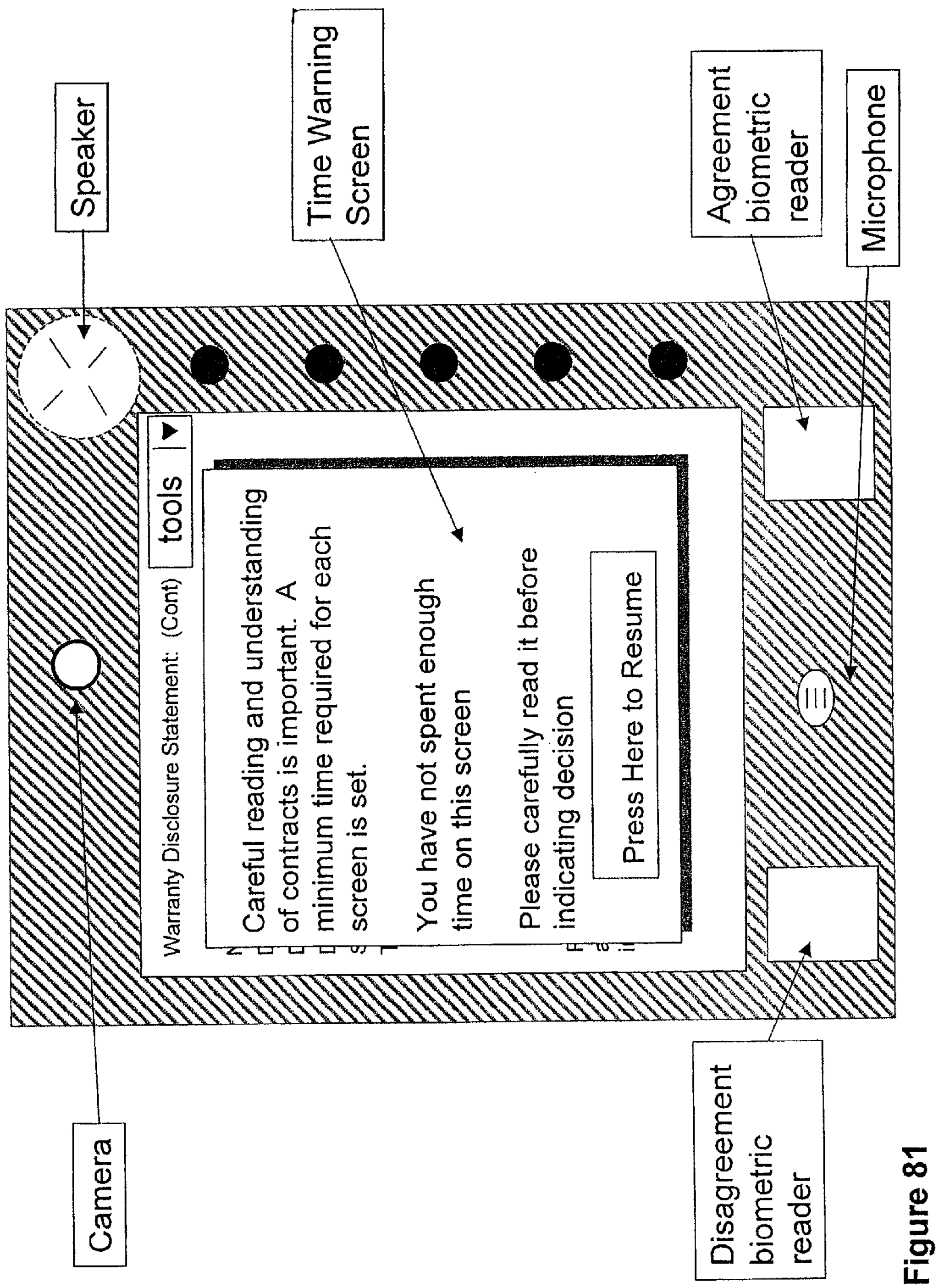
FIG. 81 illustrates an ECDU time warning screen.

During the ECDU session, the ECDU records time stamps in one embodiment. These time stamps allow the ECDU to compute how much time as been spent reading the information on a screen. If the customer spends too little time, the ECDU displays a Time Warning Screen, as seen in the embodiment of FIG. 81, letting the customer know that it is important for him/her to read all of the information and that he didn't spend enough time on this screen. The ECDU records the issuance of this Time Warning Screen in the ECDU session history. The amount of time required for each section are set to a fixed value or be adjusted for each consumer using a comprehension factor measured during routine sections such background questions.

Figure 82:
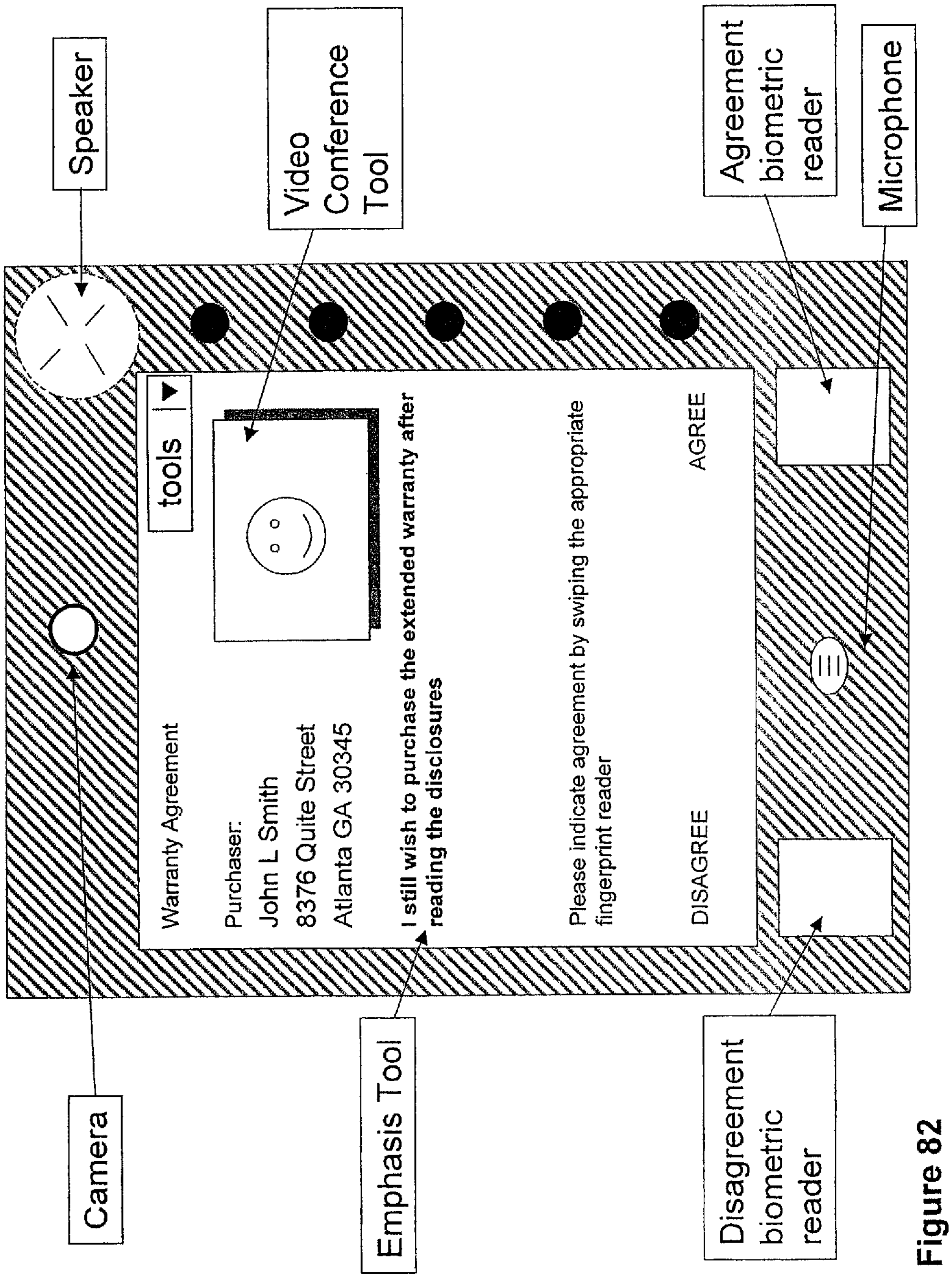
FIG. 82 illustrates an ECDU warranty agreement screen.

Upon completion of the warranty term disclosures, the ECDU can confirm that the customer still wishes to purchase the extended warranty, as shown in FIG. 82. The customer validates his continued agreement using the AGREE fingerprint reader while the camera captures the event. FIG. 82 also shows the use of the Video Conference Tool. In the top right hand corner, the video conference window is shown for connecting to live help. For example, if the user is still confused on some aspects of the disclosures or has questions in general. The full audio and video of this help session would be stored in the ECDU session record.

Figure 83:
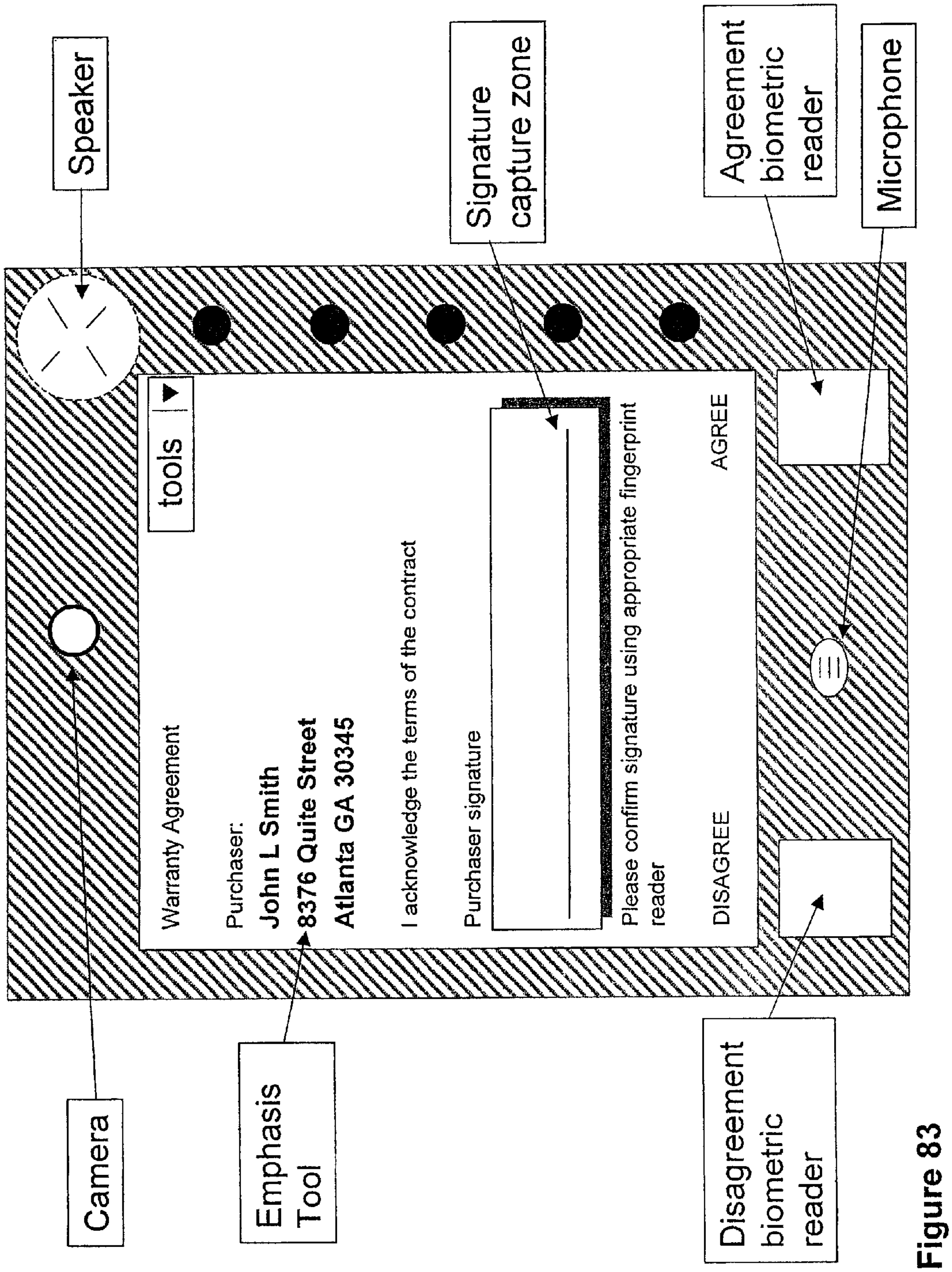
FIG. 83 illustrates an ECDU warranty agreement signature screen.

At the end of the warranty disclosure, the Warranty Agreement screen is displayed, see FIG. 83. This screen shows the user's Name and Address using the Emphasis Tool and prompts the customer to acknowledge the terms of the contract using the Signature Capture tool. After signing the tablet display with the stylus pen, the customer validates his signature using the AGREE fingerprint reader while the camera captures the event.

Figure 84:
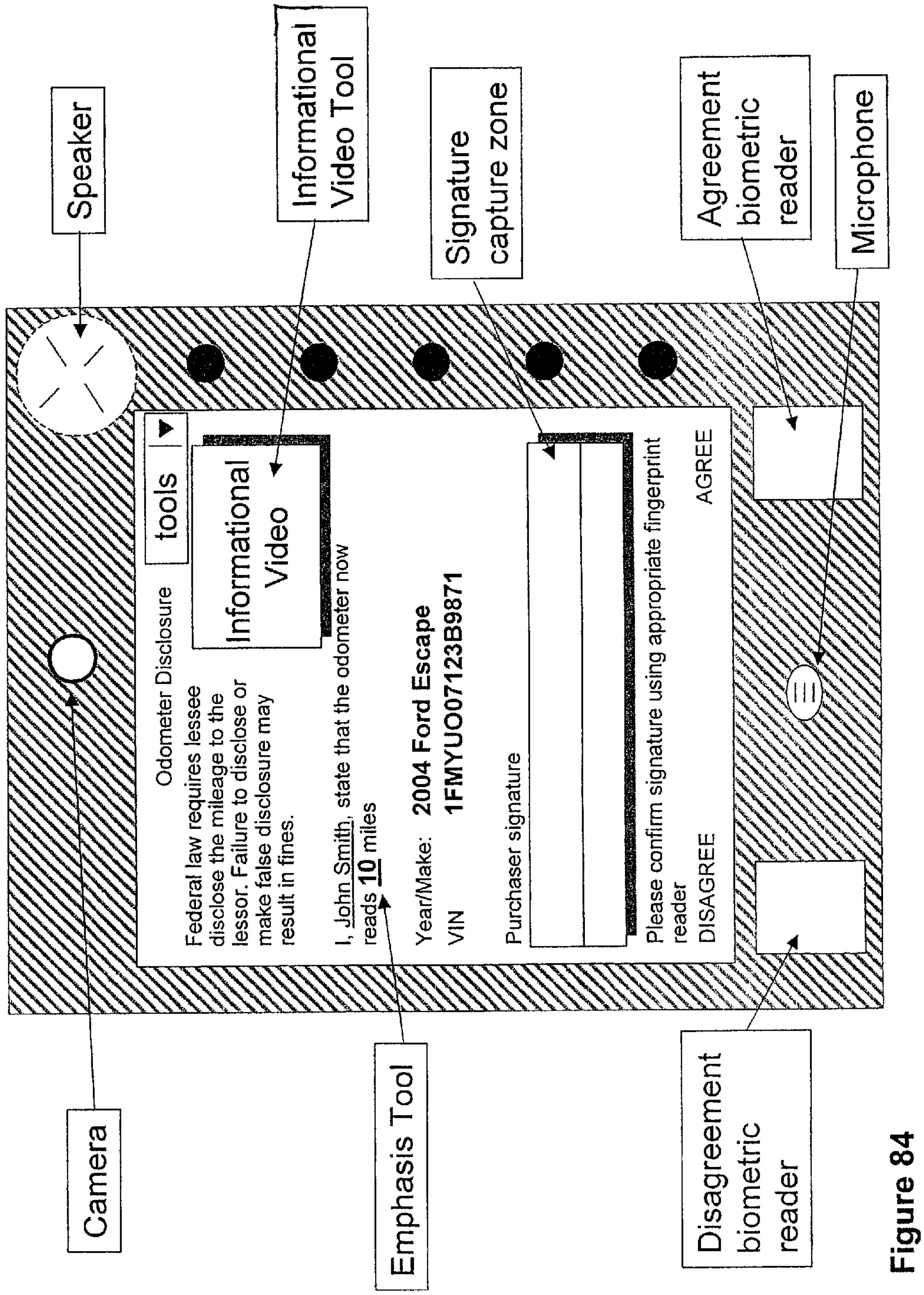
FIG. 84 illustrates an ECDU odometer disclosure screen.

Typically the ECDU displays multiple disclosures to the customer. FIG. 84 shows an odometer disclosure statement. Odometer disclosure statements are required by federal and/or state law. The ECDU displays the relevant odometer information; e.g., current mileage, purchasers name, vehicle year/make and VIN number. As illustrated in the embodiment of FIG. 84, the odometer disclosure can use the emphasis tool to indicate the most important information, and the signature capture tool is used to capture the user's signature. FIG. 84 also shows the Informational Video Tool. This tool is used to incorporate movie (audio and video) explanations. For example on this screen the informational video can explain the legal requirements behind this disclosure. After signing the tablet display with the stylus pen, the customer validates his signature using the AGREE fingerprint reader while the camera captures the event.

Figure 85:
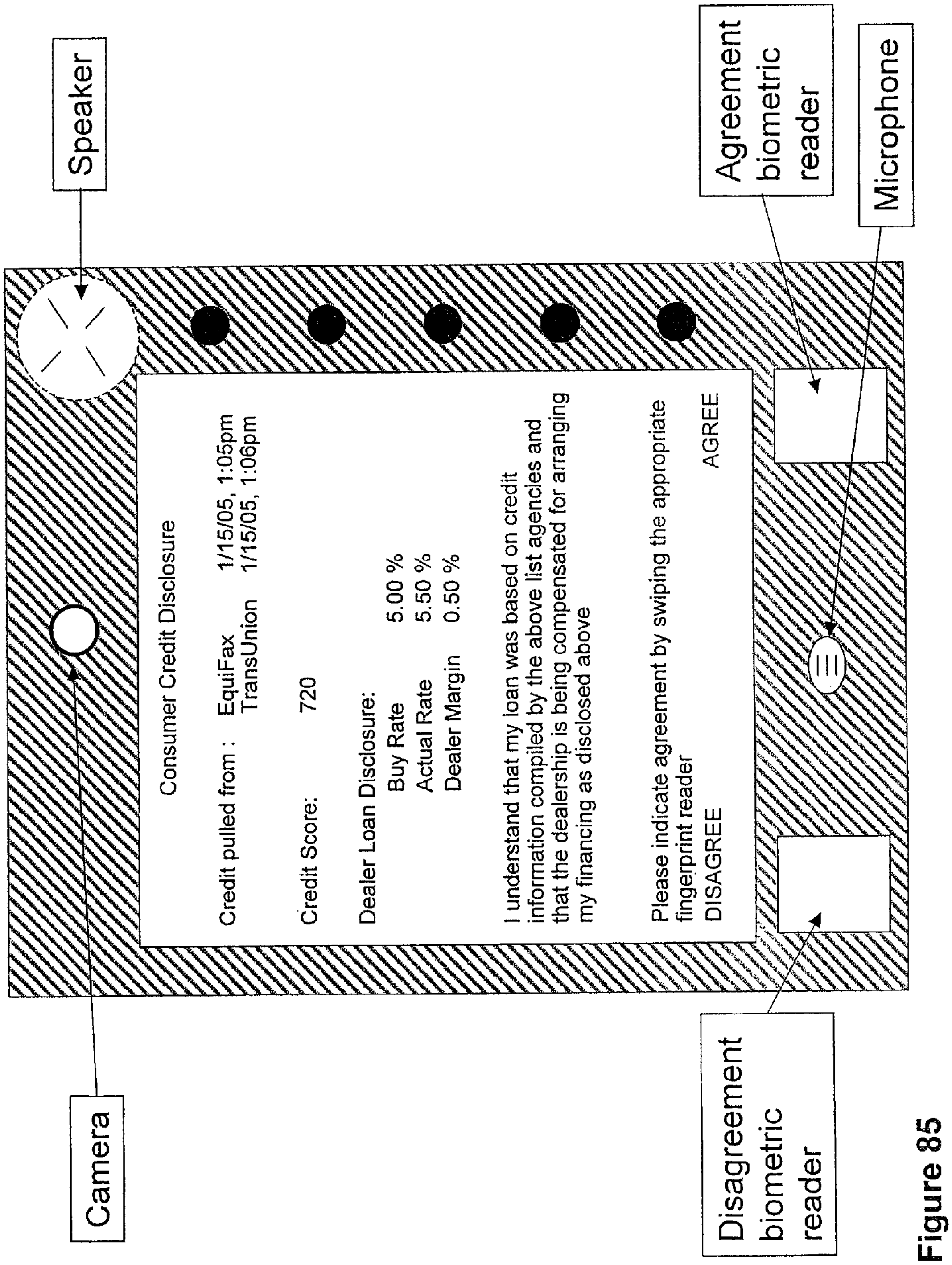
FIG. 85 illustrates an ECDU consumer credit disclosure screen.

FIG. 85 shows the consumer credit disclosure. This disclosure informs the consumer about which sources of credit information were queried and what credit score information was used in credit evaluation process. In addition, this disclosure informs the consumer that the dealership is in fact being compensated for processing the loan by a interest rate margin. Typically, the dealership is paid a lump sum amount computed using present value calculations for the difference between the "buy rate" and the "actual rate." The user is asked to acknowledge that he has read and understood this form by using the appropriate fingerprint reader.

In alternate embodiments, the various disclosures (e.g. odometer, manufacturers state of origin (MSO), tag & title, credit life, gap insurance, road hazard, extended warranty, insurance policy, etc.) are printed on specially coded paper for use with the scanning pen. These disclosures contain the usual start, tools (e.g. help and/or info), done tools along with placement of information trigger tools near key terms to indicate that interactive, tutorial videos are available if requested.

Figure 86:
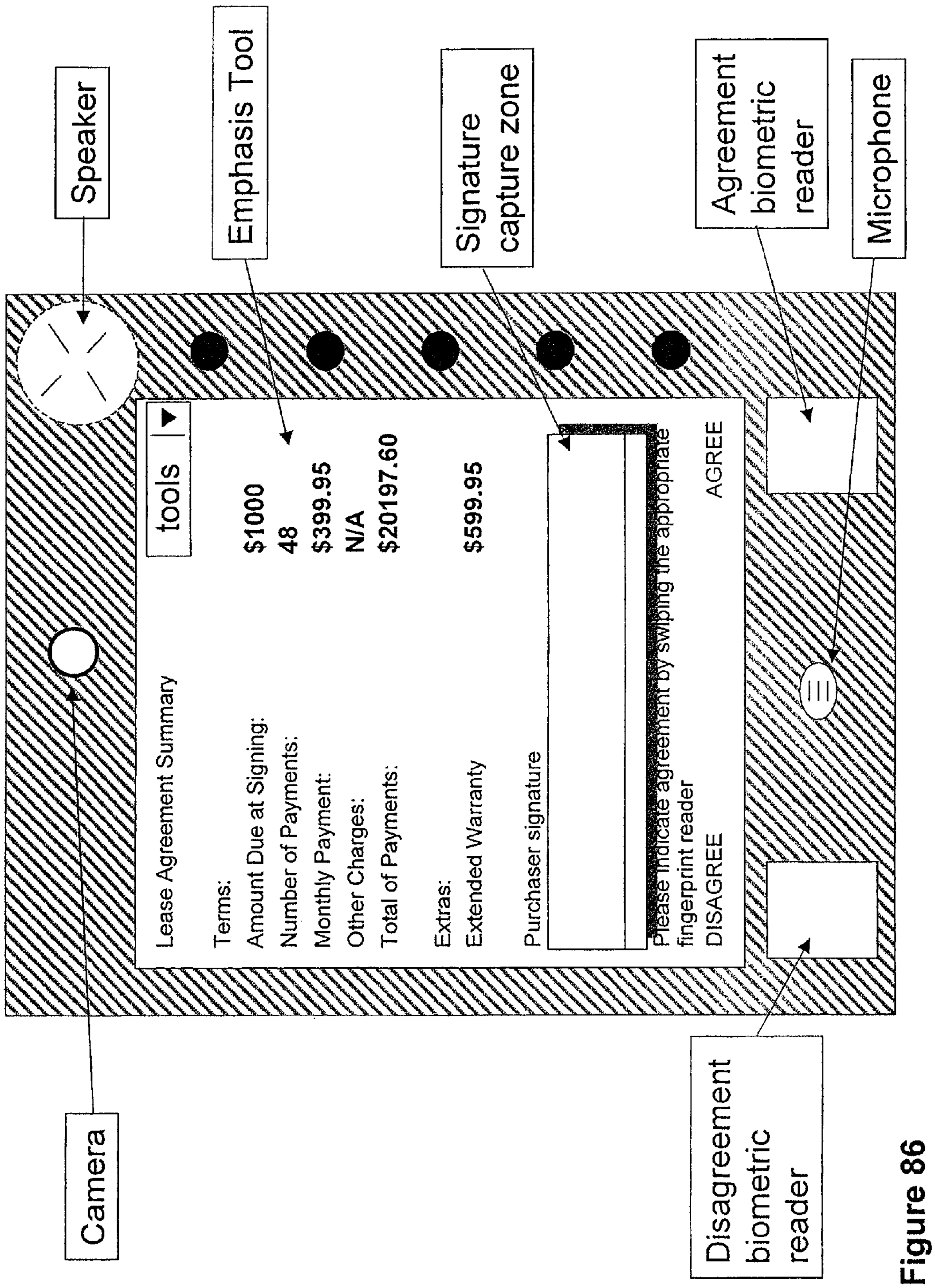
FIG. 86 illustrates an ECDU lease agreement summary screen.

Upon completion of the disclosures, the ECDU returns to the Lease Agreement Summary screen, shown in FIG. 86. This screen displays a summary of the main lease terms; e.g. Number of payments, amount of payment, amount due at signing, etc. The user signs the screen indicating his acceptance of the lease. After signing the tablet display with the stylus pen, the customer validates his signature using the AGREE fingerprint reader while the camera captures the event.

Figure 87:
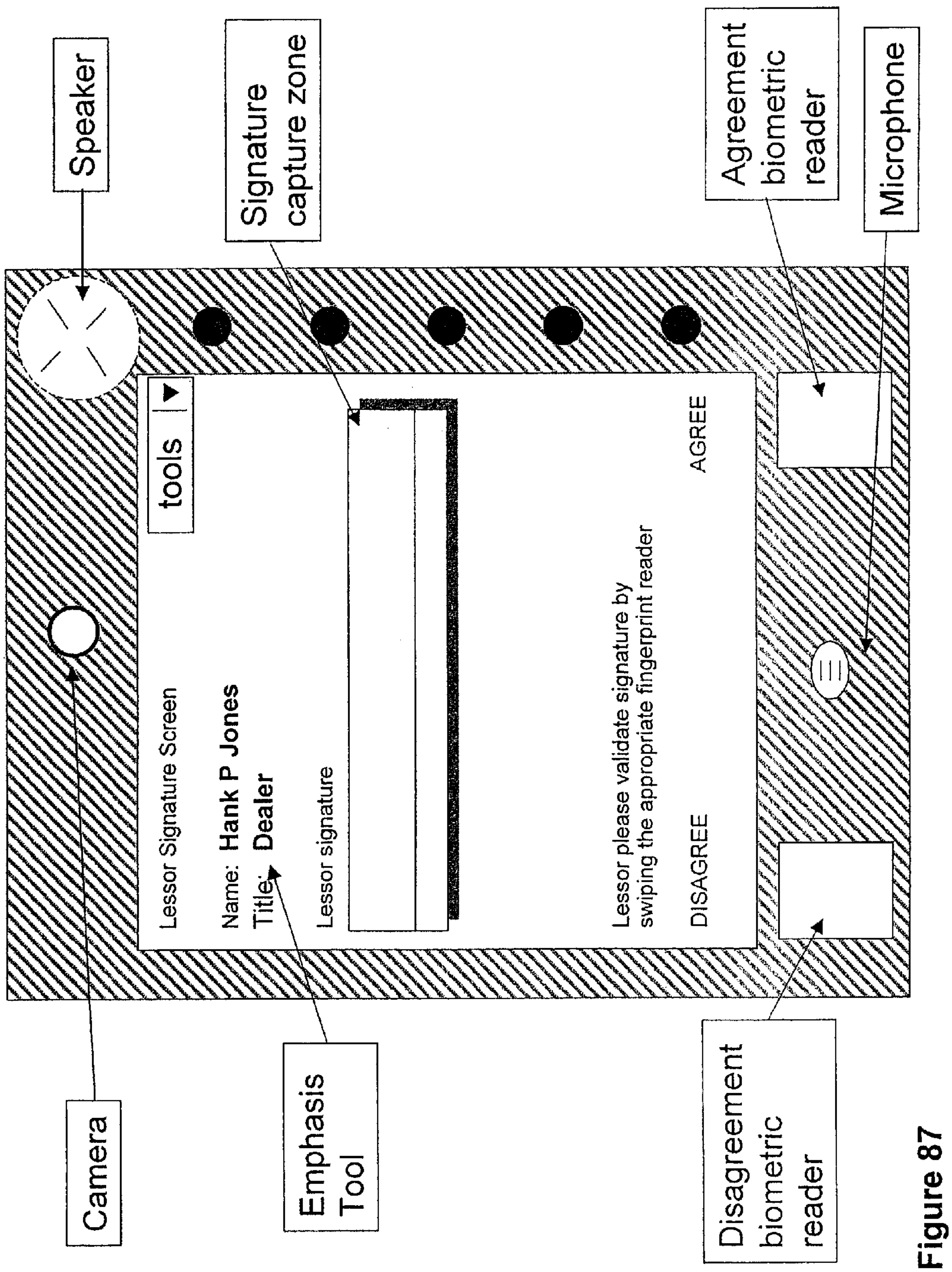
FIG. 87 illustrates an ECDU lessor signature screen.

To complete the lease agreement, usually both parties need to sign. FIG. 87 shows the Lessor Signature screen of one embodiment. The signature capture tool records the dealer's signature. After signing the tablet display with the stylus pen, the lessor validates his signature using the AGREE fingerprint reader while the camera captures the event.

Figure 88:
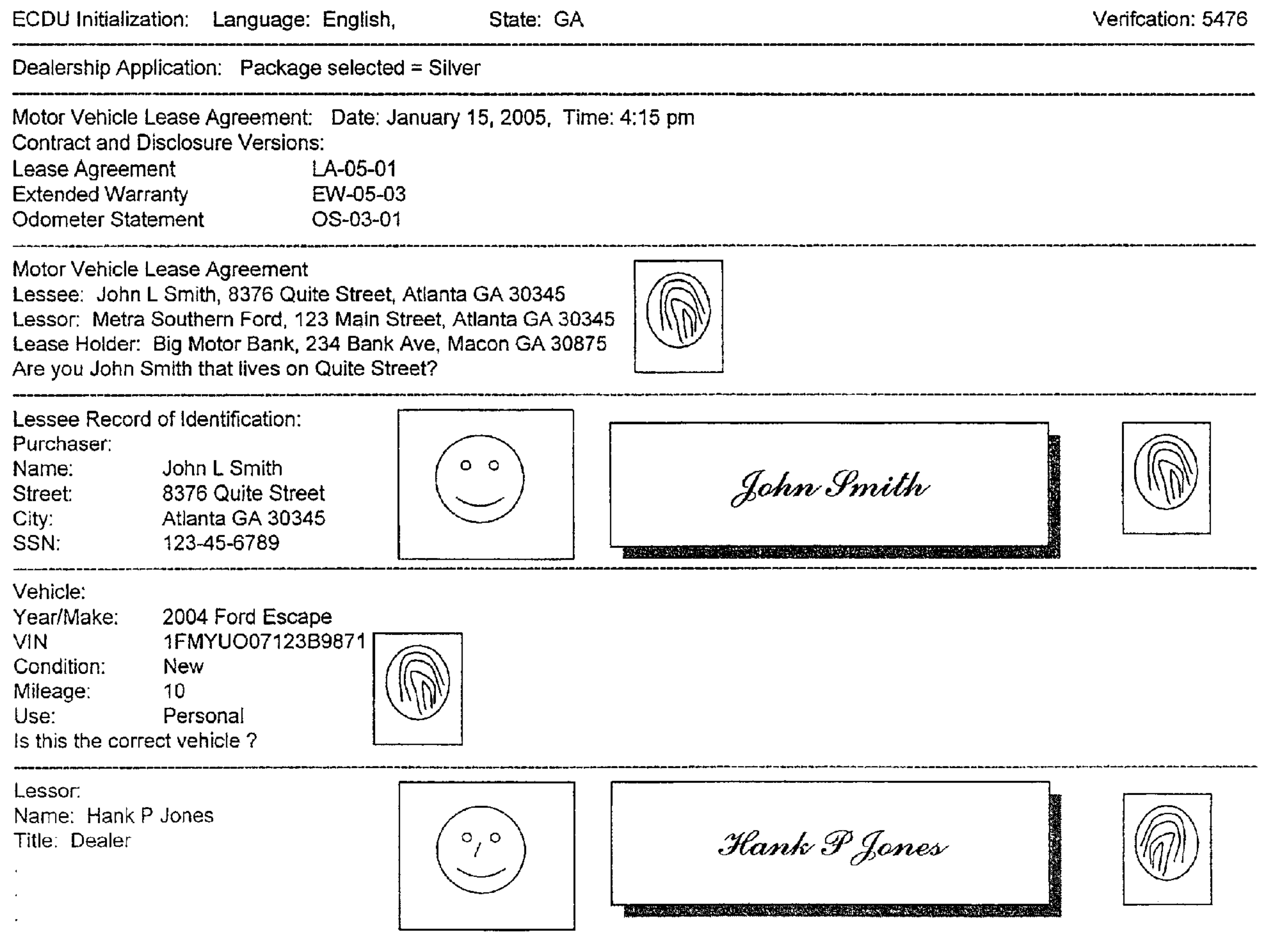
FIG. 88 illustrates an ECDU hardcopy output.
Figure 89:
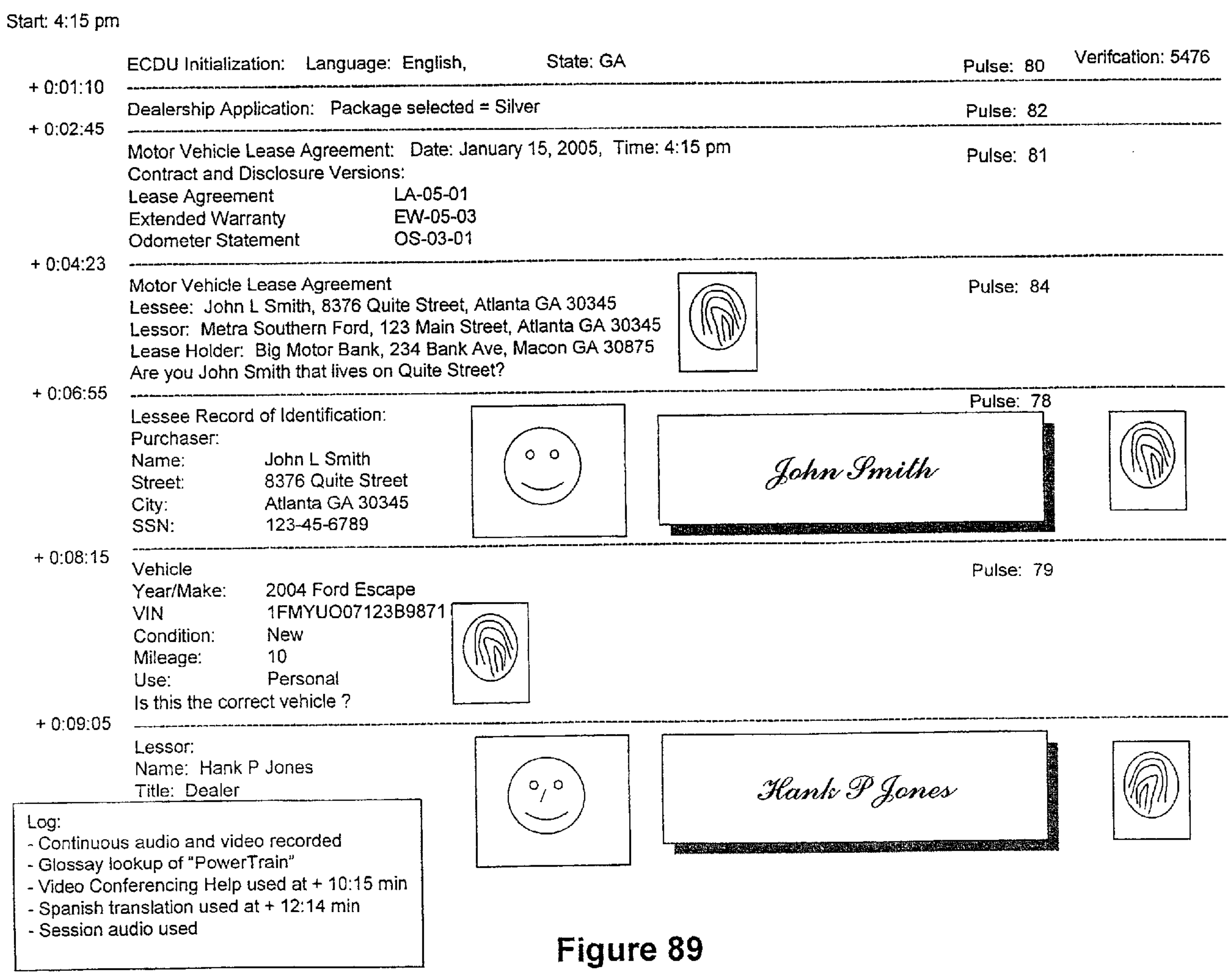
FIG. 89 illustrates an ECDU detailed hardcopy output.

The ECDU outputs a hardcopy version of the contract and disclosures, shown in FIGS. 88 and 89, using the embedded printer or available network printers. The hardcopy includes the user's fingerprint or representative code for privacy after each validated section, his photograph and signature when captured. This hardcopy is provided for the archival use of the customer and when required by federal, state law, and/or business practices. On the top right hand corner of the last page of the hardcopy is printed a 4 digit code.

Figure 90:
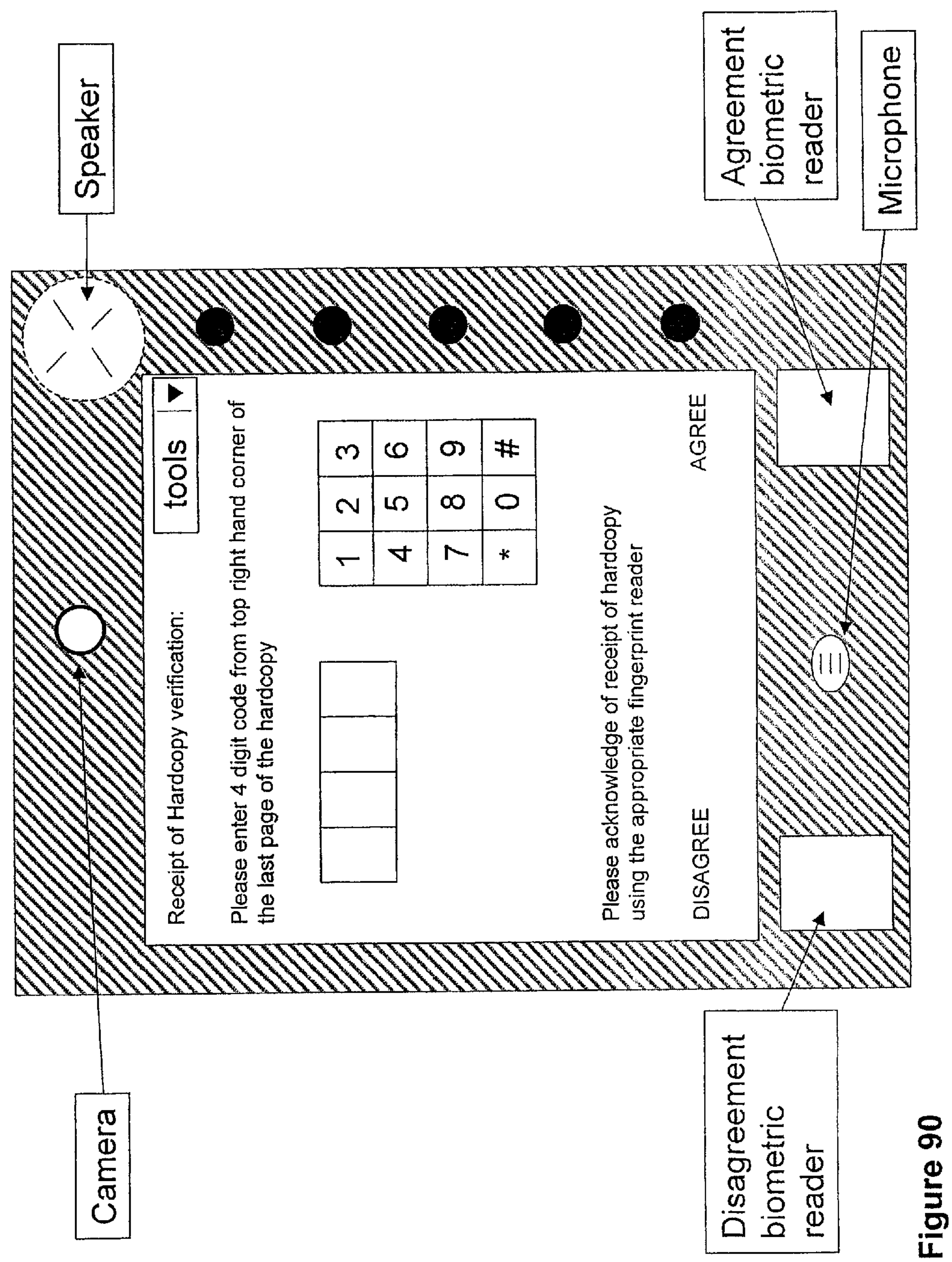
FIG. 90 illustrates an ECDU hardcopy verification.

The ECDU hardcopy verification screen is displayed after generating the hardcopy, as seen in the embodiment of FIG. 90. This screen asks the customer to enter the number from the top right hand corner of the last page of the hardcopy. This process of requiring the customer to enter this number is proof that he/she received the hardcopy. After entering the validation code, the customer validates this entry using the AGREE fingerprint reader while the camera captures the event. In other embodiments, signature or voice validation are substituted for a fingerprint reader if desired. Additionally, the camera is used to take a picture of the consumer with the hardcopy. Specifically, this hardcopy is a complete set of contract and all of the relevant disclosures.

In practice, this hardcopy verification code is greater or less than 4 digits, and can be alphanumeric or contain any enterable characters. Moreover, this verification code can be any machine readable symbol that can be read automatically by a scanner and then validated with the user's fingerprint.

In addition to providing a hardcopy, the customer can receive a softcopy stored in a portable memory device using one of the many memory stick or universal ports, or onto a personal electronic device using one of the many interface, networking or universal ports. Also, the CD/DVD writer can be used to provide the customer with a full copy of the session in an removable, archival format.

Figure 91:
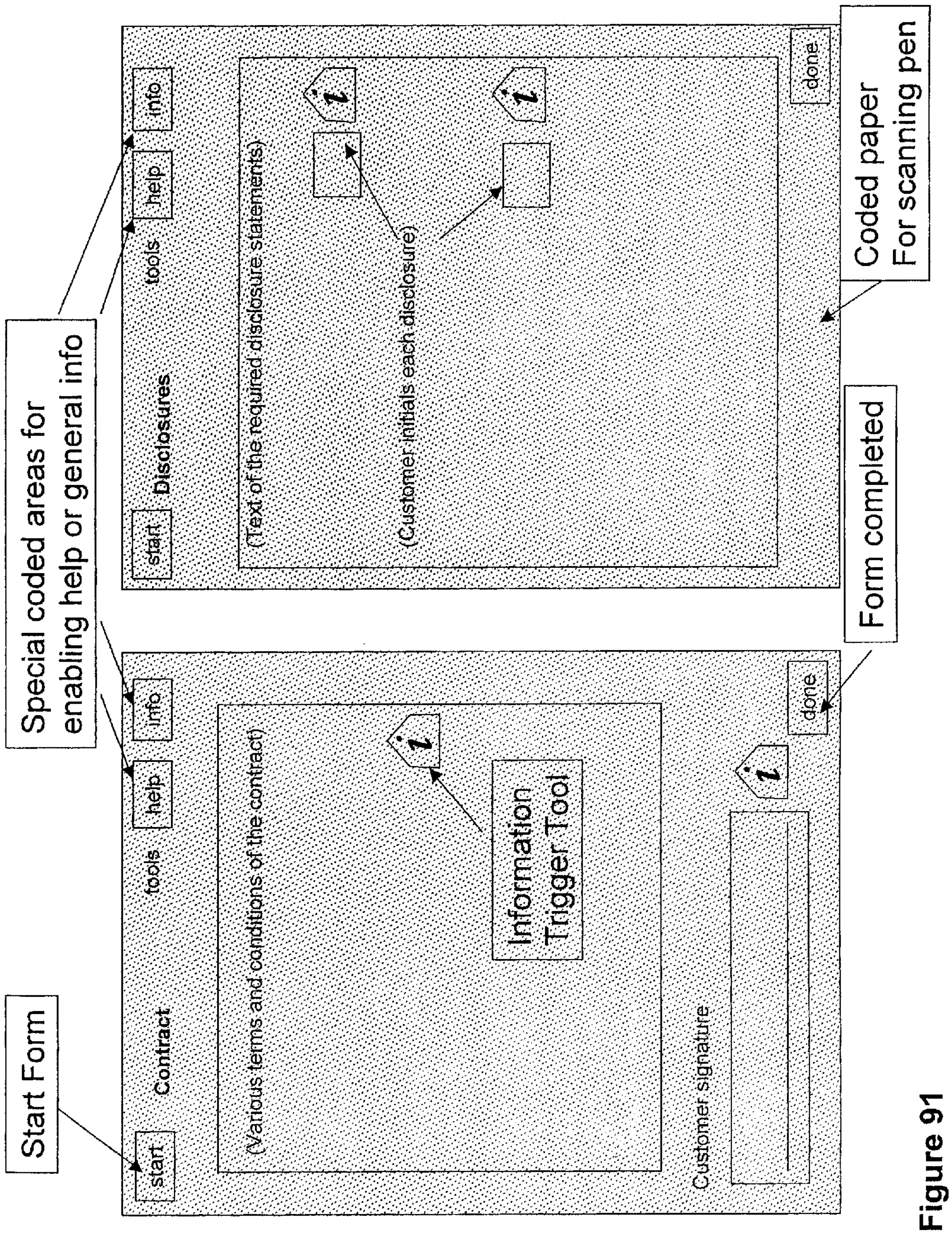
FIG. 91 illustrates hardcopy output on location coded paper.

In addition to the customer's hardcopy, the ECDU can output a ECDU session hardcopy for archival use by the dealership, as seen in the embodiment of FIG. 91. This hardcopy includes other data that is archived in the full ECDU session record; e.g., the time stamp of each screen completion, the user's signature, photo, fingerprint and/or representative code, bio feedback (e.g. pulse), etc. Also, shown in a log format indicating that continuous audio/video was recorded, the user used the glossary for certain words, etc.

In alternate ECDU embodiments, such as seen in FIGS. 19 and 20, the scanning pen is used to execute the contracts and disclosures in place of the tablet & stylus. After completing the menuing and grid process, the ECDU or the dealership computers can print the contract and disclosures with the special location coding symbols required by the scanning pen. Either the paper or forms are pre-encoded with the special location coding symbols or the printer directly prints the symbols along with the forms. FIG. 91 shows a schematic illustration of a printed contract. The first page contains the language of the contract and requires the user's signature at the bottom of the page. The second page, shown on the right in the figure, shows the required disclosures. This second page is often printed on the back of the contract. Each disclosure requires the user to initial that the terms were read and understood. Even though these are traditional paper based forms, the ECDU system is still capable of interactive operation. If the customer selected the information icon (e.g. pentagon with character i), the scanning pen relays this selection to the ECDU and the ECDU displays the relevant information tutorial for that section of the contract or disclosure. After viewing the tutorial, the customer can continue to execute the contract and disclosures. Also, at the top of each page is a row of other special function icons. After selecting the help icon, the scanning pen enters help mode. In help mode, the next selection is relayed to the ECDU for glossary lookup. The selection of the Info icon with the scanning pen causes the ECDU to enter info mode. In info mode, the next selection is relayed to the ECDU for tutorial video presentation (if available). After completion of a page, the user selects the done icon (shown on the bottom right of the page) and the scanning pen relays that the user is done with this page to the ECDU. If the customer wants to redo a screen, he may select the start icon (shown on the top right of the page). Depending on the way the special symbols are encoded on to the pages, each page can have a unique pattern and simply selecting an area on a previous or new sheet of the contract is sufficient.

Figure 92:
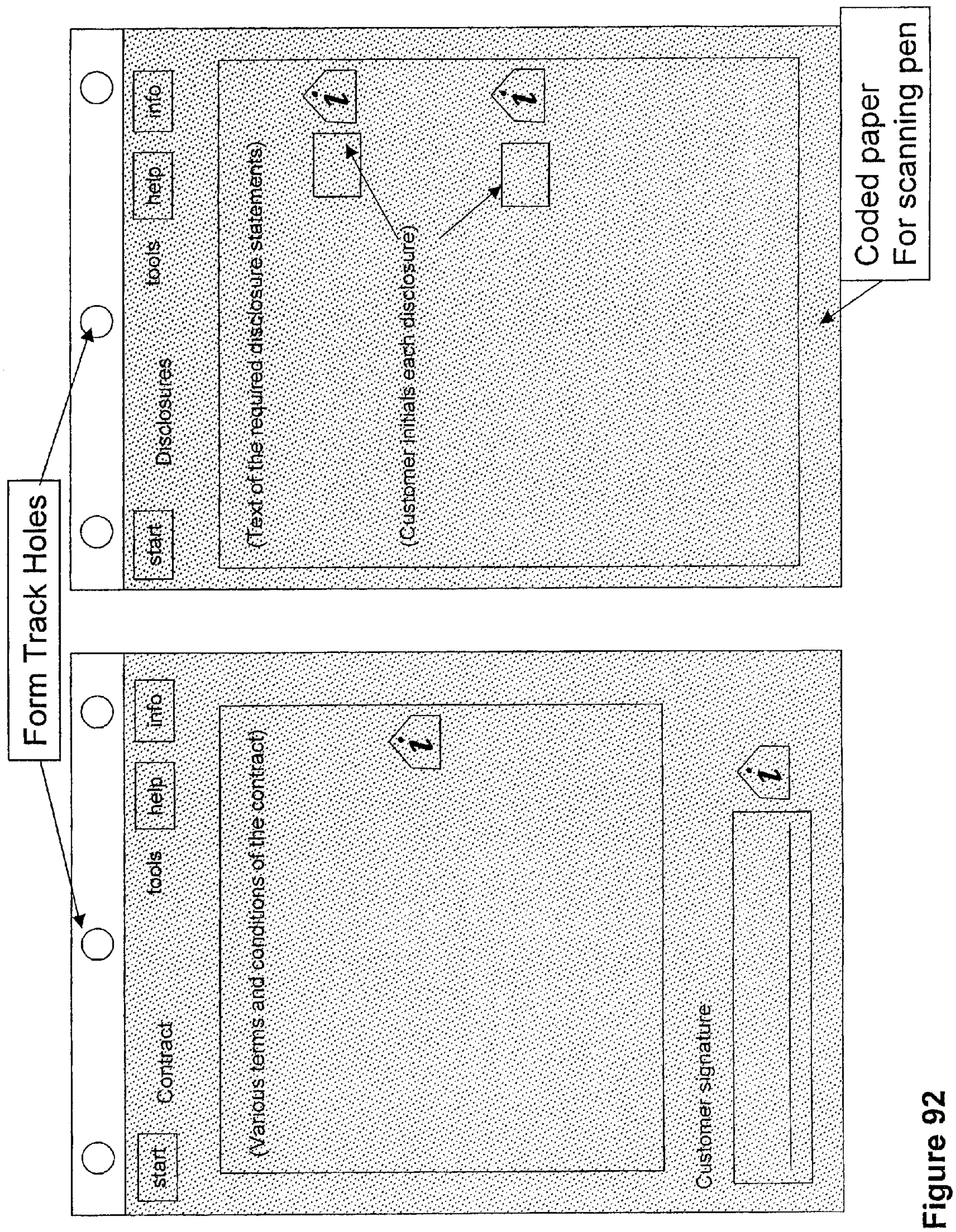
FIG. 92 illustrates hardcopy on pre-printed location coded paper.

The embodiment of FIG. 92 shows a schematic illustration of a contract and disclosure printed on a pre-printed form. The pre-printed form can either already include the special coded symbols or the printer can print them along with the text. At the top of FIG. 92, the pages each contain special form track tabs that are occasional useful for aligning pre-printed forms into printers. Typically, impact printers are used with multiple page pre-printed carbonless duplicator forms, and in this case, the special location code symbols are pre-printed with the rest of the form.

Figure 93:
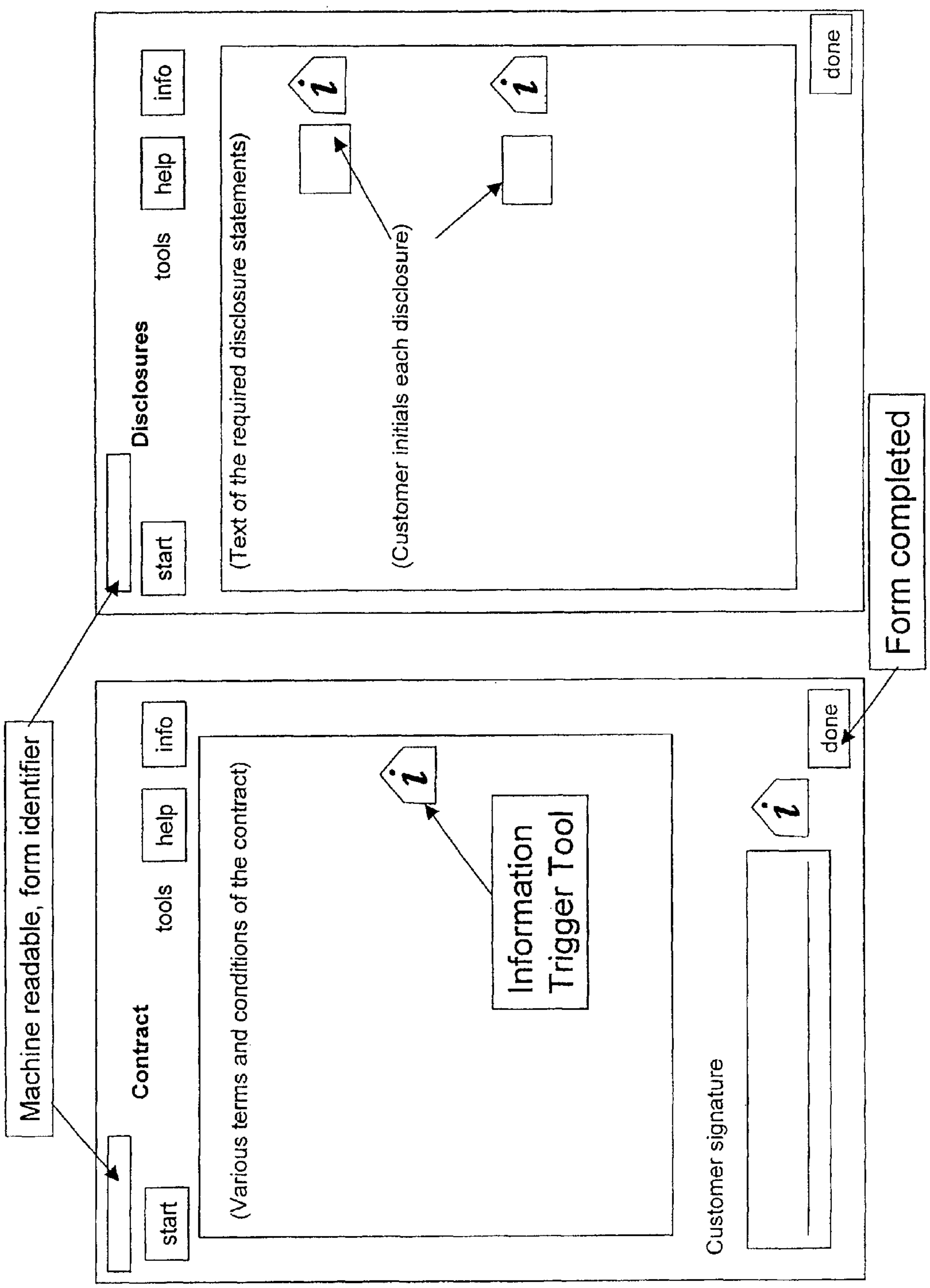
FIG. 93 illustrates hardcopy output on paper.
Figure 94:
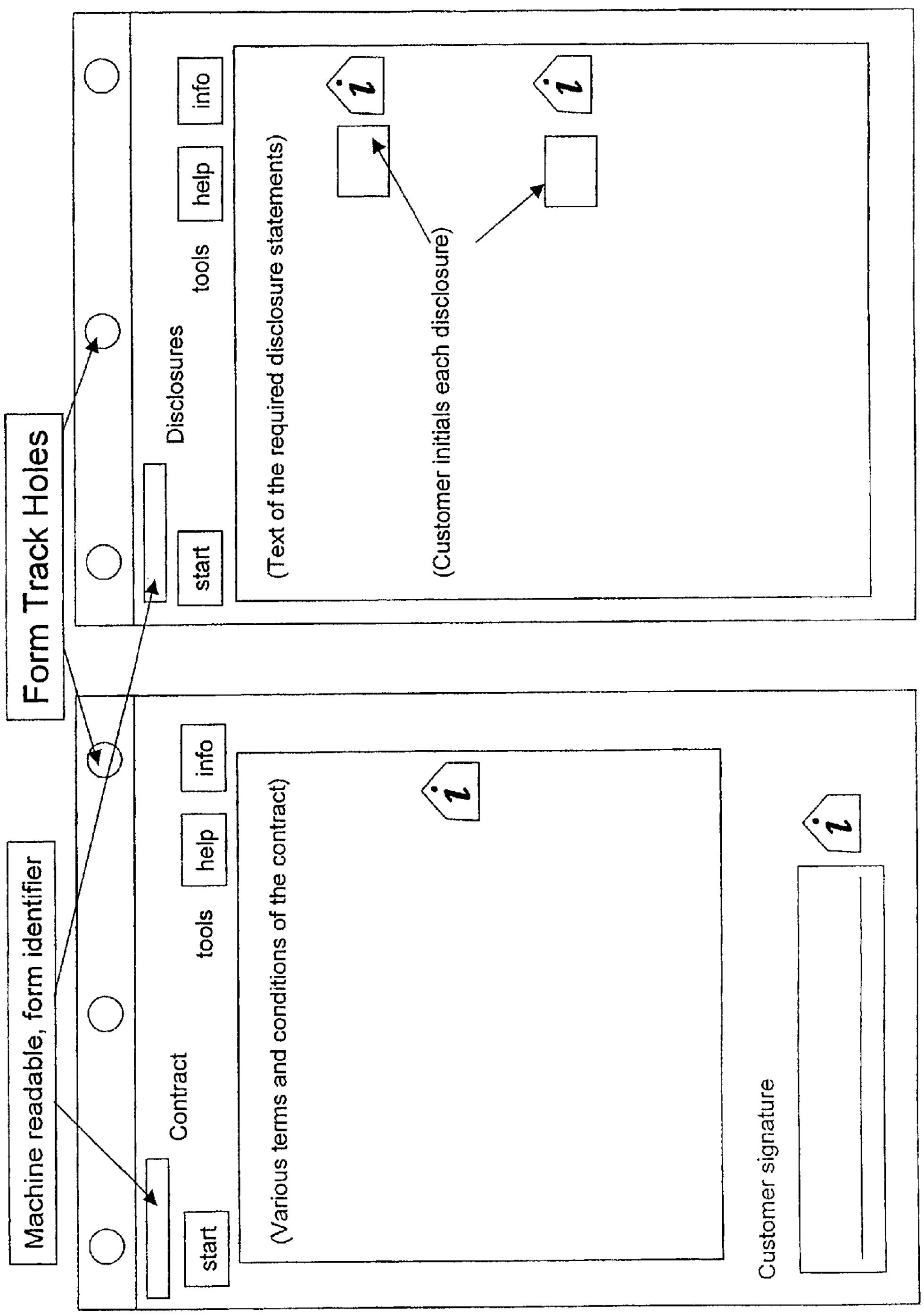
FIG. 94 illustrates hardcopy on pre-printed paper.

FIGS. 93 and 94 show non-location-coded paper-based contracts and disclosures. The paper-based documents are completed using the ECDU embodiments shown in FIGS. 25, 26, and 27. While FIGS. 93 and 94 show contracts and disclosure, non-location-coded paper-based credit applications, and non-location-coded paper-based menuing can also be completed using ECDU embodiments shown in FIGS. 25, 26 and 27.

The embodiment of FIG. 93 shows a schematic illustration of a contract and disclosure printed on paper. At the top of the figure, a machine readable (e.g. barcode) form identifier is included. This identifier is used in the paper-based ECDU embodiments to identify correctly which form is being executed at a give time in the session. Printers (e.g. laser printers) are used to print such contracts and disclosures.

The embodiment of FIG. 94 shows a schematic illustration of a contract and disclosure printed on pre-printed paper. At the top of the figure, a machine readable (e.g. barcode) form identifier is included. Alignment holes are located on the top to aid in the consistent placement of the document. The printer prints the deal specific information (car make, vin, price, etc.) on the various lines or areas on the pre-printed documents. Printers (e.g. laser printers) are used to print such contracts and disclosures.

Figure 95:
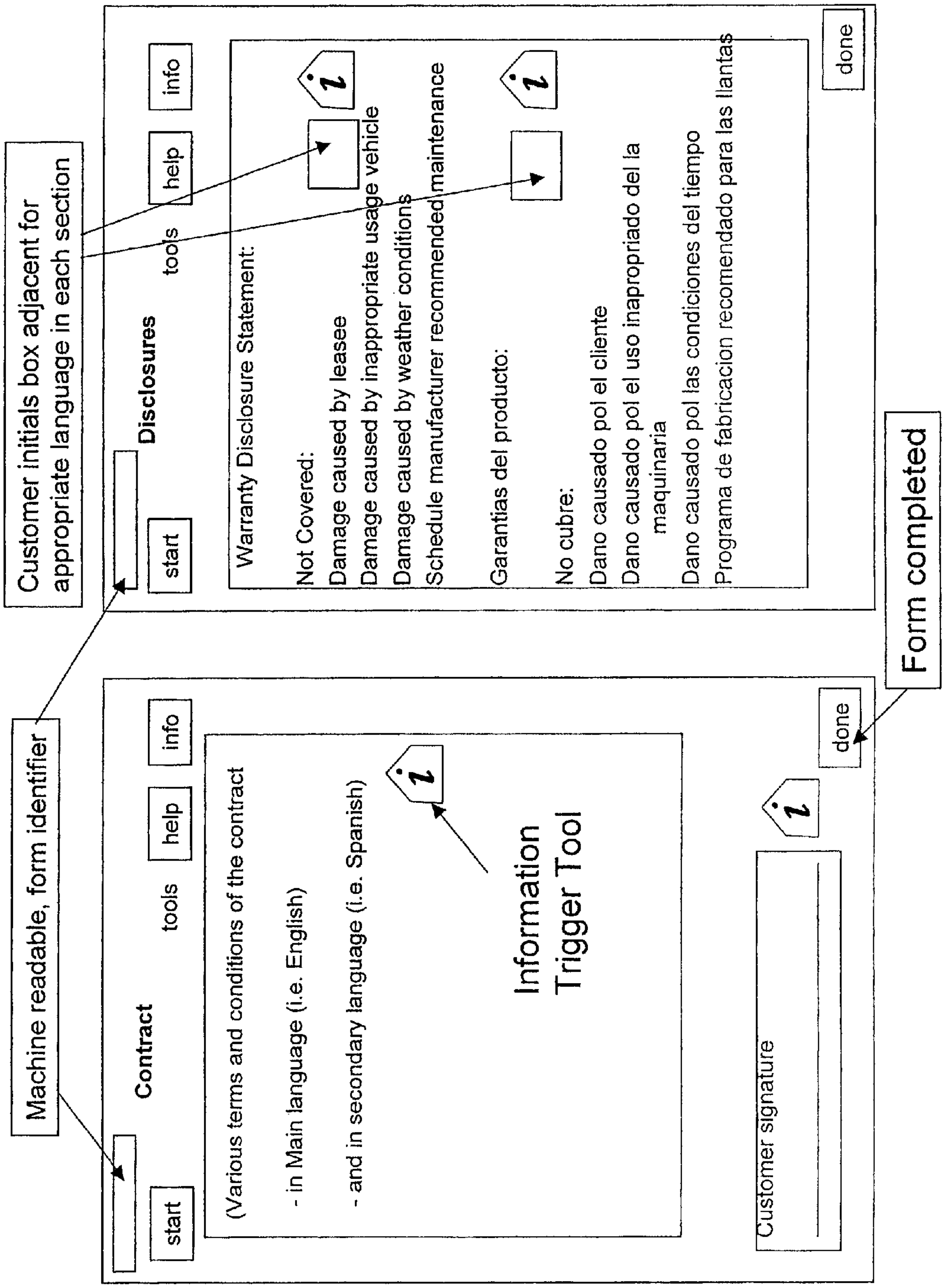
FIG. 95 illustrates hardcopy output showing interleaved multiple languages.

The embodiment of FIG. 95 is a schematic illustration of a contract and disclosure printed on paper in multiple languages. Each section of the document is printed in the main language (e.g. English) and also in the chosen secondary language (e.g. Spanish). The user can initial one box in each section indicating which language version he/she wanted to be read. The ECDU ensures that at least one box is initialed in each section.

In the many embodiments, the ECDU via the stylus and/or scanning pens records the order that portions of the contract and/or disclosure are completed. This progression of signing data is important; that is, for many contracts and/or disclosures there is a required order of execution. For example, the customer must initial all sections and sign various disclosures before signing the overall contract. Commonly in practice, some section initials are missed and the business employee prompts the user to correct the omission after the overall contract was signed. The capability of the various ECDU embodiments eliminates this possibility. In the stylus pen embodiments, the ECDU can notify the user via vibration, buzzing, chirping, verbalizing STOP, displaying a warning screen, etc if the user is attempting to complete the contract and/or disclosure out of order. Similarly, in alternate scanning pen embodiments, the location of initials and signature capture fields along with order of completion information is preloaded into the scanning pen prior to contract and/or disclosure execution. As the user executes the paper-based forms with the scanning pen, the pen records the location of any initials and/or signing events. For wireless scanning pens, the scanning pen is in frequent communication with the main ECDU processor to allow the progression of signing data to be correlated with proper order information. For scanning pens that require a docking port, the scanning pen locally compares progress of the contract/disclosure execution to ensure that the contract is being properly executed. When any deviation from procedure occurs, the scanning pen, buzzes, vibrates, chirps, verbalizes STOP, etc.

Figure 96:
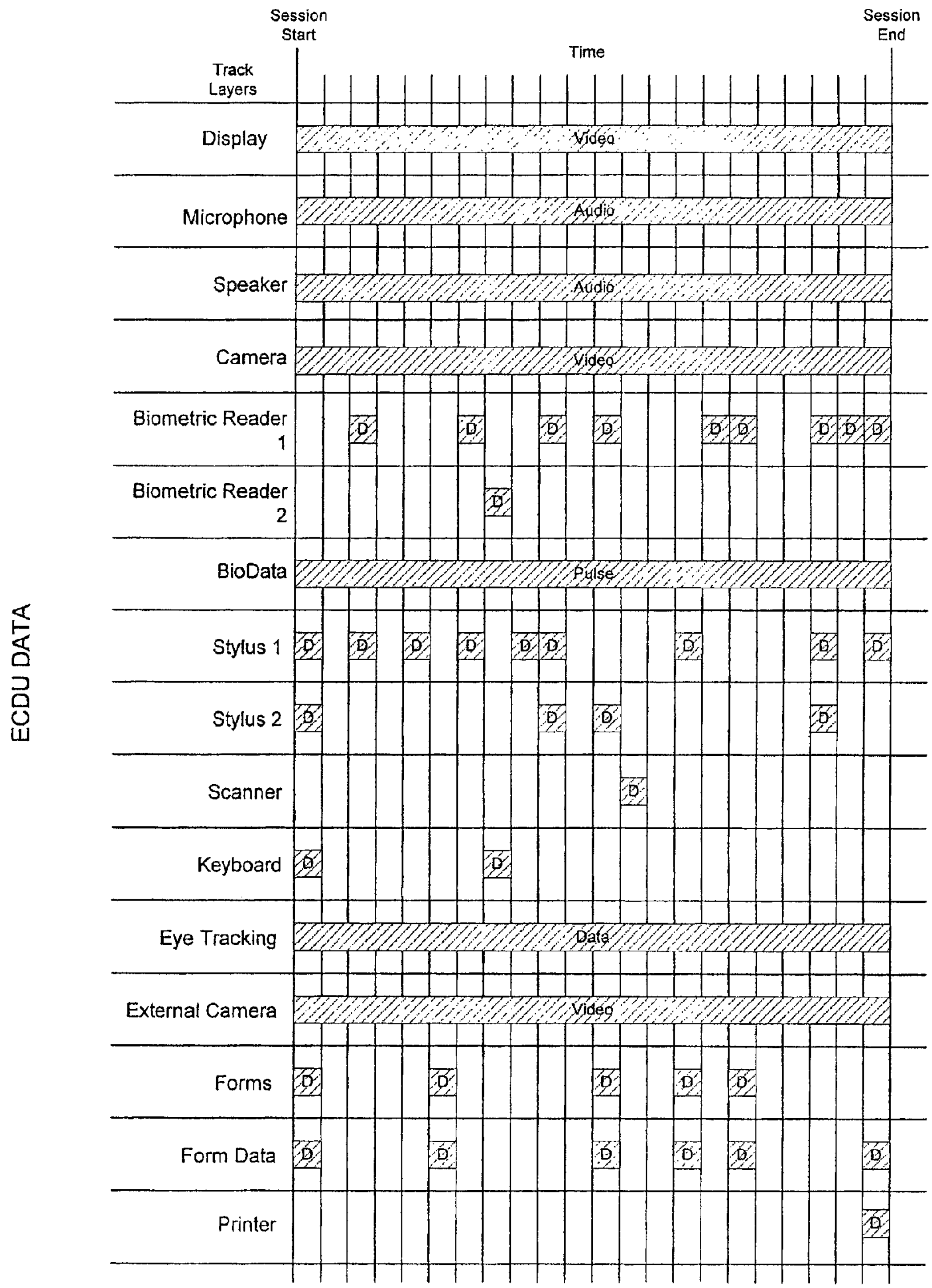
FIG. 96 illustrates an ECDU session log.

After completing the ECDU session, the ECDU transmits the complete session record, i.e. executed contract and disclosures along with other captured session data (fingerprints, photos, etc.) through the internet to the data repository. The data repository receives and stores the complete session in a secure database. The data repository also normalizes and formats the data if needed. Finally, the session data is made available in whole or in part to any authorized data repository user (i.e. financial institutions, contract parties, credit bureaus, etc.). In one embodiment, FIG. 96 shows the track layers of a sample ECDU session. As shown in figure, during the ECDU session some ECDU devices capture data continuously (e.g. microphone, camera, . . . ), while other ECDU devices capture data at key instants in time (e.g. biometric fingerprint readers, stylus data, etc.). Session logs as illustrated in FIG. 96 provide the ability for a session to be virtually replayed. For example, sales training personnel can replay parts of the session where sales are not being made to see if employee technique needs improving, marketing personnel can replay parts of the session were marketing graphics/movies are being presented to study consumer reaction, employee presentation technique, etc.

In one embodiment, metrics are extracted and compared across multiple ECDU sessions to improve the sales process and efficiency. FIG. 97 shows an ECDU product analysis metrics summary for a selected product across multiple ECDU session. Comparison of metrics across ECDU sessions allows one to see anomalies and/or trends. For example, if a salesman is not spending a sufficient amount of time talking about the product and/or using the stylus to illustrate key points. This can lead to targeted training to improve any employee weaknesses. Also, study of these metric summaries provides an audit trail that all the sales tools are being used on the sales that didn't happen, etc. Consumer eye focus data shows whether the quality of the graphics and/or multi-media presentations needs improvements. Finally, when sales times and attention metrics are high and sales continue to lag then most likely product improvements are indicated.

FIG. 98 describes the functionality of the script builder in one embodiment. Script builder is a generic term for the capability to generate the electronic format files that the interpreter in the ECDU can run. At a high level, the script builder can either edit existing scripts or create new scripts. The script builder consists of a large set of tools (shown on the right in the figure) that are useful in editing and creating new scripts. For example, import text tools are available for importing existing text based contracts. Moreover, an auto format tool is available for quickly breaking imported text into ECDU screen size chunks. As shown in the figure, the script builder has various tools for adding the ECDU functionalities to the contract and disclosure.

The scripts that the script builder creates are EXE files compiled from higher level languages (e.g. Visual Basic, Visual C, Java, etc.) in one embodiment, or are HTML (e.g. tagged ASCII text) in another embodiment.

Figure 99:
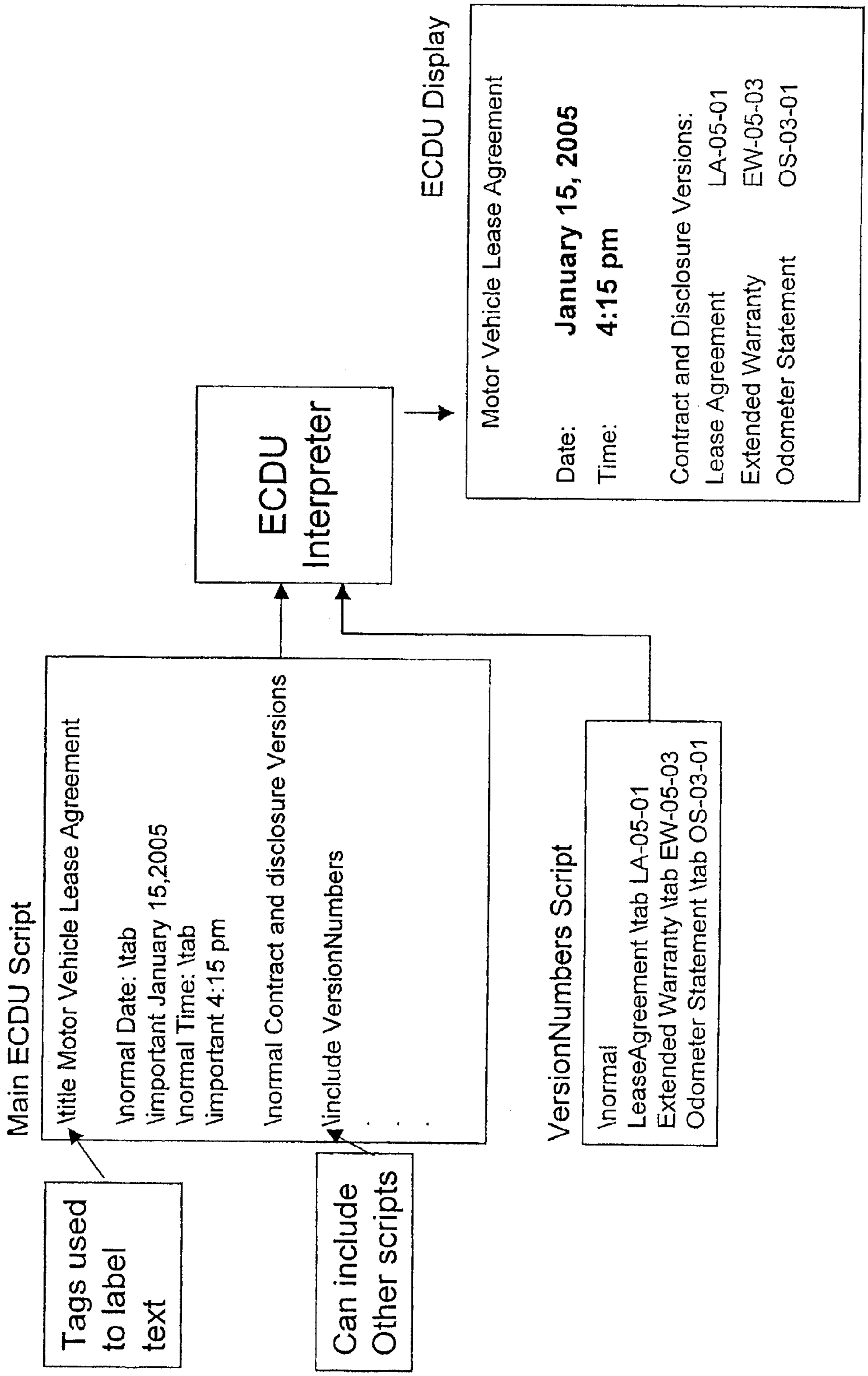
FIG. 99 illustrates an ECDU interpreter.

The ECDU runs contracts and disclosures by interpreting the electronic format as seen in the embodiment of FIG. 99. As discussed above, the electronic format typical is binary executables compiled from Visual Basic (or other high level languages) or is text scripts containing ASCII text and tags. The interpreter reads in these electronic files, processes them, and displays the information one screen-full at a time on the ECDU display. These electronic format files contain instructions to use the various ECDU tools; i.e. Emphasis Tool, Emphasis Bubble Tool, Pop-Up Glossary Tool, Signature Capture Tool, Fingerprint Capture Tool, etc.

Specifically, FIG. 99 shows a HTML-like tag approach where the script files contain ASCII text and tags. In this case, the interpreter is very similar to the HTML interpreters that exist in web browsers. In fact, the ECDU application software is implemented (in whole or in part) as a web based application available through web browsers in one embodiment. An alternative embodiment, script files are used in EXE format. These EXE files are "interpreted" by OS. Sub-scripts could be other EXE or DLL files that are called by the main script and loaded using the OS.

Figure 100:
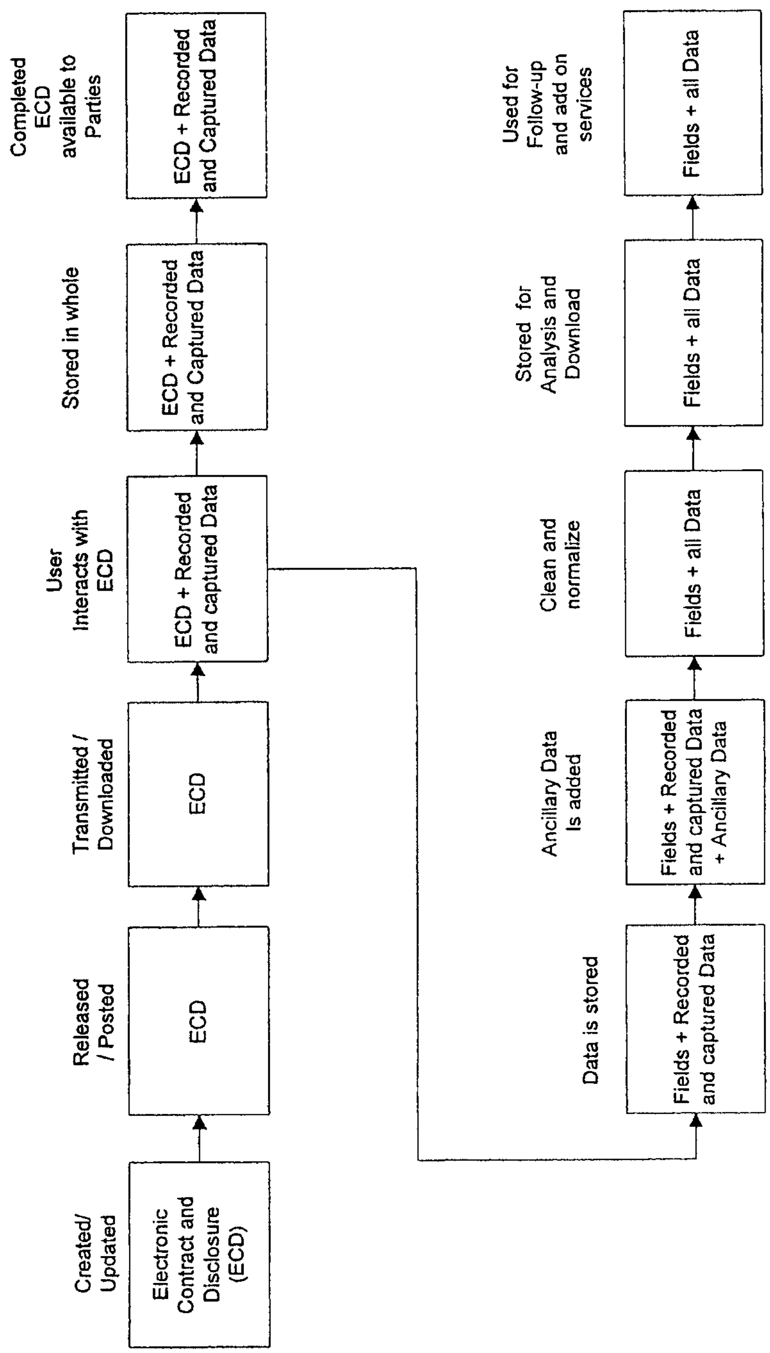
FIG. 100 shows sample evolution of electronic contract and disclosures (ECD).

FIG. 100 illustrates the evolution of an Electronic Contract and Disclosure (ECD) in one embodiment. The top row of the Figure shows the main flow of the document. Starting on the left, the ECD is created (or updated), posted, downloaded, completed by the customer using the ECDU, stored in whole, and made available to both parties in various formats. The bottom row shows a secondary evolution. After, the ECD is completed by the customer using the ECDU, the captured data with fields is stored, ancillary data is added (e.g. no call list information), data is cleaned and normalized (e.g. abbreviations expanded, etc), stored for analysis (e.g. Pattern analysis discussed below, see FIG. 101) and used for follow-up and add on services.

For example, the ECDU can output the completed ECD with captured and recorded data in either a single, multimedia record or multiple records. Moreover, these records can stored in a secure database architecture either locally or in a central data repository.

Over time, the data repository builds up multiple records of purchase sessions for a given consumer, shown in the embodiment of FIG. 101. Relevant comparisons to these stored session datasets can prove valuable in many ways. For example, identity fraud is obvious, when the fingerprint data doesn't approximately match the many previously stored versions, the photo doesn't resemble the previous versions, and the signature may not be very close either. Still another example, if the user's pulse or other biometric feedback data is not similar to previous values then perhaps he was under undue stress (i.e. high pressure sales). Furthermore, inconsistent location information, e.g. buying big ticket items away from home, might be an indicator of fraud. In another example, if the consumer claims that the terms weren't fully disclosed, then comparison with historic disclosure rates is used to show that he studied this contract as closely as he studied previous ones. These types of relative comparisons are enabled by the ECDU system described in this document. Thus, this database for a given user can benefit both parties in future disputes.

The database of stored ECDU sessions also has other benefits. Analysis of how and which products were offered, how many products were sold, effectiveness of static ads and ad videos, and how many and which type of vehicles sold have value. Also, real-time data to suppliers indicating what type of vehicles are being sold and in which area are used to adjust delivery and manufacturing schedules.

What is claimed is:

1. An automated system for managing a business transaction requiring at least the presentation of documents by a first user and the signing of documents by a second user, the automated system comprising:

a housing having a substantially flat upper surface, the housing being sized and configured for placement between the first user and the second user with the upper surface being oriented to be accessible to the first user and to the second user;

a digitizing display within the housing and visible through the upper surface of the housing, the digitizing display including a video display on which images of documents can be displayed and a digitizer configured to detect motion of at least one associated stylus on the upper surface of the housing;

a collaborative volume defined above the flat upper surface of the housing within which the first user and the second user interact with each other and with the digitizing display during the business transaction;

a computer operatively coupled to the digitizing display;

software in the computer that, when executed, displays images of documents associated with the business transaction on the video display and receives from the digitizer data indicative of the motion of the at least one associated stylus on the upper surface of the housing;

the software, when executed, permitting pages of documents associated with the business transaction to be displayed in one orientation for the first user and to be displayed in another orientation for the second user;

an imaging device configured to capture digital images of physical documents associated with the business transaction, the imaging device being coupled to the computer for transmitting the captured digital images to the computer;

the software, when executed, incorporating the captured digital images of physical documents from the imaging device into the electronic record of the business transaction.

2. An automated system for controlling a business transaction as claimed in claim 1 wherein the imaging device comprises a camera.

3. An automated system for controlling a business transaction as claimed in claim 2 wherein the camera is mounted to the housing.

4. An automated system for controlling a business transaction as claimed in claim 3 wherein the camera is mounted to a swing arm and the swing arm is pivotally mounted to the housing for positioning the camera in different positions.

5. An automated system for controlling a business transaction as claimed in claim 1 wherein the imaging device comprises a scanner.

6. An automated system for controlling a business transaction as claimed in claim 1 further comprising an audio system in the housing and coupled to the computer, the audio system being configured to produce sounds during the business transaction from at least one location displaced from the video display whereby the source of the sounds appears to the first and second users to be generally from within the collaborative volume during the business transaction.

7. An automated system for controlling a business transaction as claimed in claim 6 wherein the audio system produces sounds during the business transaction from at least a first location adjacent one side of the video display.

8. An automated system as claimed in claim 7 wherein the audio system produces sounds during the business transaction from the first location and at least a second location adjacent another side of the video display.

9. An automated system as claimed in claim 8 wherein the second location is on an opposite side of the video display from the first location.

10. An automated system as claimed in claim 9 wherein the audio system comprises a speaker in the housing at the first location.

11. An automated system as claimed in claim 10 wherein the audio system further comprises a speaker in the housing at the second location.

12. An automated system as claimed in claim 6 wherein the audio system comprises at least one speaker in the housing.

13. An automated system as claimed in claim 12 wherein the audio system comprises at least two speakers in the housing.

14. An automated system as claimed in claim 13 wherein the two speakers are located adjacent respective sides of the digitizing display.

15. An automated system as claimed in claim 14 wherein the two speakers are located adjacent opposite sides of the digitizing display.

16. An automated system as claimed in claim 6 wherein the sounds include a voice reciting information from documents displayed on the video display in one or more languages.

17. An automated system as claimed in claim 6 where the sounds include sounds related to advertising to the second user.

* * * * *